United States Patent [19]
Reed et al.

[11] Patent Number: 6,088,717
[45] Date of Patent: Jul. 11, 2000

[54] COMPUTER-BASED COMMUNICATION SYSTEM AND METHOD USING METADATA DEFINING A CONTROL-STRUCTURE

[75] Inventors: Drummond Shattuck Reed; Peter Earnshaw Heymann; Steven Mark Mushero; Kevin Benard Jones; Jeffrey Todd Oberlander, all of Seattle, Wash.

[73] Assignee: OneName Corporation, Seattle, Wash.

[21] Appl. No.: 09/143,888

[22] Filed: Aug. 31, 1998

Related U.S. Application Data

[63] Continuation of application No. 08/722,314, Sep. 27, 1996, Pat. No. 5,862,325, which is a continuation-in-part of application No. 08/609,115, Feb. 29, 1996.

[51] Int. Cl.$^7$ .................................................. G06F 15/16
[52] U.S. Cl. ..................... 709/201; 709/212; 709/227; 709/229; 709/242; 709/244; 707/10; 707/104; 707/203; 707/204
[58] Field of Search .................................. 709/200–203, 709/212, 216–219, 227–229, 232, 242–244; 707/1, 9–10, 100–104, 200–204

[56] References Cited

U.S. PATENT DOCUMENTS

| | | | |
|---|---|---|---|
| 4,274,139 | 6/1981 | Hodgkinson et al. | 709/203 |
| 4,432,057 | 2/1984 | Daniell et al. | 707/8 |
| 4,558,413 | 12/1985 | Schmidt et al. | 707/203 |
| 4,604,686 | 8/1986 | Reiter et al. | 395/500.46 |
| 4,714,992 | 12/1987 | Gladney et al. | 707/206 |
| 4,714,995 | 12/1987 | Materna et al. | 707/201 |
| 4,745,559 | 5/1988 | Willis et al. | 705/37 |
| 4,746,559 | 5/1988 | Nishikawa | 428/142 |
| 4,815,030 | 3/1989 | Cross et al. | 707/10 |
| 4,974,149 | 11/1990 | Valenti | 709/217 |
| 5,008,814 | 4/1991 | Mathur | 709/221 |
| 5,008,853 | 4/1991 | Bly et al. | 345/331 |
| 5,019,963 | 5/1991 | Alderson et al. | 707/201 |
| 5,133,075 | 7/1992 | Risch | 707/201 |
| 5,155,847 | 10/1992 | Kirouac et al. | 709/221 |

(List continued on next page.)

OTHER PUBLICATIONS

C. Bowman, P. Danzig, D. Hardy, U. Manber, M. Schwartz & D. Wessels "Harvest: A Scalable, Customizable Discovery and Access System" Mar. 12, 1995.

D. Hardy & M. Schwartz "Customized Information Extraction as a Basis for Resource Discovery" Mar., 1994.

William G. Camargo "The Harvest Broker", Dec., 1994.

D. Bulterman, G. van Rossum and R. van Liere "A Structure for Transportable, Dynamic Multimedia Documents" USENIX, Summer '91 Nashville, TN.

G. Almes and C. Holman "Edmas: An Object–Oriented, Locally Distributed Mail System" IEEE Transactions on Software Engineering, Sep., 1987.

G. Almes, A. Black, C. Bunje and D. Wiebe "Edmas: A Locally Distributed Mail System" IEEE, 1984.

*Primary Examiner*—Ahmad F. Matar
*Assistant Examiner*—Bharat Barot
*Attorney, Agent, or Firm*—Wolf, Greenfield & Sacks, P.C.

[57] ABSTRACT

An automated communications system operates to transfer data, metadata and methods from a provider computer to a consumer computer through a communications network. The transferred information controls the communications relationship, including responses by the consumer computer, updating of information, and processes for future communications. Information which changes in the provider computer is automatically updated in the consumer computer through the communications system in order to maintain continuity of the relationship. Transfer of metadata and methods permits intelligent processing of information by the consumer computer and combined control by the provider and consumer of the types and content of information subsequently transferred. Object oriented processing is used for storage and transfer of information. The use of metadata and methods further allows for automating may of the actions underlying the communications, including communication acknowledgements and archiving of information. Service objects and partner servers provide specialized data, metadata, and methods to providers and consumers to automate many common communications services and transactions useful to both providers and consumers. A combination of the provider and consumer programs and databases allows for additional functionality, including coordination of multiple users for a single database.

99 Claims, 47 Drawing Sheets

U.S. PATENT DOCUMENTS

| | | | |
|---|---|---|---|
| 5,187,787 | 2/1993 | Skeen et al. | 709/300 |
| 5,220,657 | 6/1993 | Bly et al. | 711/152 |
| 5,226,161 | 7/1993 | Khoyi et al. | 709/303 |
| 5,257,369 | 10/1993 | Skeen et al. | 709/229 |
| 5,287,504 | 2/1994 | Carpenter et al. | 707/201 |
| 5,303,379 | 4/1994 | Khoyi et al. | 395/700 |
| 5,359,730 | 10/1994 | Marron | 709/100 |
| 5,404,488 | 4/1995 | Kerrigan et al. | 711/133 |
| 5,426,747 | 6/1995 | Weinreb et al. | 711/203 |
| 5,440,744 | 8/1995 | Jacobson et al. | 709/203 |
| 5,452,447 | 9/1995 | Nelson et al. | 707/205 |
| 5,473,772 | 12/1995 | Halliwell et al. | 709/220 |
| 5,485,370 | 1/1996 | Moss et al. | 709/217 |
| 5,491,820 | 2/1996 | Belove et al. | 707/3 |
| 5,495,610 | 2/1996 | Shing et al. | 709/221 |
| 5,497,491 | 3/1996 | Mitchell et al. | 704/303 |
| 5,499,343 | 3/1996 | Pettus | 709/203 |
| 5,515,508 | 5/1996 | Pettus et al. | 709/203 |
| 5,519,769 | 5/1996 | Weinberger et al. | 379/112 |
| 5,519,875 | 5/1996 | Yokoyama et al. | 707/5 |
| 5,528,490 | 6/1996 | Hill | 705/25 |
| 5,548,726 | 8/1996 | Pettus | 709/221 |
| 5,555,427 | 9/1996 | Aoe et al. | 709/201 |
| 5,557,793 | 9/1996 | Koerber | 709/303 |
| 5,560,012 | 9/1996 | Ryu et al. | 395/101 |
| 5,564,051 | 10/1996 | Halliwell et al. | 707/200 |
| 5,566,302 | 10/1996 | Khalidi et al. | 709/201 |
| 5,577,244 | 11/1996 | Killebrew et al. | 395/703 |
| 5,581,755 | 12/1996 | Koerber et al. | 707/103 |
| 5,581,761 | 12/1996 | Radia et al. | 395/702 |
| 5,581,764 | 12/1996 | Fitzgerald et al. | 395/703 |
| 5,586,311 | 12/1996 | Davies et al. | 707/1 |
| 5,586,326 | 12/1996 | Ryu et al. | 395/701 |
| 5,596,720 | 1/1997 | Hamada et al. | 709/206 |
| 5,596,746 | 1/1997 | Shen et al. | 707/101 |
| 5,600,834 | 2/1997 | Howard | 707/201 |
| 5,608,874 | 3/1997 | Ogawa et al. | 709/346 |
| 5,615,112 | 3/1997 | Liu Sheng et al. | 707/104 |
| 5,619,710 | 4/1997 | Travis, Jr. et al. | 709/203 |
| 5,623,656 | 4/1997 | Lyons | 709/203 |
| 5,623,661 | 4/1997 | Hon | 707/1 |
| 5,625,818 | 4/1997 | Zarmer et al. | 707/104 |
| 5,628,005 | 5/1997 | Hurvig | 707/8 |
| 5,630,092 | 5/1997 | Carreiro et al. | 711/111 |
| 5,630,116 | 5/1997 | Takaya et al. | 707/201 |
| 5,634,010 | 5/1997 | Ciscon et al. | 709/203 |
| 5,640,564 | 6/1997 | Hamilton et al. | 709/303 |
| 5,644,710 | 7/1997 | Johnson et al. | 713/200 |
| 5,644,764 | 7/1997 | Johnson et al. | 707/103 |
| 5,649,192 | 7/1997 | Stucky | 707/103 |
| 5,652,887 | 7/1997 | Dewey et al. | 709/303 |
| 5,668,997 | 9/1997 | Lynch-Freshner et al. | 709/303 |
| 5,673,322 | 9/1997 | Pepe et al. | 380/49 |
| 5,682,532 | 10/1997 | Remington et al. | 709/303 |
| 5,684,984 | 11/1997 | Jones et al. | 707/10 |
| 5,684,991 | 11/1997 | Malcolm | 707/204 |
| 5,689,708 | 11/1997 | Regnier et al. | 709/302 |
| 5,706,434 | 1/1998 | Kremen et al. | 709/218 |
| 5,710,918 | 1/1998 | Lagarde et al. | 707/10 |
| 5,721,911 | 2/1998 | Ha et al. | 707/100 |
| 5,761,677 | 6/1998 | Senator et al. | 707/203 |
| 5,761,678 | 6/1998 | Bendert et al. | 707/204 |

OTHER PUBLICATIONS

W. Bender, H. Lie, J. Orwant, L. Teodosio, & N. Abramson "Newspace: Mass Media and Personal Computing", USENIX—Summer '91—Nashville, TN.

R. Thomas, H. Forsdick, T. Crowley, R. Schaaf, R. Tomlinson & V. Travers "Diamond: A Multimedia Message System Built on a Distributed Architecture" IEEE, Dec. 1985.

S. Ramanathan & P. V. Rangan "Architectures for Personalized Multimedia" IEEE, 1994.

N. Yankelovich, B. Haan, N. Mevrowitz & S. Drucker "Intermedia: The Concept and the Construction of a Seamless Information Environment" IEEE, Jan. 1988.

D. Woekl, W. Kim & W. Luther "An Object–Oriented Approach to Multimedia Databases" ACM 1986.

N. Borenstein, C. Everhart, J. Rosenberg, A. Stoller "A Multi–media Message System for Andrew" USENIX Winter Conference Feb., 1988.

S. Jackson & N. Yankelovich "InterMail: A Prototype Hypermedia Mail System" Hypertext 91 Proceedings Dec. 1991.

E. Hoffert & G. Gretsch "The Digital News System at Educom: A Convergence of Interactive Computing, Newspapers, Television and High Speed Networks" Communications of the ACM Apr. 1991.

D. Crocker, E. Szurkowski & D. Farber "An Internetwork Memo Distribution Capability—MMDF" IEEE ACM 1979.

Douglas Engelbart "Authorship Provisions in Augment" IEEE, 1984.

J.J. Garcia–Luna–Aceves "Towards Computer–Based Multimedia Information Systems" Computer Message Systems 85, 1986.

Debra P. Deutsch "Implementing Distribution Lists in Computer–Based Message Systems" Computer–Based Message Services, IFIP, 1984.

T. Purdy, D. Thorslund & N. Witchlow "Meridian SL Messaging" Computer Message Systems—85 IFIP, 1986.

Michael Tschichholz "Message Handling System: Requirements to the User Agent" Computer Message Systems—85, IFIP, 1986.

Lother Wosnitza "Group Communication in the MHS Context" Computer Message Systems 85 IFIP, 1986.

Jacob Palme "Distribution Agents (mailing lists) in Message Handling Systems" Computer Message Systems 85 IFIP, 1986.

Teresa F. Lunt "A Model for Message System Security" Computer Message Systems 85 IFIP, 1986.

A. Roger Kave "A User Agent for Multiple Computer–Based Message Services" Computer–Based Message Services, IFIP 1984.

Paul Wilson "Structures for Mailbox System Applications" Computer–Based Message Services, IFIP 1984.

J. Postel, G. Finn, A. Katz & J. Reynolds "The ISI Experimental Multimedia Mail System" Information Sciences Institute, Sep. 1986.

E. Moeller, A. Scheller & G. Schurmann "Distributed Processing of Multimedia Information" IEEE Computer Society Proceedings May 28–Jun. 1, 1990.

Richard L. Phillips "An Interpersonal Multimedia Visualization System" IEEE Computer Graphics & Applications IEEE 1991.

Jacob Palme "You Have 134 Unread Mail! Do You Want to Read Them Now?" Computer–Based Message Services IFIP, 1984.

Michael Caplinger "An Information System Based on Distributed Objects" OOPSLA '87 Proceedings.

M. Papa, G. Ragucci, G. Corrente, M. Ferrise, S. Giurleo and D. Vitale "The Development of an Object–Oriented Multimedia Information System" Lecture Notes in Computer Science, Sep., 1994.

Silvano Maffeis "A Flexible System Design to Support Object–Groups and Object–Oriented Distributed Programming" Lecture Notes in Computer Science, Jul. 1993.

R. Gotze, H. Eirund & R. Claaβen "Object–Oriented Dialog Control for Multimedia User Interfaces" Lecture Notes in Computer Science—Human Computer Interaction Sep. 1993.

Chris Maeda "A Metaobject Protocol for Controlling File Cache Management" Lecture Notes in Computer Science, Mar., 1996.

A. Joseph, A. deLespinasse, J. Tauber, D. Gifford & M. Kaashoek "Rover A Toolkit for Mobile Information Access" SIGOPS '95 1995 ACM.

Wolfgang Lux "Adaptable Object Migration: Concept and Implemenetaion" Operating Systems Review Apr., 1995.

R. Campbell, N. Islam, R. Johnson, P. Kougiouris & P. Madany "Choices, Frameworks and Refinement" Deptment of Computer Science, University of Illinois, Dec. 1991.

Klemens Bohm & Thomas C. Rakow "Metadata for Multimedia Documents" SIGMOD Record, vol. 23, No. 4, Dec. 1994.

Simon Gibbs "Composite Multimedia and Active Objects" OOPSLA '91.

T. Purdin, R. Schlichting & G. Andrews "A File Replication Facility for Berkeley Unix" Software Practive and Experience, vol. 17, Dec. 1987.

A. Black, N. Hutchinson, E. Jul & H. Levy "Object Structure in the Emerald System" OOPSLA '86 Proceedings.

Daniel T. Chang "Coral: A Concurrent Object–Oriented System for Constructing and Executing Sequential, Parallel and Distributed Applications" OOPS Messenger, Apr. 1991.

A. Birrell, G. Nelson, S. Owicki & E. Wobber "Network Objects" Proceedings of the 14th ACM Symposium on Operating Systems Principles, Dec. 5–8, 1993.

Jacques Ferber "Computational Reflection in Class based Object Oriented Languages" OOPSLA '89 Proceedings.

C. Fung & M. Pong "MOCS: an Object–Oriented Programming Model for Multimedia Object Communication and Synchronization" 1994 IEEE.

T. Hase & M. Matsuda "A New Audio–Visual Control Using Message Object Transmission", 1994 IEEE, Nov., 1994.

F. Horn & J. Stefani "On Programming and Supporting Multimedia Object Synchronization" The Computer Journal, vol. 36, No. 1, 1993.

T. Little & A. Ghafoor Spatio–Temporal Composition of Distributed Multimedia Objects for Value–Added Networks, IEEE 1991.

M. Vazirgiannis & C. Mourlas "An Object–Oriented Model for Interactive Multimedia Presentations" The Computer Journal, vol. 36, No. 1, 1993.

T. Little & A. Ghafoor "Synchronization and Storage Models for Multimedia Objects" 1990 IEEE Apr. 1990.

Cosmos Nicolaou "An Architecture for Real–Time Multimedia Communication Systems", 1990 IEEE, Apr., 1990.

Ralf Steinmetz "Synchronization Properties in Multimedia Systems" 1990 IEEE, Apr. 1990.

T. Little & A. Ghafoor "Network Considerations for Distributed Multimedia Object Composition and Communication" 1990 IEEE Network Magazine, Nov., 1990.

K. Smith and S. Zdonik "Intermedia: A Case Study of the Differences Between Relational and Object–Oriented Database Systems" OOPSLA '87 Proceedings.

S. Ramanathan & P. Rangan "Architectures for Personalized Multimedia" 1994 IEEE.

Marvin Sirbu and J.D. Tygar, "Netbill: An Internet Commerce system Optimized For Network–Delivered Services", IEEE Personal Communications Magazine, p. 34–39, Aug. 1995.

Henrik Eriksson, "Expert System As Knowledge Servers", IEEE Expert Magazine, p. 14–19, Jun. 1996.

Budi Yuwono and Dik Lun Lee, "Wise: A World Wide Web Resource Database System", IEEE Transactions on Knowledge and Data Engineering, vol. 8, No. 4, Aug. 1996.

H. Penny Nii "Blackboard Systems" The AI Magazine, Summer, 1986.

AppleShare, Apr. 1995.

"Manual Page for Unix NFS Mount Command" No Date.

"Manual Page for Unix FSTAB Command" No Date.

Phil Lapsley and Brian Kantor "Network News Transfer Protocol", Feb. 1986.

Brain Kantor and Phil Lapsley, Network News Transfer Protocol, "A Proposed Standard for the Stream–Based Transmission of News", Feb. 1986.

M. Crispin "Network Working Group", University of Washington, Dec., 1996.

Terry Gray Comparing Two Approaches to Remote Mailbox Access: IMAP vs. POP, University of Washington No Date.

Terry Gray "Message Access Paradigms and Protocols", University of Washington, Aug. 1995.

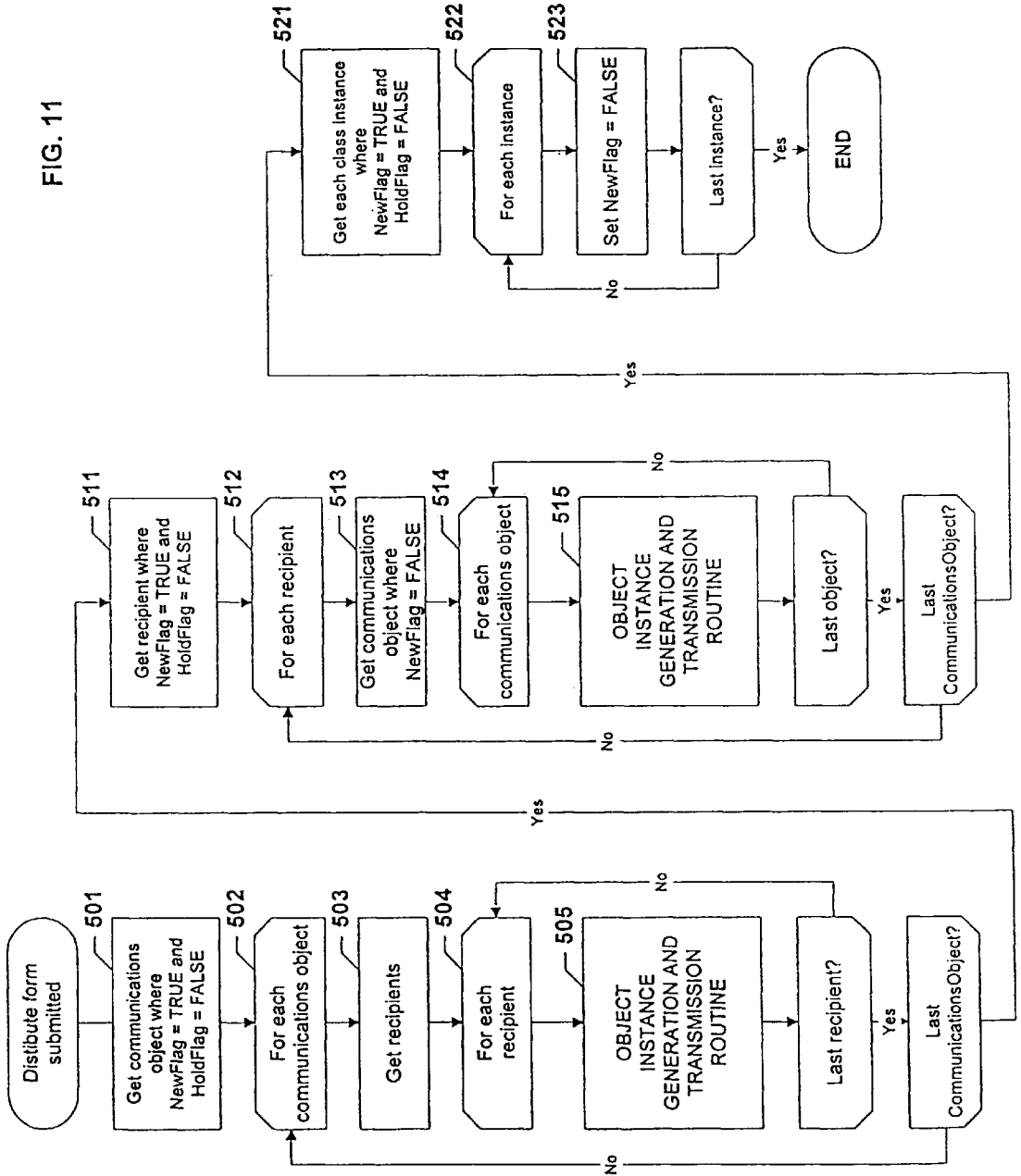

FIG. 15
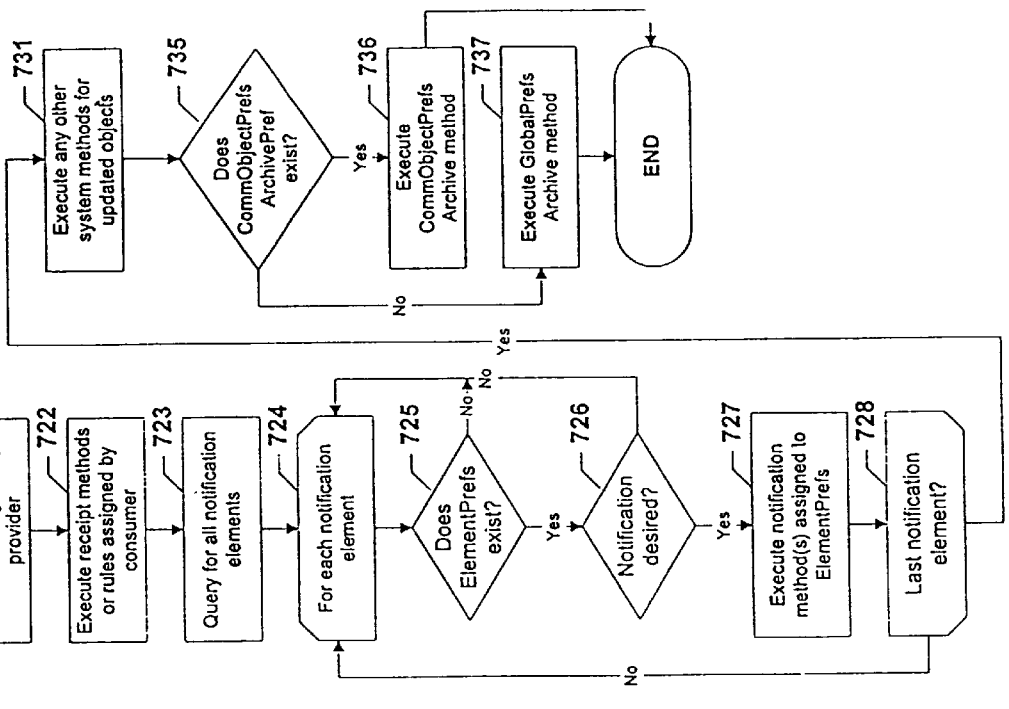
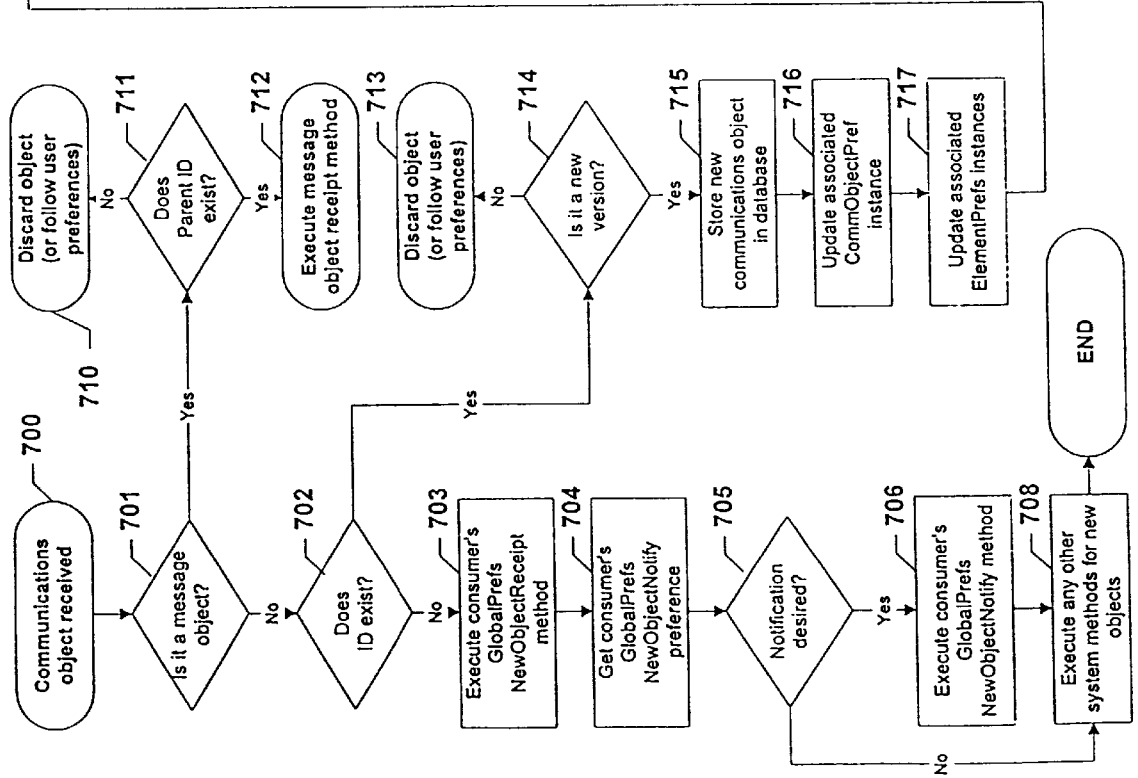

Technical Support Form

Please answer each section as completely as possible.
The more details you provide, the more likely we will be able to address your problem.

USER INFORMATION

Your name: John Doe

Email address: johnd@internet.com

Operating System: Windows 95

Beta Version: Beta 2 Release

Web Browser and Version: Netscape 3.0

Problem Type: Please select one below

QUESTION/PROBLEM:

If you are having a problem, please try to describe what you were doing prior to experiencing the problem. Also please include what you have already tried to fix the problem.

Submit your question | Clear this form

FIG. 27

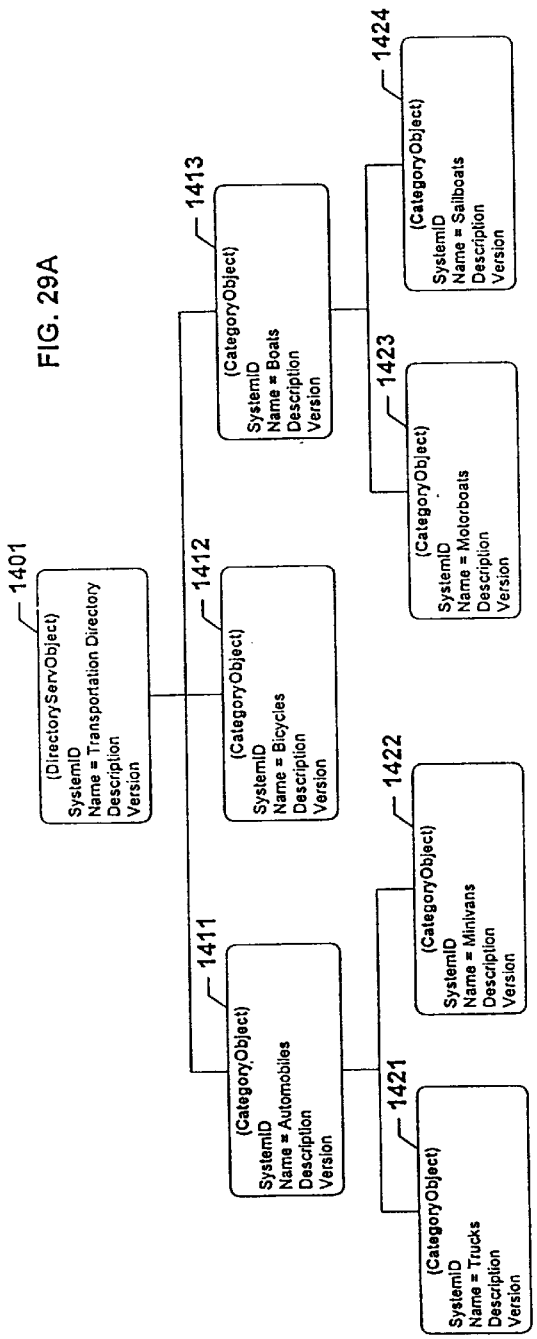
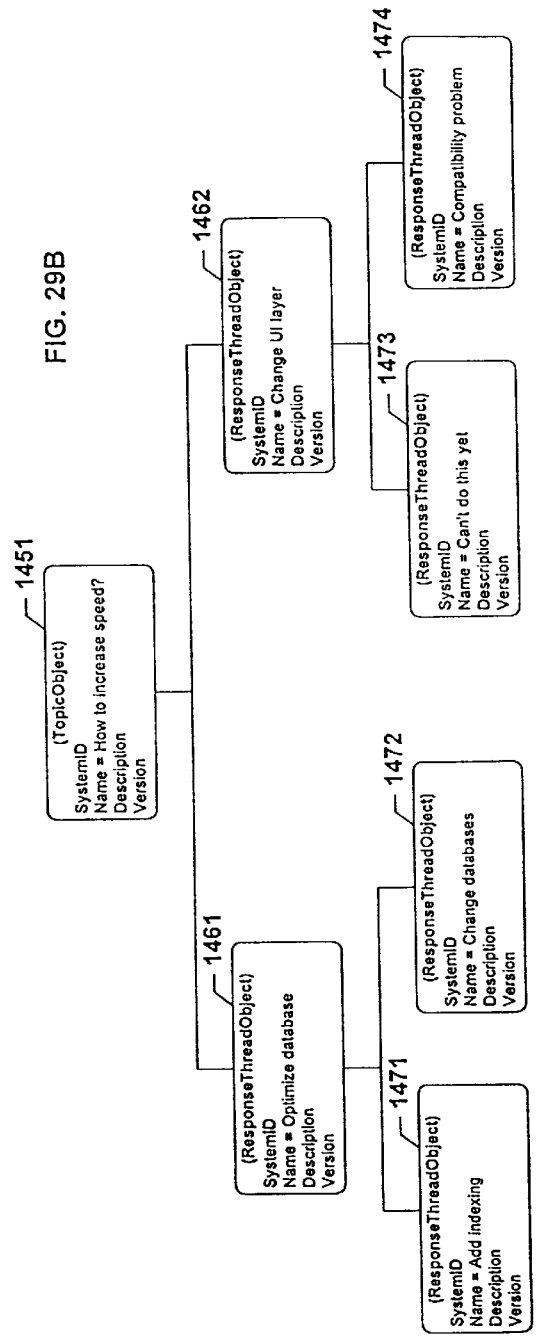
FIG. 29A
FIG. 29B

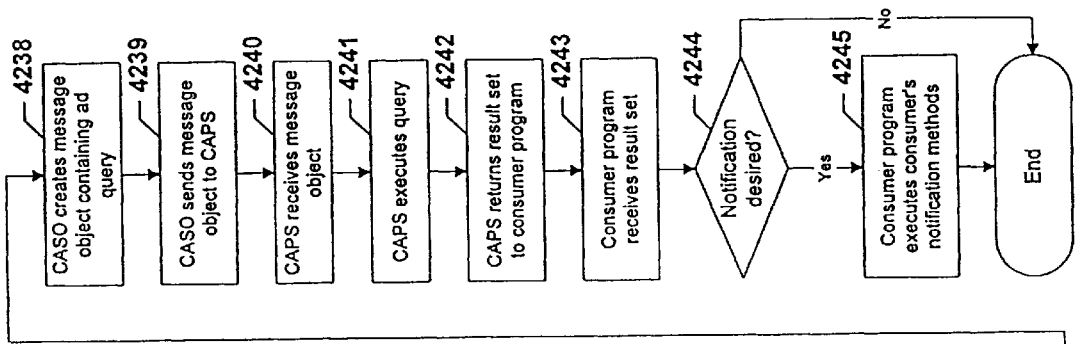
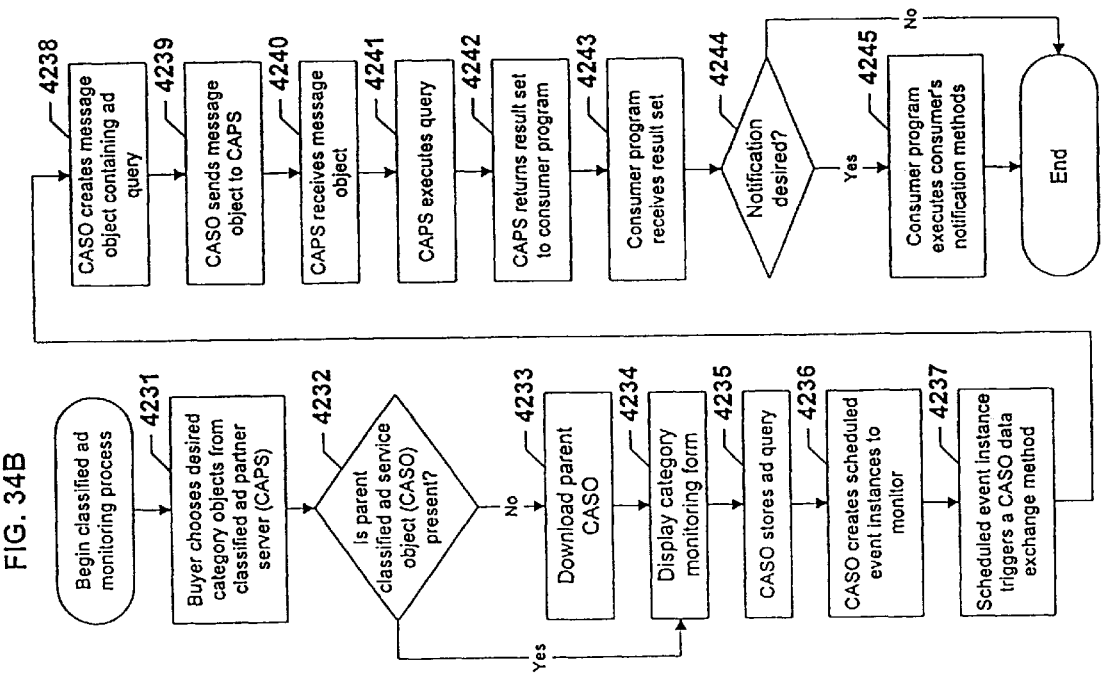
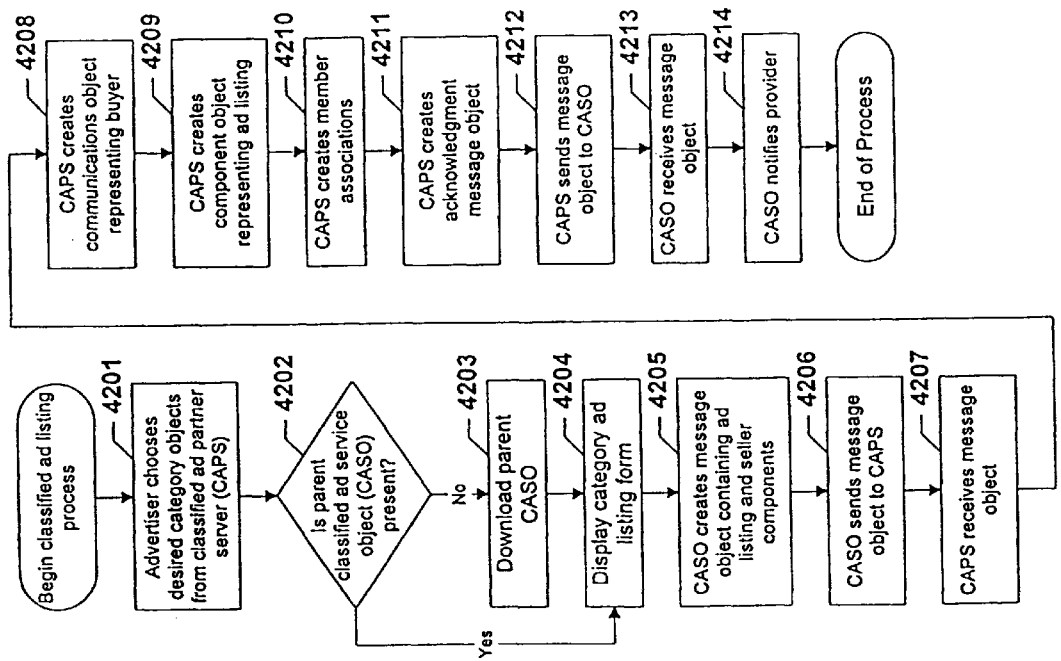

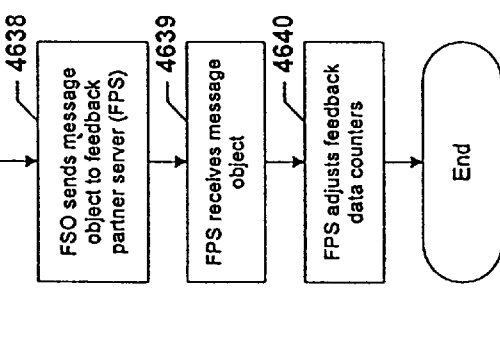
FIG. 41B
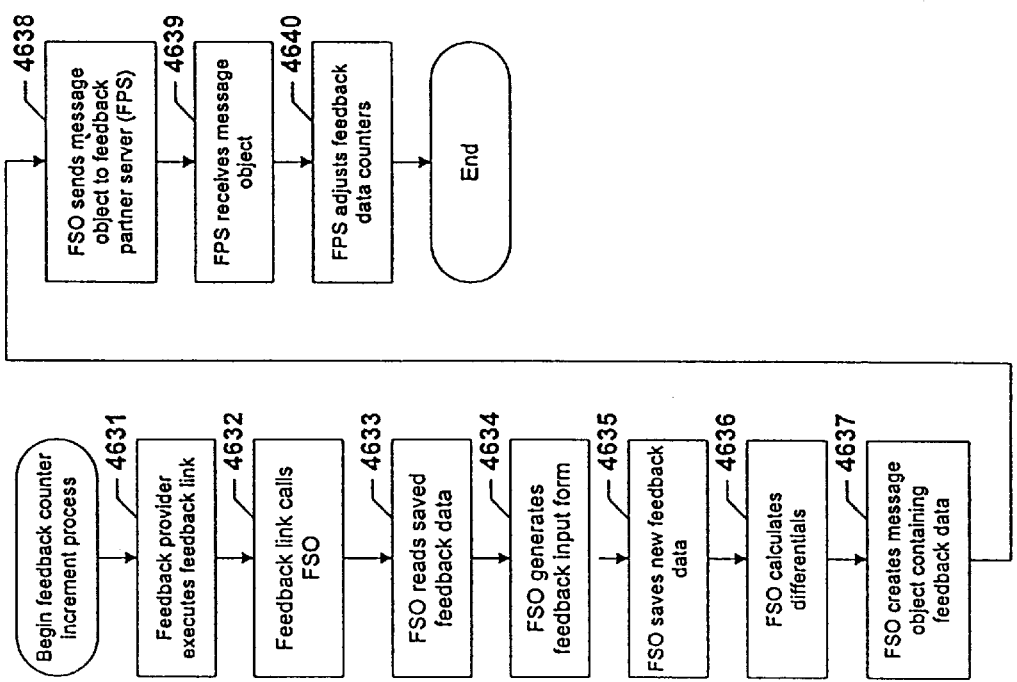
FIG. 41A
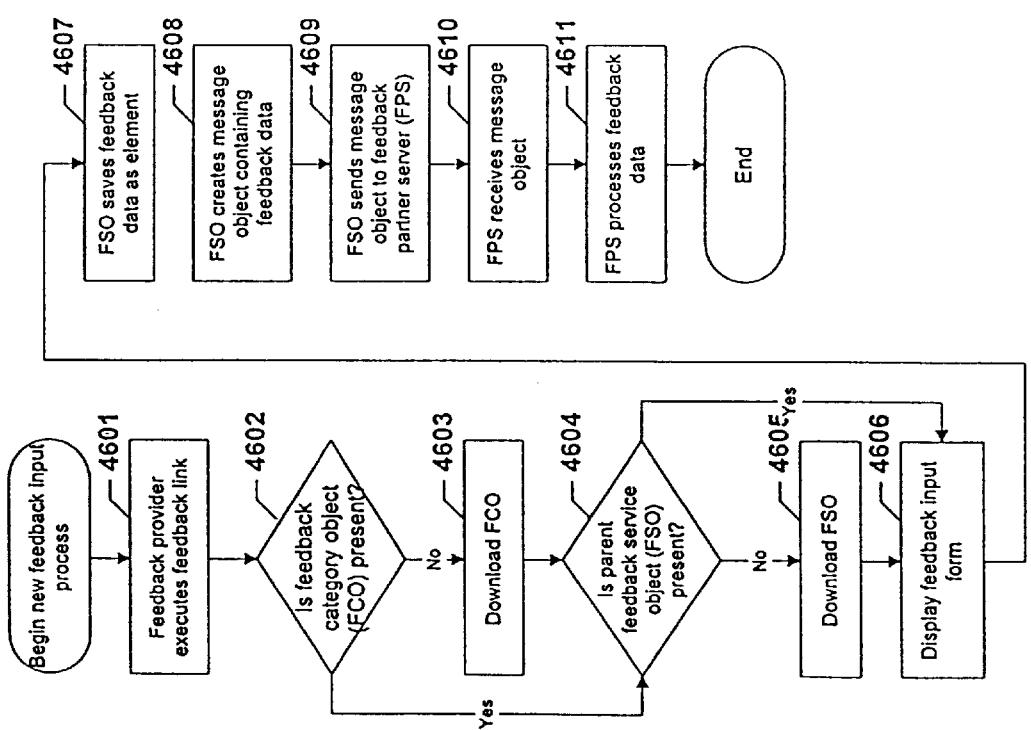

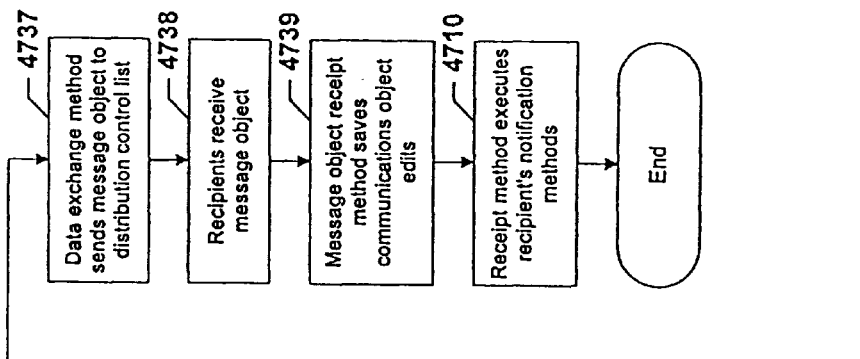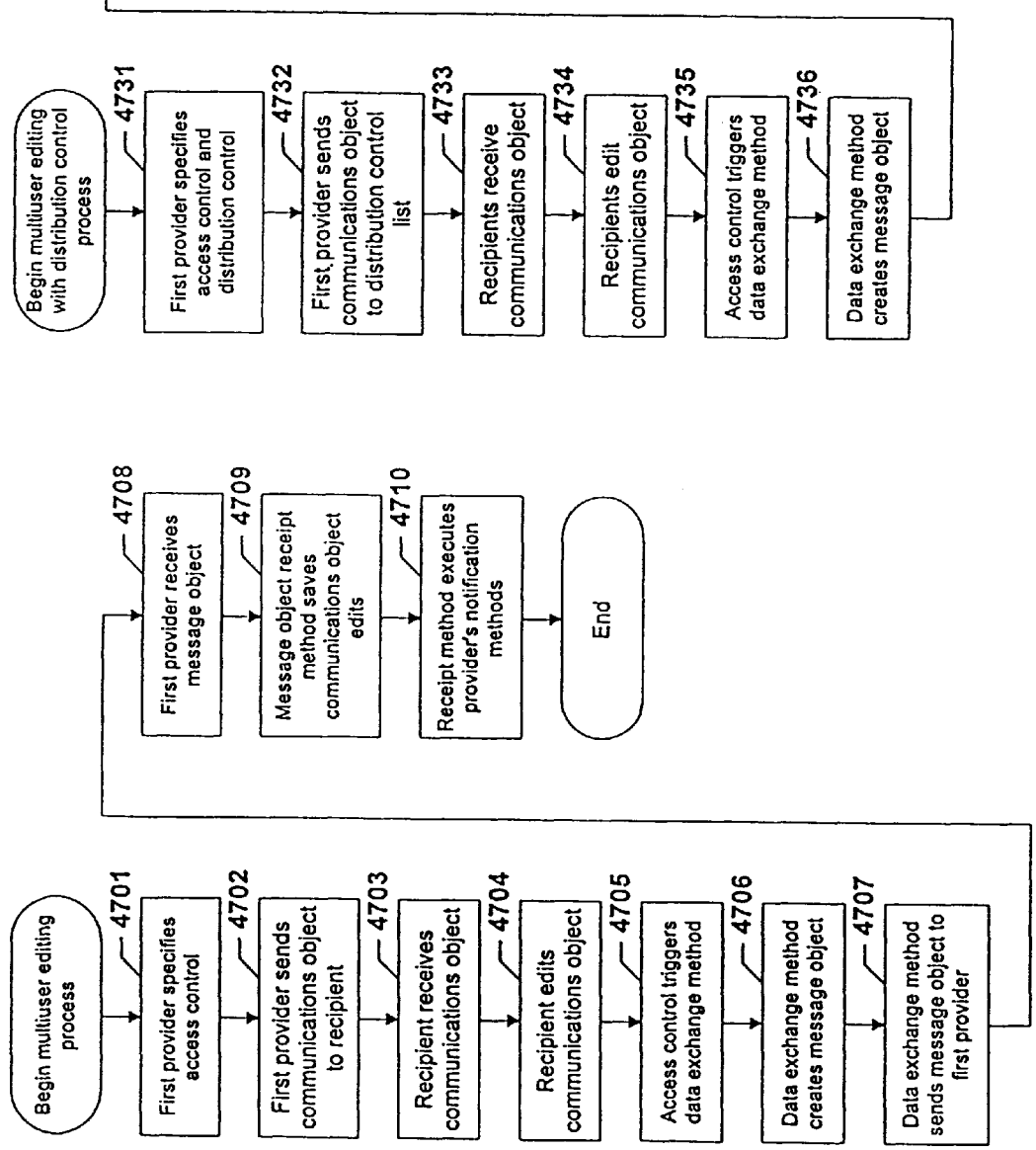

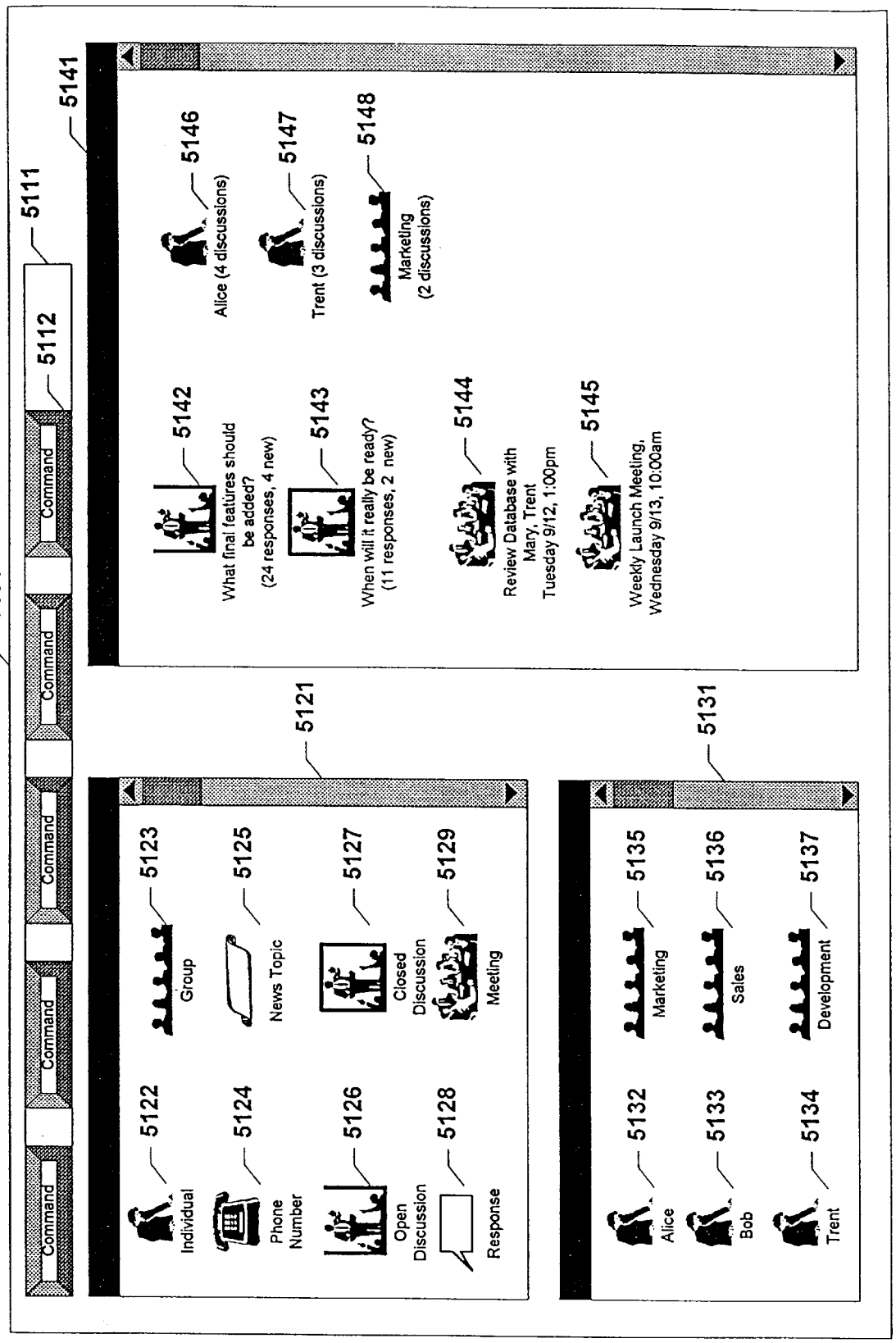

COMPUTER-BASED COMMUNICATION SYSTEM AND METHOD USING METADATA DEFINING A CONTROL-STRUCTURE

This application is a continuation of application Ser. No. 08/722,314, filed Sep. 27, 1996 (allowed) now U.S. Pat. No. 5,862,325 which is a continuation-in-part of application Ser. No. 08/609,115, filed Feb. 29, 1996 (pending).

BACKGROUND OF THE INVENTION

1. Field of the Invention

The present invention relates to data communications systems. More particularly, it relates to an automated communications system which coordinates the transfer of data, metadata, and instructions between databases in order to control and process communications.

2. Discussion of the Related Art

All communications consist of a mechanism for exchanging information between one entity, a provider, and another, a consumer. The terms "provider" and "consumer" are used to designate separate functions in information transfers. Typically an entity, at various times, operates as both a provider and a consumer in any communication relationship. These relationships may be one-to-one, such as between two individuals; one-to-many, such as between company and its customers; or many-to-many, such as between the members of a workgroup. These communications relationships may also exist over multiple communications networks, such phone networks, LANs, public data communications networks, radio and TV networks, wireless networks, and conventional postal mail networks.

Establishing, maintaining, operating, and even terminating any one of these types of communications relationships involves significant work on the part of both the provider and consumer. For example, to initiate any type of communications relationship, providers must first locate the consumers with whom to communicate and vice versa. Solving this problem is subject of several entire industries, such as the directory industry, the mailing list industry, and the advertising industry. Once a provider or consumer has been identified, contact information (e.g., names, titles, addresses, telephone numbers, electronic mail addresses, etc.) must be exchanged between the provider and consumer. This contact information must be maintained by both parties so that future communications can be effected as needed. When the contact information changes for an entity, all providers or consumers having relationships with the entity must be notified of the changes, who in turn must update their own records. This work also extends to other data and records exchanged in the context of the communications relationship, e.g. orders, receipts, product numbers, invoice numbers, customer numbers, notes, brochures, reports, etc. Maintenance of this information requires significant human time involvement for receiving information, storing information, indexing information, searching for desired information, and retrieving information. The human component of record maintenance also creates a potential for error, which can cause the information to be faulty or to become lost.

Once the communications relationship is established, the next major workload is the active use of the relationship to accomplish communications objectives. The problems here take different forms depending on the type of communications relationship. For example, in a one-to-many relationship, particularly a mass-market relationship such as a company and its customers, the problem is how to efficiently disseminate information about products and services to consumers. Optimally, such information would be disseminated only to the consumers who need the information, only at the precise time they need it, and only via the communications network the consumer preferred. However, knowing who needs what information, when, and how can be very difficult. Therefore, providers typically disseminate information widely in the form of mass advertisements and mailings via all possible communications mediums in order to reach all likely consumers. Because of this broad dissemination by providers, consumers receive large amounts of information, much of which is irrelevant to them. Consumers are forced to sort and filter through this information, and frequently much of it is discarded. Information which is kept may not be immediately useful, but may be needed at a later time. Unless the consumer expends a great deal of work to store, catalog, and index this information, the information can be difficult or impossible to find when the consumer actually needs it.

This same problem of efficient information distribution is exacerbated in many-to-many communications relationships, such as among the members of a workgroup. Here, communications are much more frequent and timely, and there is much greater quantity of information to be shared, stored, archived, and indexed. Members of a workgroup also have a strong need to employ communications for group coordination, such as scheduling meetings, conference calls, project deadlines, etc. These communications involve time deadlines and feedback requirements which are not typically present in one-to-many communications relationships.

With one-to-one communications relationships, the problem of efficient information disemination is lessened because the parties typically have a much higher knowledge of each other's needs and interests. Conversely, the need to use communications for coordination purposes is greatly increased, largely because between individuals the need for real-time communications sessions such as phone calls and personal meetings is acute. Thus the universal problem of "phone-tag", when both parties exchange numerous messages trying to coordinate the opportunity to communicate in real time.

The next workload involved in communications relationships is when the parties need to exchange, process, and store structured data. In a one-to-many communications relationship, a common example is a consumer ordering a product. The consumer must place a telephone call, locate a salesperson, and then manually transmit the necessary ordering information, which the salesperson must manually record. Paper or electronic product order forms can help automate this process for the provider, but they still must be filled out manually by the consumer. Many of these forms require the same standard information from the consumer, which the consumer must enter repeatedly. All of these information transfers require human involvement and thus create the potential for data errors. On the provider's part, more work is required to perform error checking on the order, process it, and in many cases return an acknowledgment to the consumer. Many providers invest heavily in data processing and electronic communications systems for automating these functions. However, the lack of a standard communications system for exchanging common data means that providers adopt largely proprietary systems, increasing the investment necessary for every provider. In addition, consumers must still interact with each these systems manually.

In a many-to-many communications relationship, such as a workgroup, the need for structured data exchange is even higher, especially when automated data processing tools such as computer software are in widespread use. Also, the need for structured data exchange for workgroup coordination activities, such as scheduling and planning, grows significantly.

One-to-one communications relationships may also involve strong needs for structured data exchange. For example, two individuals from different companies may need to review and revise a document involving both companies. The ability to do so electronically, using a secure method of exchange over public data networks, would make the task considerably easier. Individuals involved with one-to-one communications relationships also have an acute need to use structured data exchange to solve the problem of scheduling communications sessions, i.e. the phone-tag problem.

Since all communications relationships are inherently dynamic, they involve three other common tasks involved for providers and consumers: copying the relationship, transfering the relationship, and terminating the relationship. Copying is when one consumer wants to share a particular communications relationship with another consumer. For example, a mail-order catalog customer may wish to give a copy of the catalog to a friend, or a businessperson may need to share the phone number of a colleague with a customer. Transferring is when one provider assumes a consumer communications relationship from another, or one consumer assumes a provider communications relationship from another. An example would when a company changes the salesperson responsible for the customers in a sales territory, or when a customer transfers ownership of a product. Termination is when either a provider or consumer wishes to end a communications relationship, i.e. a provider no longer wants to distributes information, and/or a consumer no longer wants to receive, process, or store the information. A widespread example is consumers who wish to be dropped from direct mailing lists, and the providers who wish they could efficiently identify such consumers to save mailing costs. All three of these common, everyday communications relationship operations involve considerable effort on the part of the provider and consumers to carry out.

Therefore, a need exists for a communications system which allows providers and consumers to quickly and easily establish an automated communications relationship, one in which the data necessary to operate the communications relationship is exchanged and updated automatically, and which can control all types of communications via all types of communications network common to both the provider and consumer. A need also exists for a communications system which allows a provider to actively notify a consumer of new information in which the consumer may be interested, and which allows the consumer to precisely filter the information being sent by one or more providers. A need also exists for a communications system which allows providers and consumers to automatically structure, exchange, and process incoming or outgoing communications to the greatest extent possible. A need also exists for a communications system which allows providers and consumers to easily share access to many common communications services. Finally, a need exists for a communications control system which allows providers and consumers to easily copy, transfer, and terminate communications relationships.

Various computer-based systems have been created to provide mechanisms for communicating information. The Internet and World Wide Web provide a network of a large number of information sources, providing a voluminous amount of information. Computer programs exist which can be executed on Internet-connected computers to search these sources to obtain desired information. Additionally, through the medium of hypertext, providers of World Wide Web pages can create links in their pages between items of related information which can significantly aid consumers in finding desired information. However, the links to the information source are neither dynamic nor persistent; in the sense that they do not provide new or updated information once the consumer has found a topic of interest. "Bookmarks" in a web browser program can facilitate subsequent access to a particular web page to determine if new information is present. However, if the web page referenced by the bookmark is removed, the bookmark is no longer valid. Bookmark polling programs, such as Smart Bookmarks from First Floor, Inc., can also be used to determine whether a web page has changed since the last time the consumer viewed it. In addition, Smart Bookmarks can examine a changed page and automatically transfer to the consumer a text string embedded by the author of the page informing the consumer of the nature of the change. However, Smart Bookmarks' capability is limited to single text strings on single web pages. Therefore the consumer must locate and bookmark every Web page of interest. Smart Bookmarks does not provide a way for the consumer to filter the update messages, nor does it provide the consumer with any mechanism for exchanging structured information or managing a communications relationship with the provider.

A different type of Web monitoring solution is provided by Revnet Systems Inc. With its GroupMaster software, Web providers can create and insert special hyperlinks representing interest topics on the pages of their Web site. When a consumer clicks on this link a special data file is transferred to the consumer's GroupMaster client software. The client software then polls the Web server for updates to the interest topic input by the provider. Unlike Smart Bookmarks, all interest topics at the site can be checked in one update polling action. Update messages can be delivered to the consumer via the client software. However, these messages only contain links back to pages with follow-up information at the Web site. They do not store or index information from the provider, nor do they provide a mechanism for the consumer and provider to automate other types of structured data exchanges or manage a communications relationship.

Online navigation or "auto pilot" software, available from various commercial online services or software companies, can help the user automate access to online services, the Internet, and other public networks. The software provided by these services or companies can include capabilities such as automatic logons, automatic navigation of the online system according to consumer preferences, file searches, uploading and downloading data, and storage of data. Some systems can also automatically download the data necessary to update their own operation. However, the navigation software available from the online services typically requires that the consumer first establish an account with the online service, and may also involve establishing accounts with specific providers on the service. In addition, these navigator programs are specifically designed to work with the architecture and communications protocols of the online service, and cannot be easily adapted to other data communications networks, thus preventing other providers from using the functionality of the online service to create and distribute data in the same manner. Finally, they require that the consumer set up and maintain a communications relationship with each information provider on the service. If the provider changes its information offerings, the consumer must reprogram the autopilot or navigation software. This last disadvantage also applies to online navigation programs designed to work with the Internet and other non-proprietary public data networks.

Electronic mail (e-mail) systems are another electronic communications system that provides some communications contact persistence. E-mail addresses and messages can be stored and indexed within e-mail programs, or externally in other locations. E-mail rules engines allow for some degree of automated storage or response to certain message contents. However, these rules engines are typically constrained to acting on certain known information about the messages, such as the address of the message provider, or on semantic rules such as keywords which must be guessed by the provider and consumer. There is no common communications frame of reference, i.e., a structured data format and operations methodology, against which both the provider and consumer can operate to filter, classify, and organize messages. The lack of a common frame of reference also severely limits the capability of either the provider or consumer to automatically process the contents of an e-mail message, or to automatically respond to the message besides the capability to automatically address a reply message.

E-mail systems which support electronic forms overcome some of these limitations. Electronic forms allow the provider to control the content of a forms submission and to automatically or semi-automatically route that data around a network. Electronic forms also allow message consumers to automate a response to the forms provider which can be automatically processed by the provider. However, these forms must be received and processed by the consumer in the same manner as conventional e-mail messages. In other words, they do not provide a means for the consumer to control or filter messages from different providers. Forms also do not provide the consumer with a mechanism for automatically storing, indexing, or processing information from the provider. In addition, while they may automate the provider's ability to process the data returned from the forms, the consumer must still manually enter information in the form.

Specialized e-mail systems have been developed that combine the use of electronic forms with a system-wide data processing model. Examples are The Coordinator from Action Technologies, Inc., or OVAL from the MIT Center for Coordination Science. These systems allow providers and consumers to share a frame of reference for messaging such that messages can be classified into specific categories and actions. This allows message providers and consumers to automate the routing, storage, and processing of messages based on these category and actions. However, these systems require that all providers and consumers share the same frame of reference. They do not provide a generalized means for each provider on the system to establish and update their own frames of reference with one or more consumers, nor a generalized means for each consumer to coordinate the frames of reference they have with different providers.

A different approach to the problem of automating communications is the category of software that is commonly referred to as "software agents" or "mobile agents". An example is a platform for communications applications developed by General Magic, Inc. called Telescript. The Telescript language is an object-oriented, remote programming language with three core concepts: agents, places and "go". Agents "go" to places, where they interact with other agents to get work done on a user's behalf. Agents are mobile programs capable of transporting themselves from place to place in a Telescript network. The language is implemented by the Telescript engine. The Telescript engine is a multitasking interpreter that integrates onto an operating system through a programming interface called the Telescript API. The Telescript engine operates on server computers connected over a communications network. Telescript agents can operate independently anywhere within these server computers to control the transfer of message data and perform programmable actions upon that message data. For example, if a message recipient is not available, the message could be rerouted to a different location, rather than being returned to the sender undelivered. Telescript is similar to other agent technologies in that the architecture is based on agents interacting with other agents on server computers running agent "engines" or interpreters. In this architecture, the establishment of a communications relationship requires two agents: one to represent the provider and one the consumer. Although agent programming systems like Telescript provide the necessary tools for creating these agents, it is still necessary for both the provider and consumer to create and administer the necessary agents. Furthermore, Telescript does not provide a specific model for the filtering, storage, and indexing of communications between a provider and consumer via agents. Lastly, agent architectures require the addition of servers running agent interpreters to the communications network in order to operate, increasing the expense and complexity of the network.

A more specialized type of agent technology is delivery agents. Examples include Digital Delivery from Digital Delivery, Inc. and PointCast from PointCast Inc. Delivery agents do not require a network of specialized servers, but instead operate directly on a consumer's computer to retreive information of specific relevance to the user over a network. They are created by a particular provider to supply information from a server or servers under that providers control, or from a more generalized news source such as a wire service. Delivery agents allow a consumer to specify his/her topics of interest, which the delivery agent then uses to filter the available news stream and show the user only the information of interest. Delivery agents are also capable of storing and indexing the received data for the consumer. Other than communicating the consumer's topic preferences back to the provider, however, delivery agents do not provide a way to control or process other communications between the consumer and provider. In addition, since each delivery agent is typically designed as a separate executable program which must be installed and run separately, the consumer is limited as to the number of delivery agents the consumer can manage and run.

Another approach to automating communications and data transfers is shared replicated database systems such as Lotus Notes and Collabra Share. With these systems, information to be communicated is entered via a client program into one or more databases which may reside locally on client computers or on network server computers. These databases are then replicated to other server computers or local client computers throughout the system so that the data can be easily accessed by any other user of the system who needs the information and has the proper access privileges. Access privileges are controlled by one or more system administrators via the system servers. Some of these systems, notably Collabra Share, also allow users to "subscribe" to specific databases. These users can receive an e-mail notification from a database agent monitoring the database when a new entry or a certain condition has been made in that database. These systems may also employ electronic forms and forms processing languages to structure the data being entered into a database, and to take programmable actions based on the data entered. The architecture of these systems is designed for groups of users to share information related to specific topics, and to automate the transfer of data between different computer applications used by an organization. For this reason the core data structure of the architecture is a subject database or "forum". Each subject database covers a number of related interest topics under which all entries in the database are categorized. All copies of any subject database are synchronized throughout the system when data in any one copy has been changed.

While suitable for information sharing amongst the members of a group, this architecture is not well suited for automating communications relationships among a large number of information providers and consumers. First, all the providers and consumers need to be interconnected through the system in order to communicate. This could be done by having all providers and consumers enroll in one large system in which they all had access privileges. In such a system each provider would need to have at least one subject database for communicating with his/her consumers. This enormous number of subject databases would then need to be replicated among the large number of servers required to service the complete population of the system, which would quickly overwhelm the capacity of the servers or network to handle replication. A more realistic alternative would be to have each provider or group of providers operate and administer their own system, making their internal subject databases available to consumers via public data networks such as the Internet. Consumers would use the system client software to "subscribe" to the subject databases of each provider with which they desire to communicate. Only the subject databases a consumer subscribed to would be replicated on his/her desktop. This solution would spread the replication load to a large number of servers, each handling a smaller amount of traffic. However, each server would now have to manage replication for a large number of external consumers as well as internal group members. There is no easy way to distribute this replication load to the consumer's computer. Second, subject databases do not allow the consumer to control and filter the incoming communications from providers. Consumers must still scan the databases for items of interest. Providers could overcome this by creating a subject database for each interest topic, but the additional administrative and server replication overhead would strongly discourage this. Third, because notification of new information is handled via a separate application, e-mail, the consumer is forced to coordinate notification and data storage/response among two communications systems. Fourth, since subject databases are replicated from the servers, they do not give consumers an easy way to copy or transfer them to other consumers. Finally, because the entire system depends on server-based replication, administrative changes or reconfigurations of these servers such as system name or address changes require administrative updates to all subscribing consumers, a job which consumers must handle manually.

Consequently, a need exists for a communications control system which allows providers and consumers to quickly and easily establish an automated communications relationship; which automatically updates both parties with changes in communications control data from the other; which works with all communications networks shared by the provider and consumer; which allows both parties to automatically control, filter, store, index, and process communications from the other; which allows both providers and consumers to share many common communications services; and which allows both parties to easily manage, copy, transfer, and terminate the communications relationship.

SUMMARY OF THE INVENTION

The disadvantages of existing communications control systems are significantly overcome by the present invention in which software programs being executed by a provider computer and consumer computer communicate directly in order to maintain a communications control structure. This structure originates at the provider computer and is transferred to the consumer computer. Changes to the structure on the provider computer result in an updated version being transferred to the consumer computer. The communications control structure contains a combination of data, metadata, and instructions which are used by the respective programs to control the origination of outgoing communications and the processing of incoming communications between the provider and consumer.

In one aspect of the present invention, a communications system is used to coordinate communications between providers and consumers. Provider computers transfer information stored in the provider computer through a communications network to a consumer computer. The information includes processes for updating the transferred information in the consumer computer when the information in provider computer has changed. For "push" processes, the provider computer maintains address data necessary to transfer updated information to various consumers. For "pull" processes, the consumer computer uses information transferred from the provider to access a location where the provider information is stored to determine whether it has been updated and to retrieve it if necessary.

According to another aspect of the present invention, existing communications networks and network accessing programs are used to increase the functionality of the communications system. The Internet and World Wide Web, or similar type networks, are used to access and transfer the information. According to this aspect, information is created and maintained according to a recognized protocol, such as HTTP, MIME and HTML, which can be used to access other information. An appropriate display program, such as a web browser, is used to retrieve and display the information.

According to another aspect of the present invention, programs operating on the provider computer and consumer computer operate as state machines in connection with an appropriate display program. The programs operate to receive information requests from a display program and to generate a next display containing the requested information.

According to another aspect of the present invention, information is organized in a form which simplifies transfer of data, metadata, and instructions. Object oriented programming is used for combining data, metadata, and methods for storage and transfer. Specialized object classes and type definitions are used to provide intelligence in processing of transferred information. Elements in an transferred object can be used by the consumer computer to filter information and provide selective notification to a user of changed information. The combination of methods and data permits joint control by the provider and consumer over the information transferred, together with how updates, responses, and acknowledgments are processed.

According to another aspect of the invention, a provider program is used to create, edit, and maintain data, metadata and instructions in a provider database. The provider program also controls distribution of the information to various consumers. Different information contained in the provider database can be transferred and used in communications relationships with different consumers. The provider database includes information associating the information with each potential recipient. The association information is used to selectively distribute information and information updates. The provider program also receives and uses information from the consumer computer to control encoding and transfer of information to the consumer computer. According to another aspect, the provider program uses a markup language to format the information for transfer.

According to another aspect of the invention, a consumer program is used to receive and process the transferred information. The consumer program receives information from the provider or polls a location identified by the transferred information to determine when information has been updated by the provider. The consumer program then retrieves the information from the proper source and compares it to the existing information to determine what has been updated. The consumer program maintains a database of information from different providers. When updated information is received, the consumer program executes instructions associated with the information to store the updated information, notify a user of updated information, and generate responses for the consumer. The consumer program also can transfer the information to second consumer computer. The second consumer computer can obtain updated information from the provider computer or have it forwarded by the first consumer computer.

According to another aspect of the invention, methods in the communcations objects are used to automate control of underlying communication operations. When certain actions are taken by a user, or when certain types of messages or objects are received, the respective consumer and provider programs can operate automatically based upon selected methods and operations in order to act with or without input from the users. For example, acknowledgements can be automatically formatted and sent. Also, objects can be automatically transferred to others. The consumer program can transfer the information to a second consumer computer, with or without notification or approval of the user of the consumer program. The second consumer computer can then obtain updated information from the provider computer or have it forwarded by the first consumer computer. Exchange of significant data, metadata, and methods, and archiving or retrieval of changed objects can be automatically carried out by the programs. Methods can also be used to coordinate suspension or termination of communications relationships.

According to another aspect of the invention, service objects and partner servers are used to provide data, metadata, and instructions which can be used by providers and consumers to automate various communications services desired by both. The data, metadata, and instructions are received by the provider and consumer computers in the same manner as information is received by the consumer computer. The provider can include data, metadata, and instructions in the service object in the information transferred to the consumer computer. The information transferred from the service partners also controls communications with the service partner for both providers and consumers. Both providers and consumers can use service objects to communicate with a partner server in order to obtain communication services provided by the partner server.

According to another aspect of the invention, the provider and consumer programs and databases are combined to obtain additional functionality. The communication system can allow multiple users for a single program and database. The data, metadata, and instructions coordinate the operation of the programs for each user and allow for communications between users of the single database.

With these and other objects, advantages and features of the invention that may become apparent, the nature of the invention may be more clearly understood by reference to the following detailed description, the appended claims, and the several drawings attached hereto.

BRIEF DESCRIPTION OF THE DRAWINGS

FIG. 11 is a block flow diagram for a process for distributing a communications object.

FIG. 15 is a block flow diagram for a process for receiving a communications object.

FIG. 27 illustrates a user interface display of an input form for gathering technical support information.

FIGS. 29A and 29B illustrate object oriented data structures for a directory system and a message or discussion thread.

FIGS. 34A and 34B are block flow diagrams of processes for use of classified ad service objects and partner servers.

FIGS. 41A and 41B are block flow diagrams for processes for submitting feedback using service objects and partner servers.

FIG. 42 is a block flow diagram for a process for multiuser editing using single-user versions of the combined provider/consumer program.

FIG. 47 illustrates an object-oriented user interface of a provider program of FIG. 1 according to an embodiment of the present invention.

DETAILED DESCRIPTION

SYSTEM OVERVIEW

Figure 1:
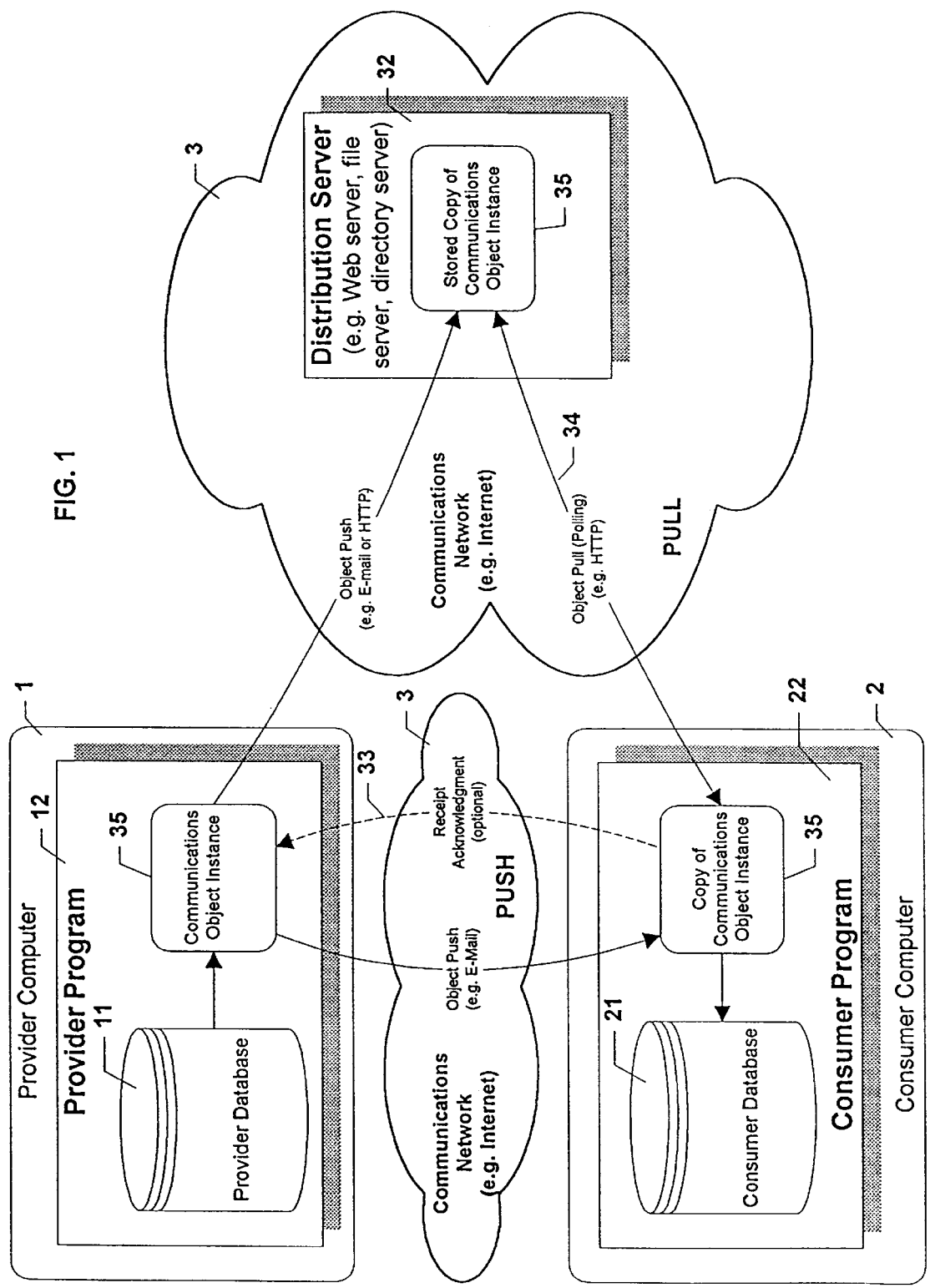
FIG. 1 illustrates a communications system according to an embodiment of the present invention.

There is illustrated in FIG. 1 a first embodiment of a system of the present invention which automatically updates a database in a consumer computer with information from a provider computer. Numerous providers and consumers exist in the system of the present invention. However, since all communications can be separated into transfers between a single provider and consumer, the design and operation of the system is illustrated with only one provider and one consumer, except as otherwise noted. As illustrated in FIG. 1, a provider computer 1 includes a provider database 11 of communications control information which it desires to disseminate or make accessible to one or more consumers. A consumer computer 2 includes a consumer database 21 of communications control information received from providers and stored by the consumer. The organization, structure, and content of the provider database 11 and consumer database 21 are discussed below. The provider computer 1 is connected through a communications network 3 to the consumer computer 2. Any communications network 3 may be used to connect the provider computer 1 and the consumer computer 2, including direct network connections, server-based environments, telephone networks, the Internet, intranets, local area networks (LANS), wide area networks (WANS), the World Wide Web, other webs, and even transfers of data on physical media such as disks or computer-readable paper outputs via postal communications networks. The particulars of the communications network illustrated as preferred embodiments are not limiting features of the invention. However, the Internet and World Wide Web provide existing capabilities between computers sufficient to provide the necessary connections. For this reason, the description of the present invention is based on this communications medium, which should be understood to be used for purpose of illustration only. Organization and operation of the Internet and communications over the Internet are discussed generally in Kris Jamsa and Ken Cope, *Internet Programming* (1995) and Marshall T. Rose, *The Internet Message: Closing the Book with Electronic Mail* (1993), which are incorporated herein by reference. Communications over the World Wide Web are discussed generally in John December and Neil Randall, *The World Wide Web Unleashed* (1996), which is incorporated herein by reference. Additionally, the illustrated embodiment is not limited to the specific networks known as the "Internet" and "World Wide Web", but relate to internet, intranet and web networks generally. A specific feature of this invention is that it is easily adaptable to control and automate communications via any type of communications network. In addition, it can select a preferred communications network and message encoding format to be used for a specific communications transaction, as further described below.

As illustrated in FIG. 1, there are two principal methods for information transfer in a data communications system, both of which can operate through the Internet. First, a "pushing" method transfers information from the provider computer 1 directly to a known consumer computer 2. An example of such a system is e-mail. So long as the consumer's address is known, the information can be routed through the communications network directly to that recipient. For the pushing method, the provider must know the consumers who want to receive the information. The provider must also know how to address those recipients in the communications network.

The second method, referred to as "pulling", occurs when the consumer computer 2 requests and initiates a transfer of information directly from a provider computer 1 or from another server computer 32 located on communications network 3 on which a copy of the information has been placed for distribution. An example of such a distribution server 32 is when a copy of the information is placed on a web server and accessed by the consumer computer 2. In the pulling method, the provider and the provider computer 1 or distribution server 32 do not need to know ab initio, the identity or location of consumer computers 2. Rather, the consumer computer needs to know the location of the provider computer 1 or distribution server 32 and the location of the desired information to be accessed on such computers.

Basic Operation of Programs for Communications

Appropriate programs executing on the provider computer 1 and the consumer computer 2 perform the functions necessary to transfer, maintain, and update the information at both locations. A program represents a set of stored instructions which are executed in a processor of the computer to process data, transmit and receive data, and produce displays. The provider program 12 operates to transmit changes in information stored in the provider database 11 at the provider computer 1. When changes are made to the information and the database, the provider program 12 operates to disseminate the changed information through the communications network 3. In the pushing method, the provider program 12 transmits the changed information, for example through e-mail, to the consumer computers 2 of all intended recipients. In the pulling method, the changed information is stored on a distribution server 32, such as a web server, which then can be accessed by the consumer computer 2. Any type of distribution server may be used, including network file servers, FTP servers, gopher servers, and so on. The type of distribution server used is not a limiting feature of the invention. The consumer program 22 will typically poll the distribution server 32 to determine whether the information has changed. This polling operation can be as simple as issuing a Web server HTTP file date request and comparing this with the file date of the last update. Polling is controlled by the information transferred from the provider program to the consumer program as further described below. Upon receipt of changed information, the consumer program 22 operates to perform certain functions with regard to that changed information. Principally, the information is stored in consumer database 21 on the consumer computer 2 for future reference and usage in controlling and automating communications between the consumer and provider. Furthermore, the information may be presented to a user at the consumer location, so that the user will be notified of the changed information. The information can be presented in a number of manners, including display or printing by the consumer program, sending an e-mail or voice-mail message to the user, paging the user, and other notification methods.

Since the provider knows what the changed information is and how consumers would likely prefer to be notified of the changed information, the transmitted information can include instructions on how the consumer program 22 should process the information for purposes of notification. For example, information from a provider may include the provider's telephone number. If the telephone number changes, the provider needs to supply everyone with whom it does business with the new number. The present invention provides a simple mechanism for carrying out such a data transfer, and of controlling which consumers receive overt notification. When the telephone number is changed in the distribution database at the provider computer 1, the information is transferred to the consumer computer 2, through either the push or pull method. Upon receipt, the consumer program 22 will process the changed information and store the new telephone number in the consumer database 21 for later access by the user or by other programs operating on the consumer's computer 2. At the consumer computer 2, the consumer may or may not be interested in overt notification of the new phone number; this depends on the consumer's relationship with the provider and how often and in what manner the consumer makes use of the phone number. This invention provides a way for notification to be cooperatively controlled by both the provider and consumer through the use of notification elements, which are described below.

Additionally, receipt and storage of the new or updated information can trigger other actions, such as automatically forwarding the information to another consumer, exchanging data with the consumer database 21, sending an automated response to the provider, or sending a message to another software program on the consumer's desktop. Again, this invention provides a means for such actions to be cooperatively controlled by both the provider and the consumer through the use of receipt methods, which are discussed below.

The information stored in the consumer database 21 can also include data, metadata, and instructions to be used by the consumer program 22 for controlling and automating communications between the provider and consumer. Again, because the provider of the information knows what communications response options are available to the consumers of the information, the provider can include the necessary data, metadata, and instructions to simplify and automate specific responses from the consumer to the provider. For example, the provider can include Web URL (Uniform Resource Locator) links to Web pages or forms on the provider's Web server. Or, the provider can also include special forms to be processed by the consumer program 22 that allow the consumer to automatically or semi-automatically transfer data from the consumer database 21 back to the provider. Examples include product order forms, survey forms, customer service request forms, scheduling forms, etc.

In the most general case, the provider knows what communications networks, network addresses, languages, encoding formats, data structures, and other communications processing data and methods are supported by the provider. Thus, the provider can include in the transferred information the data, metadata, and instructions necessary to control and coordinate general communications from the consumer to the provider or to parties related to the provider. For example, data, metadata and instructions in the transferred information can be used by the consumer program 22 or other computer programs running on the consumer computer 2 to automatically format, compress, encrypt, address, and transmit copies of a word processing document, spreadsheet, database or database query, or other computer file format. Corresponding data, metadata, and instructions in the provider program 12 can control and automate the reception of the received message, including decryption, decompression, notification of the provider, and acknowledgment of receipt to the consumer. The same control technique can be applied to the execution of real-time communications, such as telephone calls, videoconferencing, or whiteboard applications.

HTML and HTTP Server Program Format

Figure 2:
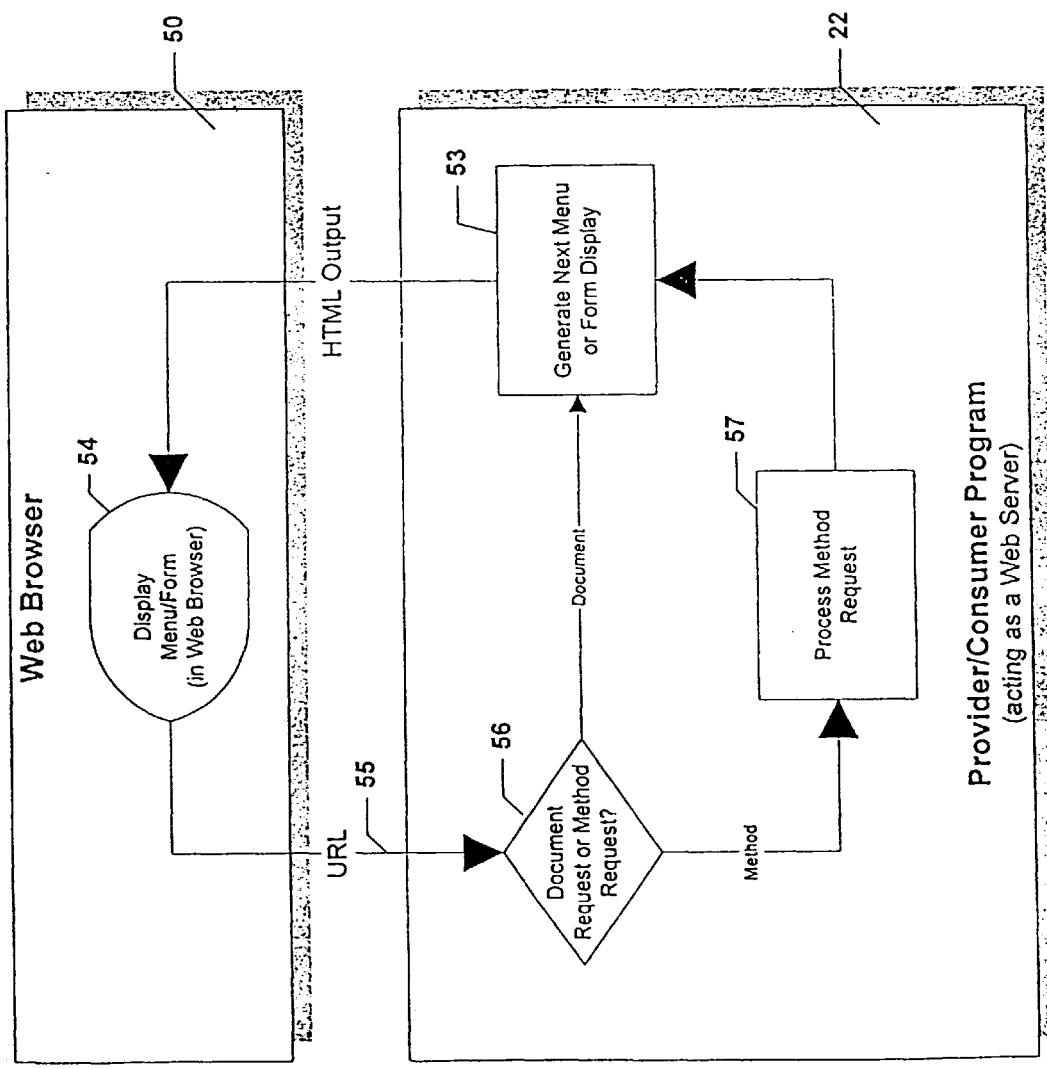
FIG. 2 illustrates an embodiment of the provider program and consumer program of FIG. 1 as state machines.

Although any kind of data communications network and any kind of user interface can be used, the system can be constructed to work with existing Internet or World Wide Web protocols for data communications and display. In particular, the provider program and the consumer program can be designed to use HyperText Mark-up Language (HTML) for display and editing. HTML is discussed in Internet Request for Comment No. 1866, which is incorporated herein by reference. The use of HTML allows links to be made to other transmitted information or to other information accessible anywhere on the World Wide Web. Also, HTML forms can be used as an input mechanism. Standard Internet protocols for accessing the Web can also be used for accessing the information in the provider or consumer databases. To do this, the provider program and consumer program are designed to emulate a Web HyperText Transfer Protocol (HTTP) server. Then, any Web browser program conforming to the HTML/HTTP standard can generate Uniform Resource Locator (URL) requests to retrieve information from the provider and consumer programs and databases. A Web browser program is a set of instructions which causes the computer to execute information requests to various kinds of servers. The servers responded by transferring HTML files or other data files back to the browser program for display, processing, and storage. Protocols or formats other than HTML/HTTP can be used in the same manner, with an appropriate interface program for requesting, receiving, processing, and displaying data in accordance with the selected protocol or format. The operation of the provider and consumer programs in connection with the Web browser program is illustrated in FIG. 2. Since the provider and consumer programs operate identically in this regard, only the operation of the consumer program will be discussed.

As illustrated in FIG. 2, the consumer program 22 can be constructed to operate as a state machine in connection with a Web browser program 50. The consumer program 22 generates and outputs a first HTML screen (step 53) to the Web browser. If necessary it also issues an operating system call such as a Windows DDE request or Macintosh AppleEvent to the browser to accept this HTML file. It then waits for an HTTP request from the Web browser program 50. The HTML screen can include information having one or more different types of displayed information, namely, text, graphics, hyperlinks, and forms. Text and graphics refers to information which is only viewed by the user. Hyperlinks associate specific text characters or graphics display locations with specific URL requests. Forms provide locations for inputting data such as text, numbers, checkboxes, and "radio buttons" to be acted upon. Hyperlinks and forms allow HTML documents to be used for all program operations including menus, editing, reports, and error messages. The Web browser program 50 displays the HTML page received from the consumer program 22 (step 54). The user operates on the displayed page in the same manner as for any information accessed through the Web browser program 50. The user can review the text or graphics, manually input a new URL request into the Web browser's URL input field, chose a hypertext link to automatically generate a URL request, or complete and submit a form. The Web browser program, typically, can also be used to move forward and backward through previously received screens. Each of the user's actions, except reviewing text and graphics, results in a URL request being generated. The URL request is sent to the consumer program 22, acting as a Web server (step 55). The consumer program processes the URL request to determine whether it refers to a document or a method (step 56). If the URL request is for a document, the consumer program generates the new HTML page and sends it to the Web browser program (step 53). If the request is for a method, then the method is executed using any additional data supplied in the URL (step 57). After the method has been executed, the consumer program generates a new HTML page based upon the results of the method.

The user enters information to be operated upon or stored by the consumer program through the use of HTML forms. If the HTML page generated by the consumer program (step 53) includes a form, then the user can enter information in designated locations in the form. When the information has been entered, the form is submitted by selecting a button on the page, and a set of program instructions (method) designated by this button is executed to process the inputted information. Many browser programs can cache HTML documents, so that a user could have several forms open at one time. Since the consumer program works as a state machine, it expects the last form generated to be the next one returned. If the user switches the order of the forms, a state error could occur. To prevent errors, each form produced by the consumer program can be provided with a state version value. If the version value of the returned form does not match the current state of the consumer program, then an error message can be returned rather than processing the forms out of order.

Alternatively, the provider and consumer programs 12, 22 could include separate native interfaces which include the display and processing functions found in a browser program, as well as the ability to provide additional functionality, such as that available in advance graphical user interfaces like those of Microsoft Windows, Windows 95, and Apple Macintosh operating systems. The use of an object-oriented graphical user interface will be specifically discussed below. The provider and consumer programs 12, 22 may also call other Web helper applications or "applets", such as those produced with Sun Microsystem's Java programming language or other programming languages, to provide additional interface functions.

BASIC DATA STRUCTURES

Information can be stored in the provider and consumer databases 11, 21, transferred between the provider and consumer programs 12, 22, and processed by these programs in a variety of ways. The use of software objects and object-oriented databases, and in particular their ability to encapsulate data and methods for operating on that data in a single structure, provide certain degrees of functionality which are useful in the storage, transfer, and processing of information. For example, by using objects for transmission of the communications control files, and an object-oriented database for storage of these files, the received object can be stored by the consumer program 22 in its database 21 without having to disconnect and store the object's variables and methods independently. In addition, the data and methods of this object can be made available to other objects in the database or program for processing operations. Object oriented data structures, databases, programs, and processing are generally discussed in Grady Booch, *Object Oriented Analysis and Design with Applications*, (2nd ed. 1994) and James Rumbaugh, *Object-Oriented Modeling and Design* (1991), which are incorporated herein by reference. Thus, the following description of a preferred embodiment will discuss the use of objects. However, other methods for storing, transferring, and processing information, such as relational databases, binary files, or procedural programs, could be used.

As discussed above, the provider computer 1 includes a provider database 11 operated on by provider program 12, and the consumer computer 2 includes a consumer database 21 operated on by consumer program 22. However, since "provider" and "consumer" are merely functional distinctions, in a preferred embodiment, a single computer and computer program would be able to operate as a provider computer 1 in executing instructions of the provider program 12 and as a consumer computer 2 in executing instructions of the consumer program 22. In this instance, only a single database may be used, if desired, to hold all of the data for transmitted objects and for received objects. The database structures described below could apply to a single database, or to separate databases if the programs operated separately. For ease of reference in describing operation of the provider program and the consumer program, separate databases will be illustrated.

Figure 3:
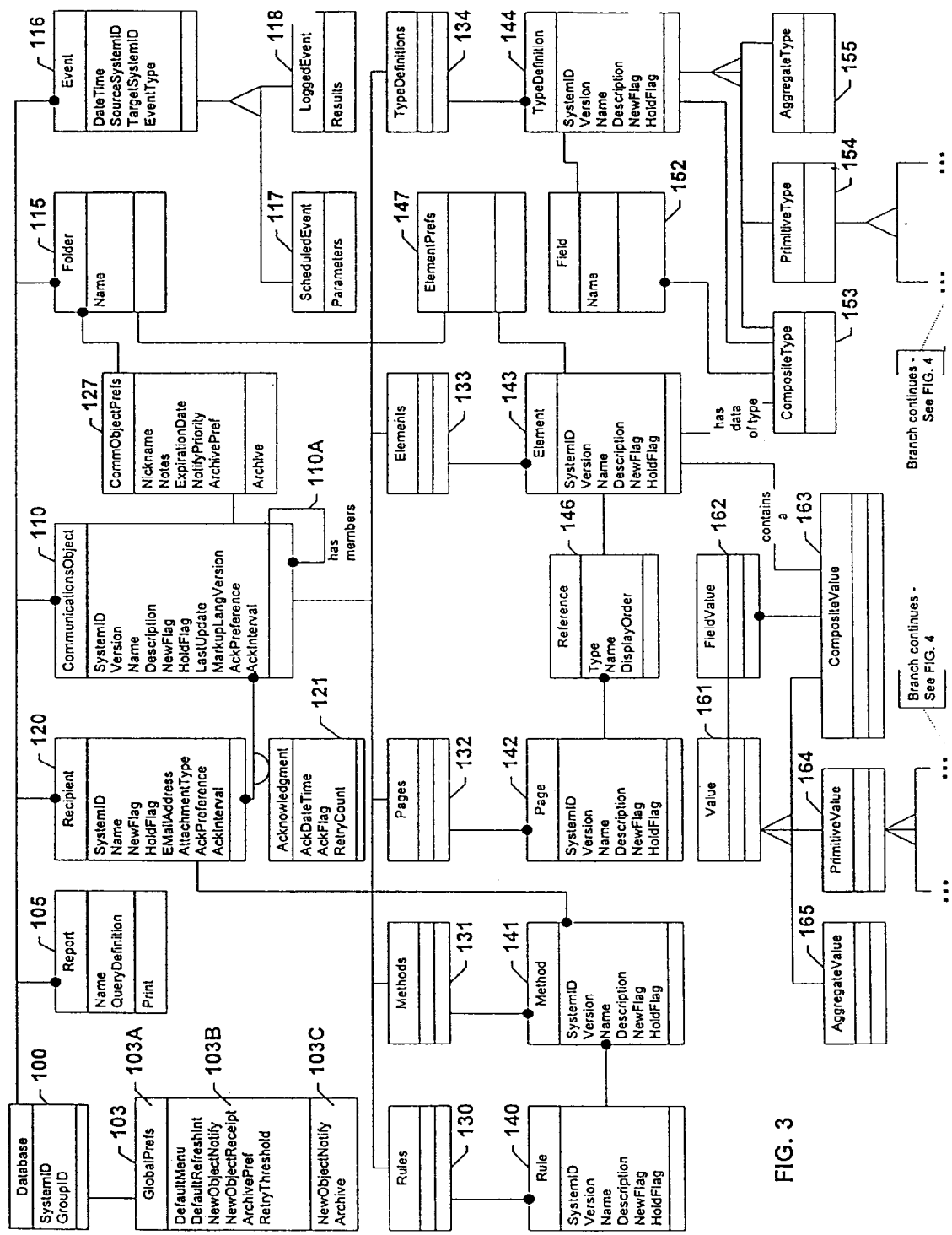
FIG. 3 illustrates object oriented data structures for storing communications data.

FIG. 3 uses a standard object-oriented notational format to illustrate an embodiment of object classes in a single database 100 of the present invention. As shown in the global preferences object class 103, each object class includes three parts: an identifier 103A, an attribute section 103B, and a method section 103C. The method section 103C is used to perform operations on the attributes of the class. Class associations are shown with connecting lines. A plain line shows a one-to-one association. A line terminating in a solid dot shows a one-to-many association. A line terminating in a open dot shows a optional (zero or one) association. A diamond at the start of a line shows an aggregation association, i.e., the higher class contains the component classes. Inheritance between classes is shown with a branching line. Only certain attributes and methods are shown in object classes; many others have been omitted for clarity.

Class Overview

There are seven principal object classes: communications objects 110, recipients 120, rules 130, methods 131, pages 132, elements 133, and type definitions 134. Communications objects are the primary data structure transmitted from the provider program to the consumer program to control communications between the provider and consumer. Like any software object, a communications object consists of attributes and methods. The type definitions class is used together with the elements and pages classes to specify the attributes of the communications object. The methods class and rules class are used to specify the methods of the communications object. By using separate object classes to define the attributes and methods that will be included in a particular communications object instance, a wide variety of communications objects can be created and managed within the same system.

Recipients include all the consumer computers 2 who receive a copy of the communications object via push distribution, or the distribution servers 32 who receive a copy of the communications object for pull distribution.

The rules 130, methods 131, pages 132, elements 133, and type definitions 134 classes are all special container classes of the rule 140, method 141, page 142, element 143, and type definition 144 classes. These special container classes are used to facilitate the rendering of an instance of a communications object in the object markup language used for object transmission, as described further below. For this reason the descriptions following will discuss only the rule 140, method 141, page 142, element 143, and type definition 144 classes. Collectively this set of classes will be referred to as the "component" classes of a communications object.

Type Definitions

Figure 4:
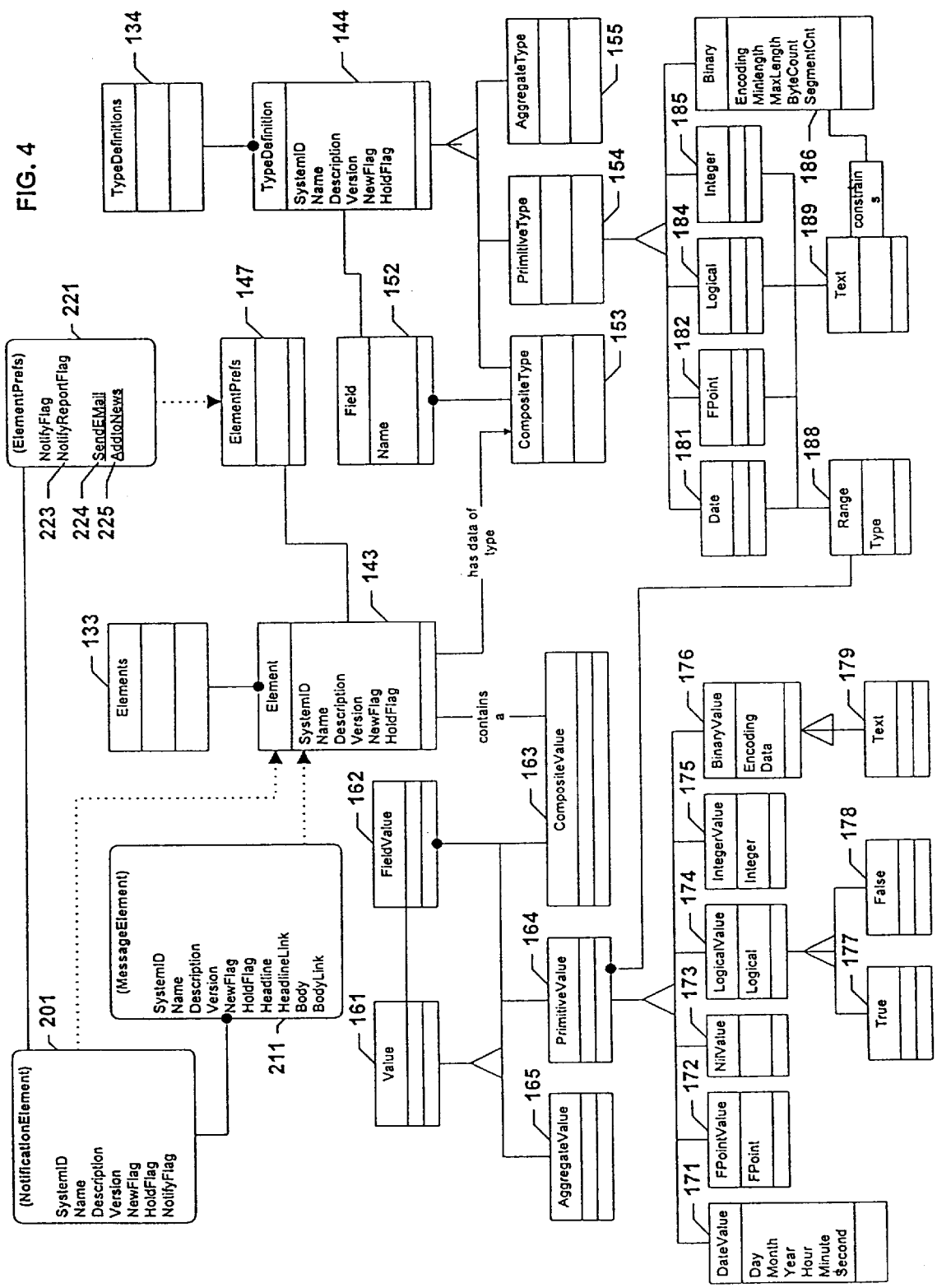
FIG. 4 illustrates the lower branches of FIG. 3, and instances of various elements.

The type definition class 144 is used to define the various data types which may be used in the elements of a communications object. Type definitions can be of primitive type 154, aggregate type 155, or composite type 153. The inheritance tree for the primitive type 154 class is shown in FIG. 4. Primitive types can include the conventional bottom-level data primitives supported by most programming languages, such as dates 181, floating point numbers 182, logicals 184, integers 185, binaries 186, etc. Text 189 is a constrained form of binary 186. Range 188 is a multiplicity of other primitive data types, such as array. As shown in FIG. 3, aggregate types 155 represent a multiplicity of primitive types 154, such as an array. Composite types 153 represent a container of primitive types 154 or aggregate types 155 that is useful in a communications context. For instance, a composite type might be PhoneNumber. A composite type 153 is composed of one or more fields 152 which each contain primitive types 154 or aggregate types 155. For example, a composite type PhoneNumber may include fields for usage, country code, area code, number, extension, and notes, each with its corresponding primitive type. A field 152 may also contain another composite type 153. In this way composite types can be nested. For example, a composite type BusinessCard could contain composite types Identity, PhoneNumber, PostalAddress, EMailAddress, and Contact-Notes. Composite types are further explained in the discussion of elements below.

Type definitions provide a powerful tool for structuring the data included in a communications object, object update, or object message. This structured data provides the common "frame of reference" necessary to automate communications operations between a provider and consumer. It also allows communications objects to call each other's methods, and for other software programs to call the methods contained in communications objects stored in the consumer database 21. The latter technique requires the use of an Applications Programming Interface (API) which will be further discussed below.

Elements

"Elements" are the primary attributes of a communications object. An element 143 might be a phone number, a postal address, an e-mail address, a text field, and so on. As illustrated in FIG. 3, an element has data of a composite type 153 with a corresponding composite value 163. A composite value 163 is composed of field values 162 in the same way a composite type 153 is composed of fields 152. For instance, the field values for the composite value Phone-Number corresponding to the composite type PhoneNumber described above could be "voice, 10188, 206, 812-6000, x101, Business hours are 9–6 daily M–F". As with fields 152, field values 162 are either an aggregate value 165, primitive value 164 or composite value 163. The value class 161 represents an abstract class inherited by the aggregate value 165, primitive value 164 and composite values 163 classes. Aggregate values 165 represent a multiplicity of primitive data values, such as an array. Primitive values 164 contain the values corresponding to the lowest level primitive types. These are shown in the continuation of the class hierarchy in FIG. 4. Primitive values include date values 171, floating point number values 172, nil values 173, logical values 174, integer values 175, and binary values 176. Text values 179 are a constrained form of binary values 176. Logical values branch into true values 177 and false values 178.

Many elements with defined composite data types and composite values are specifically useful in the context of communications automation. Standard element composite types can include standard types of contact information that might typically be shared between providers and consumers in the context of a communications relationship. These include names, titles, phone numbers, fax numbers, postal addresses, e-mail addresses, URLs, and customer numbers. Nested composite types, such as the business card, allow for powerful combinations of smaller composite types.

Other element composite types are useful for the storage, transmission, and display of communications content between the provider and consumer. Elements of this type include text blocks, graphics, and HTML. HTML elements are especially useful in the preferred embodiment as they can contain standard HTML documents which the consumer program 22 can pass directly, or with minor modifications, to the Web browser 50 for display. This allows the provider to control the appearance of data on all or a portion data being displayed, and also allows the provider to include URL links to the provider's Web server or any other related Web documents. These links can be activated immediately by the consumer when viewing the communications object using the Web browser 50 just as with conventional HTML documents. HTML elements may also include the provider's own HTML forms for acquiring information from the consumer when the object is transferred. Just as nested composite types of contact data elements can be combined into more comprehensive types such as business card elements, nested composite types for communications content can be combined into more comprehensive types such as message elements. Message elements combine text headlines with graphics, HTML, and other body content into full multimedia messages which can be filtered, sorted, and displayed by the consumer program 22.

Elements 143 may also be associated with methods 141 or rules 140. This is particularly useful for data exchange elements, which control the process of exchanging data between the consumer program 22 and the provider program 12 or another server program. Two specialized types of data exchange elements are useful for controlling the transmission of data external to the provider database 11. Attachment elements allow a provider to specify external files, objects, or other data stored in the provider's local or network computing environment to be included in the transmission of a communications object, communications object update, or message object. Query elements allow a provider to execute a query against a local or network database and have the results included in the transmission of a communications object. Data exchange elements, attachment elements, and query elements will be further explained in the description of data exchange control below.

Another category of element composite types is link elements. Link elements within a communications object are the equivalent of URLs within a Web document. They create associations between different elements of an object, different pages of an object, or different communications objects. A link element can also be a URL, linking the element to any Web page or other resource available on the World Wide Web. By associating a link element 143 with one or more link methods 141, even more powerful "link components" can be created. Component objects and link components will be explained further below.

Special element composite types, called preference elements, are used to control communications object processing. Preference elements specify object attributes that are editable by the consumer. For instance, a preference element of a composite type RefreshInterval could govern the polling interval used for object updates using the pull method of updating. An element of type RefreshInterval can consist of three fields 152: Minimum, Maximum, and Setting, all of which could be primitive integer values representing days. The Minimum field specifies the shortest allowable refresh interval (to help reduce the load on the provider's Web server), the Maximum field specifies the longest refresh interval (to limit the total time one full object update cycle can take), and the Setting field specifies the actual interval to be used (the provider's recommended setting would be used by default). The provider would initially fill out these three fields, then the consumer would be able to edit the Setting field within the Minimum and Maximum allowed. (Enforcement of this requirement could be provided by a rule 140.)

Another example of a preference element is a notification element. Notification elements are used to control how a consumer is notified of new information when the object, object update, or object message is transferred. The format and structure of notification elements are discussed below in connection with the special processing notification elements receive. Any other consumer-editable preference regarding communications object attributes or method processing can be expressed as an preference element. Preference elements receive special processing by the consumer program 22 and storage in the consumer database 21 which will be further described below.

In addition to its composite type and composite value, each element 143 includes standard attributes such as system ID, name, description, version value, NewFlag, and HoldFlag. The system ID is a unique identification value in the database 100. Identification number assignments throughout the database are discussed below. The name is a label used to identify the element to the provider or consumer. The version value is used to coordinate updates each time the element is changed. The NewFlag is set to TRUE each time an element has been changed by a provider so that new information can be indentified for distribution by the provider program 12, and identified for updating when transferred to the consumer program 22. The HoldFlag is used to identify changed elements which are not yet to be distributed. The structure and content of elements may be more fully understood in connection with the description of notification elements discussed below.

Pages

In order to organize the many elements 143 which can be contained in a communications object 110, one or more container classes may be desired. Container classes allow the grouping of elements for purposes of display, editing, or other program operations. Container classes are also useful for distribution control, which will be discussed below. Different types of container classes can be implemented, and container classes can contain other container classes. FIG. 3 illustrates the implementation of one primary container class: the page class 142. A page contains one or more reference instances 146 which associate elements 143 with the page. References may contain attributes such as DisplayOrder which control the display order of the elements on the page. Each element 143 must assigned to at least one page 142 in order to be transmitted with an object, however an element may be included on more than one page 142. Standard page attributes are similar to the standard element attributes, i.e., SystemID, Name, Description, VersionNumber, NewFlag, and HoldFlag.

Methods

The method class 141 is a form of metadata used to store methods which may be included in a communications object instance when it is transferred to a consumer. These methods should not be confused with the methods belonging to each of the other object classes in the system. A method object is primarily a mechanism for storing a method in the database for later inclusion in a communications object instance, at which time the method becomes a formal method of the communications object. Communications object methods are one of the most powerful aspects of communications objects. They allow the provider to specify processing instructions which will execute on the consumer's computer when certain conditions exist in the consumer program. For example, when a communications object is first received by the consumer program 22, a "receipt method" can automatically execute to return an acknowledgment message to the provider with information about that consumer transferred from the consumer database 21.

A second purpose of instances of the method class 141 is to execute procedures in the provider program 12 or consumer program 22. These procedures can be instructions involved with the process of creating and publishing communications objects, or they can be instructions to be executed when a message object is received from a communications object. Message objects are discussed further below.

Instances of the method class 141 may implement communications object methods in several ways. The method can simply be a call to execute a system method included in the consumer program 22. The method can be actual instructions included in the object as program code in an executable format or an interpretable format, such as a script format. The method can be a call to the methods of another communications object located in the provider database 11 or consumer database 21. The method can also be a remote procedure call to another object or application located elsewhere on the consumer's computer or on a communications network 3 accessible from the consumer program. This remote procedure call can be executed at the remote computer, or it can be downloaded by the consumer program for local execution. The application of communications object methods to automating operations in the provider program 12 or consumer program 22 will be further discussed below.

Methods 141 may be of specialized types. Method types can be determined by a type attribute, or by method type subclasses to which methods 141 are associated. Methods types include receipt methods, public methods, private methods, and system methods.

Rules

Rules 140 work in conjunction with methods to provide the operational functionality of a communications object system. Rules allow the provider database 11 and consumer database 21 to operate as active object databases, capable of initiating communications, database processing, or other procedures based on time, system variables, system events, or other conditions. Rules also supply constraints under which methods operate. The usage of rules to control the operation of an active object database is discussed generally in Jennifer Widom and Stefano Ceri, *Active Database Systems* (1996), which is incorporated herein by reference.

Rules 140 consist of one or more conditions to be tested against. Rules 140 are associated with methods 141 to execute when the conditions are met. Rules 140 are typically expressed in boolean logic using standardized query languages or other appropriate formats. Rules can govern the behavior of individual communications objects, groups of communications objects (such as all objects from a particular provider), all objects in the database, or general system actions. Examples of common processing actions governed by rules include backing up the database after X days or X number of changes, deleting or proposing for deletion communications objects that have not been accessed in X days, archiving X number of previous copies of a communications object or object component, using X amount of system resources when Y conditions are present, and allowing X number of communications objects or recipients under a particular software license. Rules may be understood further in the discussion of communications object control functions below.

Communications Objects

Communications objects 110 are the highest level data structure because they serve as the container for type definitions, elements, pages, methods, and rules. Each of these is a one-to-many relationship. A type definition 144, element 143, page 142, method 141, or rule 140 must be assigned to an object 110 in order to be transferred to a consumer, however each type definition, element, page, method, or rule may be included in more than one object 110. Communications objects have many of the same standard attributes as elements, pages, and methods, i.e., SystemID, Name, Description, VersionNumber, NewFlag, and HoldFlag. In addition communications objects also have attributes that apply only to communications objects as a whole. These attributes can include the markup language version used to generate instances of the object, the objects' age, and the number of published updates to the object, receipt acknowledgment preferences, and other universal attributes.

Figure 17:
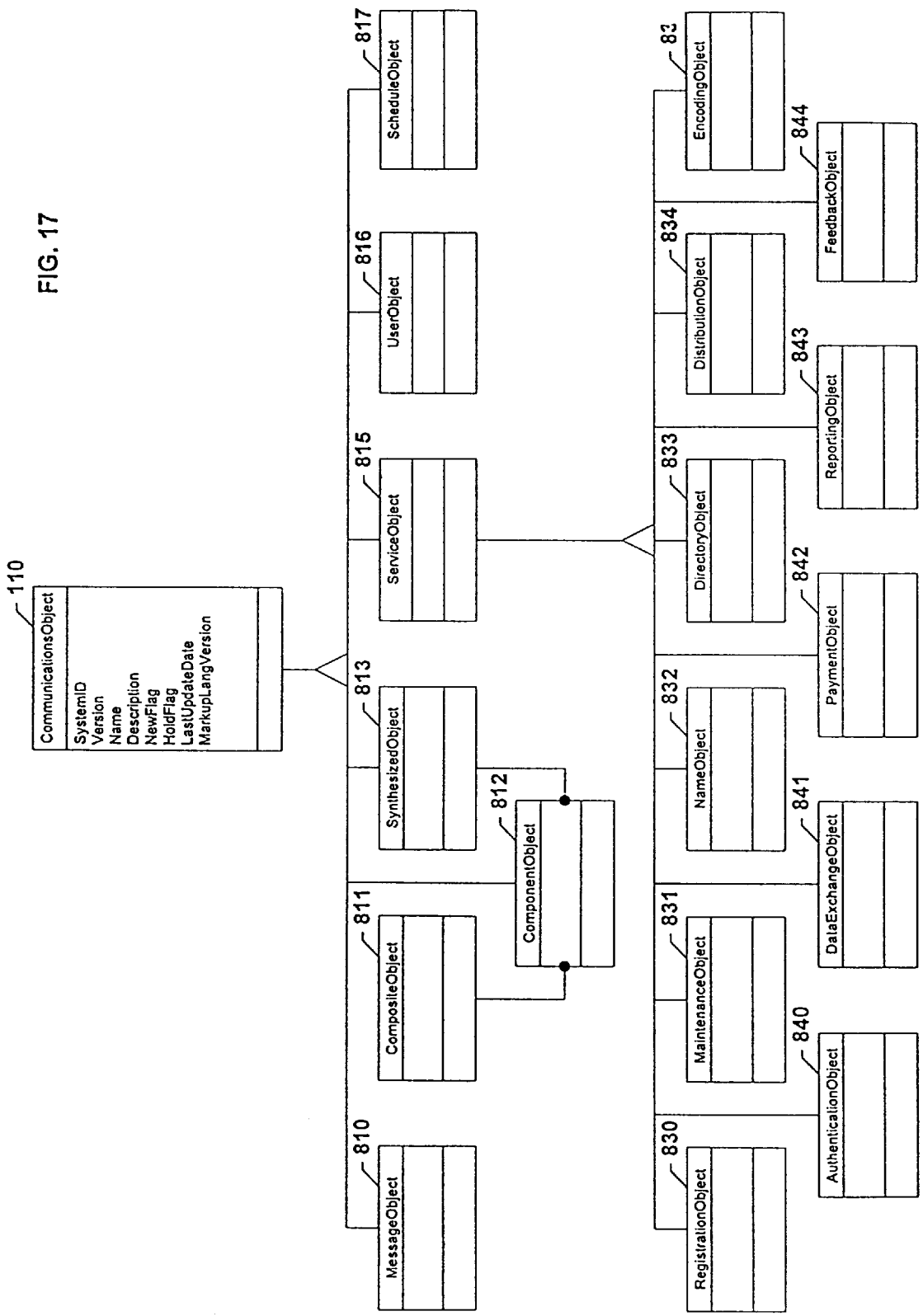
FIG. 17 Illustrates the object oriented database structures for different communications object types.

Communications objects can be of specialized types. There are several approaches for accomplishing this. One approach is to define communications object types using a special CommObjectType element included within or referenced by the communications object itself. The preferred embodiment of the present invention is to define communications object types as subclasses of the communications object superclass. These subclasses are illustrated in FIG. 17. Primary communications object type classes include message objects 110, composite objects 811, component objects 812, synthesized objects 813, and service objects 815. Each of these subclasses will be further discussed below.

Recipients

The Recipient class 120 is used to determine the distribution of a communications object. Each communications object 110 is associated with one or more recipients 120 who receive an instance of the object when it is first created or when changes are made to it. Recipients are of two types: consumer programs 22, or distribution servers 32. A distribution server 32 may also be represented by a distribution service object. Distribution service objects are further discussed below. Transfer of communications objects 110 to both types of recipients is typically via the push technique. However recipients may also be tracked in the provider database 11 even if they use the pull technique of updating via the use of receipt acknowledgment messages. Acknowledgment messages are further described below. The push method may involve a fully automated transfer via a communications network 3, or it may involve a manual transfer such as a file copy over a network or via a computer floppy disk. Recipient objects 120 include the attributes necessary to generate and transmit an instance of the communications object to the recipient. To uniquely identify recipients even when names change, a SystemID attribute can used in addition to a Name attribute. System IDs are discussed below. Other attributes include the recipient's communications network address, such as an e-mail address, the type of encoding that should be used (e.g. MIME, BinHex, UUencoding, etc.), and the maximum attachment file size the recipient can accept (to determine if multiple attachments need to be sent). Recipients 120 have an association with methods 141 in order to allow different methods to be assigned to different recipients. An example is the communications object's update method. Communications objects transmitted to consumers via e-mail push may use one update method, while those transmitted to distribution servers may use a pull update method. Encoding methods, transmission methods, and other recipient-specific methods may also be assigned in this manner.

Recipients 120 also has an aggregate association with acknowledgment 121 and page subscription 853. Acknowledgment 121 has a one-to-one association with communications object 110. Acknowledgment 121 is where consumer acknowledgment of the receipt of a communications object can be stored. Page subscription 853 is the mechanism by which a provider can control distribution by specifying which pages are transferred to a recipient. Alternately, by including in communications object 110 all instances of page subscription 853 for all pages 142 associated with the object but not necessarily transmitted to the consumer, the provider can allow the consumer to choose which pages the consumer wishes to receive. Distribution control is further described below.

Other Classes

Four other classes in the database significantly involved with program operations are global preferences 103, report 105, folder 115, and event 116. Global preferences 103 provides a means for storing the preferences of a provider or consumer for general operation of the provider program 12 or consumer program 22. This may include attributes such as the default menu to display upon program startup, the default refresh interval to assign to new objects, the user's preference for notification when new objects arrive, the number of object archive copies the user wishes to keep, and other such preferences. Global preferences 103 may also include method preferences, such as the notification method to use when new objects are received, the method to use for archiving versions of objects or object components, and the method to use for backing up the database.

Report 105 is a class for storing report definitions and report display or printing preferences. As in many database management systems, reports may be defined by the system or by the user, and can include any listings, statistics, or analysis of value to the user.

Folder 115 is a container class useful for grouping objects, particularly for consumers. Folder groupings allow groups of communications objects to be referenced simultaneously for analysis, display, sorting, searching, reporting, and transmission. Alternatively, although not shown, folders or other container classes can be applied to other classes, such as pages and elements, for similar purposes.

The event 116 class is an abstract class defining the attributes for scheduled events 117 and logged events 118. The scheduled event 117 class is used to create a queue of events for the provider program 12 or consumer program 22 to execute at some time in the future. An example is the polling operation necessary to update communications objects via the pull technique. The logged event 118 class is the counterpart used to create a log of past events. System events may need to be tracked for purposes of accumulated statistics, tracking user or communications object activity, documenting errors, providing payment transaction receipts, etc. Scheduled event and logged event objects can be further understood in the discussion of event loops, event logging, and event scheduling below.

Object Markup Language

In order to transfer a communications object instance or object update instance from a provider program 12 to a consumer program 22, the object must be output from the provider database 11 into a format suitable for transport via a communications network 3. Any type of machine readable and writable format could be used, for example a compressed binary file such as that used by most relational or object-oriented database management programs. However, for maximum compatibility with communications networks 3 and other data processing systems, object instances can be written or read in an ASCII markup language, which is a superset of HTML. As with HTML, or other standard markup languages such as SGML, each item of structured data such as an object class or container class is expressed within a set of delimiters or "tags" defined in the markup language. Certain classes in the database structure exist specifically to provide the necessary container tags for other classes. For example, in FIG. 3, the methods 131, pages 132, elements 133, and type definitions 134 classes are all special container classes used to provide the tags necessary to delimit the methods, pages, elements, and type definition sections of an object output in the markup language. Another advantage of the use of an ASCII markup language is that the data and methods contained in communications object may be rendered readable to other data processing programs for purposes of interoperability. Other programs may also be programmed to output such a language or a subset thereof for purposes of importing into a communications object system program. The use of an ASCII markup language does not preclude the use of additional formatting or encoding, such as encryption, for the entire object or for portions of the object.

BASIC SYSTEM PROCESSES

System ID and Naming Services

Because communications objects and their component type definitions, elements, pages, and methods are exchanged among multiple providers and consumers, the instances of these objects and components need to be uniquely distinguishable in each provider database 11 and consumer database 21. Name attributes alone cannot be relied upon to guarantee uniqueness. Other unique identification numbering systems could be employed, such as the provider's or consumer's U.S. Social Security numbers, U.S. Federal Employer Identification Numbers, passport numbers, etc. However, in a communications system which may be used globally, not all users may be assigned unique identifiers under one of these identification systems. A separate global identification system could be employed, such as the domain naming and e-mail addressing system used by the Internet. Although not all Internet users have their own Internet domain names, all of them have unique e-mail addresses. However, since users can and do change e-mail addresses, this would require that their system ID also change. The ideal communications system allows complete separation (or "abstraction" in object-oriented terminology) of a user's communications system ID from any real world names or physical communications network addresses with which the user is associated. In this way, users can change any of his/her names or physical communications network addresses while still maintaining complete continuity of his/her communications relationships. In addition, any changes to the user's name or physical communications network address can be automatically distributed by the user's communications object(s) to all other consumers with whom the user has a communications relationship.

To achieve this objective, a preferred embodiment of the present invention assigns a unique system ID value to each unique communications object and communications object component. This function is the equivalent of an automatically-generated unique key field ID in many conventional database management systems. This objective can be achieved in several ways. A first technique is to employ an algorithm that uses system state information together with data unique to the computer on which it is being run to produce system IDs whose probability of uniqueness is so high that for practical purposes they can be treated as unique. The use of such algorithms for creating globally unique object IDs is discussed generally in Kraig Brockschmidt, *Inside OLE* (1995), which is incorporated herein by reference. Standard industry algorithms and functions that have been created for this purpose include the Universal Unique Identifier (UUID) specified by the Open Software Foundation (OSF) Distributed Computing Environment (DCE) documentation. This algorithm is fully documented in Steven Miller, *DEC/HP, Network Computing Architecture, Remote Procedure Call RunTime Extentions Specification, Version OSF TX*1.0.11 (1992), which is incorporated herein by reference. The use of a generally accepted industry UUID has the advantage of making a communications object identifier system directly compatible with other industry standard distributed object system specifications. Examples of such standards include the DCE and CORBA specifications from the Open Software Foundation and the OLE and DCOM specifications from Microsoft Corporation.

Figure 5:
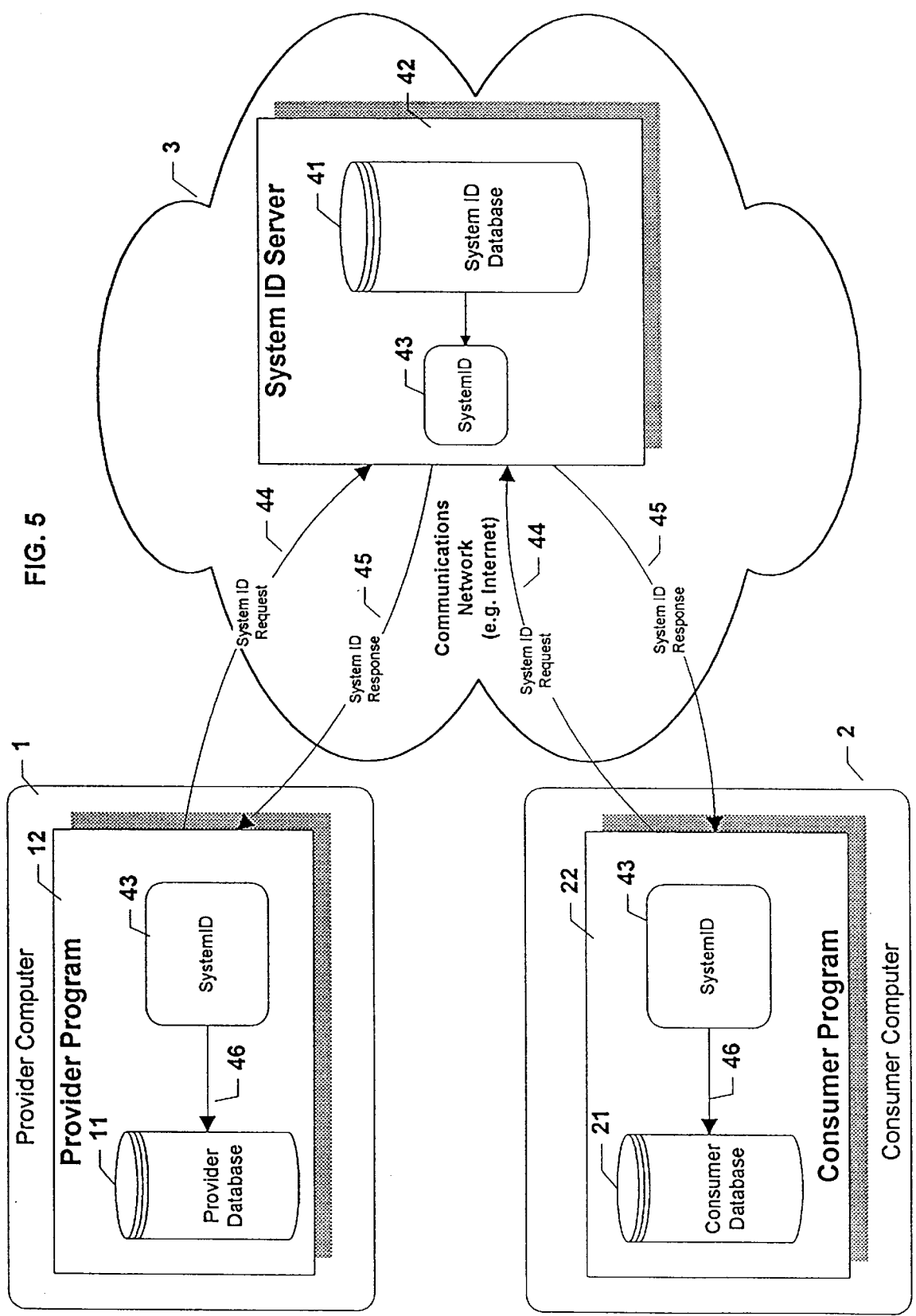
FIG. 5 illustrates the use of a system ID server.

The second alternative is to use a centralized server or set of servers to produce unique system IDs as required. This approach has the advantage of creating a centralized registry of unique system IDs. Such a registry has other applications within a communications object system, as further described below. The architecture for centralized system ID assignment is illustrated in FIG. 5. A central system ID server 42 contains a database of system ID assignments 41. The system ID database 41 could be replicated across a group of ID servers 42 at various nodes of a communications network 3 to improve performance as the number of users increases. Upon initial installation, each provider program 12 or consumer program 22 sends a request 44 via the communications network 3 to the ID server 42 for a unique system ID 43. The ID server 42 returns a response 45 to the requesting program. The requesting program then saves the system ID in the provider database 11 or consumer database 21. This system ID 43 is shown in FIG. 3 as the SystemID attribute of the Database class 100. Within the database, the provider and consumer programs 12, 22 can include a function for assigning a separate unique system ID value to each instance of a communications object 110 or any class that will become a component of a communications object. In FIG. 3, these classes include the rule 140, method 141, page 142, element 143, and typeDefinition 144 classes. Again, this function is the equivalent of an automatically-generated unique key field ID in a conventional database management system. Since the provider's system ID 100 is unique for the entire communications system, and since each instance of a communications object system ID 110 or any or any component class system ID is unique within the provider's database, the combination of these system IDs creates a hierarchical indentification system capable of uniquely identifying every communications object instance or object component class instance throughout the communications system. This unique ID for any communications object or communications object component will be referred to as its UID.

It can also be desirable to be able to assign provider groups within the communications system. Group identifiers allow providers to be classified for purposes of program licensing control, system attribute or system method access permissions, object attribute or object method access permissions, statistics gathering, or other purposes. For example, each employee of a large corporation would need a unique provider system ID, however the corporation would also need a group ID to identify the employee's communications objects as part of the corporation. The corporation may further desire to identify employees by subgroups such as division and department.

The system ID assignment function can be modified to provide this capability by including nested system IDs for each group association within the system ID database 41. The object class model for nested system ID associations is shown in FIG. 6. The system ID database 250 contains any number of unique system IDs 251. Each of these may in turn contain zero, one, or more unique system IDs that function as group IDs as shown in association 255. This nesting of IDs may be as deep as necessary. Each system ID 251 includes a name and description attribute. For top level system IDs this would be the name and description of the provider. For lower-level group IDs this would be the name and description of the group (company, division, department, etc.).

Each system ID 251 also includes a key attribute. This could be a password, encryption key, or any similar value. This value could be used in conjunction with an Authentication method of the system ID 251 to verify that the user applying for the group ID is authorized to be in that group. For example, a corporate administrator could establish a group ID for the corporation. The administrator would receive the initial key for that group ID. The administrator would need to communicate that key to each employee who would supply it in the request 44 (FIG. 5) to be assigned that group ID. Each system ID 251 can also be associated with one or more system ID category objects 252. System ID category objects can be used to establish system-wide groups useful for program licensing, statistics, access permissions, or other purposes. Category objects will be further explained below.

The system ID server 40 shown in FIG. 5 is available system-wide, and includes at least one system ID object instance 43 in the system ID database 41 for each provider. Since this object instance contains the provider's name, description, and an authentication key, the system ID server 40 is a suitable mechanism to offer both system name directory services and system authentication services. These services are further described below.

The system ID assignment function can be further improved by using communications objects included with or downloaded by provider and consumer programs 12, 22 to control the access of the provider and consumer programs 12, 22 to the system ID server 42. For example, if a group of system ID servers 42 was employed for performance or loading reasons, a communications object could determine the optimal member of the server group to access. Such specialized communications objects are referred to as service objects and will be further explained below.

Basic Object Transfer Processes

Figure 7:
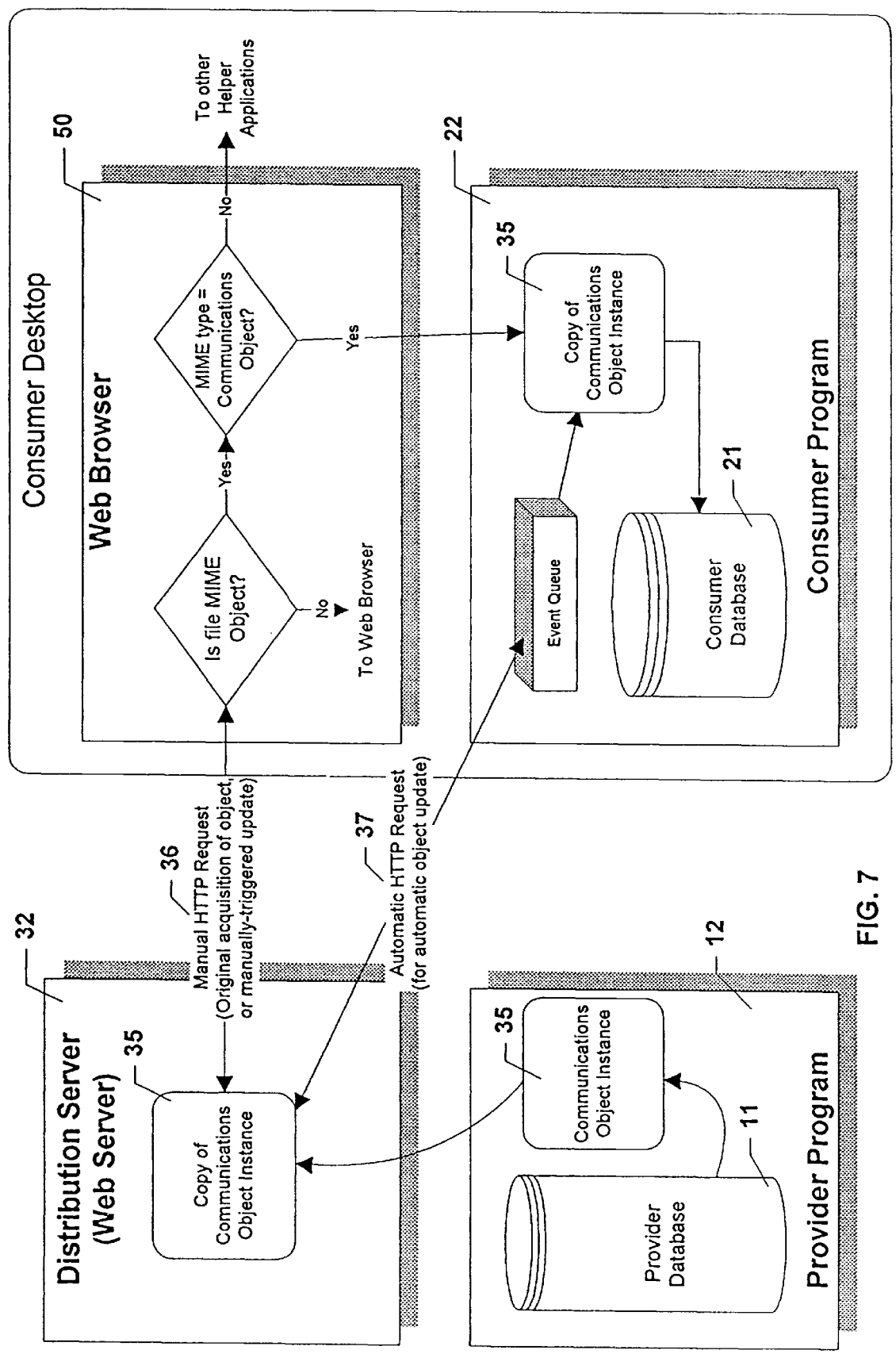
FIG. 7 illustrates a pull method of transmission of a communications object.

Besides using HTML as a display protocol, the Internet and World Wide Web also offer suitable protocols for accessing and transferring communications objects. A Web browser program 50 can be used both to retrieve the communications object and display it for viewing and editing to the consumer. The transfer of an object using a Web server 32 is illustrated in FIG. 7. An object can be transferred to a browser 50 as a result of a manual HTTP request by a user, or it can be transferred directly to the consumer program 22 as a result of automatic event processing such as polling. In the case of manual requests, the browser 50 issues a HTTP request 36 to the web server 32 to receive the communications object markup file 35 which is located on the web server 32. The HTTP request 36 can result from a URL manually entered by the user or through selection of a URL link from any Web page. Thus, providers who have World Wide Web documents can create links to their communications objects in those documents. A consumer can obtain a communications object simply by using a browser 50 to select the link. The object itself is then transferred as a standard Multimedia Internet Mail Extension (MIME) object type as defined by the Web HTTP protocol, in response to the HTTP request. The MIME type is discussed in Internet Request for Comment Nos. 1521 and 1522, incorporated herein by reference. As with other MIME objects, the browser program 50 determines whether a helper application exists for this type of MIME object. For a MIME type which uniquely identifies communications objects, the browser program 50 transfers the object to the consumer program 22 as the helper application.

In the case of a automatic HTTP request 37 from the consumer program 22 to the web server 32, the same MIME object transfer takes place, only the object is received directly by the consumer program 22. In either case, the transfer to the consumer program 22 principally results in the execution of a set of processing steps. These steps typically include decoding of the MIME object, reading of the object, and storage of the object in the consumer database 21. The consumer program 22 can also execute other processing steps based upon the version of the object, the consumer's settings for preference elements in the object, other consumer preferences, and other methods in the object. The processes for storing and processing communications objects are discussed below.

Figure 8:
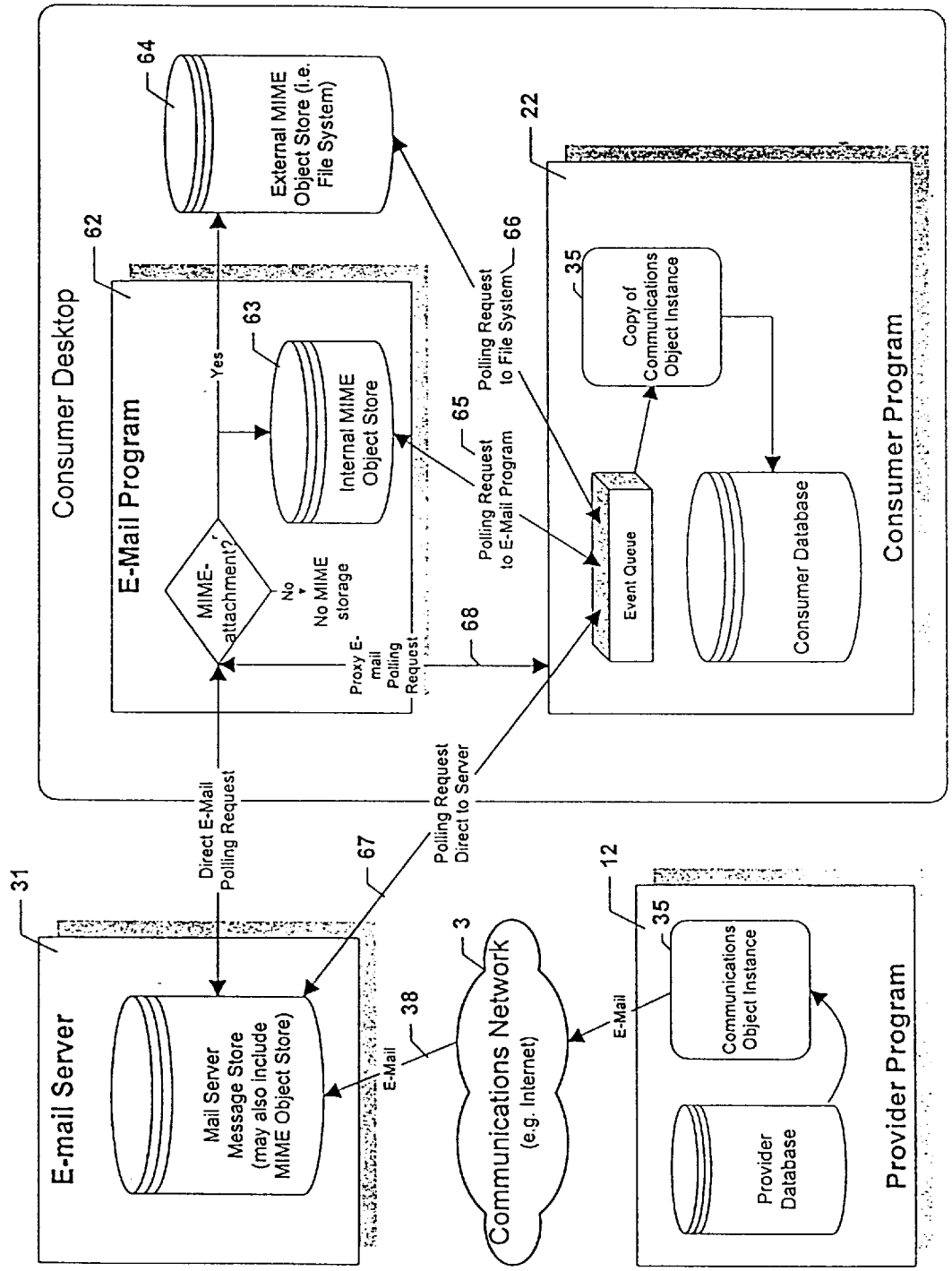
FIG. 8 illustrates a push method of transmission of a communications object.

FIG. 8 illustrates transfer of an object through e-mail using the push technique. The browser program 50 is not used for this function. The object may be attached as a MIME object to an e-mail message 38. Other attachment or encoding types may be used, such as BinHex or UUencoding. The object may also be encoded in ASCII within the text of the e-mail message itself. The optimal encoding method for each recipient can be selected and employed automatically by the provider program 12 when this information is included in the Recipients (120, FIG. 3) class, as further described below. The transmission steps for each attachment or encoding type may vary slightly. The transmission steps for a MIME attachment will be described here. The e-mail message is sent in the ordinary manner, using whichever e-mail servers and intermediaries are available (i.e., through the Internet 3), to reach the consumer's e-mail server 31. The consumer's e-mail program 62 retrieves the mail message from its server in the ordinary manner. Depending upon operation of the e-mail program, the attachment may be downloaded for storage in either an internal or external MIME directory 63, 64, or left for storage on the e-mail server 31. The consumer program 22 then periodically polls the MIME directory 65, 66 or the e-mail server 31 to locate objects of a communications object MIME type. If a communications object type is located, it is read from the storage location and processed by the consumer program as described below. It may also be deleted from the MIME storage area by the consumer program 22 after it has been read and processed.

Alternatively, all e-mail from a server can be filtered through the consumer program 22. In this process, the consumer program 22 acts as a proxy server. The e-mail program 62 polls 68 the consumer program 22, as the proxy server, for new mail. The consumer program 22, in turn, polls 67 the e-mail server 31. The resulting mail response is filtered for communications objects directly by the consumer program 22 before being transferred to the e-mail program 62.

Communications received via other types of communications networks can also be filtered for communications object transmissions in a similar manner. For example, telephone calls originated by a communications object can carry a distinctive tone or tone series which can be recognized by a receiving consumer program 22 in the same way a fax tone is recognized by a fax machine. This tone could be universal for all communications object types or could vary by special communications object types. Once the tone was recognized by the receiving program, a communications object transfer negotiation could take place between the calling provider program 12 and the receiving consumer program 22. This could be used to accomplish the transfer of communications objects, message objects, or other data independently, or to control or augment a voice telephony session.

Communications via postal mail networks can also be controlled by a communications object system in the same manner. The originating provider program 12 can control the printing of envelopes or enclosures in a machine-readable format such as bar codes. It can also control the production of transportable data files such as floppy disks or tape cartridges for transport via a postal mail network. At the receiving end, the mail or package envelope or contents can be machine scanned for data that can be interpreted by the receiving consumer program 22. Alternatively or in addition, the transported data files contained in the postal mail can be read by the consumer program 22 to process messages contained therein or to control the receipt and processing of accompanying physical goods or information.

Broadcast networks such as television or cable systems can represent particularly efficient means of transmitting communications objects or object updates via the push technique if the consumer computer 2 is equipped with a device for receiving and decoding the broadcast signal. By applying the filtering techniques described above to "listening" on a broadcast network, a consumer program 22 can receive only the communications object updates intended for communications objects in the consumer's database 21. Because broadcast networks are transmit-only, communications back to the provider must be accomplished using a "back channel" such as a telephone network or computer network, e.g. the Internet.

Provider Program Operation

As described above, the provider program 12 operates as a state machine in generating HTML screens and forms which are displayed by the user's browser program. The provider program 12 is used to create and edit instances in the provider database 11 of the object classes described above. The provider program 12 is also used to publish and distribute instances of communications objects to one or more consumer programs 22 or distribution servers 32 through the communications network 3.

Figure 9:
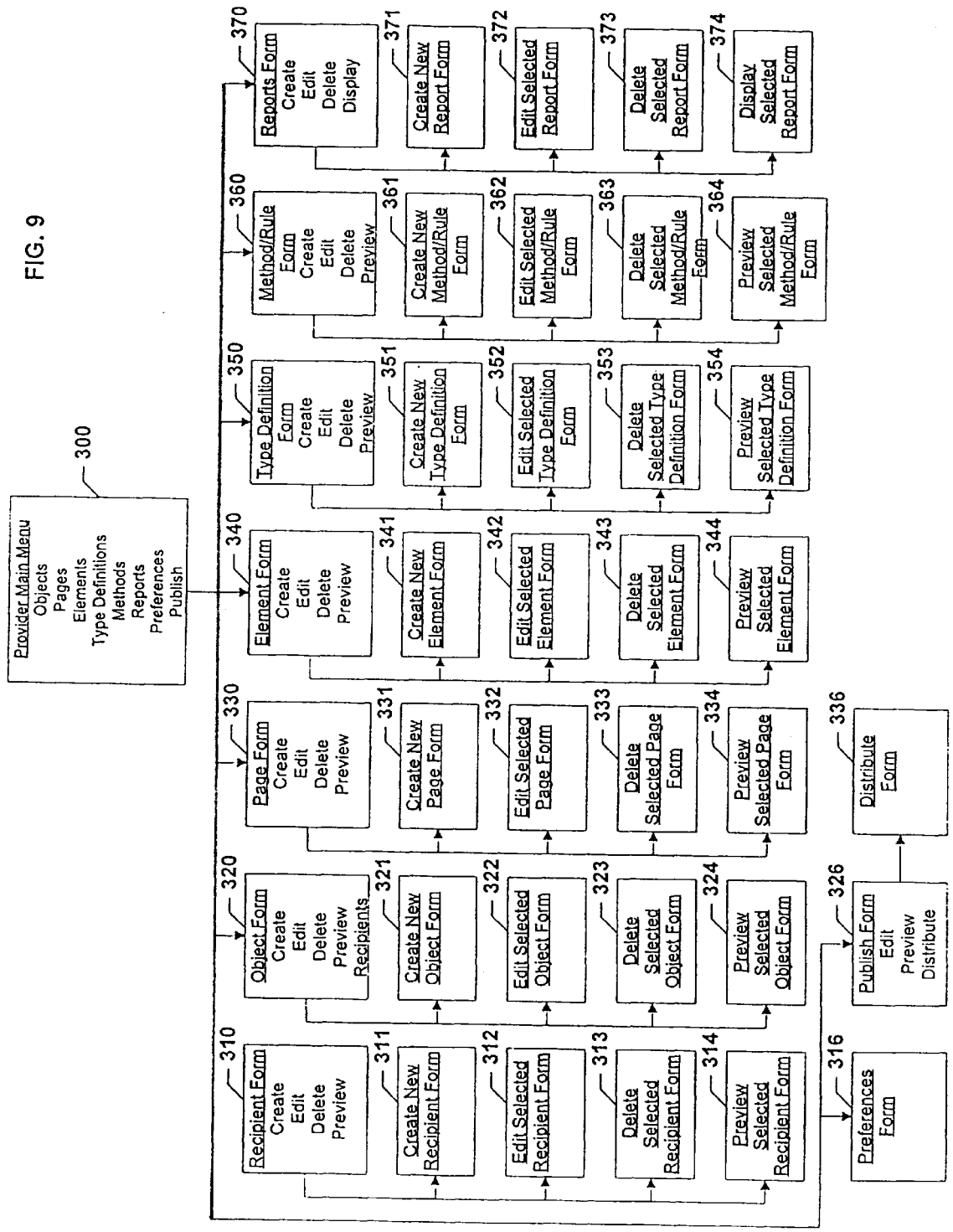
FIG. 9 illustrates operation of a provider program of FIG. 1 according to an embodiment of the present invention.

FIG. 9 illustrates the relationships between various screens and forms produced and used by the provider program. Upon starting, an HTML page of the main menu 300 screen is generated and displayed. If the browser program 50 (FIG. 2) is not currently operating, the provider program 21 starts the browser program 50 and generates a DDE, OLE, AppleEvent, or similar operating system request to start the browser program 50 and have it display the requested HTML page. The main menu 300 screen lists various menu items which are hyperlinks to other HTML pages containing additional menus or forms. The menus and forms discussed with respect to the provider program 22 or consumer program 21 are merely illustrative of the capabilities of the system. The features and functions of the system can be organized in any order or hierarchy within the screen based menu system. Alternatively, another native interface system could provide a substantially different organization. The use of a graphical user interface will be specifically discussed below. Additionally, other functions and features can be added by creating other menus or forms and adding hyperlinks between the existing menus or forms and those new screens. Furthermore, in addition to specific menus, various choices can be implemented on toolbars displayed on one or more of these HTML pages. In order to satisfy user preferences, many menus, forms, and toolbars can be editable by the user via preference forms or even direct HTML source editing. Such preferences may allow a different default startup menu screen, different toolbars, different menu choices on any given screen, different screen fonts or backgrounds, and other display or operational preferences.

The first five choices on the main menu 300 allow the user to work with the communications objects, pages, elements, type definitions, methods, and rules stored in the provider database. The provider program is primarily creating, displaying, editing, and reporting on objects in the provider database. Therefore, the menus and forms used by the provider program are similar to a the menuing, browsing, editing, or reporting modes of any conventional database application. Initially, there are no user-defined communications objects, pages, elements, type definitions, methods, or rules. (System-defined communications objects, pages, elements, type definitions, methods, or rules may exist but are not editable by the user). Upon selection of one of the menu choices, a HTTP request is generated to display the requested HTML page. The communications object 320, page 330, element 340, type definition 350, and method/rule 360 forms include similar functions: create, edit, delete, and preview. Although the functions are similar, each menu has links to different HTML forms used for performing the functions on the different types of data (communications object 321–324, page 331–334, element 341–344, type definition 351–354, and method/rule 361–364). In addition to the menu choices, a list of the appropriate class instances from the provider database 11 is displayed in order to select the data to edit, delete, or preview. In one embodiment, hyperlinks or form buttons for editing, deleting, and previewing are associated with each data item in the list. Alternatively, a single link to the edit, delete, or preview forms can be used and the data item can be selected from a list when the appropriate form is displayed.

The create forms 321, 331, 341, 351, 361 are respectively used to create a new communications object, page, element, type definition, or method/rule instance. A form is displayed having entry locations to input the necessary attribute data and create the desired associations. Association choices can be shown as lists of the associated class instances with checkboxes or input fields for each instance. For example, when a new page is created, the page create form 321 that creates a new instance of a page (142, FIG. 3) would include a list of communications objects (110, FIG. 3) to which the new page can be assigned. It would also include a list of elements (143, FIG. 3) that can be assigned to the page. The display order for these elements could be input as numerical values in input boxes representing each reference instance (146, FIG. 3).

Figure 10B:
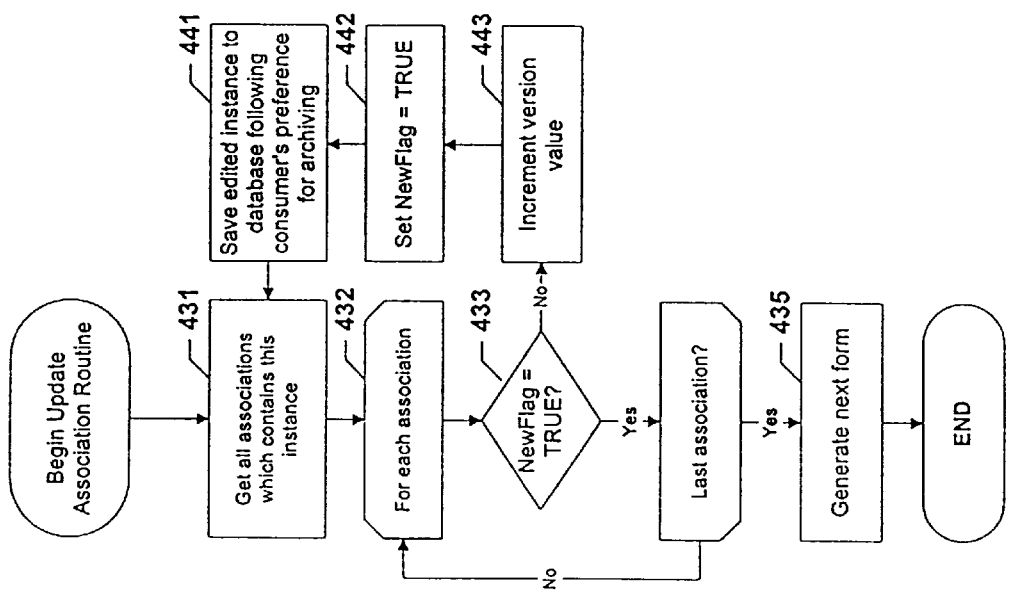
FIGS. 10A and 10B are block flow diagrams of operations of the processes for form submissions and update associations.
Figure 10A:
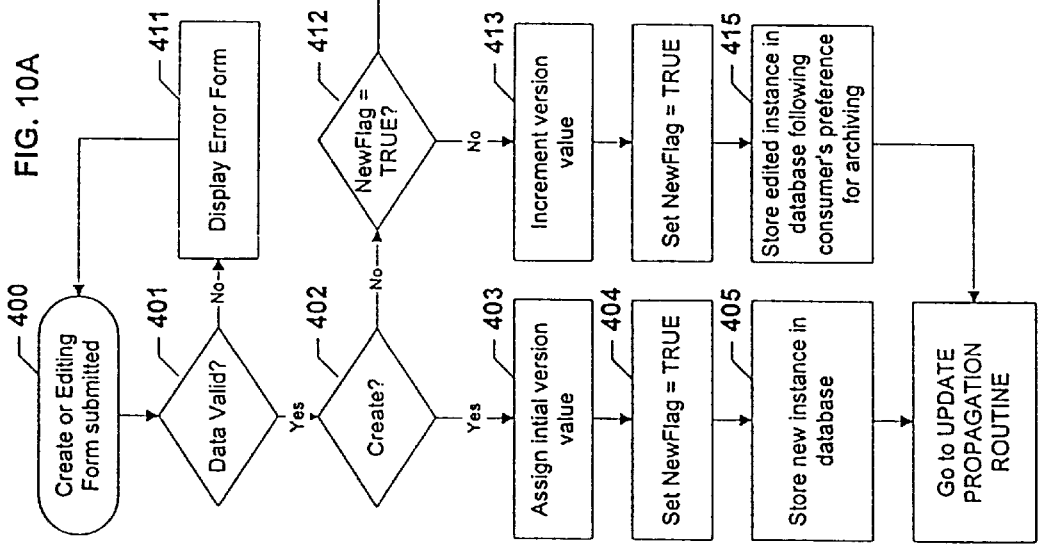

FIG. 10A shows the processing steps to be taken upon submission of a create form. These steps also apply to submission of an editing form as described below. When a create form is submitted (step 400), the provider program 12 first determines whether the form data is valid (step 401). If it is not the provider program returns an error screen or form with information about the error to the user (step 411). This error screen may include a form for correcting the error, or hyperlinks to other forms where the error can be corrected. Once a form passes the validation test, the provider program then determines whether the form is a create or an edit operation (step 402). For a create operation, the program next assigns the new instance an initial version value (step 403), sets the instance's NewFlag attribute to TRUE (step 404), and saves the instance to the provider database 11 (step 405). The version value is used to compare changed object class instances in the object reception processing. The NewFlag attribute is used to indicate a class instance that requires distribution.

The submission of any new or changed data in an communications object component class triggers the update association rule. This rule can be stored as a rule 140. The method associated with this rule is illustrated in FIG. 10B. In this method, the provider program first queries the provider database 11 for all associated class instances which contain the new or updated class instance (step 431). The program then processes each associated class instance to determine whether it is already identified as a new instance (steps 432, 433). If the associated class instance is not new, the version value is incremented (step 443), the NewFlag is set to TRUE (step 442), and the instance is stored in the provider database 11 (step 441). When an associated class instance becomes new, every container association with this instance must also be processed (steps 431–433). In this way the program processes the entire tree of all class instances which contain the newly created class instance, incrementing version values and marking them as new. This is necessary to ensure the complete distribution of all associations to any new or changed class instances. When all container class associations have been updated, the next HTML screen is generated (step 435).

The edit forms 322, 332, 342, 352, 362 shown in FIG. 9 permit the editing of instance attributes and associations in the database of the appropriate class. For example, the communications object edit form 312 will list the pages which currently exist in the database and therefore can be assigned to the object. A submitted edit form 322, 332, 342, 352, 362 is processed according to the steps illustrated in FIGS. 10A and 10B. A test for an edit form is performed in step 402. From this point there are only two differences from create form processing. First, if the NewFlag attribute of the edited class instance is already TRUE (step 412), this means the instance has been edited since the last distribution operation. In this case, the update association method need not be performed. The edited instance can simply be saved to the database (step 425) and the next HTML screen generated (step 426).

Second, edited instances do not necessarily replace the previous instance when stored in the database (steps 415, 425). Multiple versions of object instances may be maintained in the database so that the user can revert to previous data. The number of previous versions stored is controlled by a global preference attribute (103, FIG. 3) or a communications object preferences attribute (127, FIG. 3) and one or more archiving rules 140. Each time an edit form is submitted, the archiving rule 140 is triggered. Using the appropriate preference attribute, the archive rule determines if the preferred number of previous versions of the communications object (110, FIG. 3) are already stored in the database. If so, then the oldest version is deleted when a new version is stored. If not, the new version is added to any previous versions that exist. Data archiving control is further discussed below.

The delete forms 323, 333, 343, 353, 363 shown in FIG. 9 are used to remove class instances from the database. The form can require confirmation that the selected instance is to be deleted. Additionally, the delete form can provide a list of other instances of the same class in order to allow the selection of multiple items for deletion. Processing of a submitted delete form first involves executing the steps of the update association method illustrated in FIG. 10B. Then the selected class instance or instances can be deleted from the database. Instance deletion may follow a user preference for archiving a specified number of deleted instances, or maintaining deleted instances for a specified interval of time before purging them completely from the database.

The preview forms 324, 334, 344, 354 shown in FIG. 9 provide a display of a selected communications object, page, element, or type definition as it would appear to the consumer, without editing labels or internal naming labels. This is similar to the print preview mode of a word processor. Submission of a completed method/rule preview form 364 executes, when possible, the selected method or rule to test how it would operate in the consumer program 22.

The recipient form 310 accessed from the object menu 320 is used to assign the recipients (120, FIG. 3) who will receive each communications object. From this form the user can add or delete recipients associations for the selected object by the use of checkboxes for each recipient. The user can also choose to go to four additional forms. The create recipient form 311 allows the user to add a new recipient instance to the database. The edit selected recipient form 312 allows the user to edit the recipient's settings for communications object distribution. The delete recipient form 313 permits the user to delete a recipient from the database. No special processing is required when adding, editing, or deleting recipient instances since they are not a communications object component and there are no associations that contain them. However, NewFlag and HoldFlag attributes for recipients are set as described previously for purposes of communications object distribution. The preview recipient form 314 allows the user to see precisely how any selected communications object and its component pages and elements will appear to a selected recipient.

The reports form 370 is used to create, edit, delete, and display reports (120, FIG. 3) from the database. Menu items link it to the create report form 371, edit report form 372, delete report form 373, and display report form 374. The preferences form 316 is used to edit the user's overall preferences (GlobalPrefs 103, FIG. 3) for program display and operation.

An object is published by using the publish menu form 326. Publishing refers to the process of reviewing and finalizing changes and initiating distribution. When selected, the publish menu 326 provides a list of communications objects, pages, elements, type definitions, methods, rules, and recipients which have been changed since the previous publishing operation. The items on the list can be selected, edited, and previewed in a manner similar to that under the respective communications object, page, element, type definition, and method/rule menus. One editing action a user might typically take at this time is to set the HoldFlag attribute to TRUE. When this is done all other editing changes are preserved but the class instance will be withheld from distribution until the HoldFlag attribute is reset to FALSE. Once the user is satisfied that all the information is correct, the user selects the distribute form 336. This form first provides the opportunity for a final confirmation that the new information is ready to be published. It also allows setting of various parameters relating to the distribution process. One such parameter is the date and time the actual distribution operation should occur if it is not to take place immediately. Another parameter is an acknowledgment setting and acknowledgment interval, which are described below. Once the distribute form 336 is submitted, the communications object generation and distribution process is initiated.

Basic Communications Object Distribution Process

In the communications object distribution process, instances of the communications object (110, FIG. 3) are created and transmitted to the recipients (120, FIG. 3) associated with the object. This processing proceeds in accordance with the instructions on the distribute form (336, FIG. 9) and the attributes and methods of the recipient (120, FIG. 3). Two different techniques can be used to publish an existing communications object which has been updated. The entire communications object, including all of the changes, can be transmitted each time it is distributed. Alternatively, only the component class instances which have been changed may be sent. The only difference is that in the second technique the distributed communications object only contains the class instances and associations where the NewFlag attribute is set to TRUE. Instances and associations which have not changed are ignored. Therefore, whether the unchanged data is sent to the consumer program is irrelevant. Whether to send a complete object or only changed components depends upon the complexity of the object and the potential for communications objects to become desynchronized due to transmission errors. Complete-object transmissions can also be intermixed with updated-components-only transmissions on a periodic basis to prevent dysynchronization errors. The type of update distributed can also be controlled on a per-recipient basis by the attributes of the recipient's object (120, FIG. 3).

FIG. 11 illustrates the process performed by the provider program 12 in distributing an entire object. The provider database 11 is queried (step 501) to determine all new or changed communications objects which need to be published, i.e., those which have a NewFlag attribute set to TRUE and a HoldFlag attribute set to FALSE. The program then loops (step 502) through each communications object instance 100 which is to be published. For each object the program reads the associated recipients 120 (step 503). The program begins a second loop (step 504) through each recipient 120. Using the recipient attributes and methods, a communications object instance is generated and transmitted to this recipient (step 505, further shown in FIG. 12). The loop is repeated for all recipients of the communications object.

At this point all new or changed communications objects have been distributed to their assigned recipients. However, a new or edited recipient may need to receive an existing communications object that has not changed. To account for this case the provider program queries the database for all recipients 120 whose NewFlag attribute is TRUE and HoldFlag attribute is FALSE (step 511). The program then loops (step 512) through each of these recipients 120, quering for the associated communications objects 110 where the NewFlag attribute is FALSE (step 513). The program then loops (step 514) through each of these communications objects 110 executing the object generation and transmission routine for each object (step 515).

After all communications object instances 110 have been transmitted, the program does another query of the database for all class instances where the NewFlag attribute is TRUE and HoldFlag is FALSE (step 521). The program loops through these instances and resets their NewFlag attribute reset to FALSE (steps 522, 523). This prepares the database for the next round of editing and publishing.

Figure 12:
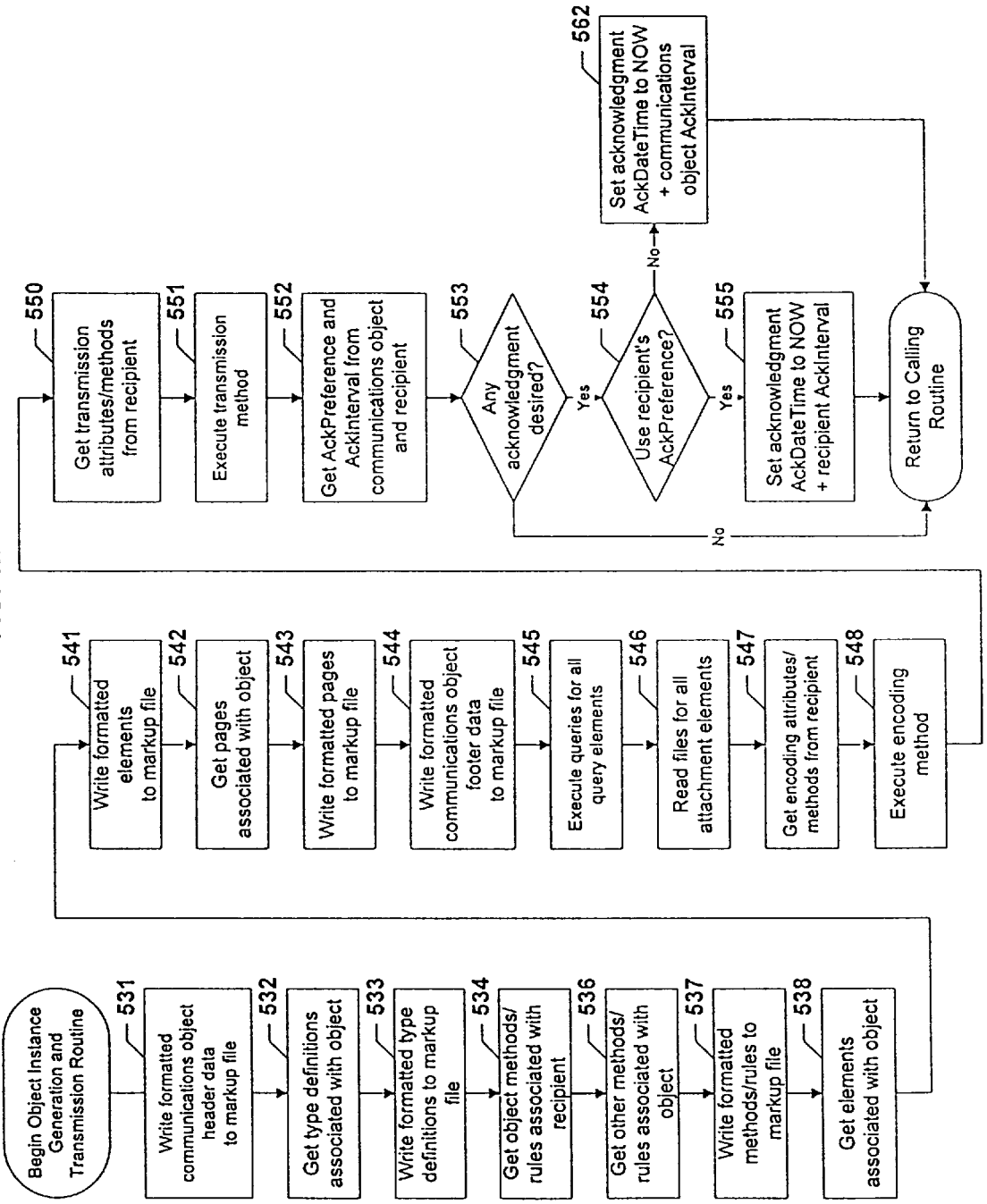
FIG. 12 is a block flow diagram for a communications object generation and transmission routine.

The procedures for generating and transmitting the communications object instance for each recipient are illustrated in the flow chart of FIG. 12. The program begins by creating (Step 531) a header portion of an object markup file from the attributes of the communications object (110, FIG. 3). A header portion includes a header tag, the provider's system ID (the SystemID attribute of database 100, FIG. 3), and any group IDs or category IDs (250, 251, 252, FIG. 6), the communications object 110 system ID attribute, and other attributes of the communications object appropriate for transmission. (Note that the combination of the provider's system ID and the communications object 110 system ID consitutes the communications object's UID described previously.) Next, the program reads all type definitions (144, FIG. 3) associated with the object (step 532) and writes them in the markup language format to the markup file (step 533).

The program then retreives the communications object's methods and rules (step 534) which are associated with the recipient (120, FIG. 3). Associating methods and rules with recipients allows each communications object instance to use optimal methods and rules for that recipient. An example is update methods. A communications object transmitted to a distribution server 32 such as a web server would use an update method for pull distribution. A communications object transmitted via e-mail to a consumer would use an update method for e-mail push distribution. Receipt methods are another type of method that might typically vary by recipient. Next, the methods and rules that are associated directly or indirectly with the communications object are read and written in the markup language to the markup file (steps 536, 537). Indirect associations are methods or rules that are associated with a page, element, or type definition which is associated with the communications object. This process is repeated for elements (steps 538, 541) and pages (steps 542, 543). Finally the necessary footer information is read from the communications object and written in the markup language to the markup file (step 544). The markup file now includes the complete object ready for transmission.

If only changed components of the communications object were to be transmitted, rather than an entire object being resent, only the type definitions, elements, pages, methods, and rules which have changed, i.e., those having NewFlag attributes set to TRUE, would be stored in the markup file. Unchanged pages and elements would be omitted.

Because the actual transmission may include addtional data besides the communications object itself, the following two steps involve executing any queries indicated by query elements (step 545) and reading any attachments specified by attachment elements (step 546). These two processes will be further described in the discussion of data exchange control below.

At this point all the parts of the message are ready to be encoded for transmission. Encoding attributes and methods are associated with the recipient 120. This allows communications object transmissions to be encoded in an optimal or desired format for each recipient. For example, e-mail recipients who use MIME attachments can receive MIME objects, while e-mail recipients who cannot read MIME can receive BinHex attachments or have the communications object markup file encoded directly in the ASCII text of the e-mail message. Compression, encryption, and other encoding methods can also be applied. Encoding service objects may also be employed. Encoding control and encoding service objects are further described below. The recipients encoding attributes and methods are read (step 547) and the encoding methods are executed (step 548).

After encoding, the communications object is transmitted to the recipient according to the attributes and methods of the recipient (steps 550–551). As discussed previously, according to a preferred embodiment, objects sent directly to consumer computers 2 using the push method are sent as e-mail messages or message attachments to the addresses of the recipients. These transmissions can be queued using scheduled events 117 to reduce system load. Objects sent to a distribution server 32 for distribution using a pull method are saved to the appropriate web server document directory. Alternatively, based upon the access the provider has to the provider's web server, the object could be mailed to the Web server administrator, uploaded as an HTTP form to the Web server, or otherwise stored for later posting by the Web server administrator. The transmission steps could also include an e-mail message, voicemail message, or other notification to the administrator that the object is ready to be stored on the server. Alternatively, transmission to a distribution server 32 can be automated through the use of a distribution service object. Distribution service objects will be further discussed below.

The final set of steps is to record data about the distribution in an acknowledgment association (121, FIG. 3). First, in step 552 an AckPreference value and the Ackinterval value are retrieved from both the communications object intance (110, FIG. 3) and the recipient instance (120, FIG. 3). This is necessary because acknowledgment can be controlled at the communications object level, or the recipient level. The acknowledgment attributes for the communications object are transmitted as parameters to a receipt method, as further described below. The distribute form (336, FIG. 9) contains radio buttons for three choices: no acknowledgment, acknowledgment using communications object settings, or acknowledgment using recipient settings. If the provider's choice was no acknowledgment (step 553), the routine is finished. If the recipient settings were selected (step 554), an acknowledgment association (121, FIG. 3) is created between the recipient (120, FIG. 3) and the communications object (110, FIG. 3). The AckDate Time value of the acknowledgment association (121, FIG. 3) is set to the date/time of transmission plus the recipient's Ackinterval and the AckFlag is set to FALSE (step 555). If the communications object settings were used, the AckDate Time is set to the date/time of transmission plus the communications object's AckInterval and the AckFlag is set to FALSE (step 562). The AckDateTime value and the AckFlag value of the acknowledgment association (121, FIG. 3) can now be used by the provider program 12 to check for missing acknowledgments as of the acknowledgment due date as further described below. This completes the object generation and transmission routine.

Consumer Program Operation

One advantage of the communications system of the present invention is that the transmitted communications object instance can be automatically received, processed, stored, and indexed by the consumer program 22. Since the data is structured as an object and stored in an object-oriented database 21, the data it contains can be easily searched using the consumer program 22 in order to locate specific information or perform certain functions.

The consumer program 22 may also coordinate with operation of other applications on the consumer computer 2 in order to provide the data to those additional applications. For example, name and address information may be transferred to a personal information management program. E-mail address information can be transferred to an e-mail program for its address book. Similarly, data can be transferred to word processing or spreadsheet programs to be incorporated into documents. Also, the proper information can be used for standard electronic data interchange (EDI) formats or other types of electronic information exchange. Alternatively and in most cases preferably, these other applications can access the consumer program through an API to retrieve communications-related data when needed. These applications can also call the methods of the communications objects to automate data interchange with the provider of the object. This has the advantage of storing the data and methods only once on the consumer's desktop, saving storage space, decreasing complexity, and increasing the accuracy of the resulting communications. The use of an API for communications object access will be further discussed below.

Figure 13:
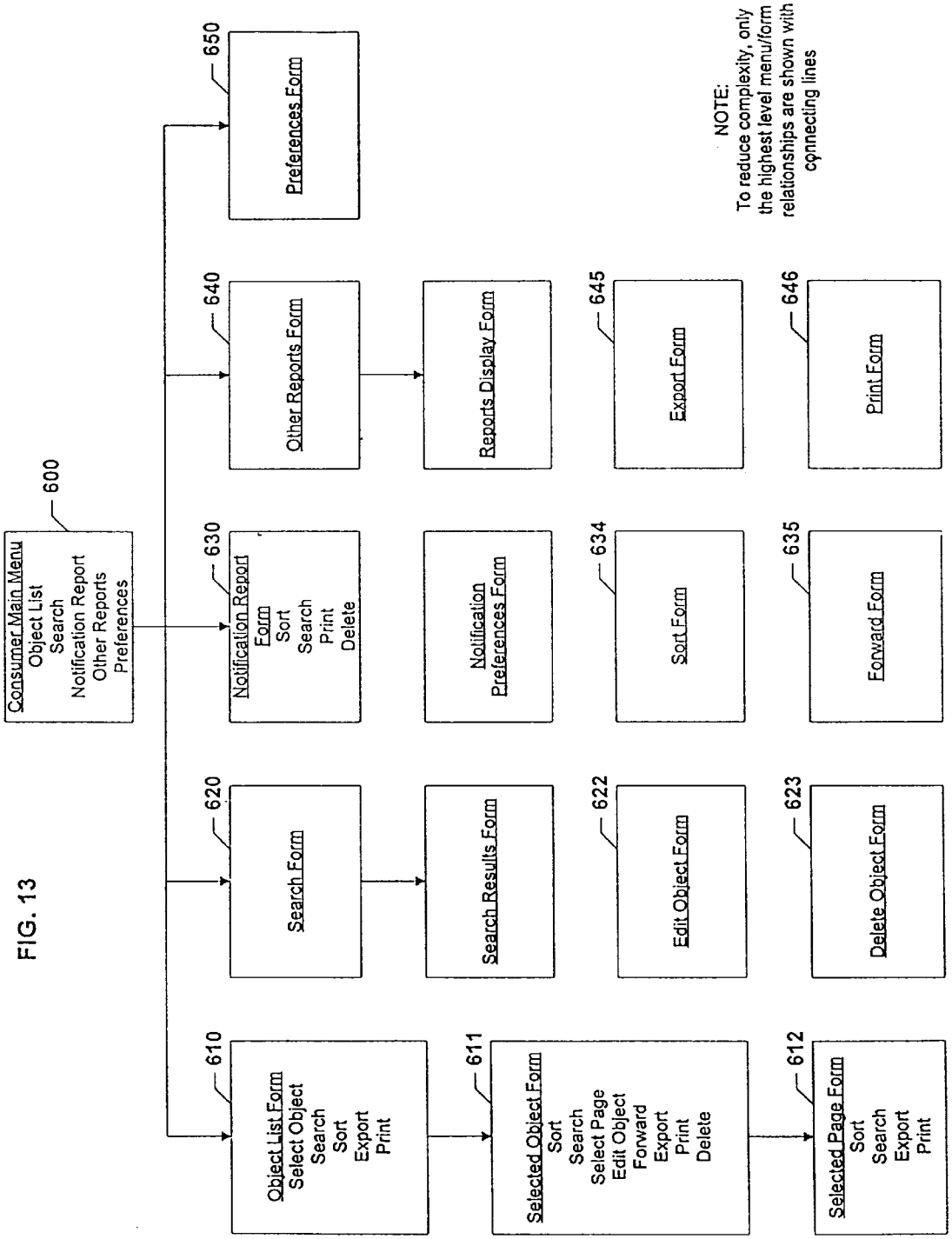
FIG. 13 illustrates operation of a consumer program of FIG. 1 according to an embodiment of the present invention.

FIG. 13 illustrates the relationships between various screens and forms produced and used by the consumer program in processing objects stored in the consumer database. The consumer program is primarily reading, editing, and reporting on objects to the consumer database. Therefore, the menus and forms used by the consumer program are similar to a the browsing, editing, or reporting modes of any conventional database application. Upon startup, an HTML page of the main menu 600 screen is generated and displayed. As with the provider program 12, the menus and forms discussed with respect to the consumer program 22 are merely illustrative of the capabilities of the system. They can be organized in any order or hierarchy, and other functions and features can be added by creating or modifying other menus, forms, or toolbars.

The main menu 600 lists the principal types of functions which can be performed by the consumer program 22. The object list form 610 provides a directory to the communications objects in the consumer database. A name or other identifying information for each object is displayed in a list format. The name or identifying information also functions as a hyperlink to the object. The user can set various attributes of the display, such as formatting of characters, amount and order of information identifying the object, and organization of the communications objects in the list, using the preferences form 650. The choices in the object list form provide access to forms for performing functions with respect to the attributes or methods of one or more communications objects selected in the object list.

Figure 14:
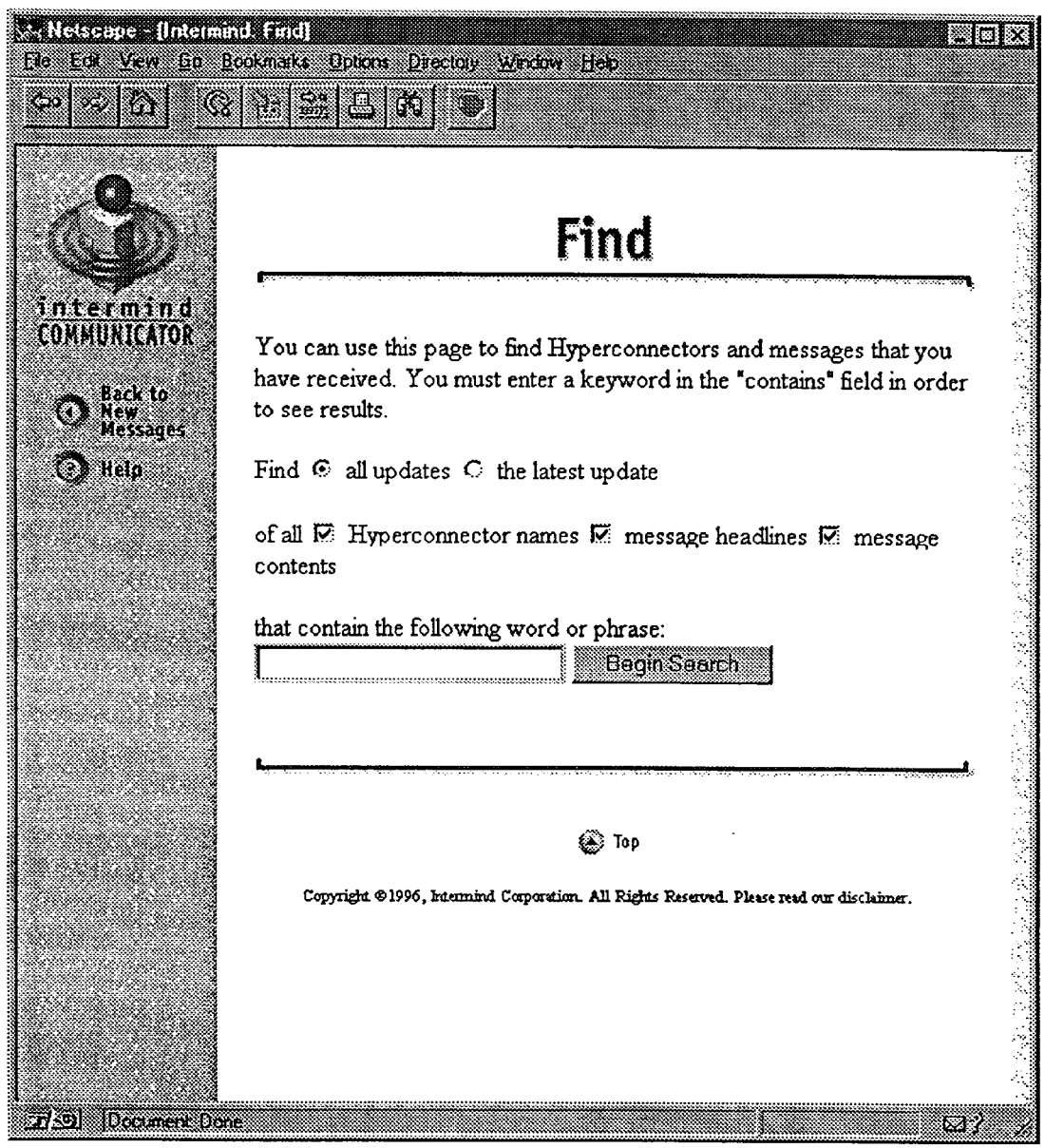
FIG. 14 represents a user interface display for a form for inputting information in conjunction with an embodiment of a consumer program.

The search form 620, as illustrated in FIG. 14 will be used as an example for processing of a form request. The search form 620 presents the user with a screen which allows the input of information, whether typed in or selected as check boxes. As illustrated in FIG. 14 the search form 620 includes a location to enter a search string. The search may also be expanded or limited based upon the form from which the search form was requested. For example, if the search form 220 was selected from the selected object form 211, then only that selected object is searched. The user may elect to search all objects instead by checking an appropriate checkbox. Similarly, the search can be limited to certain folders of communications objects. The user can also select the method for display of the search results. When the search form 220 is submitted as a request, the consumer program 22 will then act to process the form (step 57 in FIG. 2). The processing of a search form results in a query of the consumer database 21 according to the search attributes entered in the form. The query is performed in the same manner as queries for any object-oriented or relational database. A search report is then generated as the next screen (step 53 in FIG. 2), which is outputted to the browser program 50 and displayed (step 54 in FIG. 2). In the search report, the consumer program 22 will automatically generate a hyperlink URL for each communications object name and page name displayed so that the respective object and page can be selected.

Referring back to FIG. 13, other functions shown in the object list form 610 (sort, export and print) operate as forms in a manner similar to that for the search form 620. Selection of the choice causes a URL request for the appropriate form, which is displayed. The user can then complete the information in the form and submit the form for processing. After processing, the next appropriate screen will be generated and displayed.

The sort form 634 presents a set of options for displaying communications objects, pages, and elements. Choices include sorting by container (such as a folder), order (ascending or descending), and unit (object, page, element). The class instances in the consumer database 21 are then sorted according to the selected criteria and redisplayed.

The export form 645 operates to transfer data from the database to be used by other applications, such as a contact file for a personal information manager or a mail merge list for a word processor. First, a search or sort is performed to select a group of communications objects, pages, or elements to be exported. The export form includes choices to select the elements to export, the destination (such as a disk, file, clipboard, etc.) and a format. Upon submission of the completed form, the data meeting the export form criteria is transferred to the selected destination in the selected format. The data can then be used by the other application. A screen identifying the results of the export is then displayed.

The print form 646 is used to print information in the database. Some routine print functions can be performed by the browser program 50. However, other printing functions, such as printing selected elements or pages or using special print formatting, can be performed directly from the print form. The print form requests information relating to the selection of elements to be printed and the format for printing. A results screen can also be displayed after the print operation.

The select object function results in a display of the selected object form 611. An object may typically be selected by selecting its name on a form, which is hyperlinked to the object. In the selected object form 611, the names of the pages of the object are displayed in a list, with hyperlinks to each page. From the selected object form 611, the user can sort, search, export and print using the forms as discussed above with respect to the object list form 610. Other choices are also possible with respect to the selected object which will be discussed further below.

An edit object form 622 can be used to edit a communications object's attributes, including its component elements. Most attributes and elements of a communications object are defined by the provider and are not editable by the consumer. However, certain elements are defined by the provider specifically for editing by the consumer. These preference elements may include polling refresh intervals, return receipts, subscription elements, and notification elements. A consumer may also assign other attributes and associations to a communications object. These include folder assignments, nicknames, notes, notification priority, expiration date, and archive method. All communications object attributes and element attributes edited by the consumer are stored separately from the object in the consumer database 21. This is accomplished by use of the CommObjectPrefs class 127 and ElementPrefs class 147 shown in FIG. 3. Whenever the consumer first edits or adds communications object attributes, an instance of the communications object preferences class 127 is created in the consumer database 21 and associated with the communications object 110. Similarly, whenever the consumer first edits a preference element, an instance of the element preferences class 147 is created and associated with the element 143. The edited or assigned attributes are stored in these two class instances, and appropriate methods 141 are stored with or associated with these classes (these associations are not shown in FIG. 3 due to space limitations). In this way the consumer's data is not overwritten when an updated communications object is received. Additionally, the consumer may forward a communications object without including the consumer's own attribute preferences, although the consumer may optionally choose to do so. Communications object forwarding is described further below.

The delete object form 623 shown in FIG. 13 allows a communications object to be removed from the consumer database 21 if the information is no longer desired. The form also allows the consumer to reconfirm that the selected object is to be deleted. Additionally, the user may select certain options for deletion. Such options may include maintaining the object for a predefined period before actual deletion, or storing basic information (such as an object name, UID, and update method) so that the object could easily be retrieved again if needed.

The select page option displays the selected page form 612 which provides a listing of the elements on that page. Typically, the page (142, FIG. 3) would be displayed using the display order attribute of each page reference (146, FIG. 3) as specified by the provider. However, the user may resort the elements using the sort form 634. If a page contains editable preference elements (143, FIG. 3), the HTML rendering of the element on the page would include the input form fields necessary to edit the preference element. It would also include the form processing method name necessary for the consumer program 22 to validate and store the edited element preferences in an element preference instance (147, FIG. 3). The export form 645 and print form 646 can also be used with respect to a selected page or elements on the selected page.

The notification report form 630 is selected from the main menu 600 in order to provide information about new communications objects, updates to existing objects, messages received by objects, database status messages, and other news of which the user wishes to be informed. The notification report form provides the user with the capability to select and filter information received from a provider. Operation of this form is discussed below in connection with notification element processing.

The user can generate other reports relating to the consumer database using the other reports form 640. Standard reports might include database statistics (total objects, pages and elements; database file size; and size of objects being held), object statistics (frequency of use; last use; age in system; total age; size; number of updates; and last update), and transaction logs (number of updates; percentage of CPU time used, online time used; percentage of errors; and types of errors). Additionally, consumers could specify their own database reports to be added to this form.

The preferences form 650 allows the user to edit operational preferences that apply to the consumer database 21 or consumer program 22 as a whole. These can include configuration options such as the initial menu to display upon startup, the colors and fonts for the forms and data, and field defaults. The user may also select options such as a default refresh interval to use for new objects, a default expiration period, and default settings for editing or preference forms.

Basic Communications Object Reception Process

FIG. 15 is a flow chart illustrating the operations for processing communications object instances 110 received by the consumer program 22. As shown, an entire object is provided (Step 700) to the consumer program 22 each time any changes are made to the object. Alternatively, only the changed portions of the updated object may be sent in an object update. These processing steps for this case are not described but are substantially similar. Upon receipt of the object, the consumer program 22 first determines whether the received object is a message object (step 701). Message objects and their processing will be explained below. If the received object is not a is message object, the next step is determining whether the communications object already exists in the consumer database 21. This is done by querying (step 702) the consumer database 21 for the UID of the communications object 110. If the UID does not exist, the object is processed as a new object.

For new objects, the consumer program 22 first executes the consumer's GlobalPrefs NewObjectReceipt method (step 703). This method allows the consumer to control the processing of new communications objects. Typically this method will store the object to the consumer database 21. However, the consumer may wish to discard objects received from any provider system ID on a list maintained in the consumer database 21, commonly referred to as a "kill file". Additionally, the NewObjectReceipt method controls the permissions the consumer extends to the new object to execute its own receipt method(s). For example, new objects from providers whose system ID is not in the consumer database 21 may not be allowed to execute their receipt method, while new objects from known providers may be extended this privilege. Receipt methods trigger automatic actions taken when a communications object or object update is first received by a consumer program 22. For example, a receipt method may automatically return an acknowledgment message back to the provider confirming the consumer's receipt of the object or object update. Receipt methods and acknowledgment messages are further described below.

Once the NewObjectReceipt method has been executed, the consumers notification preferences for new objects are retrieved (step 704) from the NewObjectNotify attribute of the GlobalPrefs class (103, FIG. 3) in the consumer database 21. A test is done to see if notification is desired (step 705). If so the consumer program 22 retrieves and executes the consumer's GlobalPrefs NewObjectNotify method (step 706). The user may wish to have the object displayed immediately, to receive an e-mail about the new object, to include a message about the new object in the user's notification report (including its size, methods, update intervals, etc.), or any other notification action or combination of actions. Notification preferences and methods are further described below. Also, different actions may be taken based upon the program state and operation involved with the object's arrival. For example, the user may wish to have an object displayed immediately if the user manually selected it as a HTTP request from a Web site, but not if it was an object update retrieved automatically via a Web HTTP polling request by the consumer program 22, or if it arrived via e-mail. Different actions may also be taken based upon attributes or methods of the communications object itself, or a comparison between these and with the existing objects in the consumer database 21. For instance, the consumer may wish to immediately display new objects from selected providers whose system ID is already present, but only have notification in the notification report of new objects from any other provider system ID.

After any notification methods have been executed, the consumer program 22 executes any other system methods that may apply to new communications objects (step 708). For example, a Register method would check to see if the updated object wished to register a new public method (141, FIG. 3) in the consumer database 21. After any system methods are executed, new communications object processing is complete.

In step 702, if an object already exists in the database, then it is processed to determine what changes have occurred and what actions should be taken by the consumer program 22 because of those changes. In this way the communications control system of the present invention functions not just as an information transfer system but as an event processing system. Both the provider and consumer share control over the processing that takes place when knowledge of an event is transferred from provider to consumer. The first event, the arrival of a communications object update, is processed in step 714. The version value of the updated communications object 110 is compared with the version value of the most recent version stored in the consumer database 21. In the authoring process, the update association rule and method (FIG. 10B) has ensured that any change to a component of a communications object results in the communications object's version value being incremented. Therefore if the newly received object's version value is older or equal to that of the existing object, the newly received object is not new. In this case the object is either discarded, or other processing may take place depending on the consumer's preferences, such as notification in the consumer's notification report (step 713). Communications objects with equal or lesser version values typically represent retransmissions due to distribution errors by the provider, forwarded objects from other consumers, or manual retrievals of an object by the consumer when the consumer is unsure of the object's update status.

If the newly received communications object's version value is newer than the last version stored, the consumer program 22 first stores the updated object in the consumer database 21 (step 715). The next set of steps involves updating communications object associations. When a consumer is able to edit data related to a communications object, this data needs to be stored separately from the communications object so it is not overwritten by a subsequent communications object update. The data structures necessary to accomplish this are shown in FIG. 3. First, when a consumer first edits any attribute relating to a communications object 110 as a whole, an instance of the communications object preference class 127 is created by the consumer program 22. This instance 127 has a one-to-one association with its parent communications object 110. It also has a one-to-many association with folder instances 115. These associations are created using the edit object form (622, FIG. 13), and allow the consumer to further control processing related to this communications object. A consumer is also able to edit preferences related to specific elements 143 within the communications object 110. As described above, these preference elements are a mechanism for providers to give consumers control of specific types of communications object update processing. Whenever a consumer edits a editable preference element 143, an instance of the element preference class 147 is created by the consumer program 22. This element preference instance 147 has a one-to-one association with its parent element 143. Optionally it may also have an association with one or more folder instances 115, which allow the consumer to further control processing related to this preference element. When an updated communications object is received by the consumer program 22, the associations between the communications object preference instance 127 and each element preference instance 147 need to be updated to the new "parent" communications object 110 and elements 143. These update steps are shown as steps 716 and 717 of FIG. 15. Referring again to FIG. 3, if an element 143 for which an association with an element preference 147 exists is absent in the communications object update, the consumer may wish to be notified and/or the element preference instance 147 deleted. This can be accomplished via a notification method as described below.

The consumer program 22 then proceeds with additional processing steps depending on the contents of the new and old versions of the communications object 110. First, this means executing any receipt methods 141 or rules 140 associated with the communications object 110. Referring again to FIG. 15, receipt methods 141 or rules 140 assigned by the provider are executed first (step 721). Receipt methods 141 or rules 140 assigned by the consumer, i.e., those associated with the communications object preference instance (127, FIG. 3) associated with the communications object, are executed next (step 722). Receipt methods and rules and their use are further described below.

After receipt method processing, notification processing is carried out. Processing of notification elements (steps 723–727) is further described below. After notification processing, the consumer program 22 executes any other system methods that apply to updated communications objects, such as the Register method (step 731). Finally, the consumer program 22 checks the archive preference attribute of the communications object preference instance (127, FIG. 3) to see if it exists (step 735). Archive preferences determine the number of previous instances of a communications object stored in the consumer database 21. This is identical to how archiving works for previous versions of communications object components stored in the provider database 11. In a preferred embodiment, consumers can control archiving either globally or by individual communications object. If the consumer has indicated an archive preference for the object, the consumer program 22 executes the archive method indicated by the communications object preference (step 736). If no such archive preference exists, the consumer program 22 executes the archive method indicated by the consumer's global preferences (103, FIG. 3) in step 737. This completes the processing of an updated communications object.

Combined Provider and Consumer Program Operation

The functions of provider and consumer programs and databases have been separated in the above discussion in order to simplify the description of the communications system of the present invention. However, in one embodiment, the program functions and databases are combined. Thus, a single database includes all of the communications objects and object components which have been created or received by the user. This eliminates complexity and saves disk space for the user. The program offers the provider functions when creating and distributing communications objects, and the consumer functions when receiving and processing them. Combining the program functions and databases in this way yields significant additional functionality not available when the programs and databases are separate.

First, communications relationships can be linked in both directions between users. Referring to FIG. 3, when the programs are separate, the provider must create and maintain a recipient instance 120 for each desired recipient. When the programs are combined, however, the functions of a recipient instance 120 can be replaced by a communications object instance 110 received from that recipient. By including an element 143 of a special composite type "ReceiveObject", the received communications object 110 can supply all the fields required of a recipient instance 120, including network address, preferred encoding format, and preferred transmission method. The provider only needs to make an association once between the recipient's communications object and the provider's own communications object or objects 110. From that point onward, the provider no longer needs to maintain these attributes or methods of the recipient instance 120, as they will be updated automatically from the recipient's communications object 110.

Second, all the elements, type definitions, and methods of both received and transmitted objects are present in a single database and program operation environment. This allows the provider to use the attributes and methods of received objects for other purposes. For example, special communications object types can be used to supply services needed by other communications objects. Such services include directory services, authentication services, payment services, and feedback services. These "service objects" will be further discussed below. Components from received communications objects can also be reused within the provider's own communications objects, thus creating "synthesized objects". Synthesized objects will be further discussed below.

Third, the elements and methods of the provider's own communications objects can be made available to communications objects from other providers. This allows for the automated, intelligent exchange of many types of standard personal or business data which otherwise would require human effort. Data exchange automation will be further discussed below.

Fourth, a single notification report system can be used to report messages and events to the user, whether they are associated with provider objects or consumer objects. Notification reports are described below.

Event Loops, Event Logging, and Event Scheduling

The provider program 12 and consumer program 22, whether combined or separate, operate internal event processing loops similar to many computer operating systems or software programs which need to handle user and system events as well as scheduled or automatic operations. The main event loop is illustrated in FIG. 16A. In this loop the program first checks to see if there is a system event waiting for processing (step 751). If so, the program processes the event (step 752). It then determines if the event requires logging (step 753), either by a method included directly in the event, or by checking the system ID of the source class initiating the event against event logging rules in the rules class 140. If logging is required, the program generates an instance of the logged event class (118, FIG. 3), recording the date and time of the event, the system ID of the source object requesting the event, the system ID of the target object carrying out the event, the event type (for example, polling, inserting, editing, deleting), and the event results.

If there is not an event waiting in step 751, or when an event does not require logging in step 753, or when the event logging task is finished in step 754, the program begins idle processing tasks (step 755). During idle processing periods other specialized event loops can be processed until the expiration of the main event loop (step 756). These specialized event loops may include a scheduled event loop, an inbox/outbox monitoring loop, a rule-monitoring loop, and so on. The specific event loops used are not a limiting feature of the invention.

Figure 16B:
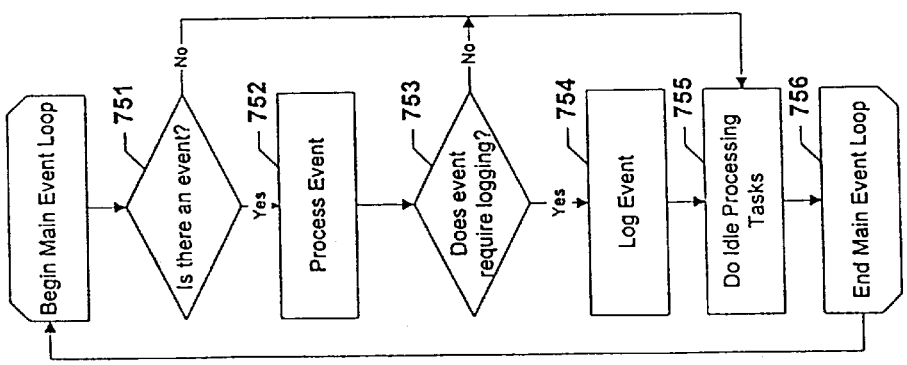
FIG. 16B is a block flow diagram for the scheduled event loop of the consumer or provider program.
Figure 16A:
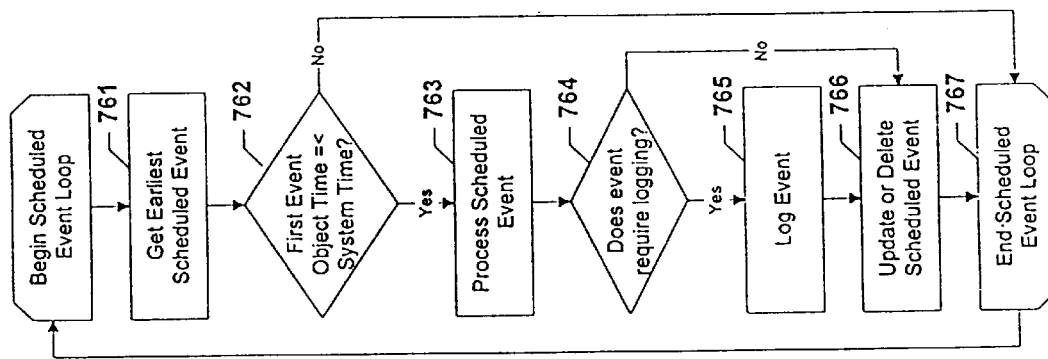
FIG. 16A is a block flow diagram for the main event loop of the consumer or provider program.

The scheduled event loop is shown in FIG. 16B. Whenever an event needs to be scheduled by any method, system procedure, or direct user input, it generates an instance of the scheduled event class (117, FIG. 3). This instance includes the date and time of the event, the system ID of the object requesting the event, the system ID of the object carrying out the event, the event type, and the event parameters (if any). When executing the scheduled event loop, the provider program 12 or consumer program 22 first retrieves the earliest scheduled event instance (step 761). It then checks to see if the scheduled date/time is equal to or less than the current date/time (step 762). If so, it processes the event (step 763), then tests to see if event logging is required (step 764), as described above. If event logging is required, it generates and saves an instance of logged event class (118, FIG. 3) in step 765. Finally, it either deletes or updates the scheduled event instance (step 766), depending on the nature of the event. A communications object update polling event would, for example, be incremented by the next polling interval.

At the end of this process, or if the earliest scheduled event instance had not yet elapsed in step 761, or if an executed event did not require logging in step 764, the program terminates the scheduled event loop (step 767) and commences the next idle processing task.

ADVANCED COMMUNICATION OBJECT TYPES

The basic architecture of a communications object system lends itself to many specialized communications object types which enable significant additional functionality. As discussed earlier, in a preferred embodiment each of these specialized types are implemented as subclasses of the communications object superclass 110. Examples of these subclasses are illustrated in FIG. 17. These examples are merely illustrated of the users of communications object types and not a limiting feature of the invention.

Alternatively, these special object types could be distinguished by the use of a special element contained in a communications object. This element would have a special composite type such as CommObjectType, and the value of this element would determine the communications object object type for purposes of processing by the consumer program 22, provider program 12, distribution server 32, or a communications object system partner server 1302.

Message Objects

Communications objects represent a transfer of communications intelligence, in the form of data, metadata, and instructions, from a provider to a consumer who wishes to form a communications relationship with that provider. Once the communications object has been exchanged, further communications between the provider and consumer can carry greater intelligence because they can be be orginated and received as transmissions between these two communications objects. Although these messages can be structured in any form, in a preferred embodiment they are simply a special communications object type called a message object 110. This means they can be generated, encoded, transmitted, received, and processed in the same fashion as any other communications object. The only difference is that the generation. or receipt of a message object may not result in an update to the sending or receiving communications object, but rather the execution of one or more methods at the sending or receiving program, and optionally changes to other objects or object components in the sending or receiving databases. A communications object update may be considered a special form of message object which includes changes to the receiving communications object.

Message objects can also be sent to or received from any other communications server, program, or process which is not a formal part of the system but is compatible with the message object format. Not all messages produced by a communications object system need take the form of message objects, however. The attributes and methods of communications objects can also be used to generate and received other structured or unstructured message formats compatible with other communications systems, servers, or processes, or any custom format of the provider's choosing.

As with any communications objects 110, message objects may be transmitted or received via either the push or pull technique, using any communications protocol. Specifically, message objects can be transmitted and received using both store-and-forward protocols, such as SMTP e-mail, and direct transmission protocols, such as HTTP. In the latter case, message objects can take the place of HTTP forms for automated processing by the web server, such as Common Gateway Interface (CGI) script processing.

The processing steps for receipt of a message object by the consumer program 22 are illustrated in FIG. 15. First, a newly received object is tested to determine if it belongs to the message object subclass (step 701). If so, the next test is to see if the message object's "parent" exists in the consumer database 21 (step 711) by searching for its UID. The parent is the communications object (110, FIG. 3) that produced the message object. If the UID of the parent object is not present, the message object is rejected as invalid. This may also result in an error message being displayed to the user or placed in the the user's notification report, depending on the user's preferences.

If the parent UID exists, the final step is to execute the message object's receipt method or methods. Since a message object is simply a special type of communications object, it may carry its own methods, or it may call the methods of its communications object "parent". Additionally, when received by the originating provider program 12, it may call any other method 141 present in the provider database 11 which originated the parent communications object. For example, a communications object could include a receipt method 141 named GetStatData which obtains statistical data from a consumer database 21 and returns a message object to the provider program 12. When the message object is received by the provider program 12, it may execute a receipt method 141 named PostStatData which is present in the provider database 11, but not in the original communications object 110. Alternatively, method names can be polymorphic. In this case a method included in the communications object 110 could perform one action when received by the consumer program 22, but another action when called by a message object in the provider program 12. The method can distinguish between these programs by matching the system ID of its originating database (100, FIG. 3) with the system ID of the database in which it is executing. (Such a match may also be made on a group ID rather than a specific system ID.) For example, a communications object 110 could include a method TransferStatData which, when executed by the consumer program 22, would be used to gather statistical data from the consumer database 21 and return a message object to the provider. However, when the same TransferStatData method is executed by the message object back at the provider program 12, the method could be used to post the statistical data to the provider database 11 (or another database maintained by the provider).

Because of this, message objects generally do not need to transport their own methods, but can instead call methods present in their parent communications object (already stored in the consumer database 21 and provider database 11), or other methods from their originating provider database 11. This makes them a highly efficient means of transporting structured message data and initiating automated processing of that data.

For providers, message objects allow the provider program 12 to operate similarly to a consumer program 22. In other words, message objects returned to a provider program 12 by communications objects which originated in that provider program 12 can execute the receipt methods, notification methods, and other processing methods of their parent communications object 110. This gives the provider many of the same benefits that the communications object gives to the consumer. The ability for both the provider and consumer to benefit equally from the automated processing of message objects is a core advantage of a communications object system.

Component and Composite Objects

Another powerful feature of communications objects is their ability to be physically or logically nested. This nesting is illustrated in FIG. 3 by the one-to-many association 110A for communications objects 110. Communications objects contained by another communications object are called component objects, and the container object is called a composite object. FIG. 17 illustrates the one-to-many relationship between the composite object subclass 811 and the component object subclass 812.

Each component object has an association 110A to the composite object which contains it. A component object may be contained by more than one composite object. As with other associations in the provider database 11, changes to component objects can be propagated upward to the composite objects which contain them via the update association method (FIG. 10B). Thus, for editing and display purposes, component objects can be treated as one or more methods, rules, pages, elements, or type definitions that become part of the larger composite communications object. Composite objects can access the elements or methods of their component objects in the consumer database 21 just as if the elements or methods were contained directly in the composite object. In this manner component objects can be dealt with as independently transferrable objects for purposes of updating, distribution control, and other uses as described below, while still functioning as an integral part of the composite objects which contain them.

Composite objects may optionally contain additional elements 143 representing their component object members. In this way a composite object can be separated from its component objects yet still contain the information necessary to retrieve or update its component objects. This use of composite objects may be more fully understood in the description of distribution control functions below.

Composite and component objects are particularly useful for creating many different kinds of metadata structures in communications object system databases 100. Example are directory category hierarchies and discussion response thread hierarchies, shown in FIGS. 29A and 29B. Another example is schedule objects Synthesized Objects When the functions of the provider program 12 and consumer program 22 and their respective databases 11 and 21 are combined, a provider can create synthesized objects. A synthesized object is a communications object which contains components or component objects from other providers. These are referred to as "external components" or "external component objects". FIG. 17 illustrates the synthesized object subclass 813. A synthesized object does not necessarily require a special communications object type, although it may be desirable for licensing, authentication, or other purposes. The uses of synthesized communications objects may be more fully understood from the description of service object types below.

Just as with a standard communications object, when the external components or component objects of a synthesized object change after the receipt of an updated object from the external provider, those changes trigger the update association rule, described above. Thus the changes are propagated upward to the components and communications objects which contain them using the update association method (FIG. 10B). In this fashion synthesized communications objects transmit the changes to their external components in the same fashion as they do with their internal components.

Service Objects

Service objects are another special class of communications object whose primary function is to provide communications services to other communications objects. As shown in FIG. 17, the service object superclass 815 can be further broken into subtypes such as registration service objects 830, maintenance service objects 831, name service objects 832, directory service objects 833, and so on. Service object types can be used by the provider program 12 and consumer program 22 to distinguish the services that service objects make publicly available to other objects. The use of service objects will be discussed in separate group of sections below.

User Objects

User objects are communications objects 110 used to represent communications object system users or groups of users in a communications object system database 100. User objects are shown as class 816 of FIG. 17. User objects 110 have many different applications for both service object partner servers and multiuser implementations of a communications object system database 100. User objects will be further discussed in the service object and advanced system architecture sections below.

Schedule Objects

Schedule objects are communications objects 110 used to represent scheduled real-world events in a communications object system database 100. Scheduled objects are shown as class 817 of FIG. 17. Schedule objects 110 are used to coordinate communications about events, such as phone calls and meetings. Schedule objects will be further discussed in the scheduling control section below.

COMMUNICATIONS CONTROL FUNCTIONS

The preceding sections have explained the basic mechanisms by which communications objects are created, updated, and distributed by a provider, and received, processed, and stored by a consumer. While the transfer of a communications object may itself communicate information between the provider and consumer, this is only a first use of the present invention. A second principal use is employing the transferred communications object to control and automate additional communications between the provider and consumer. The following sections will explain these control functions as they apply to distribution, encoding, transmission, reception and acknowledgment, notification, updating, data exchange, communications object exchange, forwarding and chaining, transfer, termination, event tracking, archiving, and reporting. Two additional types of control functions, for multinetwork communications and scheduling, will be discussed in the advanced system architecture sections. This set of control functions is not exhaustive but merely illustrative of how the control capabilities of a communications object system may be applied.

Distribution Control

A provider may wish to distribute different information to different consumers. In addition, a provider may wish to grant different consumers different communications control and access privileges. One way to accomplish this is for the provider to create different communications objects and assign them (via push) or make them available (via pull) to different consumers. However, when a large number of communications object components are being distributed to large number of consumers, this solution quickly becomes unwieldy. A second drawback to this approach is that when a global naming system is used, each of these communications objects must have a unique name. These different names can easily confuse consumers, who would rather be able to associate a single communications object name with the real-world name of the person, company, product, service, etc. that the communications object represents. Thus, in a preferred embodiment, providers would be able to automatically distribute customized versions of the same communications object.

In addition, in some cases it is preferable for the consumer to control this customization process. For example, a provider may offer several versions of a software product, all sold under the same name. The provider may wish to offer a single communications object corresponding to that product name, yet allow it to be customized for the particular product versions. However since the provider does not know which version each consumer is using, it is preferable for the consumer to control customization.

This leads to four scenarios for distribution control from a single provider to one or more consumers: provider control using the push technique, consumer control using the push technique, provider control using the pull technique, and consumer control using the pull technique. This section will discuss each of these in turn. Distribution control involving multiple providers will be discussed further in the multiuser operation section below.

For provider control using the push technique, we have already described how a provider can assign different communications objects to be distributed to different consumers using the create new recipient form or edit selected recipient form (311, 312, FIG. 9). Distributing customized communications objects simply requires extending this same technique down to the component level. This means the components for each communications object instance are customized for each recipient during the communications object instance generation process. This process is analogous to steps 534, 545, 547 of FIG. 12 where object methods, encoding methods, and transmission methods are customized for each recipient by associating them with the recipient instance (120, FIG. 3).

Figure 18:
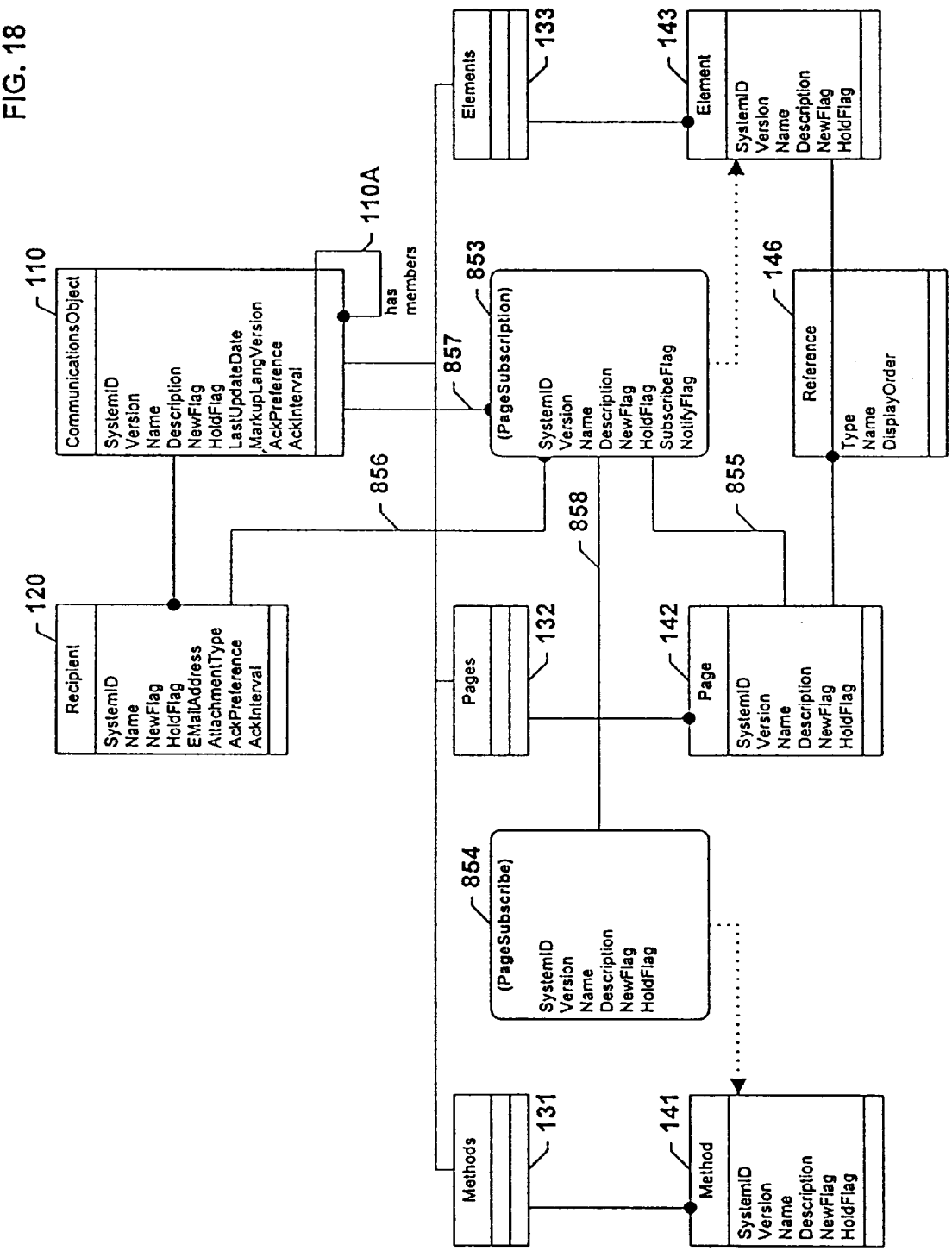
FIG. 18 illustrates object oriented data structures used for distribution control.

Any communications object component can be used for customized distribution. FIG. 18 illustrates the data structures necessary for controlling distribution using pages 142. While pages are the preferred embodiment that will be discussed here, other classes, such as elements 143, could also be used. Alternatively, additional container classes could be employed, such as page groups. The components or component groups used for distribution control are not a limiting feature of the invention. When page distribution control is used, a rule 140 exists such that the creation of any page instance 142 also creates an instance of a page subscription element 853 (and deletion of the page instance also deletes the page subscription element instance). A page subscription 853 is an instance of element class 143 with a composite type PageSubscription. This composite type includes a logical value SubscribeFlag. The rule 140 that creates a page subscription instance 853 also creates a one-to-one association 855 with the page 142 it represents. Therefore, a list of page subscriptions 853 associated with each page 142 contained by a communications object instance 110 can be displayed on the edit selected recipient form (312, FIG. 9). The SubscribeFlag attribute of each page subscription 853 can be represented as a checkbox on this form. By checking the desired boxes, the provider can create an association 856 between the recipient instance 120 and the page subscription 853. This results in specific pages being assigned to the communications object instance that will be transmitted to the recipient.

Figure 19:
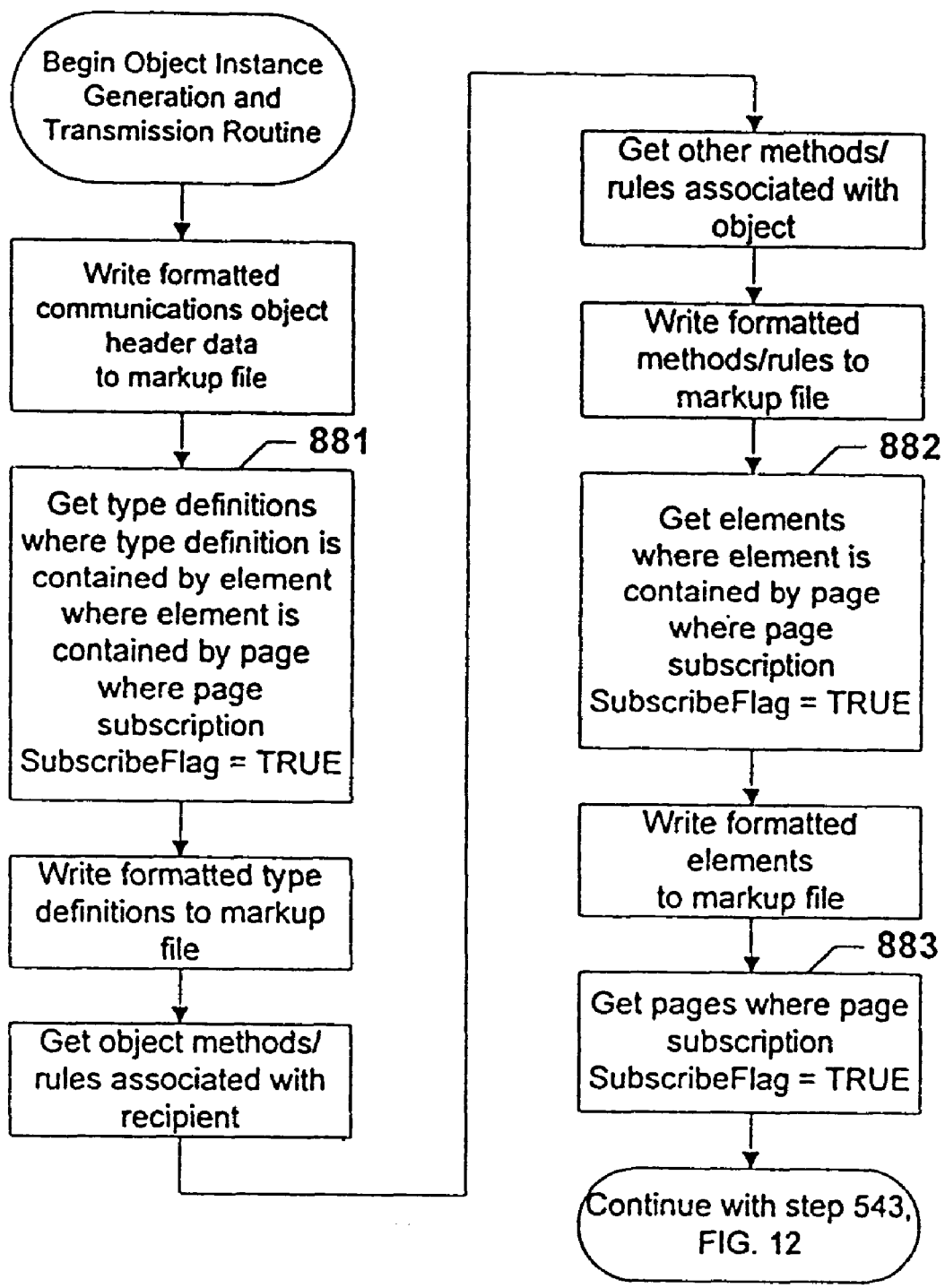
FIG. 19 is a block flow diagram for a process for generating an object when page distribution control is used.

FIG. 19 illustrates the three minor modifications that selective page distribution requires in the object generation and transmission process illustrated in FIG. 12. First, in step 881, only those type definitions (144, FIG. 3) associated with elements (143, FIG. 3) contained by pages (142, FIG. 3) associated with page subscriptions (853, FIG. 18) having a SubscribeFlag attribute which is TRUE are selected for inclusion in the object markup file. Second, in step 882, only elements contained by pages associated with page subscriptions having a SubscribeFlag attribute which is TRUE are selected. Third, in step 883, only pages associated with page subscriptions having a SubscribeFlag attribute which is TRUE are selected. All other steps are identical to those shown in FIG. 12.

The second case covers how the provider can allow the consumer to control distribution using the push technique. For example, a software company might offer multiple pages within a communications object pertaining to a software product. Each page would correspond to a particular version of that product. If the company did not know which version a consumer was using, it could include a menu of these pages in the communications object. A consumer's choices from this menu would be automatically returned to the provider via a message object, which would invoke a method in the provider program 12 to change the consumer's page subscription settings in the provider database 11. In this way the consumer can choose to "subscribe" to the page or pages corresponding to the product version the consumer is using. This saves transmission time for the provider and file space for the consumer.

To accomplish this requires first that the page subscription elements 853 be transmitted with the communications object as a preference element that will be editable by the consumer. To include page subscription elements in the communications object, an "Include Page Subscription" checkbox can be included next to the "Include Page" checkbox for each page listed on the create object or edit selected object form (321, 322, FIG. 9). As shown in FIG. 18, when the form is submitted with an "Include Page Subscription" checkbox selected, a contained-by association 857 is created between this page subscription element instance 853 and the selected communications object instance 110. In addition, when consumer page distribution control is in effect, each page subscription instance 853 has an association 858 with a PageSubscribe method 854. These two associations 857 and 858 mean that all page subscription elements 853 and one PageSubscribe method 854 will be transmitted as communications object components in the same manner as any other communications object element or method.

Once the communications object is received by the consumer program 22, the SubscribeFlag values of the page subscription elements 853 are editable by the consumer using the edit object form (622, FIG. 13) (The operation of this form in conjunction with the operation of the consumer program 22 is described above.) When this form is submitted to the consumer program 22, its contents are processed by the associated PageSubscribe method. This method first creates a message object instance (810, FIG. 17) containing the changed page subscription elements 853 and the receipt method PageSubscribe. It then transmits this message object instance 810 back to the provider program 12. When the message object instance 810 is received by the provider program 12, the PageSubscribe receipt method is executed using the changed page subscription elements 853 as a parameter. As a polymorphic method, this results in an update operation that changes the SubscribeFlag values of the page subscription elements 853 associated with the recipient 120. This in turn removes the association 856. In this way the consumer is able to edit his/her own page subscription settings in the provider's database 11. An updated communications object instance can be returned by the provider program 12 immediately, at a scheduled future date/time, or at the time of the provider's next publishing operation.

Figure 20:
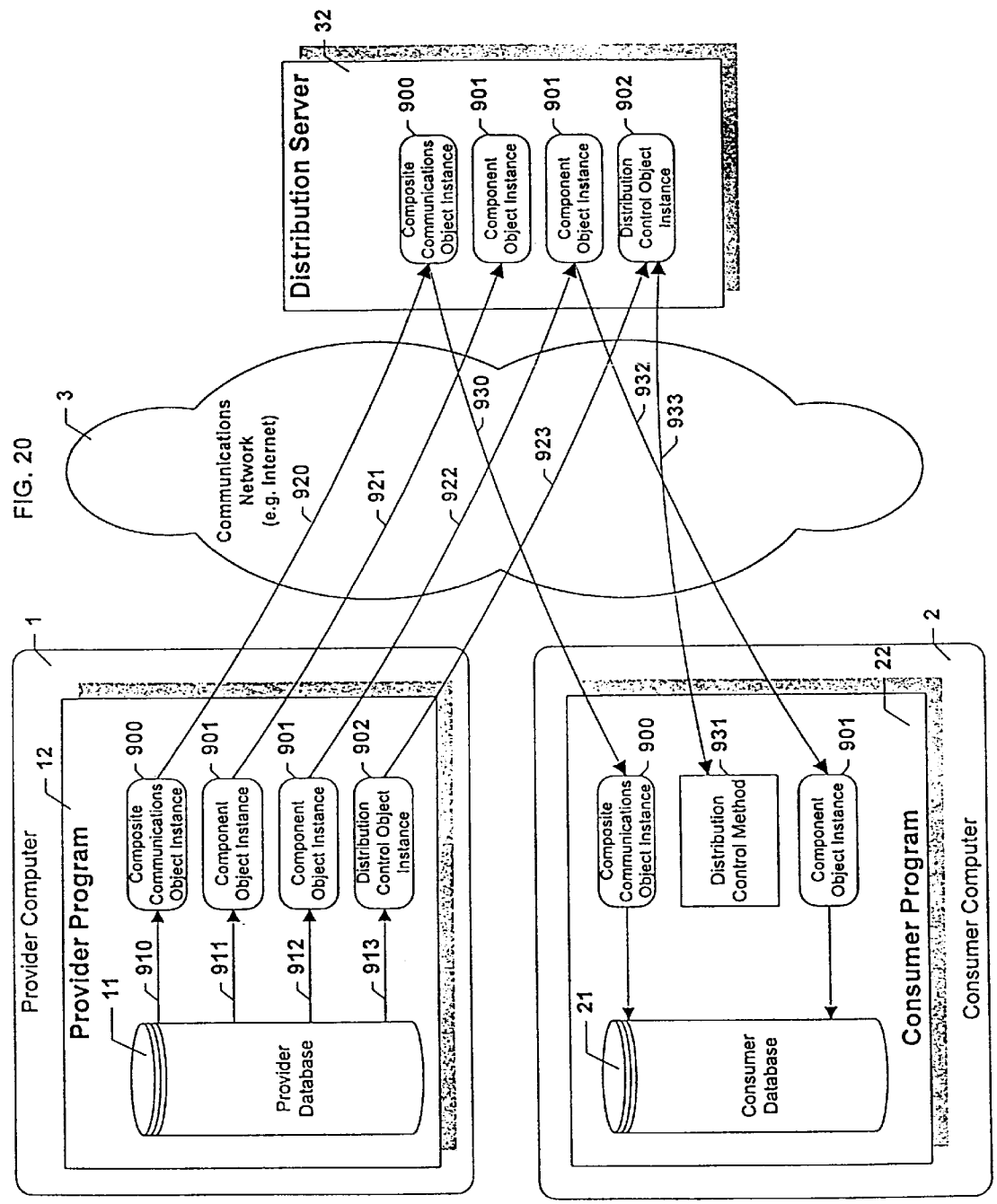
FIG. 20 illustrates operation of the communications system for distribution control using a pull method of transmission.

Both the foregoing distribution control processes operate via the push technique. For high volume distribution, the pull technique is more likely to be employed. Distribution control using the pull technique is illustrated in FIG. 20. Pull distribution requires the consumer program 22 to interact directly with a distribution server 32. In a preferred embodiment, this can be accomplished using a distribution service object 1310 and a distribution partner server 1302. These will be further discussed in the distribution service object section below. Customized distribution, whether controlled by the provider or the consumer, has two requirements. First, the components of a communications object must be available independently on the distribution server 32. Second, the instructions governing the selection of these components must execute either in the consumer program 22, or the distribution server 32, or both. In essence, program logic must be used to replace the human intelligence of the provider in determining how to customize communications object components.

The first condition can be met by breaking the communications object into a composite communications object 900 and a set of component objects 901. Two such component objects are shown in FIG. 20, however any number of component objects can be used. The second condition can be met by either including a distribution control method in the composite communications object, or transferring a second communications object with one or more distribution control methods to the distribution server 32, or both. Alternatively, the distribution control instructions can be programmed directly into the distribution server 32, or supplied via another program or object called by the distribution server 32. FIG. 20 illustrates an instance of a distribution control communications object 902 produced by the provider program 12 and transmitted to the distribution server 32.

Provider control of distribution via the pull technique involves the following steps. First the object instance generation and transmission routine (FIG. 12) generates the composite communications object instance 900 (step 910) and the component communications object instances 901 (steps 911, 912). The composite communications object instance 900 includes a distribution control method 901. This method can execute automatically (as a receipt method) or manually (with consumer activation) within the consumer program 22 to retreive the desired component objects from the distribution server 32. If some distribution control logic will reside at the distribution server 32, the object instance generation and transmission routine also needs to produce one or more distribution control objects 902 (step 913), or this logic must be alternatively supplied to the distribution server 32. (One alternate method of supplying this logic is a distribution service object 1310. Distribution service objects will be further described below.) Each of these objects are then transmitted to the distribution server 32 (steps 920, 921, 922, 923), either separately or in a combined transmission.

The next step is for the consumer to obtain a copy of the composite communications object instance 900 (step 930). When the object is received by the consumer program 22, the distribution control method 931 can be executed automatically as a receipt method or manually by the consumer (step 931). The distribution control method 931 determines which component objects 901 should be retrieved. These instructions may incorporate any logic or business rules the provider wishes to employ, using whatever data is available to the communications object in the consumer database 21 or elsewhere in the consumer's computing environment. For example, if the communications object represented a software product, the distribution control method 931 could examine the consumer database 21 or the consumer's local or network environment to determine if the product was installed and what version the consumer was using. Alternatively it could present an input form to the consumer to gather other relevant data for processing. The distribution control method 931 could then determine and download the appropriate component objects 901 from the distribution server 32 (step 932). For example, it could download the component objects 901 that correspond to the version of the product the consumer was using. If the consumer did not have the product installed, the distribution control method 931 could download the component objects 901 that are compatible with the consumer's computer system. Alternately, the distribution control method 931 could transmit data it retrieves from the consumer database 21 or the consumer's computer environment to the distribution control object 902 on the distribution server 32 (step 933). This data could then be processed by the distribution server 32 to determine the optimal component objects to return to the consumer program 22. This can be more efficient than transferring a sizable distribution control method to each consumer. Automatic data exchange will be further discussed below.

The final scenario is consumer control of distribution via the pull technique. This is similar to consumer control via the push technique, and again uses page subscription element instances (853, FIG. 18) and a PageSubscribe method (854, FIG. 18). However there are three differences. First, the page subscription elements include additional attributes which allow them to function as link elements to the corresponding component objects location on the distribution server 32. Link elements are more fully described in the section on communications object exchange control below. Secondly, the PageSubscribe method operates differently, as explained below. Thirdly, both the page subscription element instances and the PageSubscribe method may be contained in either the composite communications object 900 or the distribution control object 902.

Once the composite communications object is received at the consumer program 22, the consumer can control component distribution in one of two ways. If the page subscription element instances (853, FIG. 18) are included in the composite communications object, the consumer can edit their SubscribeFlag values using the edit object form (622, FIG. 13). When this form is submitted to the consumer program 22, the PageSubscribe method (854, FIG. 18) processes the form data. The PageSubscribe method then uses the link attributes of each page subscription element instance (853, FIG. 18) to retreive from the distribution server 32 the component objects 901 for whom SubscribeFlag equals TRUE. If the page subscription element instances (853, FIG. 18) are included in the distribution control object 902, the consumer could invoke a hyperlink in the edit object form (622, FIG. 13) which calls an HTML form from the distribution server 32. This form displays the page subscription element instances (853, FIG. 18) for editing in the same manner as the edit object form (622, FIG. 13) displays in the consumer program 22. However, when this form is returned to the distribution server 32, the PageSubscribe method in the distribution control object 902 or its equivalent is used to return the specified component objects 901 to the consumer program 22. Again, this latter process can be more efficient than distributing page subscription elements and large PageSubscribe methods in the composite communications object to all consumers.

One advantage of using composite communications objects for distribution control is that a single composite communications object 900 can be used to control updating for multiple component communications objects. This will be further explained in the discussion of update control, below. Alternatively, distribution control can be accomplished using specialized forms of data exchange control. This will be further explained in the discussion of data exchange control, below.

Encoding Control

Encoding refers to the formatting of communications data to increase its communications value. Communications encoding may take many forms, including human languages, computer languages, character sets, data file formats, compression formats, transmission formats, encryption formats, and display formats. Multiple types of encoding may be applied to the same communications transmission. A communications object system represents a significant improvement over existing communications encoding control processes for three reasons. First, communications objects provide a simple, automated way for the communications sender to know which encoding formats are optimal for a communications recipient. Secondly, because this encoding data is stored within a structured database 11, 21, it can be easily accessed by the provider program 12, consumer program 22, or another software program using an appropriate API, for the purposes of automating both the encoding process for the sender and the decoding process for the receiver. Thirdly, the sharing of encoding and decoding methods can be dramatically simplified through the use of encoding service objects. Encoding service objects will be further discussed below.

Communications objects can control the encoding of transmissions of the communications objects themselves, communications object updates, related objects such as message objects, attachments to communications object transmissions, or any other form of message, data stream, broadcast, or data exchange process. They can also control both the encoding process for the sender (be it the provider or consumer), and the decoding process for the receiver.

The fundamental process by which communications objects control encoding and decoding is as follows. Using the provider program 12, the provider supplies within a communications object (110, FIG. 3) one or more elements, methods, rules, (143, 141, 140, FIG. 3) or any combination of these governing the encoding formats to be used by communications transmissions resulting from this communications object. Once the communications object 110 is acquired by a consumer, any communications transmissions resulting from the communications object, whether generated manually by the consumer using the consumer program 22, automatically by the consumer program 22 itself, or automatically by another software program accessing the communications object via an API, will use the appropriate encoding. When such transmissions are received back by the provider program 12, or by another software program or process which has been programmed by the provider or by other communications objects received from the provider program 12, these transmissions can be decoded by reference to the same data and methods included in the original communications object.

Encoding can be applied directly by methods contained within the communications object, by encoding service objects, by system methods contained in the programs 12, 22, by other utility software programs called by these programs, or by other applications that call the data and methods of the communications object via an appropriate API.

Encoding control is particularly relevant to communications security. Many data encryption systems operate through the use of a digital key or signature for securely encoding a communications message, and a second related key for decoding and authenticating the message. The two keys are related through the use of a mathematical algorithm. Such systems are often referred to as public/private key encryption systems. The encoding key, which is generally publicly available, is called the public key; the decoding key, which is guarded by the recipient, is called the private key. Public keys can also be digitally "signed" so they can be authenticated via reference to a trusted source. The use of encryption algorithms, public and private keys, digital signatures, authentication, and other topics related to secure communications is discussed generally by Bruce Schneier, *Applied Cryptography*, Second Edition (1996), which is incorporated herein by reference.

As with other forms of encoding, communications objects are an excellent mechanism for simplifying and automating public/private key encryption. Referring to the data structures in FIG. 3, this is because a communications object 110 is an ideal vehicle for transmitting one or more of the provider's public keys to the consumer's computer, where it can be used to automatically encrypt messages being returned to the provider. The public key can be stored as an element 143, and the encryption method can be stored as a method 141. By encrypting the return message as a message object 110, the message object can invoke a receipt method 141 at the provider program 12 which can automatically decrypt the message using the provider's private key and the decryption method, stored as an element 143 and method 141 in the provider database 11, or otherwise made available to the receipt method 141.

This security technique is not limited to public/private key encryption systems, but can be applied to any form of encryption where data and/or methods supplied by the provider are necessary to accomplish automatic encryption at the point of message origination (the consumer), as well as automatic decryption at the point of message reception (the provider). The specific encryption protocol or algorithm is not a limiting feature of the invention.

One particular advantage of a communications object system in this respect is the ease with which multiple public keys may be used. Multiple keys may be included within a single communications object, or a single key may be constantly changed via communications object updates, or both techniques can be used together. Since encryption can be applied automatically by the consumer program 22, the encryption method 141 can programatically or randomly chose from among the available public keys. By including an indentifier value 161 within each public key element 143, and including this unencrypted identifier value in the header of the encrypted message objects 110, the provider program 12 can also automatically identify and apply the matching private key element 143 for decryption. The use of multiple rotating public keys significantly reduces the risk of security breaches if any one key combination is broken, and increases the effort necessary to compromise the security of the messages.

The authentication of public keys and digital signatures can also be automated via the use of authentication objects, a special type of service object. Authentication objects and servers will be further discussed below.

Figure 21:
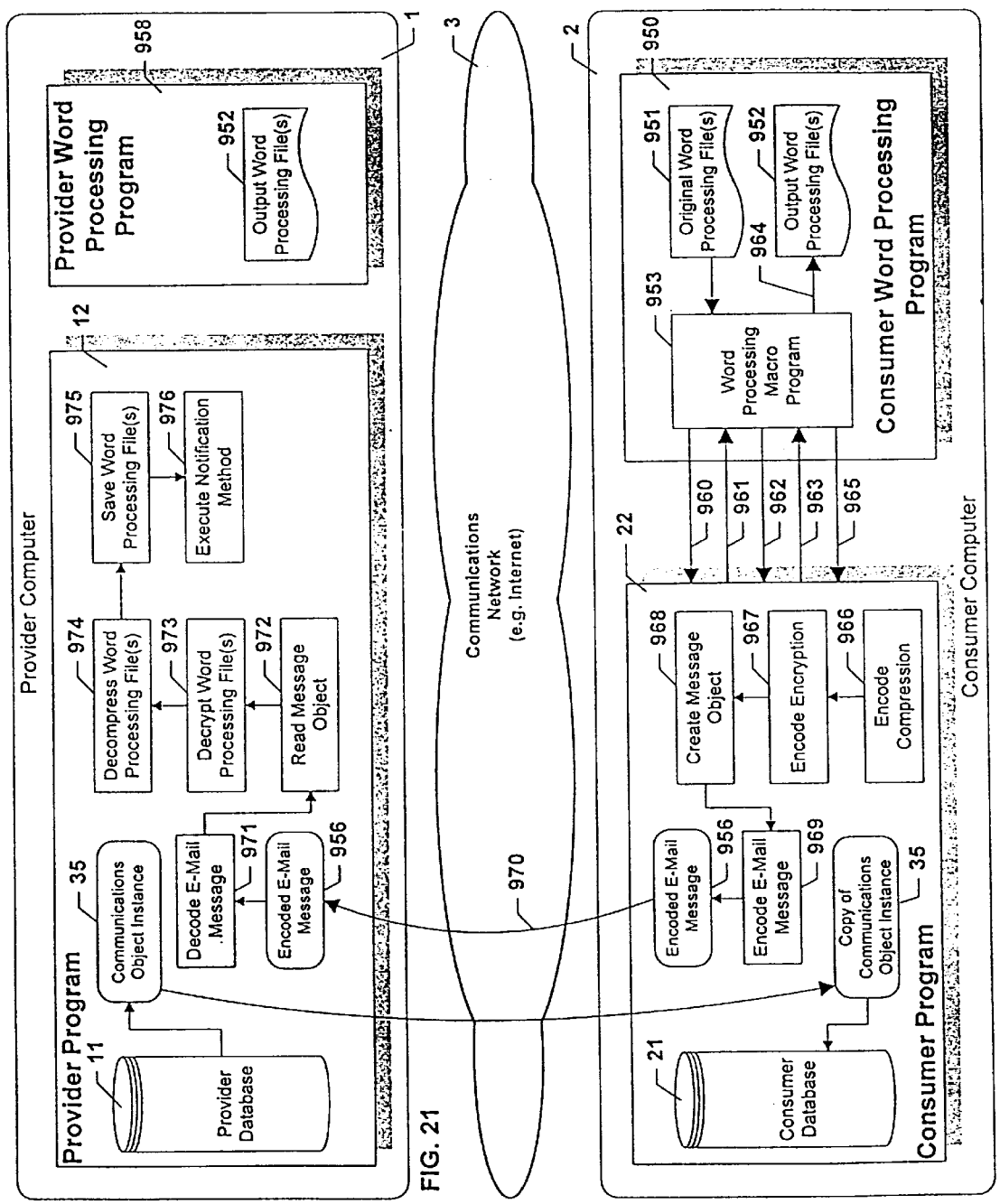
FIG. 21 illustrates operation of the communications system for encoding control.

An example illustrating the application of encoding control and automation using communications objects is shown in FIG. 21. A provider using the provider program 12 has created and distributed to a consumer program 22 a communications object instance 35. This communications object contains a WPFileSend method 141, plus such additional elements, methods, and rules (143, 141, 140, FIG. 3) as are necessary to govern the encoding and transmission of word processing documents from consumers. A consumer wishes to transmit a word processing file 951 produced by a word processing program 950 to the communications object provider. The word processing program 950 runs concurrently with the consumer program 22 on the consumer computer 2. The consumer invokes a command within the word processing program 950 to execute a macro program 953 such as those available within popular word processors such as Microsoft Word from Microsoft Corporation and WordPerfect from WordPerfect Corporation. The macro program 953 makes an API call to the consumer program 22 (step 960) which returns a list of the available communications objects which support word processing file transfer (step 961). These choices are presented to the consumer in a menu or dialog box. Alternatively, the macro program 953 could retain an internal list of frequently-used word processing file recipients. If a communications object represented multiple recipients, the macro program 953 could make additional calls to the consumer program 22 to present such menus or dialog boxes as were necessary to determine those sub-choices. Once a particular recipient or recipients were chosen, the macro program 953 would make one or more calls to the consumer program 22 for the input options necessary to execute the communications object's WPFileSend method (step 962). The consumer program 22 would return the necessary parameters, including the provider's choice of preferred word processing document formats, message category options, encryption options, notification options (such as priority), return receipt options, event logging options, accounting options, and message attachment options (step 963). Those which require consumer input could be presented in one or more additional dialog boxes.

Once the consumer has provided this input, the macro program can use the provider's choice of preferred word processing formats to save the consumer's designated word processing file or files 952 in that format (step 964). If the optimal format is not possible (due to word processing program version differences, conversion filter capabilities, or other factors), the next most preferred format can be used. Once the file or files 952 have been saved, the macro program 953 can make a final API call to the consumer program 22 (step 965). This calls the WPFileSend method of the selected communications object and supplies the name of the word processing file or files to be sent together with the additional parameters to the method. The WPFileSend method executes a series of steps within the consumer program 22. First, it uses the provider's preferred compression format to apply a compression algorithm such as PKZIP from PKWARE, Inc. or SIT from Aladdin Systems to the word processing file or files, Inc. (step 966). As with the word processing file format, if the most preferred compression format is not available, the next most preferred format can be used. The WPFileSend method then uses the provider's public key to apply an encryption algorithm such as RSA from RSA Data Security, Inc. to the word processing file or files (step 967). Once the word processing file or files are ready, in step 968 the WPFileSend method creates the appropriate message object or objects (810, FIG. 17). Then the WPFileSend method creates an e-mail message or messages 956 and applies the encoding format such as MIME, BinHex, or UUEncoding specified by the communications object 110 to attach the message object or objects (step 969). Lastly, the e-mail message or messages are transmitted back to the provider computer 11 (step 970).

When the e-mail message 956 is received by the provider program 12, the WPFileSend method stored in the provider database 11 is executed. This performs each decoding step in reverse order. First the e-mail message 956 is decoded to produce the message object attachment or attachments (step 971). Then the message object or objects are read and processed to determine the subsequent decoding steps necessary (step 972). Using the function calls and parameters supplied in the message object, the word processing file or files 952 are decrypted (step 973). The same procedure is followed for decompression (step 974). Next, the file or files files are saved to an appropriate storage directory (step 975). Finally the provider's notification preferences for the WPFileSend method are followed (step 976). For example, this step may involve placing a notification message element (211, FIG. 4) and a hyperlink to the file or files in the provider's notification report. Clicking this hyperlink will open the provider's word processor 958 and load the word processing file 952, as is the convention with files of specific MIME types submitted to a browser 50. In this way the provider can view the fully translated word processing file or files 952 in the optimal format without expending any human effort to receive, decompress, decrypt, or translate the file format.

Transmission Control

As discussed earlier, a communications object system can control and automate communications via any type of communications network to which both the provider and consumer have access. The particular communications network used is not a limiting feature of the invention. For example, many providers and consumers share access to three common communications networks: the Internet (a data communications network), the telephone system (a voice/fax/data communications network), and the postal system (a physical communications network). Communications objects themselves are typically transmitted and updated via a data communications network such as the Internet (although alternate communications networks such as the telephone system or postal systems could also be used).

However, these objects can be used to control communications via other types of communications networks such as voice, fax, and postal. To do so requires that the provider program 12 or consumer program 22 include the external drivers or function calls necessary to interface with these communications networks. In the case of telephone communications networks, this could be accomplished through a serial interface driver and an appropriate voice/data/fax modem hooked to the provider's or consumer's computer or local area network. Alternatively the programs 12, 22 could support operating system telephony API calls such as the Telephony Applications Programming Interface (TAPI) provided with the Microsoft Windows family of operating systems from Microsoft Corporation. For postal networks, the interface could be accomplished through a print driver capable of producing machine- or human-readable printer output. This output could be printed directly on the transmission media, such as a postcard or envelope, including within the transmission media, such as within an envelope, or applied to the exterior of the transmission media, such as a label or routing slip. Incoming transmissions via a postal network can be processed via manual data entry or automatically via the use of a print scanner or barcode reader. Alternatively the programs 12, 22 could output or input digital files from removable magnetic or optical media, such as floppy disks or disk cartridges, that are transmitted via postal networks.

Transmission control is accomplished using a communications object system in the same manner as encoding control. Using the provider program 12, the provider supplies within a communications object (110, FIG. 3) one or more elements, methods, rules, (143, 141, 140, FIG. 3) or any combination of these governing the preferred communications network to be used for any communications transmission resulting from the communications object. Once the communications object 110 is acquired by a consumer, any communications transmissions resulting from the communications object, whether generated manually by the consumer using the consumer program 22, automatically by the consumer program 22 itself, or automatically by another software program accessing the communications object via an API, will determine use the most preferred communications network available. The determination of the optimal communications network is a cooperative endeavor betweent the provider and consumer. The provider can indicate the range of available choices and the provider's preferences within this range. The consumer program 22 can automatically, or manually with the consumer's input, determine the consumer's preference from among these choices.

Transmission control can be illustrated with a communications object which offers software technical support options. Referring to FIG. 3, a page 142 within the communications object 110 can include elements 143 which allow a consumer to access technical support resources via e-mail, fax, postal mail, or voice. Each element 143 is associated with a method 141 governing the communications network to be used for that type of transmission. E-mail options can invoke a SendEMail method 143 which can obtain from the element 143 all data necessary to address the e-mail, specify the subject line or subject line subsections, add other carbon copy or blind carbon copy recipients, and include any additional data in the body of the message or as attachments to the message (data exchange control is further discussed below). The consumer can enter the balance of the message manually via a text input field on an HTML form, or by designating an appropriate computer file or files. The SendEMail method can then send the e-mail via Internet SMTP. Fax options can similarly invoke a SendFax method which can obtain from the element 143 the provider's fax number, calculate any necessary prefixes or long distance area codes, and compose automatic cover pages and body pages. Again the consumer can enter the balance of the message manually via a text input field on an HTML form, or by designating an appropriate text or computer file or files. The SendFax method can then transmit the fax message via model or fax API interface. Postal mail options are handled using a similar SendPostal method. In this case the output is printed to a local or network printer. Fully addressed and barcoded postcards, envelopes, or labels can be printed automatically depending on the capabilities of the consumer's printer. These can include human or machine-readable routing codes for use when the postal delivery is received by the provider. Voice options can call a SendVoice method that can provide powerful control over telephony. For example, beyond just autodialing a phone number obtained from the element 143 (which, like a telephone speed dial button, the consumer need never see), a SendVoice method may use additional touchtones to navigate a receiving voice menu or voicemail system until it has reached a specific destination. At this point it may visibly or audibly notify the user that the line is ready. Another option with appropriately equipped computers is for the SendVoice method to allow the user to record a voicemail message immediately using a microphone and soundcard. Then the SendVoice method can completely automate the transmission of this voicemail message in the background while the user does other work. If the provider is appropriately equipped, a SendVoice method could also coordinate the alternating transmission of data and voice in the same telephone call. Alternately, it could employ protocols such as VoiceView from Radish Software, Inc. for mixing data and voice in one telephone session.

When a data communications network, such as the Internet, is available to both the provider and consumer, many communications transmissions can be more efficiently and automatically accomplished via this channel. However, certain tasks such as the shipment of physical goods or live voice telephony must occur via alternate communications networks. Because they can operate so efficiently via a data communications network such as the Internet, communications objects are particularly well-suited to the scheduling, tracking, and coordination of communications transmissions taking place via alternate communications networks. Communications coordination will be discussed further below.

Receipt and Acknowledgment Control

In conventional communications systems, the vast majority of communications message processing must be done by humans. In a communications object system, both providers and consumers have a powerful way to automatically control the processing that takes place when specific communications events occur. Like many other aspects of a communications object system, this control is cooperatively shared by the provider and consumer. The provider can specify what processing the provider wishes to have take place. The consumer can place limits upon what processing a provider is allowed, as well as specify additional processing the consumer wishes to have take place.

The primary mechanism for controlling automatic event processing within a communications object system is the receipt method. A receipt method is one or more methods which are executed automatically upon receipt of a communications object. Receipt methods are identified by their method type as described above. Receipt methods can be associated with any type of communications object 110, including communications object updates, composite objects 811, and message objects 110. In addition to the receipt methods included by a provider, a consumer can also assign his/her own receipt methods to a communications object. Like any method, receipt methods can call other methods, so a series of receipt methods can be chained in a particular order. 15 As shown in FIG. 15, receipt method processing is a standard part of communications object reception processing. Receipt methods assigned by the provider are executed first (step 721), followed by any receipt methods assigned by the consumer (step 722). The provider's methods are given execution priority because a consumer's receipt methods could result in program state changes the provider cannot predict.

Perhaps the most common example of how a provider can use receipt methods is acknowledgment messages. Although acknowledgment messages can take any form and be sent to any receiving program (or human), in a preferred embodiment they are transmitted as message object instances 810 back to the provider program 12 or to a distribution server 32. Alternatively they can be sent to another computer program designed by the provider to receive the message object instances 810 or another structured message format. Acknowledgment messages are used to confirm receipt of any type of communications object, including another message object. Acknowledgment messages can be produced by a consumer program 22 to acknowledge receipt of a communications object from a provider program 12. They can also be produced by a provider program 12 to acknowledgment receipt of a message object from a consumer program 22. The ability of a communications object system to produce and process acknowledgment messages automatically is another strong advantage it holds over other communications systems. This is because with most conventional communications systems, acknowledgment messages are either not produced at all, or if they are, they must be processed manually by the user. If acknowledgment messages are not produced at all, the user has no way to guarantee that important communications transmissions have succeeded. If they must be manually processed by the user, the user is forced to periodically check for receipt of the acknowledgment message, then take appropriate action if it has not been received. Automatic acknowledgment processing shifts this burden entirely to the provider and consumer programs 12, 22. The user can simply instruct the program to alert the user if an acknowledgment message has not been received within an expected period. The user is then able to forget about the matter completely, knowing the program will notify him/her only if there has been a problem with the transmission. The program can also be instructed to attempt automatic retransmissions before notication, further reducing the potential workload on the user.

The data structures necessary for acknowledgment automation are shown in FIG. 3. The primary structure involved is the acknowledgment association 121. This is a one-to-one assocation between a recipient instance 120 and a communications object instance 110. It includes an AckDateTime attribute which is a date value and an AckFlag attribute which is a logical value. As explained earlier in the distribution process for communications object or object update (steps 552–562, FIG. 12), the AckDate Time value is set to the the date/time of distribution plus the acknowledgment interval. The acknowledgment interval is taken from the AckInterval attribute of either the communications object 110 or the recipient 120, depending on which the provider chooses to govern acknowledgment. The AckFlag value is also initially set to FALSE.

The steps necessary for acknowledgment automation are shown in FIG. 1. When a consumer program 22 receives a communications object instance 35 from a provider program 11, the consumer program 22 executes the object's receipt methods. By including an SendAck receipt method in the communications object 35, the provider can cause an acknowledgment message 33 to be returned to the provider program 12. The SendAck method simply generates a message object instance (810, FIG. 17) that includes another SendAck receipt method and the recipient's database system ID (100, FIG. 3). When the acknowledgment message object 33 is received by the provider program 12, its SendAck receipt method 141 is executed. Being a polymorphic method, the operation performed by the SendAck method 141 at the provider program 12 is different than at the consumer program 22. Referring again to FIG. 3, the SendAck method 141 first uses the system ID of its parent communications object 110 and the system ID of its originating recipient 120 to query the database for a acknowledgment association 121. It then changes the value of the AckFlag attribute to TRUE. The AckFlag attributes of all acknowledgment associations 121 are maintained in this way. Now all that is required to complete acknowledgment automation is for the provider program 12 to periodically execute a scheduled event 117. This event executes a Ack-Monitor method which queries for all acknowledgment associations 121 where AckDate Time is equal to or less than NOW and AckFlag is FALSE. Those instances meeting this criteria represent recipients 120 from whom acknowledgment messages have not been received in the alloted interval. The AckMonitor method could then take appropriate actions. For example, it could execute a designated notification method to notify the user, such as placing an entry in the user's notification report. Notification control is further discussed below. Alternatively, the AckMonitor method could automatically retransmit the appropriate communications object instance 110. Each time it did this it would increment the AckDate Time value of the acknowledgment association 121 by the appropriate AckInterval. It would also increment the integer value of the RetryCount attribute by one. If the acknowledgment association 121 continued to fail the AckMonitor check, each subsequent retransmission would continue incrementing the RetryCount attribute until it equaled a RetryThreshold attribute value stored in the global preferences instance 103. At this point user notification could be triggered, as well as other appropriate actions designated by the provider, such as deletion or inactivation of the recipient instance 120.

Like any other message object, acknowledgment messages can also be used to report back useful information to the provider about the consumer, such as statistical or usage data. Data exchange control and reporting control will be further discussed below.

When communications objects are distributed using the push technique, receipt acknowledgment messages can be used to delete recipients 120 who do not wish to continue receiving communications object updates. This is accomplished in the same manner as consumer distribution control using the push technique, described above. In this case, the SendAck receipt method presents a form to the consumer allowing him/her to edit the logical value of a Subscribe element 143. The resulting value is returned with the acknowledgment message object instance 810. Upon receipt by the provider program 12, a negative Subscribe element value causes the SendAck method to delete the association between the recipient 120 and the communications object 110.

Acknowledgment messages can still be used even when the distribution method uses the pull technique. This is accomplished identically to the above except for the following. First, the acknowledgment message object instance (810, FIG. 17) returned to the provider program 12 includes such additional data about the consumer as is necessary to create a recipient record 120. Second, if the recipient record 120 instance does not exist in the provider database 11, the SendAck method needs to create it, and also create the association 121 between the recipient 120, the communications object 110, and one or more methods 141, including an update method. This specialized use of an acknowledgment message object 110 is referred to as a registration message. Registration messages are important for three reasons. First, registration messages can be used to track communications object distribution and usage even when the provider does not have the capability to distribute updates using the push technique. An example is when an expensive, high-powered web server is used for high-volume distribution of a communications object, but an inexpensive personal computer and e-mail account is used for tracking communications object acknowledgment messages. Second, registration messages can be used on an intermittent basis by only including the SendAck receipt method in selected communications object updates. This allows distribution statistics and other data to be gathered periodically rather than with every update. Third, if the acknowledgment message object 110 includes the e-mail address of the consumer, the resulting list of recipients 120 created by registration messages can allow the provider to convert the communications object update method from pull to push. Conversion between update methods is discussed further below.

Another common example of a provider-assigned receipt method is scheduling polling events when a communications object uses the pull technique for updating. A SetPolling receipt method can cause the previous polling even to be deleted and the next polling event to be scheduled. With composite communications objects (811, FIG. 17), a GetComponents receipt method can govern the updating of each component object to which the consumer is subscribed. This allows a composite object to control the updating of all its component objects as described in the distribution control section above. Update control will be described further below.

Another example of a provider-assigned receipt method is registration. Certain communications objects such as service objects may explicitly wish to register themselves or their public methods within the consumer database 21. Object and method registration will be discussed further below.

The foregoing cases are all provider-assigned receipt methods. A unique feature of the present invention, however, is that once a consumer has received a communications object from a provider, the consumer is also able to assign receipt methods. These methods can be assigned to the object as a whole, or to specific preference within the object. The data structures necessary for accomplishing this are shown in FIG. 3. Receipt methods applying to the communications object 110 as a whole can be assigned via an association created between the communications object preference element 127 and a method 141 (this association is not shown due to space limitations). Receipt methods applying to specific preference elements can be assigned via an association between the element preference instance 147 and a method 141.

A common example of a consumer-assigned receipt method is forwarding, wherein receipt of a communications object update causes that update to be forwarded to another consumer program 22. Forwarding is further described below.

Consumer-assigned receipt methods can also be used to control data or message exchange with other software programs operating on the consumer computer 2 or within the consumer's local network environment. This can be accomplished via receipt methods which call operating system methods or the methods of the target computer program.

Update Control

One of the most distinguishing features of a communications object system is its ability to control the automatic updating of communications objects. Certain types of communications objects, such as those designed for one-time data exchange operations, may not be persistent in the consumer database 21 and thus not require updating. However every communications object that will be persistent in the consumer database 21 needs to be updated when the provider makes changes to the object. Push-based updating is automated through the use of the update association rule (FIG. 10B) described above. Pull-based updating is accomplished through the use of update methods. As with any other object method, an update method may be a reference to a system method, an method carried internally in the object, or a call to a remote method stored on another computer accessible via communications network 3. A communications object may also be associated with multiple update methods.

When a communications object instance is distributed using the push technique, updates are pushed by the provider program 12, so an update method is not required in the communications object. However, an update method may still be employed in this case for error correction. For example, if the provider typically distributes communications object updates via the push technique every 30 days, the provider could include in the communications object a receipt method that creates a scheduled event instance (117, FIG. 3) in the consumer program 22 to be activated in 60 days. With each subsequent update of the communications object, the receipt method would reschedule this scheduled event instance for another 60 days into the future. If a push transmission from the provider did not reach the consumer within a 60 day period, the scheduled event instance would be actived. It would trigger the update method which would send a message object 110 back to the provider program 12. This message object could contain the e-mail address of the consumer computer 2, the version and date of the last communications object received, and other such data as would allow the provider program 12 and consumer program 22 to resynchronize after an error condition.

When a communications object employs the pull technique of updating, an update method is used to control the update operation. Pull-type update methods can use any services available at the consumer program 22 to initiate an update. In a preferred embodiment shown in FIG. 1, an update method initiates a polling request from the consumer program 22 to a distribution server 32. For example, the consumer program 22 can issue a HTTP "Get" request to Web server using the "If-Modified-Since" parameter in the header. The date/time of the most recent existing communications object version in the consumer database 21 is supplied as the value for the "If-Modified-Since" parameter. This value is stored as the LastUpdate date attribute of the communications object (110, FIG. 3). If the date/time of the the communications object markup file 35 on the Web server has not changed, the Web server returns a response code indicating "no change", and the update method will schedule the next polling event. If the date of the file 35 stored on the Web server 32 is newer, the Web server returns the communications object markup file 35, and processing begins as shown in FIG. 16.

Referring again to FIG. 3, the triggering of update methods is typically controlled by a scheduled event instance 117 in the consumer program 22. As described above, this scheduled event instance 117 can be created by a receipt method executed when a communications object or object update 110 is received. It can also be scheduled or rescheduled by an update method triggered by a scheduled event instance 117. This combination of using receipt methods and update methods to control scheduled event instances 117 provides comprehensive control over update events. This is further augmented by the ability of receipt and update methods to use any data available to them within the communications object 110 or the consumer database 21 to make update decisions. For example, update events can be scheduled based on a specific periodic interval or specific date/time set by the provider. By the use of preference elements, the provider may also allow the consumer to choose an update interval or date/time, or to choose from within an update interval range or data/time range offered by the provider. The provider can also let the update method determine a random date/time within a periodic interval or date/time period. This last approach, commonly referred to as a "back off", can be useful for controlling server loads. For instance, a provider may publish a weekly newsletter on Friday afternoons at 2 p.m. Eastern Standard Time. By specifying that the receipt or update method schedule the update polling event for a random time within the next 3 hour period, the provider can efficiently distribute a very large volume of updates within that 3 hour period without overloading the server. Receipt or update methods can also use other logic or data to control update polling. This might include factors such as the total age of the communications object in the consumer database 21; the frequency with which the consumer has viewed or acted upon the communications object; costs or fees associated with an update; or other criteria. The specific algorithm or algorithms used to control update scheduling are not a limiting feature of the invention. The consumer may also wish to have the consumer program 22 dynamicaly reschedule update events depending on other factors such as the time of day, the interval since the program was last run, local or Internet network traffic levels, the consumer's own system activity level, other system or environment variables, disk space availability, or other factors. Update methods can also be triggered manually by the consumer.

Different update methods, or differing parameters to one update method, can also be active depending on the consumer's preferences or other rules determined by the provider or consumer. For example, a different polling interval may be associated with one or more notification elements, so the polling frequency may be determined by which notification elements a consumer has activated. Notification elements are further discussed below.

The nature of communications object architecture makes it easy for a provider to convert a communications object 110 from push to pull updating and vice versa. To convert from push to pull updating, the provider need only add a pull-based update method to the communications object, then distribute it via the push technique to all recipients 120. As soon as it is received by each recipient the object will begin to use pull updating. The conversion from pull updating to push updating is almost as straightforward. The provider first adds a receipt method to the communications object 110 that will return a registration message to the provider program 12 or a distribution server 32. As described above, registration messages create or update a recipient instance 120 and its association with the communications object 110 and an update method 141. As each registration message is received, the recipient is converted to a push update method. The provider need only maintain the pull version of the communications object 110 on a distribution server 32 until the provider believes all outstanding copies of the object have returned a registration message.

In certain cases it may be advantageous to combine both the push and the pull techniques of updating for a single communications object 110. For example, a provider may wish to use pull updating for distribution of a monthly newsletter, but also wish to be able to distribute an update via the push technique when very timely news occurs, such as a special event. In this case the provider can use pull updating in the communications object 110, but also include a receipt method that returns a registration message from the consumer the first time the communications object 110 is received. (Consumer registration information can be updated whenever the consumer changes it. Registration updates will be further discussed below.) These registration messages create a special association between the recipient 120 and communications object 110 which has a PushSpecial attribute (not shown in FIG. 3). Recipients 120 whose association with a communications object 110 has a Push-Special attribute are ignored during standard communications object updates. However when the provider needs to distribute a push update, the provider can set a PushSpecial flag for the communications object 110 using the edit object form (322, FIG. 9). When this flag is set, all recipients 120 associated with the communications object 110 will receive the update via the push technique. Alternatively, the provider may choose to distribute a message object 110 to all recipients 120 who have a PushSpecial association with a communications object 110. This message object can include a receipt method that triggers an update via the pull technique. In this fashion a small message object may be distributed via a push medium such as e-mail in order to trigger the downloading of a much larger update via another medium such as the World Wide Web or FTP.

One communications object can be used to control the updating of other communications objects. For example, the receipt method for a composite communications object can trigger the updating of each of its component objects. To illustrate this, refer to FIG. 20 and the preceeding discussion of consumer distribution control using the pull technique. A composite communications object 900 can contain multiple page subscription element instances (853, FIG. 18) corresponding to its component communications objects 901. Each page subscription element instance can include an attribute for the current version value of the corresponding component object 901. This version value attribute can be maintained using a rule 140 that updates the version value of the page subscription element instance when the version value of the component communications object 901 changes. When the composite communications object 900 is updated, its receipt method can compare the version value in this attribute with the version value of the corresponding component object 901 currently stored in the consumer database 21. When the version value has changed, the update method of the corresponding component object 901 can be executed to update the component object. In this manner the component objects themselves do not need to be polled for updates. This same technique of "indirect updating" can be applied to any set of communications objects, where elements in one communications object are processed to trigger the updating of other related communications objects. In this way, for example, a single communications object at a web site could be used to check for updates on many additional communications objects on the web site or related web sites.

Another highly efficient update control technique, referred to as update query control, requires the use of database program operating on a distribution server 32. In a preferred embodiment, this can be accomplished using a distribution service object 1310 and a distribution partner server 1302. These will be further discussed in the distribution service object section below. With update query control, the communications object 110 controlling the updating need not contain any direct references to the specific communications objects or component objects being updated. Rather the controlling communications object 110 can contain one or more data exchange elements 143 and data exchange methods 141 which function as an update method. (Data exchange elements and data exchange methods will be further explained in the data exchange control section below.) The data exchange method 141 can first execute a query of the consumer database 21 for all communications objects which match the query critieria. For example, a composite communications object 900 could query for all its component communications objects 901. The query result includes the UID and current version value of each component object 901. The data exchange method then uses the result set to perform a second query of the distribution server 32. The distribution server 32 would return each component object 901 for which the version value on the distribution server 32 was greater. In this manner a single communications object could be used to very efficiently update thousands or even millions of communications objects stored on high performance database servers.

This process can be made even more efficient for the consumer by the maintenance of an index of provider UIDs and the communications objects 110 with which they are associated with on the distribution server 32. This process is further described in the directory service object section below.

Another update control approach that can be used with both the pull and push techniques is version monitoring. Version monitoring can be employed with either the push or the pull technique. Version monitoring uses a rule 140 to monitor version values included in message objects passed between the programs 12, 22, and 32 to detect when a communications object 110 needs to be updated. Version monitoring is further discussed in the sections on data exchange control and data archiving control below.

Notification Control

One of the greatest advantages of a communications object system over other communications systems is the ability it gives information consumers to control notification about communications events. The fundamental reason for this is that within a communications object system all messages are transmitted and received as some type of communications object. This allows messages to be "preprocessed" by the consumer program 22 or provider program 12 using data or methods from one or more communications objects already present in the consumer database 21 or provider database 11. This preprocessing allows these programs to do a large amount of the sorting, filtering, and notification work that otherwise would require human effort.

In a communications object system notification control is achieved primarily through the use of notification methods 141, notification rules 140, and notification elements 141. Collectively these are referred to as notification components. Notification methods 141 can operate on a communications object as a whole, or they can be associated with specific notification elements 143 contained within a communications object. Since notification elements 143 describe the nature of other data or events about which the consumer may be notified, they are one of the principal metadata constructs of the present invention. Communications objects or object updates can carry multiple notification elements 143. Each notification element 143 may also be associated with multiple other elements 143 such as message elements 143. Consumers can accept default notification methods 141 assigned to each notification element 143, assign other system notification methods 141, or create and assign their own notification methods 141. The combination of these capabilities provides a powerful means of active messaging.

As described above, notification elements 143 have a special type definition which the consumer program 22 uses to trigger notification processing. FIG. 4 illustrates a basic example of a notification element instance 201 called a topic element. Topic elements allow providers to specify interest topics on which consumers can choose to receive notification of new messages. A topic element 201 includes the attributes of element class 143, namely system ID, name, description, version, NewFlag, and HoldFlag. It also includes an attribute NotifyFlag which accepts a logical value for the default notification state set by the provider. A topic element 201 is associated with one or more message elements 211. A message element 211 carries the actual content of the message about which consumers can choose to be notified. It includes attributes for headline, headline link, body, and body link. The headline is a text field that will be displayed in a notification report for the consumer. The body is a text field that contains the body of the message, which can be displayed on its own report page. By default the headline can be linked to the body. Optionally the provider can choose to supply a headline link attribute, such as a URL, which would link the headline to another web page, communications object, or other resource. The provider can also supply a body link which would link the message body and another web page, communications object, or other resource. Alternatively, the body can be an HTML field, which allows the provider to completely control the formatting and presentation of the body page as well as provide any number of URL links within this page.

The topic element 201 illustrated is a simple "on/off" notification element. Notification elements may also be of other composite types which give providers and consumers more latitude over notification control. Specifically, the composite type could include additional fields 152 of a primitive type integer range which allow the notification element to have a "threshold" value rather than an on/off setting. Thresholds let providers add a valuative dimension to communications events. For instance, a notification element about new product announcements could have a range setting of one to five indicating the importance of the announcement. Consumers can now choose from a gradient of interest levels in this topic rather than just an on/off setting. Another use of thresholds is a frequency threshold. Frequency thresholds allow consumers to control the frequency of messages they will receive related to a specific notification element. For example, a consumer could choose to receive a maximum of three messages on a specific topic in any 30-day period. The notification method associated with this element would track the messages associated with this notification element and turn off notification for any that exceeded this frequency threshold. The specific configuration of notification elements used is not a limiting feature of the invention.

Figure 22:
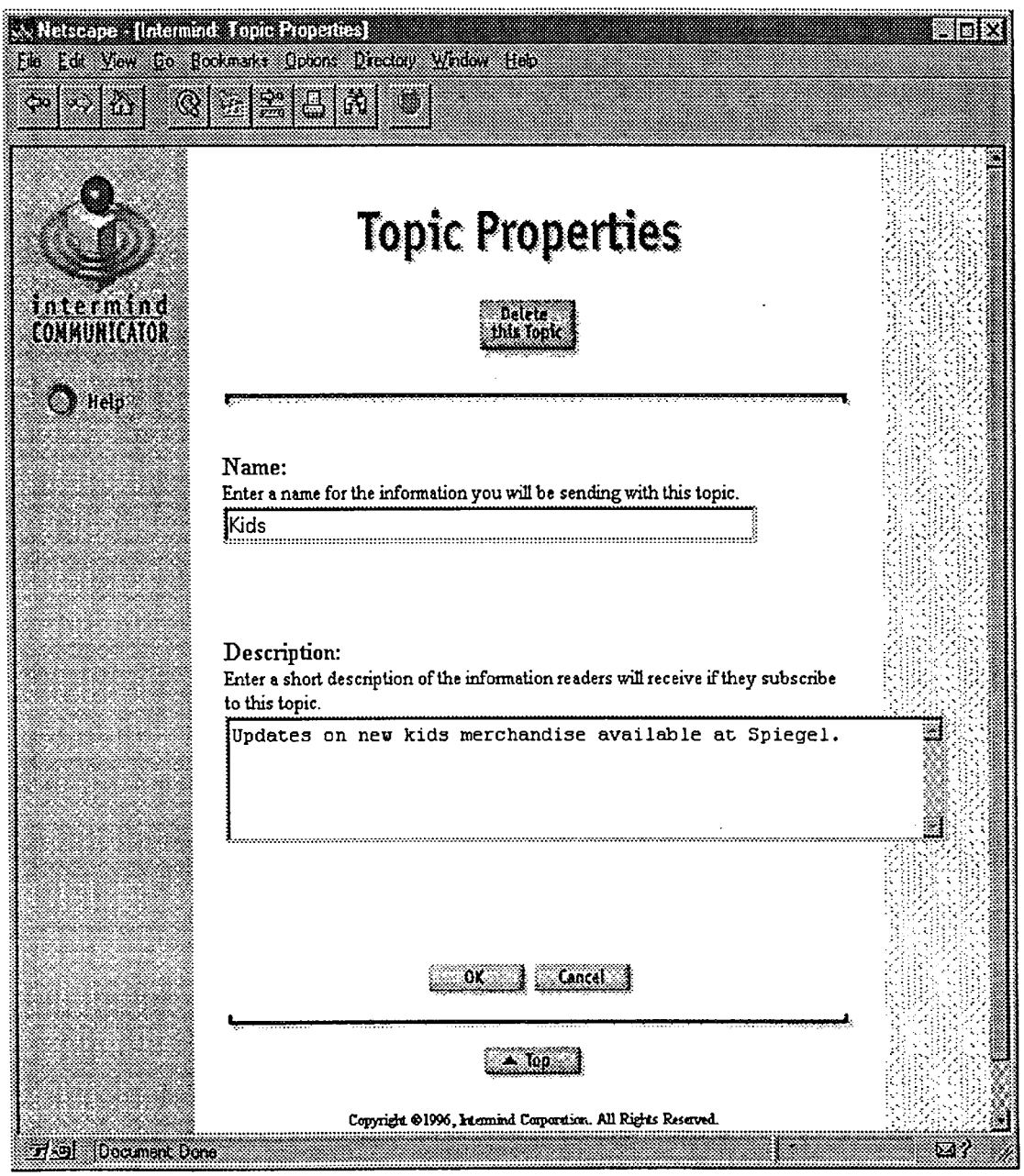
FIG. 22 illustrates a user interface display of a form for creating notification elements in the provider program.

The use of notification elements and notification methods to control messaging involves the following sets of steps. First the provider uses the create new element form (341, FIG. 9) in the provider program 12 to create notification element instances for each communications topic where the provider wishes to allow consumers to control notification. FIG. 22 illustrates a typical create new element form for notification elements. The provider inputs the name and description attribute for the information topic covered by the notification element. For example, the name of a notification element for a company selling a software product might be "New Version Announcements". For an on/off-type notification element, the description might be, "Includes all new version announcements, both minor and major upgrades". For a range-type notification element, the description might be "Choose from one to five. One receives only full point upgrade announcements. Five receives all new product announcements, including weekly maintenance patches." A list of these notification elements would appear similar to the table of contents for a newsletter, or the items on a customer interest survey. The provider can assign notification elements to one or more pages (142, FIG. 3) which in turn can be assigned to one or more communications objects (110, FIG. 3). The provider may consolidate notification elements on one or more pages specifically for this purpose, or intersperse them with other element types on various pages. Optionally the provider can also create the initial versions of each message element or other type of element associated with each notification element.

Figure 23:
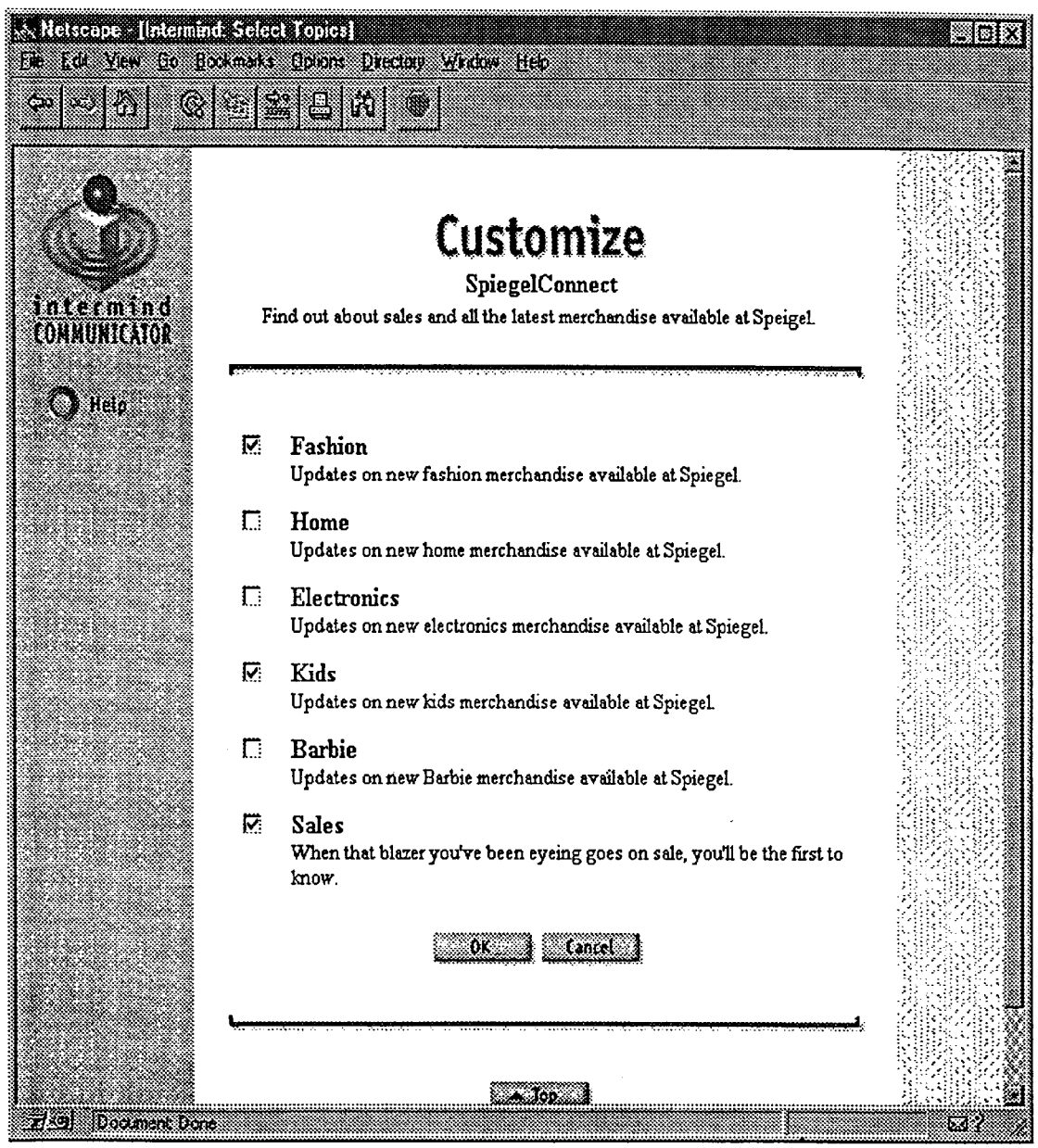
FIG. 23 illustrates a user interface display of notification elements on a edit object form in the consumer program.

When the communications object containing the notification elements is transferred to the consumer program 22, the preference values for each notification element are editable by the consumer. As shown in FIG. 4, these preference values are stored in an instance 221 of the element preferences class 147. This instance inherits the logical attribute NotifyFlag from the notification element instance 201. The value for this field is represented by a checkbox next to the name and description of the notification element 202 when the consumer is editing any form containing the notification element. This could be the selected page form (612, FIG. 14) or the edit object form (612, FIG. 14). The selected page form would present the notification element in the context of the other elements on the page. The edit object form allows all preference elements for the object, including all notification elements, to be edited at once. FIG. 23 illustrates how notification elements on a typical edit object form might appear.

When the provider wishes to transmit information related to a notification element, the provider uses the edit selected element form (342, FIG. 9) to create or edit the message elements 211 or other elements associated with one or more notification element. The provider does this for all messages or other notification events the provider wishes to transmit in a particular communications object distribution. Of course any other communications object or object component changes will also be transmitted in the same distribution operation.

The processing of notification elements in an updated communications object received by the consumer program 22 is shown in steps 724–728 of FIG. 15. After the appropriate element preference associations have been updated (step 717), the consumer program 22 queries the updated communications object for all notification elements (step 723). Notification element types can be designated by any of the techniques discussed in the data structures sections above. One such technique is to include a logical value IsNotifyElement in all such elements. The program then begins a loop through each notification element (step 724). First, it checks to see if an associated element preference instance (147, FIG. 4) exists (step 725). If not, the notification element is skipped. Alternatively, the program could follow object-level or global-level consumer preferences for this case. A special rule could also be followed for new notification elements. Alternatively, notification of new notification elements can be accomplished by having the provider include one or more special notification elements specifically for this purpose. Updates to these special "metanotification elements" can include links to the new notification elements for easy editing by the consumer. For each element where an associated element preference instance (221, FIG. 4) exists, the consumer program 22 performs a notification test (step 726). For example, the test for an on/off topic element (201, FIG. 4) would be if the NotifyFlag value of the consumer's element preference instance (221, FIG. 4) was equal to TRUE. In the notification element fails the test, the consumer does not desire notification, and the program proceeds to the next notification element for processing. If the notification element passes the test, the program executes the notification methods the consumer has assigned to the element preference instance (step 727).

Notification methods provide the consumer with a powerful mechanism for controlling notification of communications events. Rather than simply maintaining a passive message queue as is typical of most e-mail or voicemail systems, notification methods allow the consumer to specify message processing actions to take upon receipt of a specific type of communications event or specific communications content. The consumer is able to specify such actions because of the metadata provided by the notification element 143, and because of the structured format of the message data contained in the communications object. Notification methods 141 may trigger any action available to the consumer program 22, subject to the user's permissions.

Figure 24:
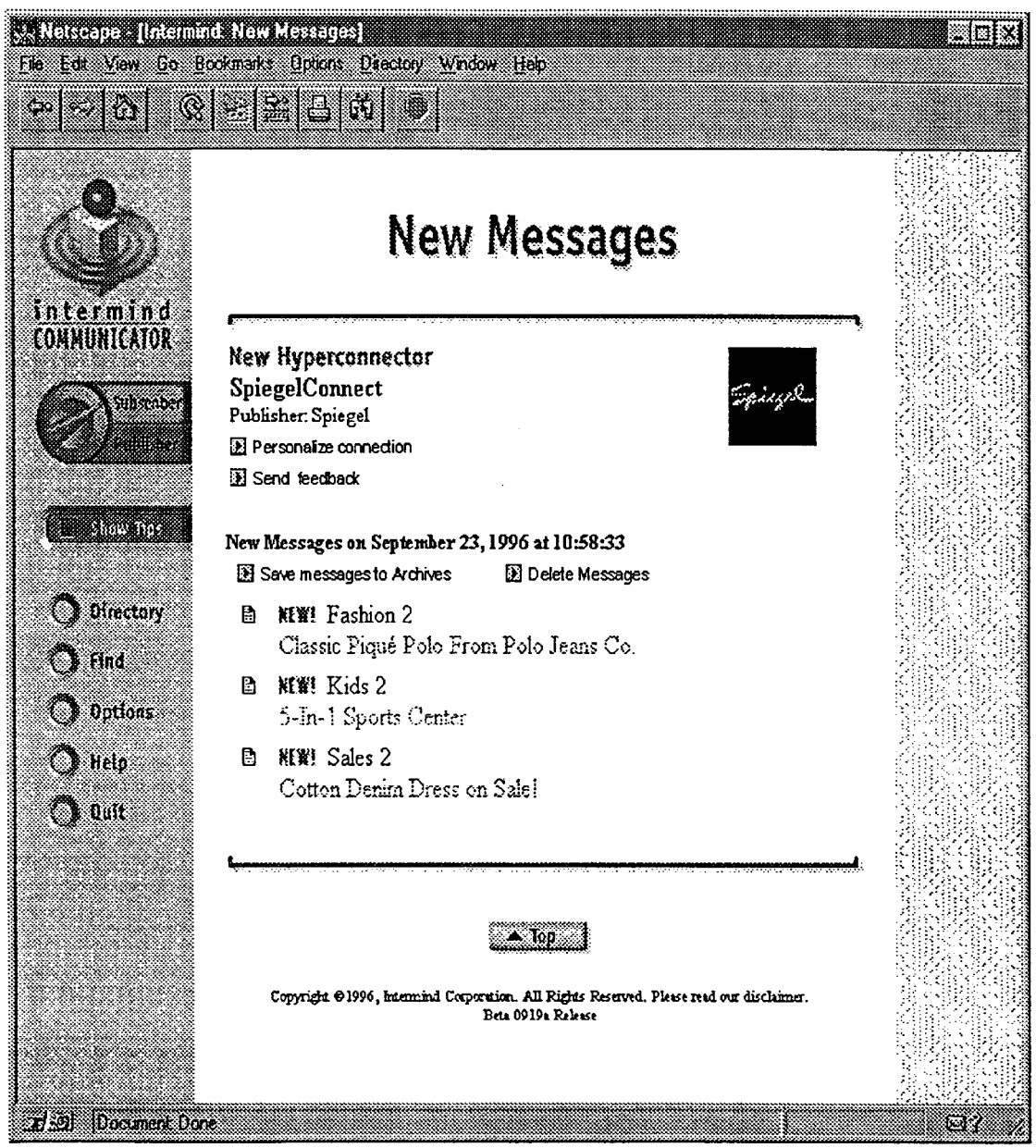
FIG. 24 illustrates a user interface display of a notification report.

FIG. 4 illustrates two typical notification methods assigned to an element preference instance 221. A SendE-Mail method 224 causes each message element 211 associated with the notification element 202 to be sent as an e-mail message to an address or addresses specified by the consumer. Preferably, such an e-mail message would use as the start of its header a signifying string such as "Special Alert:", followed by the headline text value from the associated message element 211. The body of the message would then contain the body value from the associated message element 211. It could also contain the headline link value, body link value, and other status or navigational information, such as the name of the originating communications object, the name of the provider, or other actions taken. An AddToNotifyReport method 225 causes the headline of each associated message element 211 to appear in the consumer's notification report (630, FIG. 14). To set this trigger, the AddtoNotifyReport method adds a logical NotifyReportFlag attribute 223 to the element preference instance 221 and sets its value to TRUE. To display the notification report (630, FIG. 14), the consumer program 22 performs a query of the consumer database 21 for all message elements 211 associated with all element preference instances 221 where the NotifyReportFlag 223 value is TRUE. The actual content displayed in the report is determined by attributes of the consumer's global preferences (103, FIG. 3). The consumer may wish to see headlines only. In this case each headline can be displayed as a hyperlink. When selected, the hyperlink will display the message body and body links as a separate page. Alternatively, the consumer may wish to see all headlines, messages, and links in the notification report. Headlines may also be linked to other elements or methods, such as those used for data exchange. Headlines may also function as a hyperlink directly to another URL anywhere on the Internet. Another option is for the consumer to see communications objects for which there are new notifications displayed differently than other communications objects for which there are no new notifications. Notification reports may also be sorted according to the settings of the sort form (634, FIG. 14), or by using various toolbar buttons for common sorting or filtering options. For example, notification data could be sorted by communications object name, communications object nickname, date, folder, or notification priority. Different standard or custom notification reports can also be stored and presented as menu options or toolbar buttons. A example of a notification report sorted by date showing headlines only for communications objects which had new notifications is shown in FIG. 24. Each notification report entry can include a button for deleting the entry from the notification report immediately, or a checkbox for batch deletion, or both. In either case, when the notification report form is submitted, this button or checkbox causes the NotifyReportFlag attribute 223 of the corresponding preference element instance 221 to be set to FALSE. The format of a notification report is not a limiting feature of the invention.

These examples are merely illustrative of the actions that can be taken by notification methods. Notification methods may trigger any method operation available to the consumer program 22. Other examples include sending messages to other applications running on the consumer machine 2; sending messages to the consumer's operating system to trigger dialog boxes or trigger other system events; creating or controlling a screensaver display on the consumer machine 2; creating or controlling a background desktop graphic or set of graphics on the consumer machine 2; and sending voicemail to the recipient. Any combination of notification methods 141 may also be used together. The specific notification method used is not a limiting feature of the invention.

Notification methods 141 can also be assigned to communications objects as a whole. For example, notification about new communications objects can be controlled through a NewObjectNotify method of the global preferences instance (103, FIG. 3). Described further above, the use of the NewObjectNotify method is illustrated in steps 704–706 of FIG. 15. Notification at the object level is also useful for certain communications object updates. This is particularly true for "metamessages" that the provider wishes to transmit to all recipients of a communications object, such as a change in business name or ownership, significant structural or operational changes to a communications object, or splitting a communications object into multiple objects.

A receipt method 141 can also be used to control notification. For example, a receipt method 141 could automatically search the message elements within a communications object update for text strings specified by the consumer. As shown in FIG. 3, these text strings could be stored in an element preferences instance 147 associated with the communications object 110 and the receipt method 141. When this receipt method 141 executes, if it finds any instance of the search string in the message elements, it causes the notification element or elements 143 associated with that message element to pass the notification test and trigger the corresponding notification method 141. Such a receipt method 141 provides a powerful secondary means of notifying the consumer of communications object content which may not be directly related to topic elements or other types of notification elements.

Notification control operates similarly in the provider program 12. Here notification methods 141 are associated primarily with message objects 110. As with the consumer program 22, notification methods 141 can be assigned to a message object 110 as a whole, to elements within a message object, or activated by receipt methods associated with the message object. When the provider program 12 and consumer program 22 are combined, the same notification reporting system can be used for both provider and consumer operations. Report sorting options can allow provider notifications to be shown separately from consumer notifications, or they can be combined on the same reports.

Notification methods 141 can also be assigned to system events, and these too can be integrated into the same notification reports. For example, a system event can trigger notification that a provider is due to release a periodic communications object update, or a consumer that his/her consumer database 21 needs to be backed up.

Data Exchange Control

The ability of a communications object system to automate common communications tasks is perhaps best exemplified by its ability to automate data exchanges between consumers and providers. Typical examples include the exchange of contact information, demographic data, psychographic data, billing information, product registration information, customer service data, technical support data, transaction histories, stock feeds, news data, weather data, and so on. A communications object system is capable of automating the exchange of such data to a greater degree than any other existing communications system for five reasons. First, such data is already stored in a consumer database 21 in such a fashion as to be available for automated access and delivery. Second, such data is available in structured, typed formats that allow providers to easily specify the data they require. Thirdly, communications objects give providers the tool they need to transfer such data from the consumer back to the provider. Fourth, message objects and the architecture of the provider program 12 allow the provider to automate the processing of such data when it is received back at the provider. Fifth, the ability of the provider program 12 and consumer program 22 to automatically trigger events and respond to message objects means a multi-part data exchange transaction (such as a purchase and receipt acknowledgment) can be automated throughout.

The primary data structures involved with data exchange control are data exchange elements 143 and message objects 110, both described above. Any communications object method 141 involved with data exchange can be referred to as a data exchange method. Data exchange elements 143 in a communications object 110 can call a data exchange method 141. Data exchange methods 141 in the consumer program 22 can produce message objects that can be transmitted back to the originating provider program 12, or to any other program capable of processing the message object. Data exchange methods in the provider program 12 can also produce message objects that can be sent to any consumer program 22 containing the parent communications object. Like any communications object, message objects can contain any combination of components required to transport and process the data they contain. Data exchange methods that produce message objects can be fully automatic. For example, a receipt method can produce and transmit an acknowledgment registration message object, described above, with no consumer intervention. Data exchange methods that produce message objects can also obtain manual data input from the consumer or provider. In a preferred embodiment the mechanism for obtaining this input is an HTML form. Such input forms are produced and displayed by the provider program 12 or consumer program 22 in the same fashion as the forms produced for operation of the programs themselves. A typical input form is shown in FIG. 27. Each data field that accepts input on the form is an attribute of an element 143. Other text or graphics that appear on the form, as further instructions or directions to the user, are other elements either supplied by the provider or drawn from the consumer database 21 or provider database 11. Any communications object component stored in either of these databases may be included, subject to the consumer's or provider's data access rules discussed below. The only difference between input forms produced by data exchange methods and standard program forms is that an data exchange input form is generated by and processed by a data exchange method. Alternatively, user input can be obtained through other user interface options including standard operating system functions such as dialog boxes and menus. The use of a graphical user interface will be specifically discussed below.

Besides input form and message object generation, data exchange control in a communications object system involves data type control, data persistence control, data access control, and data security control. Each of these must be considered from the standpoint of internal data, i.e. data within the provider database 11 or consumer database 21, and external data, i.e. data available elsewhere within the provider's or consumer's computing or network environment.

Data type control is required because providers need a way to specify the data they require in a specific data exchange transaction. The data type definition features of a communications object system, as explained above in the data structure section, are ideally suited to this need. By creating a system-wide set of low-level composite type definitions, such as Name, Address, and Telephone, and then nesting these inside of progessively more comprehensive composite type definitions, such as BusinessCard or Resume, a hierarchy of standard data type definitions can be created that are available to all providers and consumers. This has two very significant advantages. First, as providers design input forms and methods for data exchange tasks, they can choose from among these standard data type definitions rather than needing to create their own composite data type definitions, saving considerable time and effort. Second, data type standardization means that consumers need only enter data once into each instance of each data type that pertains to them. For example, the consumer only needs to enter his/her name, addresses, telephone numbers, birthdate, and other personal data one time into the consumer database 21. From that point on all communications objects which need data of these types can access these data type instances. This saves the consumer data input time and also vastly reduces the potential for data input errors.

Like any communications object component, every composite data type can be identified by the unique system ID of its type definition (144, FIG. 3). When multiple instances of a particular data type exist, such as multiple telephone numbers, the provider can use a data exchange method to specify if all instances are desired, or query for selected instances using additional criteria, or use an input form to prompt the consumer to select one or more specific instances. Such an input form can be generated dynamically by the data exchange method based on the presence and number of instances of a data type that satisfy a provider's selection criteria. The input form can also be dynamically generated based on the need for further input by the consumer, or to conform to the consumer's data exchange rules, discussed below. Data type standardization can be further extended by the use of type definition service objects, which will be further discussed below.

Providers can also create their own data type definitions and specify the use of these composite data type definitions in data exchange methods. When a provider-specific data type can be aggregated or calculated from other system standard data type definitions which are already present in the consumer database 21, the resulting element can be composed automatically by a data exchange method. When a provider-specific data type requires the input of new data from the consumer, an input form can be generated by the data exchange method. Once submitted, the data can also be saved as a element preference instance (147, FIG. 3) in the consumer database 21. The provider can then use the system ID of the type definition of this element to query for this element preference instance in future transactions. This allows a provider to dynamically generate and persistently store provider-specific data type definitions in the consumer database 21. A common example of such a data type might be a consumer's preference between a provider's selection of product colors, such as clothing or paint. Storing this data locally at the consumer database 21 means that it can easily be included in any future communications from the consumer. Additionally, such data can be shared among all communications objects or data exchange methods from that provider, as further explained below. Another key benefit is that this data can be easily and immediately edited by the customer should the customer's information or preferences change. Such changes can also be automatically transmitted back to the provider through the use of data association rules, discussed below.

As with any multiuser database system, shared access to data requires data access controls. This control should cover all common data operations such as creating, reading, writing, moving, and deleting data. In a communications object system, data access controls need to extend beyond human operators to communications objects, since these objects are essentially acting as "surrogates" for their respective providers. The key data structure involved with data access control is the rules class 140. Data access rules can monitor all forms of data access within the provider database 11 or consumer database 21 as well as external data in the provider or consumer's computing or network environment. For example, a typical rule governing access to communications object components or element preference instances might be that only other communications objects sharing the same database system ID (100, FIG. 3) can read, write, or delete such instances. This would prevent different providers from having access to each other's private data. This rule could be modified so that only communications objects sharing a group system ID (251, FIG. 6A), described above, could have access to such data. This would allow all communications objects created by employees of the same company, or within a company division, to access each other's communications object component or element preference instances. Data access rules can be system-wide, assigned by providers, or assigned by consumers. An example of a provider-assigned rule would be restrictions on communications object forwarding, which will be further discussed below. An example of a consumer-assigned rule would be that designated personal data, such as household income, must be explicitly authorized by the consumer before it is transmitted in any data exchange. A stricter rule would state that more sensitive private data, such as credit card numbers, must be encrypted and require one or more passkeys for decryption prior to any data exchange. In order to protect their integrity, data access rules can also enforce the ability to add or change other data access rules, and also the hierarchy in which rules take precedence when two or more rules apply. Data access rules can also be selectively applied by the consumer to particular communications objects 110 or communications object groups such as folders 115 by creating associations between these and a data access rule 140. The application of rules to control data access within an active database is further discussed in the aforementioned *Active Database Systems*.

As the preceeding examples illustrate, enforcement of data access control rules is of paramount importance when automatic data exchange methods have shared access to a pool of private data belonging to the consumer. One mechanism for enforcing data access rules is system- or consumer-controlled encryption of sensitive private data. Any access to such data requires that the consumer enter the necessary passkey in order to decrypt the data. A second mechanism is system- or consumer-controlled authentication of communications objects. This requires the use of digital signatures and authentication protocols for communications objects. Such protocols are fully described in the aforementioned *Applied Cryptography* by Bruce Schneier, and will be further discussed below.

Data type, persistence, access, and security control can be applied to the exchange of data external to the provider database 11 or consumer database 21 in the same manner as internal data. Such external data falls into three general categories: system data, file data, and data available via external queries. System data includes system environment variables, configuration variables, and operating statistics. File data includes data available directly via operating system calls such as files, persistent system objects, or any other data stored directly in the user's local or network computing environment including removable storage devices mechanisms such as floppy disk drives, CD-ROM drives, or tape drives. Data available via external queries includes data stored in and available through other computer programs operating in the user's local or network computing environment, including application programs, database servers, naming or address servers, web servers, or any other type of server.

Data type, persistence, access, and security control for system data is generally dictated by the features of the operating system and the privileges it grants to the provider program 12 or consumer program 22. The use of standard system environment variables such as the current date and time are central to the operation of these programs, and this data is frequently incorporated automatically into communications object components.

For external file data, data type control can be particularly useful. For example, personal computers running the MS-DOS or Microsoft Windows operating systems use a standard set of setup and initialization files including AUTOEXEC.BAT, CONFIG.SYS, WIN.INI, and SYSTEM.INI. Standard data type definitions can be created for elements that store information about each of these files, such as their name, size, date, and local directory path. A composite data type PCSetupFiles can also be created which included elements for each of these specific files. Providers can use these standard data type definitions to easily access the contents of these files for processing or data exchange. This access can be controlled by data access rules in the same way as internal data. This capability is particulary valuable for software or hardware technical support, where it can save both the provider and consumer considerable manual time and effort obtaining and exchanging this data.

A communications object system allows data persistence, access, and security control for external file data to operate at two levels. First are the standard file privileges granted to the user of the provider program 12 or consumer program 22 by the operating system or network administrator. Second are the rules 140 that can be enforced within the provider program 12 or consumer program 22 themselves. Data persistence control is particularly relevant to external file data. With the appropriate file creation privileges, data exchange methods can control the creation, modification, and deletion of external files on the user's computer system. These files can be used for many purposes, including the storage of message attachments, web helper files, log files, troubleshooting files, and files created by or intended for use by other software programs in the user's local or network computing environment. Access control and data security enforcement for these files, including encryption and authentication of individuals or communications objects requesting access, can be handled in the same manner as internal data. The ability to access and manage external file storage is particularly valuable in conjunction with the use of attachment elements. Attachment elements allow a provider to store the specification for a file or files as a specific type of communications object element 143 which receives special processing during the communications object generation and transmission routine. This is shown as step 546 in FIG. 12. After the communications object itself is generated for transmission, any attachment element it contains is processed to determine the file, system object, or other attachment it specifies to attach to the transmission. Such attachments can be encoded in MIME, BinHex, UU encoding, or other attachment encoding format as described above. When the communications object bearing the attachment is received by the consumer program 22, the attachment is stored according to a corresponding receipt method. The attachment can be stored internally as an element 143 in the consumer database 21, or externally in the consumer's file system. File data exchange control can also be combined with notification control. For example, a message element (211, FIG. 4) including a hyperlink to the attachment can also be created for inclusion in a notification report (630, FIG. 13) by the consumer program 22. In this way communications object updates can serve as a powerful means of automatically distributing and indexing one or more external attachment files.

One of its most powerful forms of data exchange control in a communications object system is the ability to automate external data queries and the processing of query result sets. This is because it gives providers a tool to allow consumers quickly and easily set up automated queries against any type of data server maintained by the provider. These queries are easily set up because they can be composed using any data available in the consumer database 21 (subject to the consumer's data access rules, as explained above), so the consumer need only enter any new data required. The queries are easily automated because the data exchange method that executes them can create its own scheduled event instances (117, FIG. 3) to execute future instances of the query. External query control can also be combined with notification control to automate notification depending on the query results. For example, a data exchange method that executes a data query for a stock price can notify the consumer if the new price is a certain dollar amount or percentage amount changed from the previous price.

Data type control is especially useful with external queries. This is because the use of standardized data query languages such as Structured Query Language (SQL) makes it easier for providers to create or consumers to modify routine data queries. SQL and other approaches to standardized data query languages are discussed generally in R. G. G. Cattell, *Object Data Management—Object-Oriented and Extended Relational Database Systems* (1994), which is incorporated herein by reference. In a communications object system, the specifications for a structured query can be stored as a special type of communications object element 143 called a query element. Query elements receive special processing during the communications object generation and transmission routine. This is shown as step 545 in FIG. 12. After the communications object itself is generated for transmission, it is tested for any query elements. For each query element it contains, the data exchange method associated with the query element is executed to perform the query. This could be a query against the provider database 11, against another local application acting as a server, against a network database server, against a web server, or against any other server capable of query processing. When the query result set is returned, the data exchange method determines what further steps to take. These may include appending the data to the communications object transmission as a file attachment, creating and appending a message object, or otherwise modifying the communications object or its encoding or transmission. Query elements thus provide a powerful extension to a provider's ability to control and customize communications object distribution.

Data persistence, access, and security controls all apply to external data queries as well. Again, a communications object system allows these to be implemented at two levels. At one level, these can be the same controls that apply to the human operator of the programs 12, 22. For example, the user's ability to read, write, or create new records in a database server can be governed by a user ID and login password controlled by a system administrator. The programs 12, 22 can simply require the same information to be entered manually. Alternatively, the programs 12, 22 could store this information as global preferences that it can submit automatically as part of executing data exchange methods. The programs 12, 22 can then implement their own layer of internal security. This can include the use of system-wide login names and passwords, the implementation of rules 140 controlling data access, and the encryption of sensitive data, all as described above. Data access and security control is particularly useful when data exchange methods employing queries are executed by the consumer program 22 on the behalf of the consumer. Using such controls, a provider is able to select the subset of consumers on a communications network 3 such as the Internet who will have access of some kind to one or more databases or database servers operated by the provider. This control is useful when the provider wishes to charge access fees for the data, to protect the data for competitive or security reasons, or to monitor or track access to the data.

By being able to control the exchange of external system data, file data, and data available via external queries in addition to internal data, the programs 12, 22 can automate many routine information transactions on data communications networks. This can produce a vast savings in the human labor normally required to exchange such data. The present invention is able to further increase this labor savings by automating the processing of such data once it has been exchanged. As with other data exchange operations, this is accomplished through the use of data exchange elements 143, data exchange methods 141, and message objects 110. Any data exchange method can produce a message object 110 that can call itself or another method or methods for processing the contents of the message object once it is received. As explained above, data exchange methods that call themselves are polymorphic, performing different operations at the provider program 12 than at the consumer program 22. An example of such a method is the SendAck method discussed above. Like any communications object method, data exchange methods can also call other methods, including other data exchange methods. In this way a succession of automated data exchanges may take place between a provider program 12 and consumer program 22 without any human intervention if none is required. Such automated data exchanges may also occur between the provider program 12 or consumer program 22 and other data servers as explained in the discussion of data query control above and the sections on service object partner servers below. This includes requesting data from the server or posting data to the server.

As explained above, when the provider program 12 and consumer program 22 are combined, the same facilities for processing communications objects on behalf of the consumer are available for processing message objects on behalf of the provider. For example, message objects 110 can contain or produce message elements (211, FIG. 4) for inclusion in a notification report (630, FIG. 13). Because notification reports are produced by queries against the databases 11, 21, these message elements can be sorted by any criteria desired by the provider. For example, they can be sorted by their parent communications object (110. FIG. 3), by related notification element (201, FIG. 4), by the type of action required by the provider, or by any other element contained in the message object which produced them. Within the notification report, message elements can be hyperlinked to other data exchange methods to control further processing of the message object data. As with data exchange methods in the consumer program 22, this can include the generation of input forms for gathering additional input from the provider and the generation of message objects that can be returned to the consumer or to other data servers.

Figure 25:
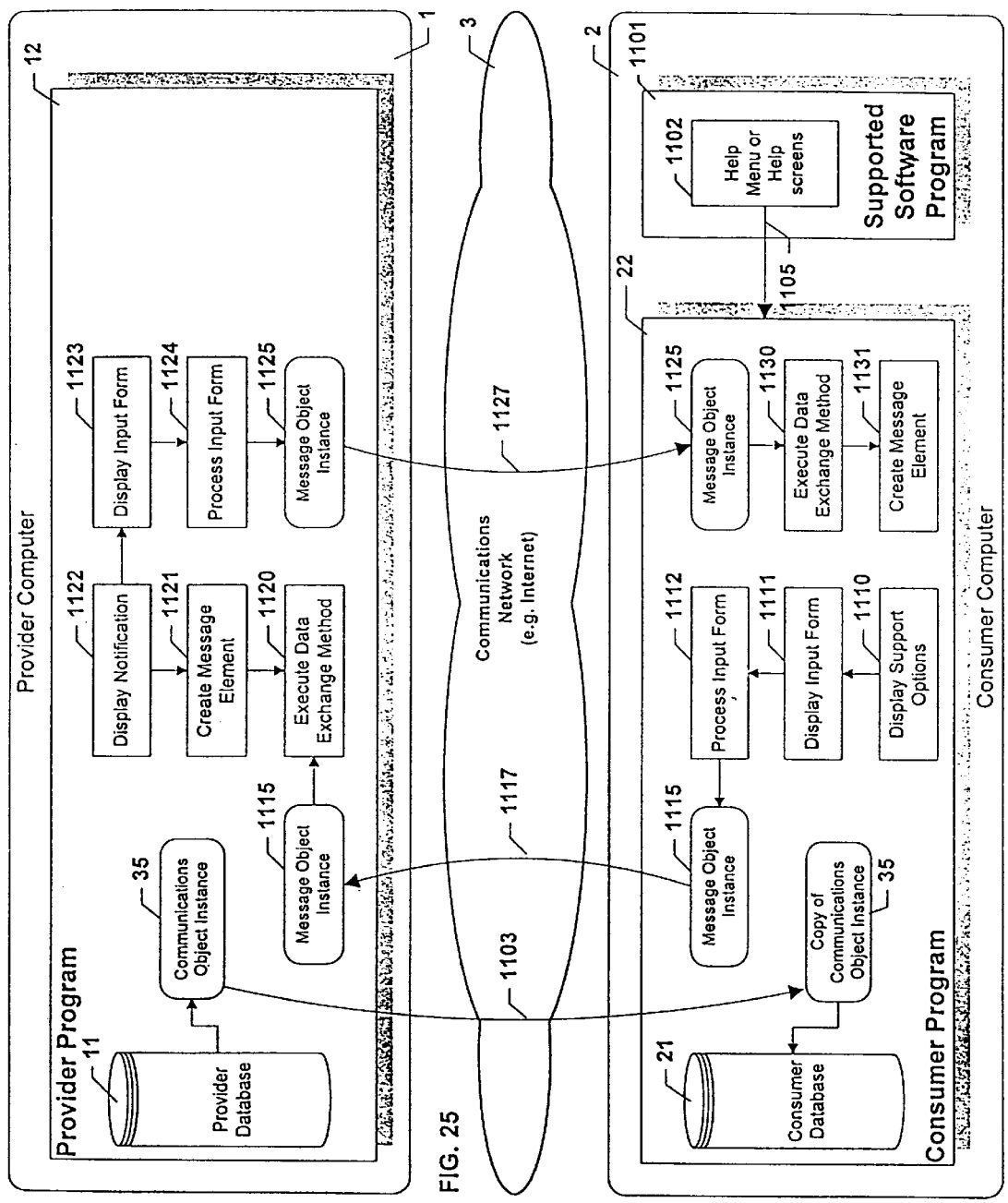
FIG. 25 illustrates operation of the communications system for data exchange involving technical support of a software product.

An example of the full cycle of automated data exchange and message object processing would be the use of a communications object system to provide technical support for a software product. This is illustrated in FIG. 25. The company producing the software product 1101 would use the provider program 12 create a communications object 35 representing the product. The company would then distribute this communications object 35 to the consumers using the product (step 1103). This could occur in many ways, for example by delivering it with the product, shipping it separately on a floppy disk or CD-ROM, e-mailing it to the consumers, or making it available on the company's web server. When a consumer using the product had a technical support question, the consumer could manually locate the company's communications object 35 within the consumer program 22. Alternatively the company could add an API call directly from the software product 1101 to the communications object 35 in the consumer program 22. Such an API call could be made from commands placed in the software product's Help menu or product help screens 1102. By activating such a command, the customer can automatically call the appropriate page (142, FIG. 3) of the communications object 35 in the consumer program 22 (step 1105). API calls are further described below.

Figure 26:
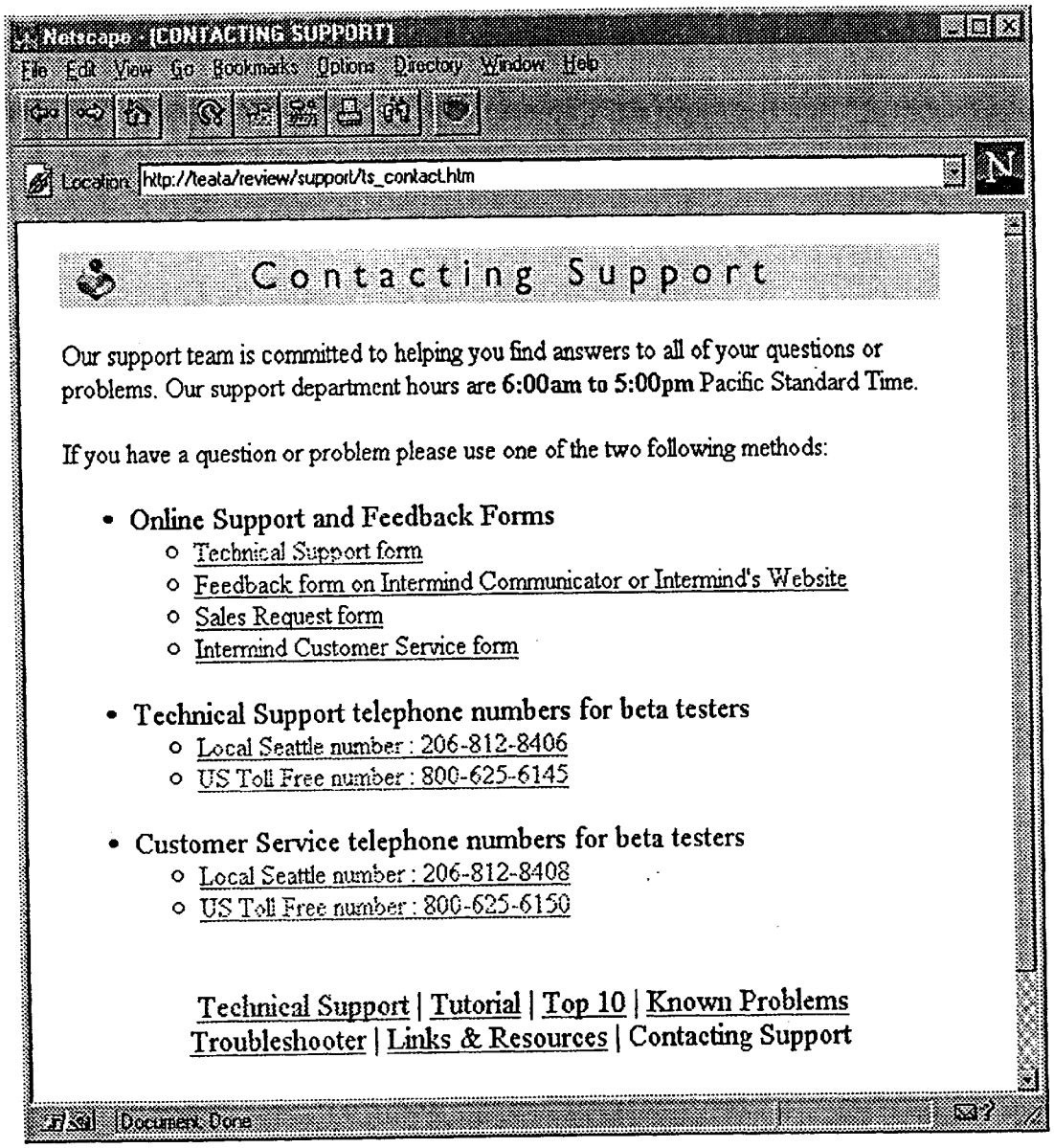
FIG. 26 illustrates a user interface display of technical support options for users of a software product.

Whether called up manually by the consumer or automatically by an API call, the appropriate page (142, FIG. 3) within the communications object 35 would display the various technical support options offered by the company (step 1110). FIG. 26 is an illustration of how such a page might typically appear. Each data exchange element 143 representing a support option appears as a hyperlink command or button. When activated by the consumer, this command calls the data exchange method 141 associated with the data exchange element 143. The data exchange method 141 then generates an input form for gathering additional data from the consumer (step 1111). FIG. 27 illustrates how such an input form might typically appear. As described above, an input form can display fields for manual input from the consumer which are attributes of a data exchange element. These include checkboxes, radio buttons, drop-down lists, and text input fields. Text input fields can be used for free-form text input such as writing technical support questions in a manner similar to writing e-mail messages. The input form can also display data already present as elements in the consumer database 21 for confirmation and authorization by the consumer. When the consumer submits the input form, the data exchange method 141 processes the form input in the same manner that system methods process program form input as described above (step 1112). This includes any error detection routines, which may display additional messages or input forms. Once the form data is validated, the data exchange method 141 produces a message object instance 1115. This message object instance may include internally or as attachments any of the different types of exchange data discussed in this section. For example, it could include system data such as the time and day, computer type, CPU type, and RAM available. It could also include file data such as the consumer's AUTOEXEC.BAT or the initialization file for the supported software program 1102. It could also include data from a data query such as a error log report produced via an API call to the supported software program 1102. The automated inclusion of this data not only saves a great deal of manual effort on the part of the consumer, but elimates manual data entry or attachment errors. Finally, the data exchange method 141 transmits the message object instance 1115 to the provider program 12 (step 1117).

At the provider program 12, the message object instance 1115 executes a data exchange receipt method 141 (step 1120). This data exchange method 141 could be a polymorphic version of the same data exchange method 141 used in the consumer program 22, or a separate data exchange method 141. The data exchange method 141 processes the data contained in the message object instance 1115. Because this data is of known data types in a structured transmission format, the data exchange method can apply the provider's own rules 140 or other processing logic to automate message processing to the greatest extent possible. This includes doing an automated scan of the consumer's input data and included system data, file data, or the results of data queries to spot the symptoms of known bugs in the software program 1101 or of common operator errors. Based on the results of this processing, the provider program 12 can produce an message element instance (211, FIG. 4) associated with a particular notification element instance (201, FIG. 4) which the provider has classified for technical support requests matching this profile (step 1121). This classification can be based on any data contained in the message object 1115. This could include the version and platform of the software product 1101 used by the consumer, the original technical support option chosen by the consumer, the probable diagnosis produced by the data exchange method processing, the number of technical support messages received from the consumer, and so forth. The headlines from these message element instances (201, FIG.

4) can then be displayed in a notification report (step 1122) similar to that used for consumer notification (see FIG. 24). In this way notification control can be combined with data exchange control to give the provider a powerful mechanism for filtering and categorizing technical support requests.

When the provider activates a headline link on the notification report, this calls the associated data exchange method which produces an input form allowing the provider to respond to the consumer (step 1123). Similar to the input form presented to the consumer in step 1111, this input form can contain pre-configured response options from which the provider can choose. As with consumer messages, these response options can include both internal and external data and attachments. For example, the provider could choose from a list of standard answers to frequently-asked questions that would automatically be incorporated in the provider's reply message object. The provider could also choose from a list of technical support documents related to the consumer's symptoms that could be automatically attached to the provider's reply. Once the provider submits the input form, the process is a mirror of the steps that took place at the consumer program 22. First, the form data is validated and processed (step 1124), and then another message object instance 1125 is produced. In order to maintain the continuity of the "thread" of messages passing back and forth between the provider and consumer, this message object 1125 uses the same system ID as the original message object 1115, but updates the version value. This updated message object is transmitted back to the consumer program 22 (step 1127).

At this point the steps mirror the processing that took place at the provider program 12. First, the message object instance 1125 executes a data exchange receipt method 141 (step 1130). The data exchange method produces a message element instance (211, FIG. 4) associated with the notification element instance (201, FIG. 4) which the consumer designated for this type of response (step 1131). The headline from this message element instance will now appear on the consumer's notification report as described above in the discussion of notification control. When the consumer activates the message element's headline link, the data exchange method 141 associated with the message element instance (211, FIG. 4) produces an input form, and the cycle begins again at step 1111. This input form can display the provider's response as well as the consumer's new reply options. For example, if the provider suggests a solution, but the consumer finds the solution does not work, the consumer can use the form to send this input back to the provider. Again, to maintain the continuity of the messaging thread between the consumer and provider, each message object 1115, 1125 produced uses the same system ID, but updates the version value. By archiving message objects 1115, 1125, the data exchange methods at both the consumer program 22 and provider program 12 can automatically interlink new messages with older versions, allowing both the provider and consumer to easily refer to previous messages in the thread. Communications object archiving is further discussed below.

Data exchange control can also be combined with receipt and acknowledgment control. For example, at any stage of message object exchange in the preceding example, the message object's receipt method could automatically produce an acknowledgment message object that would be immediately transmitted back to the originating program 12, 22. As explained in the discussion of receipt control above, this acknowledgment message could produce an explicit notification of receipt, or simply disable a scheduled event that would otherwise notify the consumer if an acknowledgment was not received within the expected interval.

Referring to FIG. 3, the preceeding discussion of data exchange has focused primarily on data exchange events initiated either manually by the consumer or automatically by scheduled events 117. Either one of these techniques can be employed to either pull new data to the consumer or push data from the consumer to the provider. However data exchange events can also be triggered automatically by data exchange rules 140. Perhaps the most common example is the update association rule discussed above. The update association rule (FIG. 10B) ensures that changes made within the provider database 11 are distributed to all associated recipients 120 via all associated communications objects 110. When the provider and consumer programs 12, 22 and databases 11, 21 are combined, a corresponding data exchange rule 140 can be employed by a consumer communications object 110 to monitor changes to one or more provider elements 143. Such a data exchange rule creates an association between an element 143, a communications object 110, and a data exchange method 141. When the version value of the element 143 changes, the rule 140 is invoked which calls the data exchange method 141 of the communications object 110. The data exchange method 141 can then produce a message object 110 to transmit the changed data back to the provider program 12. Alternatively, a message object or another type of structured message can be transmitted via any available communications network to any other address the provider designates. In this fashion a communications object consumer who is also a provider can automatically update all of his/her communications object relationships associated with a particular element 143 just by editing the element 143. A common universal example is change-of-address notifications. With any other communications object network, such as postal systems, telephone systems, fax systems, or e-mail systems, a change of address involves significant human labor on the part of the party whose address is changing to notify all his/her communications partners. For their part, each communications partner must update their own records when a change-of-address notification is received. When data exchange rules 140 are employed in the present invention, every communications partner is updated automatically whenever relevant communications data elements change. This includes both partners who are recipients 120 of the user's own communications objects 110, as well as partners from whom the user has received a communications object 110 employing data exchange rules. As the number of users of a communications object system grows, the overall human labor savings involved in this automatic two-way updating of contact data can become very significant.

A specific application of data exchange rules is registration updates, discussed in is the update control section above. A registration update is a message object returned by a consumer program 22 to a provider program 12 or distribution server 32 in order to modify a recipient instance 120 and/or other elements associated with a communications object 110. Typically any element 143 in the consumer database 21 that is part of the registration data maintained in the provider database 11 will be monitored by a data exchange rule 140 contained by the communications object 110. Any changes to these elements 143 will result in a message object being produced that produces an update in the corresponding recipient instance 120 or other element 143 in the provider database 11.

Figure 37:
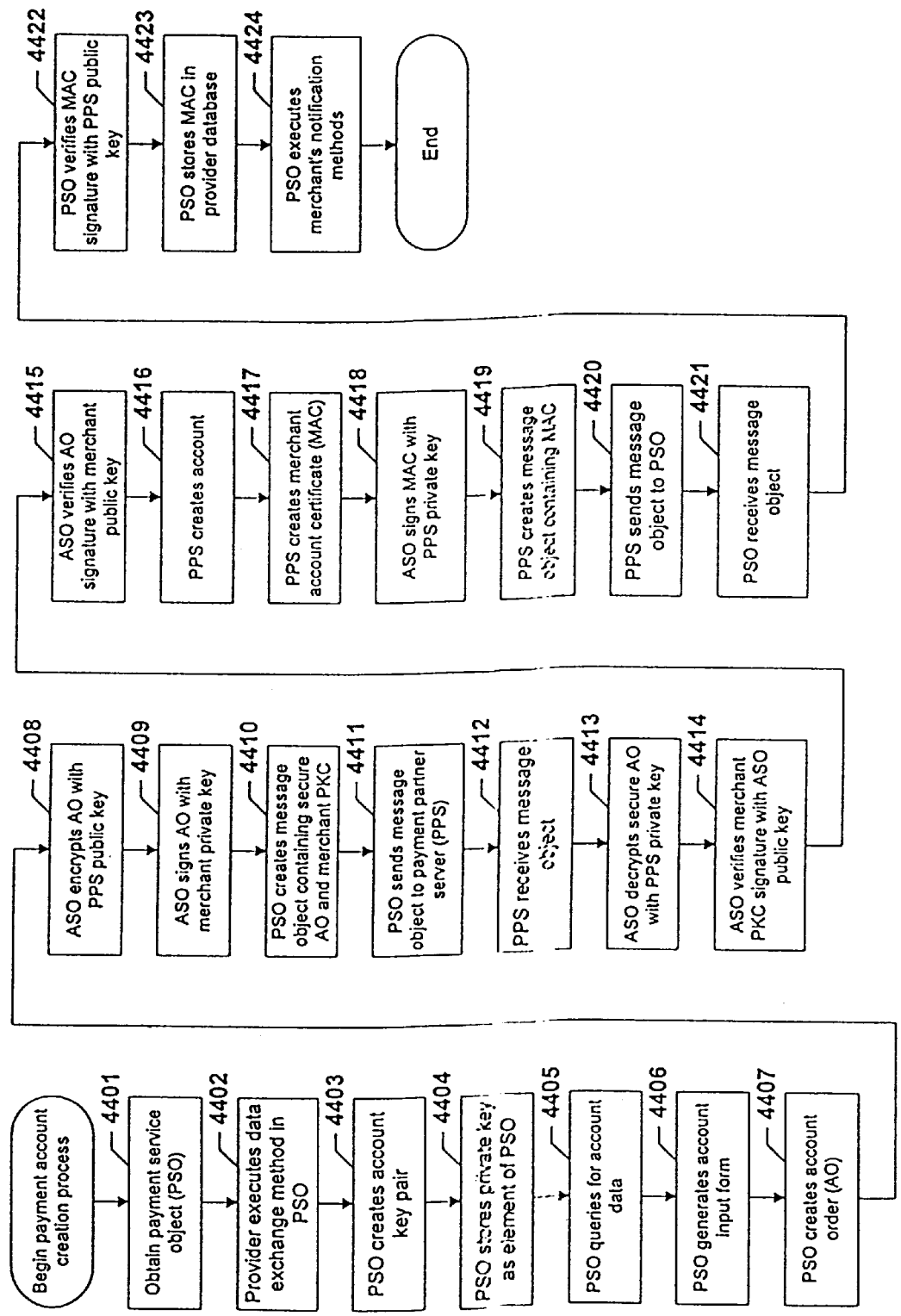
FIG. 37 is a block flow diagram for a process for creating payment accounts using service objects and partner servers.

Another example of data exchange rules is version monitoring. Version monitoring can be a more efficient updating technique when the message object traffic volume produced by a communications object 110 is more frequent than changes to the communications object 110 itself. With version monitoring, changes to a communications object 110 are neither explicitly pushed by the provider program 12 nor regularly pulled by the consumer program 22. Instead each message object passed between the programs 12, 22 contains the most recent version value of the parent communications object 110. A version monitoring rule 140 operating in either or both programs 12, 22 compares this version value in the message object with the current version of the communications object 110. Whenever a change is detected, the version monitoring rule 140 executes the update method 141 of the communications object 110 to update the current version in the consumer database 21. A specific example of version monitoring is shown in FIG. 37, explained in the payment service object section below. Version monitoring rules 141 can also be implemented at distribution servers 32 to add efficiency to the update polling process. This is discussed further in the data archiving control section, below.

Because data exchange control is one of the core functions of the present invention, it can be applied in many unique ways. An example is offline viewing of World Wide Web content. Existing software programs such as Freeloader from Individual Inc. and WebEx from Travelling Software Corporation allow Internet users to download to their local hard disk selected Web pages together with all or a selected subset of the helper files (graphic files, sound files, multimedia files, etc.) used on that page. These programs are called "offline browsers" because they allow the reader to view all or a majority of the web page's content while offline. This speeds up viewing times and reduces online access charges. These programs can also monitor the web page using a polling interval set by the user and download new versions when the page is updated.

This functionality can be significantly improved upon using a communications object system and data exchange controls. First, in existing offline browsers, a user must select specific web pages for monitoring and downloading, and there is no selective notification about changes to those pages. With a communications object system, a single communications object 110 can allow the consumer to select from a variety of notification elements (201, FIG. 4), each with its own notification control. Second, most existing offline browsers require the user to choose the "depth" of linked pages and helper files that will be downloaded for new or changed pages. This is strictly a guessing game for users, who have no clear idea what additional pages or supporting helper files they may be interested in. With a communications object system, the provider of the content can create a data exchange method 141 that presents the relevant downloading options to the consumer, and then intelligently sets a polling interval and selects the content the provider knows is related to the consumers expressed interest. Third, with offline browsers, downloaded web pages have no feedback component other than hyperlinks contained on these pages. With a communications object system, the downloaded data can include or be linked to communications objects 110 and their components. Thus feedback can happen both manually using data exchange elements 143 that return message objects 110, and automatically using reporting control. Reporting control is further discussed below.

A second application is personalization of web or hypermedia content, i.e., presenting a customized or filtered view of a web site to reduce the need for scanning or browsing by the consumer. One existing approach is to have consumers establish an ID, choose a password, and enter personal preference data into input forms provided by the web server. This data is then stored at the web server or another remote location and used to present customized views of the web site. An example is MyYahoo from Yahoo Inc. To see new content, the consumer must then manually visit the web site, enter the necessary ID and password, and browse their customized content, which is only available online. Whenever the consumer's preference data changes, the consumer must manually change it on all such web sites.

A communications object system overcomes all of these disadvantages. Using a communications object 110 employing data exchange methods 141 to control the relationship, the provider can first gather most or all of the consumer's preference data automatically. This can be controlled by rules 140 imposed by the consumer. The provider's communications object 110 itself can create the necessary ID for the consumer using the system ID (100, FIG. 3) of the consumer database 21 or a derivative thereof. The consumer is not required to give a password manually because the provider's communications object 110 can communications with the consumer program 22 to establish the consumer's identity (the consumer's own indentification and preference elements 143 stay safely within the consumers own computing environment). The provider's communications object is able to automatically download and selectively notify the consumer of new personalized content as described above. Finally, any changes to identification or preference elements 143 are made once locally and are transmitted automatically to all such web provider relationships.

Another approach to web content customization is commonly referred to as "cookies". A cookie is a data structure passed from a web server to a browser as part of the HTTP protocol. Cookies are produced by the web server and stored locally in a preferences file by the browser. When the user next connects to the web server with the browser, the web server can interrogate the browser for the cookie and use it to identify the user. The cookie can additionally store preference data about the user, whether entered manually by the user via HTML forms or collected automatically by the web server based on the user's browsing choices. Cookies are an attempt to surmount the manual data entry and maintenance requirements of the first approach above. Unfortunately, cookies are not directly viewable or editable by the consumer, nor do cookies give the consumer any control over the data collected or transmitted by the cookie. (Some browsers do give consumers the ability to turn off the cookie function altogether.)

A communications object system overcomes these limitations by replacing the cookie with a communications object 110 from the provider. In fact such an improvement can be made under the existing HTTP protocol if a communications object exchange is initiated manually by the consumer during a browsing session by clicking on a hyperlink representing a communications object 110 on a web page presented by the web server. The resulting download of a communications object 110 can trigger a data exchange receipt method 141 which automatically transmits back to the web server any necessary data elements 143 from the consumer database 21. This can be controlled by rules 140 imposed by the consumer. The web server can then prepare and return customized content for the consumer program 22 to display to the browser. Alternatively, the web server can return another communications object 110 to repeat the information interchange process. In contrast to cookies, the consumer can be completely in control of this process. The consumer can view the elements 143 of the relevant communications object; edit those elements 143 which involve consumer preferences; and apply rules 140 governing data access, data security, and data logging by the communications object. These improvements can bring rich, automated new forms of web content personalization with none of the disadvantages of cookies.

Another approach is to have personalized content delivered automatically to the consumer via a content delivery application. An example of this solution is PointCast from PointCast Inc. Here the personalization options are stored locally as part of the application, so the consumer effort required by the server-based solution above is avoided. However the disadvantage to this solution is that the preferences are part of a single application, or at best part of a limited number of modules within the application. Thus, it is not possible for a large number of providers at multiple locations to offer content personalization options. Notification options are determined at the application level, not the provider level or content level, so a user's choice of notification options is very limited. The personalization options are for the reception of information only. They do not extend to feedback or data exchange automation.

A communications object system overcomes these limitations by allowing providers and users to control communications relationships at the level of individual communications objects 110. Any number of providers and consumers can take part, each with access to the full range of data exchange control provided by communications objects 110 and data exchange methods 141. Thus a communications object system can be used to provide any number of of personalized content delivery services, rather than the limited number offered by one particular application. For example, data query control can be used to submit an HTTP request to any web server. This query request can include a unique identifier for the consumer such as the consumer's UID or a derivative thereof. This query can also include any new or updated data elements 143 in consumer database 21 that pertain to the provider and are not already present or current at the web server. The elements 143 or communications objects 110 returned by this query can offer completely customized news reports, weather reports, product brochures, advertisements, stock quotes, real estate listings, classified listings, Internet searches, health care advice, or any other current personalized information desired by the consumer. The specific data type is not a limiting feature of the invention. The consumer can also control notification options for this information down to the level of elements 143. The information can also be hyperlinked to data exchange elements 143 within the relevant communications object for direct, automated feedback by the consumer.

Communications Object Exchange Control

A special case of data exchange control is communications object exchange control. This are the functions by which communications objects 110 can control the retreival and transmittal of other communications objects 110. The retreival of one or more communications objects 110 by another communications object 110 is known as link control. Link control can be provided using link elements 143, link methods 141, and link rules 140. Collectively these are referred to as link control components. For ease of sharing between communications objects 110, link control components can be combined in a separate component object type (812, FIG. 17) called a link component object 110. In a communications object system, the function of link component objects 110 is directly analogous to the function of hypertext document retrieval protocols in hypertext systems. The best example is the usage of URLs (Uniform Resource Locators) in the World Wide Web. In their simplest form, link elements 143 can in fact be URLs, in which case no link method 141 is required if a web browser is used as the display interface. However the architecture of a communications object system permits much more powerful forms of link control than URLs.

The first advantage is the use of link methods 141. URLs are a standardized addressing protocol for the retrieval of hypertext files, binary files, and other digital resources used anywhere on the web. The URL protocol, when combined with the HTML encoding/display protocol and the HTTP communications protocol, forms the standards that make the web possible. All web programs must incorporate this protocol in order to operate. Introducing other addressing protocols would require an enormous reengineering and upgrading effort throughout the web. With a communications object system, the URL protocol is just one possible link method 141. Other link methods could employ other protocols, syntaxes, name resolution services, and features. Since those methods can be made available via any of the mechanisms described in the discussion of methods above, new link methods 141 can easily be propagated throughout a communications object system.

A second advantage is multiplicity. A URL can only represent a single resource on the web, although the browser receiving that resource can be programmed to retreive additional resources, such as the graphics associated with an HTML page, automatically. A link element 143, on the other hand, can designate any number of resources to be retreived in one action. It can supply these resources through its own attributes, through other associated elements, or through link methods 141.

A third advantage is processing flexibility. The processing of the resource received by a URL request is determined by the browser or other program executing the URL request. This processing can only be modified by changing the protocol or reprogramming the receiving software. With a communications object system, a link method 141 also controls the processing of the resource retrieved. The link method 141 can also call other methods for processing the resource retreived. If the resource is a communications object 110, its own receipt method or methods 141 can further determine the processing it receives.

A fourth advantage is the power of the address resolution protocol. As explained in *The World Wide Web Unleashed*, cited above, a URL is resolved by a web program in several steps. First the IP (Internet Protocol) address of the host computer is resolved via a lookup via a lookup to the user's local DNS (Domain Name Service) host. This host may in turn lookup the name on additional DNS hosts until the name is resolved successfully or an error message is produced. Next the web program requests the specific HTTP resource on the IP host specified by the URL. This can be the name of any document or MIME file supported by the web protocols, or it can be the name of a method available on the host together with the parameters to pass to that method. In the latter fastion, it is possible for the host to "resolve" a first URL into a second URL by returning the second URL in the form of an HTTP redirect command as the result of its processing. An HTTP redirect is a URL that is automatically processed by the web software that made the original URL request. In this manner a succession of redirects is possible until the final resource is resolved. The use of HTTP redirects to accomplish the persistent naming of web resources is generally discussed in Stuart L. Weibel and Erik Jul, "PURLs to Improve Access to Internet" in the 1995 November/December issue of the *Online Computing Library Center (OCLC) Newsletter*, page 19. Information on the PURL naming service is also available on the World Wide Web at http://purl.oclc.org/.

This approach requires that all address resolution logic be present in one of two places: in the DNS protocol, or in the address resolution methods available at remote hosts. With a communications object system, the address resolution logic first resides in the link method 141, which can in turn call any other communications object method 141 or partner server method 141 as described in the section on communications object methods above. This means that by using a UID, URL, name, or other attribute or combination of attributes supplied in a link element 143, the link method 141 can first search the local databases 11, 21 within the programs 12, 22 for the specified communications object or objects. If the communications object is not found locally, the link method 141 can then query one or more distribution servers 32 where the communications object is likely to be stored, such as LAN or WAN distribution servers. These distribution servers 32 may be represented by distribution service objects 1310, which will be further discussed below. If the target communications object 110 is not found on a distribution server 32, then the link method 141 can process the attributes of the link elements 143 to determine the next most efficient means of retreiving the communications object. For example, if a URL is available, the link method 141 could process this. If a URL is not present but a UID is available, the link method 141 could automatically use a UID resolution service. If a UID is not present but a name is available, the link method 141 can use a name resolution service. UID or name resolution services can operate similarly to the Domain Naming Service (DNS) for the Internet, or to the PURL naming service cited above. Additionally, the name resolution service could incorporate features under consideration by the World Wide Web Consortium (W3C) for Uniform Resource Identifiers (URIs) and Uniform Resource Name (URNs). These systems are discussed generally by the W3C staff at the W3C World Wide Web site at http://www.w3.org/pub/WWW/Addressing/.

A communications object system offers particular advantages for deploying a global name resolution service. With such a service, each communications object provider would have the opportunity to obtain a unique name corresponding to the UID for any communications object 110. This naming service would operate in the same manner as DNS, where Internet users can currently apply for a unique domain name corresponding to a unique Internet host IP address. Just as DNS allows any web program to resolve a domain name in a URL to a unique host IP address, a global communications object name service would allow any link method 141 to resolve a communications object name to its UID, URL, or any other unique addressable attributes. Because this name resolution service is completely abstracted from any underlying communications addressing protocol, it would allow the use of names that are exactly the same as the real-world name of the person, company, product, service, or other entity that the communications object represents. Also, because the name service results are processed by a link method 141, the link method 141 can determine the most efficient way to retreive the specified communications object 110. Such a name service can be made available to other communications objects 110 by use of a name service object 1310. The use of name service objects and name partner servers will be further discussed below.

When the provider program 12 and consumer program 22 are combined, a communications object system can also automate the exchange of communications objects 110 between two providers. This is a common need analogous to the exchange of business cards between individuals. Although only one business card need be exchanged to create a communications relationship, a two-way exchange provides the greatest number of communications options in both directions. This synchronization can be accomplished by the use of a special method 141 called an autoexchange method. An autoexchange method 141 operates as both a receipt method 141 and a data exchange method 141. The the data structures involved are illustrated in FIG. 3. When a provider program 12 first receives a communications object 110 with an autoexchange method 141, it first compares the database system ID of the communications object 110 with those of its recipient instances 120. If the database system ID is already present, the relationship is already established, and the autoexchange method is ignored. If not, the autoexchange method 141 is executed according to the receiving provider's preferences. Such preferences can be specified using the provider preferences form (316, FIG. 9) and stored in the global preferences instance 103. One preference may be to automatically generate and transmit a default communications object 110 instance back to the first provider. Another preference may be to generate a message element (211, FIG. 4) for use with the notification report (630, FIG. 13) to notify the receiving provider of the autoexchange request. The headline of the message element (211, FIG. 4) could be linked to the create new recipient form (311, FIG. 9). This form would serve as the input form for the autoexchange method 141. The received communications object 110 could supply the attributes necessary for the recipient instance 120 on this form. Therefore the receiving provider need only select the preferences for the communications object or objects 110 to be returned to the first provider. When this form is submitted, the autoexchange method will trigger the distribution of this communications object as described above.

The autoexchange of communications objects 110 can also be extended to web servers, data servers, and other electronic communications relationships. This is an extension of the process of using communications objects as "cookies" described in the preceeding section on data exchange control.

Forwarding and Chaining Control

A special case of communications object exchange is when a consumer wishes to send a provider's communications object in the consumer's database 21 to another consumer. This is the real-world equivalent of a businessperson needing to share the contact information for a customer with a business associate, or a mail order customer wanting to tell a friend how to subscribe to a mail order catalog. A communications object system can accomplish this using forwarding methods. A forwarding method 141 allows the user of one consumer program 22 to transmit another provider's communications object via the push technique to another consumer program 22.

Execution of a forwarding method typically displays the forward form (635, FIG. 13). The forward form allows the user to manually input the e-mail address, encoding data, and any other data necessary to forward the communications object 110 to the recipient. Alternatively, the user can select the recipient from a list of recipients (120, FIG. 3) already present in the consumer database 21. In this case, the recipient instance (120, FIG. 3) contains the necessary information to address, encode, and transmit the communications object. When this form is submitted, the forwarding method generates a message object 110 and transmits it to the recipient. The contents of this message object can vary with the type of forwarding desired. An anonymous forwarding or "redirect" operation would simply send the communications object 110 itself, exactly as if it had been pushed from the original provider. This communications object would be received at the recipient's consumer program 22 just like any other communications object 110. A signed forwarding operation would include a forwarding element 143. A forwarding element is a recipient instance 120 representing to the forwarding consumer, e.g. their system ID, name, e-mail address, and so on. This information could be displayed by the notification method at the receiving consumer program 22. A signed forwarding operation could also include a message element (211, FIG. 4). In this case the forwarding consumer could control the headline and message displayed by the notification method at the receiving consumer program 22. A signed forwarding operation could also include copies of the forwarding consumers element preference instances (147, FIG. 3). In this case the receiving consumer would be able to choose whether to adopt these preferences or start with the default preferences of the original communications object 110. Any of these forwarding operations could also be authenticated, which would add an element 143 with a digital signature verifying the identity of the forwarder. Authentication is described in the encoding control section above, and authentication service objects are further described below.

Alternatively, the forwarding operation also need not include the original communications object 110. The forwarding message object 110 can instead include a data exchange element supplying the attributes of the communications object 110 and a data exchange method for retreiving it. Such data exchange method can operate automatically as a receipt method or can present an input form for manual confirmation by the consumer. If the communications object 110 is distributed via the pull technique, the data exchange method can retreive it from the distribution server 32. If the communications object 110 is distributed via the push technique, the data exchange method can send a message object 110 to the originating provider program 12 requesting transmission of the communications object 110. Such message object can be processed automatically by the provider program 12 or require manual approval by the provider, depending on the rules 140 applied by the provider to communications object transmission requests.

Forwarding is a unique operation in that update control can be specified by the forwarding and/or receiving consumer. By default, the forwarded communications object will use the update control specified by the original provider. However, subject to forwarding control rules (discussed below), the forwarding consumer can also control updating. This is accomplished by including in the forwarding message object 110 a receipt method governing updating. This receipt method can designate that the communications object 110 will be updated via the push technique from the forwarding consumer program 22 or another consumer program 22, or updated via the pull technique from a distribution server 32 other than the original distribution server 32. This can be done regardless of how the communications object 110 is updated at the originating consumer program 22. The ability of a communications object to be updated from another consumer program 22 or distribution server 32 is referred to as chaining. Chaining is a powerful means of distributing communications object updates, because it spreads the load for distributing objects throughout the communications network 3. This makes the push method more feasible for large-scale distribution of communications objects. A particular example of chaining is the distribution of communications objects on a local area network (LAN). If one consumer program 22 or distribution server 32 on the LAN is receiving communications object updates from over a public data network such as the Internet, this program can automatically distribute updates to other consumers on the LAN. This can significantly lower traffic on the public data network and increase the efficiency of the communications object distribution process.

Chaining can be implemented via push or pull techniques. Chaining via the push technique is accomplished in the consumer program 22 by use of a consumer receipt method 141 that invokes a forwarding rule 140. A forwarding rule associates a communications object instance 110 with one or more recipients 120. When an update to a communications object 110 is received by the consumer program 22, the receipt method checks to see if it is subject to a forwarding rule. If so, a copy of the communications object 110 is transmitted to the recipient 120. Chaining offers the same update control options as described in the update control section above. This means it can be controlled by the forwarding consumer, or the forwarding consumer can pass control to the receiving consumer. When the push technique is used, message objects 110 can be used to control the creation and modification of recipient instances (120, FIG. 3) and acknowledgment instances (121, FIG. 3) in the forwarding consumer program 22 in the same way as they are in the provider program 12, described above in the update control section.

The original provider of a communications object 110 can also control forwarding and chaining pertaining to the object. This is necessary because communications objects may contain sensitive data or methods which the provider does not wish other consumers to obtain without the provider's control. As shown in FIG. 3, this can be accomplished through the use of forwarding control attributes of the communications object itself 110, forwarding control elements 143, and forwarding control rules 140. As with other rules, forwarding control rules may be implemented at the system level, or they may be implemented by a particular communications object. In case of conflicts, the more restrictive forwarding control rule takes precedence. Forwarding control rules can cover all aspects of forwarding and chaining operations. Specifically, they can prohibit any forwarding, permit forwarding but prohibit chaining, permit chaining only using specified update techniques, permit forwarding without the inclusion of element preference instances 147, and permit forwarding or chaining only with notification to the original provider. Notification to the original provider can be accomplished by having the forwarding method transmit a message object 110 back to the original provider whenever a forwarding event takes place. These messages objects can be used to track recipients in the same fashion as described above in the receipt and acknowledgment control section. Forwarding control rules can also control the "depth" of chaining. This can be accomplished by incrementing an integer counter attribute of a forwarding control element 143 each time a communications object 110 is advanced to another consumer program 22 in the chain. If the maximum chain depth is exceeded, further chaining is not allowed. A forwarding method can track the consumer programs 22 that comprise the chain by including the forwarding elements 143 for each forwarding consumer in the communications object 110. A receipt method 141 can optionally generate an input form whereby the receiving consumer can choose to receive updates from any consumer program 22 higher in the chain. A forwarding control method can also use an input form to have forwarding control rules applied manually by the forwarding consumer. Such an input form can include reminders about sensitive data and display rules about forwarding or chaining for the consumer to follow manually. Distribution control can allow the original provider to selectively apply forwarding rules to specific consumers. This is done by producing custom forwarding control attributes 110, elements 143, or rules 141 for each recipient. Distribution control procedures are described above in the distribution control section.

Transfer Control

A forwarding operation creates a copy of a communications object 110 at a second consumer program 22, leaving the first communications object 110 at the first consumer program 22 intact. This creates a new communications relationship between the new consumer and the original provider. By contrast, a transfer operation moves a communications object 100 from one consumer program 22 to another consumer program 22, and does not leave a copy of the communications object 110 at the first consumer program 22. Thus, a transfer operation does not create any new communications relationships, but instead transfers ownership of a communications relationship from one consumer to another. This is similar to the difference between copying or moving a computer file. The copy operation creates a second physical copy in a second location; the move operation keeps only one copy in the new location.

Methods 141 used to transfer communications objects between consumers are referred to as a transfer methods. Just as a move operation on a computer file is often implemented by the operating system as a copy operation followed by a delete operation on the original file, a communications object transfer method may be carried out as a forwarding method followed by a termination method. In addition, just as most computer operating systems first confirm the successful copy of the file to the new location before deleting the file in the old location, a communications object system should preferably allow consumers to confirm the successful transfer of the transferred communications object to the new consumer before deleting the communications object from the transferring consumer. This can be accomplished by using of message objects 110 as described above in the receipt and acknowledgment control section. Specifically, as illustrated by the data structures in FIG. 3, a transfer method 141 generates a message object 110 to the receiving consumer in the same manner as a forwarding method. The primary difference is that the message object includes a transfer receipt method 141 that adds a transfer rule 140 and an associated scheduled event 117 to the receiving consumer's consumer database 21. The transfer rule 140 is associated with the transferred communications object 110 such that when an update to the communications object 110 is received, the rule 140 is triggered. The rule 140 then executes the transfer method 141 which first deletes the associated scheduled event 117. The transfer method 141 then produces a message object 110 and transmits it back to the transferring consumer program 22. This message object invokes the originating transfer method 141 which then deletes the associated communications object 110. Optionally, the transfer method 141 could also produce a message element (211, FIG. 4) to provide notification to the transferring consumer that the transfer is complete. If an update to the communications object 110 in the receiving consumer program 22 is not received before the scheduled event 117 is triggered, it means an error condition likely exists. In this case the scheduled event 117 can produce a message element (211, FIG. 4) to provide notification to the receiving consumer. The scheduled event 117 can also execute the transfer method 141 which produces a message object 110 and transmits it back to the transferring consumer program 22. This message object invokes the originating transfer method 141. This transfer method can then either attempt a retransfer of the communications object 110, or produce a message element (211, FIG. 4) to provide notification to the transferring consumer, or both. The options for automatic error correction are more fully described in the receipt and acknowledgment control section above.

As with forwarding control, transfer control can also be exerted by the original provider using transfer rules 140 and transfer methods 141 in the communications object 110. Transfer rules and transfer methods are a particularly powerful means of data exchange control because they can accomplish automatic data exchange events involving the provider, the transferring consumer, and the receiving consumer all in one. An example is the transfer of ownership of a real world object, such as an automobile. A real-world rule applies to such a transfer, namely that the selling consumer must notify the automobile licensing authority, and the buying consumer must apply for a new title from the licensing authority. In this case the licensing authority would be the provider of a communications object 110 representing an automobile title. The selling consumer would have obtained the communications object 110 when he/she purchased the automobile. Using data exchange methods as explained above, the licensing authority would have used the communications object 110 to obtain the necessary elements 143 from the consumer required by law to register the vehicle. The licensing authority could then use updates to the communications object 110 to communicate with the consumer about the license, such as sending notifications about annual license renewals. (Payment for such license renewals can also be automated by data exchange methods in the communications object 110, as further described below.) When the time came to transfer the automobile title, the selling consumer would invoke the transfer method 141 in the communications object 110. The transfer method 141 would first generate an input form requesting the necessary data about the buying consumer and transaction details. (If a communications object 110 representing the buying consumer was also present, an association with such object 110 could be used to provide such data.) The transfer method 141 would then produce two message objects 110. The first message object would be transmitted to the licensing authority, containing the necessary elements 143 to automatically register the sale. The second message object would be transmitted to the buying consumer. This would include the forwarded communications object 110 representing the title. A transfer rule 140 would also determine which element preference instances 147 must be transferred with the communications object 110. For example, the Vehicle Identification Number (VIN) must be transferred with the title; a new VIN may not be specified by the buyer. The transfer method 141 would also add a rule 140 to the selling consumer's database 21 requiring that affirmative acknowledgment message objects needed to be received from both the licensing authority and the buying consumer before the communications object 110 representing the title will be deleted. The transfer method 141 could also create a scheduled event 117 that checked for the receipt of these message objects after a specified interval.

On the buying consumer's part, the message object 110 received with the transferred communications object would invoke a transfer method 141. This transfer method 141 would first add a transfer rule 140 to monitor updates to the communications object 110 to ensure that it was operating properly. The transfer method 141 could also produce a scheduled event 117 associated with the transfer rule 140. This scheduled event 117 would check for the receipt of a reply message object from the licensing authority. Next the transfer method 141 would produce an input form requesting confirmation of the purchase and application for the new title by the buying consumer. It is signficant to point out that the buying consumer should not need to enter a single piece of data other than authentication or confirmation information. All such data is already present either in the communications object 110 or the consumer database 21. The transfer method method 141 would then produce a message object 110 to be transmitted to the licensing authority with the title application. When the licensing authority returned a acknowledgment message object 110 to the buying consumer, it would trigger the transfer rule 140. The transfer rule 140 would execute the transfer method 141. The transfer method 141 would first delete the transfer rule 140 and its associated scheduled event 117. The transfer method 141 would then produce another acknowledgment message object 110 to return to the selling consumer. When this acknowledgment message object was received, the same sequence of events would take place. The transfer rule 140 would execute the transfer method 141, which would first delete the transfer rule 140 and its associated scheduled event 117. It would then delete its associated communications object 110 and then delete itself. This would complete the transfer, with all parties assured of verified data delivery to the others.

Transfer control can be applied to almost any situation where the real world ownership of an object or goods is transferred by an exchange of data between the transferee and the transferor, or between the transferee, transferor, and a third party such as a licensing authority, broker, agency, listing service, and so on. A universal example is classified ads. By using a communications object instance 110 to represent goods for sale via a classified advertising service, all or most of the communications transactions between the buyer, seller, and classified ad service can be automated. The use of a communications object system for classified advertising is further discussed in the description of data exchange service objects below.

Termination Control

A communications object system also offers an efficient new way for providers and consumers to control the termination of communications relationships. In most communications systems, it is easy for a provider to terminate a communications relationship. This is also true of a communications object system. As discussed in the distribution control section above, providers can control communications object distribution by both push and pull techniques. Referring to FIG. 3, if a provider controls the distribution of a communications object 110 via the push technique, the provider need only delete the association of a recipient 120 with a communications object 110. If the provider controls the distribution of a communications object 110 via the pull technique, the provider can change the behavior of the distribution control method 141 or distribution control rules 140 included in the communications object 110 or transmitted to a distribution server 32.

However, in many communications systems, it is often very difficult for a consumer to terminate a communications relationship. An example is the difficulty many consumers have in being removed from direct mailing lists or telephone solicitation lists. With the communications system of the present invention, consumers have complete and immediate control over any communications object relationship. From the consumer's perspective, this is accomplished simply by deleting the corresponding communications object 110 using the delete object form (623, FIG. 13). If a termination method 141 (FIG. 3) is present in the communications object 110, the delete object form calls this method; otherwise, it calls a default system termination method 141. A system termination method 141 would simply delete the communications object 110 from the consumer database 21. Optionally the system termination method 141 can replace the association between the communications object 110 and the database 100 with an association between the communications object 110 and a special "trash" folder 115. This permits the user to change his/her mind and recover the terminated communications object 110 at a later date by reversing this operation. A similar technique can also be used just to temporarily suspend or deactivate a communications object 110, which could later be reactivated by reversing the operation.

By including a termination method 141 in the communications object 110, a provider can also control the actions taken upon termination of a communications relationship. Generally, this does not mean the provider can prevent the consumer from terminating the relationship (i.e., deleting the communications object). Rather, the provider can control some of the actions taken when a communications relationship is terminated. An example is notification. If a communications object 110 is updated via the push technique, the provider must be notified in order to delete the association between the recipient instance 120 and the communications object 110. This notification can be processed manually by the provider, or automatically by the provider program 12. In either case the termination method 141 produces a message object 110 and transmits it back to the provider program 12. When it is received, a receipt method 141 of the message object can delete the association between the recipient 120 and the communications object 110. Alternatively, it can first produce a message element (211, FIG. 4) that notifies the provider of this action. When the headline of the message element (211, FIG. 4) is selected, the termination method 141 can produce an input form which may give the provider further options. For example, the provider may wish to replace the association between the recipient 120 and the communications object 110 with another one between the recipient 120 and a special folder 115 such as an "Former Customers" folder. This maintains the consumer information so that the provider can attempt to reestablish the relationship at some future date.

If a communications object 110 is updated via the pull technique, it is not necessary for a message object 110 to be returned to the provider program 12. Deletion of the communications object 110 at the consumer program 22 will terminate the relationship. However, the provider may still wish to employ a termination method 141 to receive overt notification of this event. Furthermore, regardless of the update technique used for the communications object 110, the provider may wish to employ a termination method 141 as a data exchange method. A common reason for doing this would be to ask the consumer why he/she is terminating the communications relationship. In this case the termination method 141 generates an input form where the consumer could indicate his/her reasons by selecting from checkboxes, radio buttons, or drop-down lists, entering text into a text box, or any other means of data input. When this input form is submitted, the termination method 141 generates a message object 110 and transmits it back to the provider program 12. At the provider program 12 a receipt method can automatically compile the consumer's input by storing it as elements 143, incrementing counters within elements 143, storing it in an external database, or any other data processing method. In this fashion the provider could periodically review aggregate statistics and/or direct textual feedback from consumers about why they terminated the communications relationships.

In certain cases, a termination method 141 can be combined with termination rules 140 in order to control the processing of a termination method 141. An example is the case of a communications object 110 representing an automobile title given above. Here a termination rule 140 could specify that, once initiated with an actual automobile title, a communications object 110 could not be terminated until a some form of acknowledgment message object 110 had been received from the licensing authority. This might be a transfer acknowledgment, or a destroyed vehicle acknowledgment, or any other form of acknowledgment for proper disposition of the title. Such a rule could be very valuable to the licensing authority in enforcing compliance with the laws covering automobile title registration.

A communications object system provides a unique mechanism for enforcing the termination of a communications relationship. In the course of a communications relationship, a provider may have obtained a consumer's e-mail address. If so, the provider would have the ability to send the consumer new communications objects even after the consumer has already terminated the communications relationship. Although the consumer is able to delete these new communications objects with a single action, a large number of providers taking this action still requires significant effort and irritation on the part of the consumer. This is essentially the electronic equivalent of "junk mail". To prevent this, the consumer database 21 can track all or selected terminated communications objects 110. Such a record is commonly referred to as a "kill file". This is accomplished using a termination rule 140. First, the termination rule 140 requires that any termination method 141 executed in the consumer program 22 replace the association between the communications object 110 and the database 100 with an association between the communications object 110 and a designated "kill folder" instance 115. The termination rule 140 may also make this an optional checkbox on any input form generated by the termination method 141. Second, the termination rule 140 is triggered by the receipt of any new communications object 110. The termination rule 140 executes a termination method 141 that compares the UID of the new communications object 110 with the UIDs of all communications objects 110 associated with the kill folder. If there is a match, the termination method 141 can take whatever action is specified by the consumer. Typically, this will be to delete the communications object 110 without notification to the consumer. Alternatively, the termination method 141 could compare only the provider ID (the system ID of the provider database 100) with the provider ID of all communications objects 110 associated with the kill folder. This would detect any communications object 110 produced by a particular provider, not just a specific communications object 110. Another option is for the termination method 141 to track the number of attempted transmissions for any particular communications object 110 by incrementing an integer value attribute of the association between the communications object 110 and the kill folder 115. When this integer value reached a threshold, the termination method executes a notification method notifying the consumer, who may then take appropriate action.

Event Tracking Control

Unlike many other communications systems, a communications object system is able to provide direct, seamless control over event tracking. As shown in FIG. 3, the principle data structures involved with event tracking control are the event class 116 and the logged event class 118. Any communications object system method may produce a logged event instance 118 for purposes of tracking communications actions.

There are many uses for communications event logs. One of the most common is error tracking. System rules 140 can monitor logged event instances 118 to provide alerts to frequent error conditions. Another common usage is providing communications relationship histories. For example, a provider can specify that a data exchange method 141 used for product ordering create a logged event instance 118 each time a product is ordered. The provider can have the same or a related data exchange method 141 make logical decisions within the consumer program 22 based on a query of the logged event instances 118 for previous product orders. Such data can also be reported in a message object 110 transmitted to the provider. This can decrease data processing requirements on the provider's end and increase the ability of data exchange methods 141 to make decisions relevant to the consumer's actual needs.

Event tracking control is particularly valuable for the generation of reports and statistics reports related to the use of particular communications objects, groups of communications objects, or the usage of a provider program 12 or consumer program 22 as a whole. Reporting control will be further discussed below.

Data Archiving Control

By functioning as active databases, the provider program 12 and consumer program 22 can control the archiving of the data they store. This is a very useful capability for many communications functions. First, many providers and consumers frequently wish to refer to past communications data. When stored in electronic format, this data is also computer searchable, which is another key advantage. Additionally, archiving data can be useful for error correction, as explained below. As shown in FIG. 3, data archive control is achieved primarily through the use of archive attributes, archive rules 140 and archive methods 141. The application of data archiving rules 140 in both the provider program 12 and consumer program 22 is explained above and in steps 735–737 of FIG. 15. These examples show how an archiving attribute and rule are used to control the number of previous versions of a communications object that will be archived. Archiving rules also allow control of archiving using time intervals, data size parameters, by the presence or absence of element preferences 147, and other parameters.

It is particularly useful for both providers and consumers to be able to control archiving at both a global database level and a communications object level. It can also be useful to control archiving at the element level. Global archive control is accomplished by storing communications object archive preferences as attributes of global preferences 103 and applying system archiving rules 140 and system archiving methods 141. Individual communications object archive control is achieved by storing archive preferences as attributes of the communications object preferences element is 127 and applying archive rules 140 and archive methods 141 associated with the communications object 110. Element archive control is accomplished by storing archive preferences as attributes of the element 143 and applying archive rules 140 and archive methods 141 associated with the element 143. These three levels can also be intermatched. For example, if a communications object included a archive preference attribute in its preference element 127, but had no archive method 141, then the global system archive method 141 uses the local archive preference attribute.

Archive control can also maintain instances of system objects. This is particularly valuable for maintaining the queue of logged event instances 118. For example, a rule 140 can specify that any logged event instances 117 older than X interval be deleted, preventing an unnecessary buildup of data.

In general, providers only need to control archiving in the provider database 11 and consumers only need to control archiving in the consumer database 21. However, archiving control can also be combined with distribution control and data exchange control as a way to ensure the versions of a communications object in a provider database 11 and a consumer database 21 stay synchronized. This is another aspect of version monitoring, discussed above. Version monitoring is desirable because it is possible for the consumer to miss versions of a communications object instance 110. For example, if the communications object instance 110 is distributed via the push technique, communications network errors may cause the transmission to fail. If the communications object instance 110 is distributed via the pull technique, communications network errors or distribution server errors may also prevent an update from occuring, although the polling retry process can frequently correct this. A more likely scenario is that either the consumer computer 2 or the consumer program 22 is not operated by the consumer during one complete version update cycle by the provider. For example, if the provider updates the communications object once per day, but the consumer does not operate the consumer program 22 for a week, the consumer may have missed six communications object versions. Finally, a communications object version could become corrupted in the consumer database 21.

If a uniform version value algorithm is used throughout the communications object system to increment the value of version attributes of communications object instances 110 or its components, recovery of lost or missing versions is straightforward. When the push technique of updating is used, recovery is accomplished using a version monitoring rule 140 and version monitoring method 141 at the consumer program 22. These can be implemented by the provider or the consumer. The version monitoring method 141 operates as a specialized data exchange method 141, explained above. The version monitoring rule 140 is associated with the communications object 110 so it is triggered each time an update is received. The version monitoring rule 140 executes the version monitoring method 141 which compares the version value of the update received with version value of the most recent communications object 110 stored in the consumer database 21. If the version value algorithm indicates that a version value is missing in the sequence, the version monitoring method 141 generates a message object 110 containing a data exchange element 143 specifying the missing version values and the system ID of the consumer. The version monitoring method 141 then transmits the message object back to the provider program 12. Here, the message object executes a version monitoring receipt method 141. The version monitoring method 141 then executes the communications object instance generation and transmission routine (FIG. 12) for the specified missing version communications object versions and the specified recipient 120. When these new instances are received by the consumer program 22, synchronization is restored.

When the pull technique of updating is used, the steps are slightly different. In this case the version monitoring method 141 at the consumer program 22 needs to be able to determine the network address of the missing communications object versions on a distribution server 32. This can be done in several ways. A first technique is to use a version naming algorithm to derive the address from a combination of the network address of the current communications object 110 and the missing version value. For example, if the network address of the current communications object instance 110 is http://company.com/commobject.cos and the missing version value is 3481, then the computed network address would be http://company.com/commobject3481.cos. This requires two minor modifications to the communications object instance generation and transmission routine (FIG. 12). First, a step is added in which the version naming algorithm is used to rename a copy of the previous communications object version instance 110 stored on the local or network file system. Alternatively, the routine could regenerate this previous instance if it were missing. Second, at the conclusion of the routine, both the current and renamed previous version of the communications object 110 are transferred to the distribution server 32. Now when a new communications object instance 110 is received at a consumer program 22, the version monitoring rule 140 executes a version monitoring method 141. The version monitoring method 141 first determines if any versions are missing. If so, it uses the version naming alrogrithm to determine the network addresses of each missing communications object version. It then executes a polling operation for each missing communications object from the distribution server 32, restoring synchronization.

A second technique is to store the date and network address of previous versions in the communications object 110 itself. This approach has the advantage of allowing any number of version naming algorithms to be used. This can be done with three minor modifications to the communications object instance generation and transmission routine (FIG. 12). The first modification provides that each time a new version of a communications object instance 110 is generated, the version naming algorithm is used to generate a unique network address name for this version. This unique network address name together with the version value and current date and time is stored as a archive composite type element 143 contained in the communications object 110. This element is itself maintained by an archive rule 140 such that only n instances, or only instances newer than X interval, are stored. The second modification is the same as described above, i.e., the communications object instance generation and transmission routine uses the unique network address name to rename a copy of the previous communications object version instance 35 stored on the local or network file system. Alternatively it could regenerate the previous instance of the communications object instance 35 it were missing. Finally, at the conclusion of the routine, both the current and renamed previous version of the communications object instances 35 are be transferred to the distribution server 32. Now when the new communications object instance 35 is received at a consumer program 22, the version monitoring rule 140 executes a version monitoring method 141 as above. The version monitoring method 141 compares the version value attributes of the archive elements 143 contained in the updated communications object instance 35 with those in the consumer database 21. If any are missing, the version monitoring method 141 uses the network address stored in the archive element 143 to execute a polling operation for each missing communications object from the distribution server 32, restoring synchronization.

A third approach is to use a version monitoring method 141 as an enhancement to the basic communications object update polling method described above. This requires a distribution server 32 capable of executing a data exchange method, however it tremendously simplifies version monitoring. In this case, a version monitoring method 141 operating at the consumer program 22 need only submit the UID and version value of the communications object 110 to be updated to the distribution server 32. The distribution server 32 then executes its own version monitoring method 141 to compare the version value submitted with the version values of the archived communications object instances 110 stored on the server. The distribution server 32 then returns to the consumer program 22 all missing versions. In a preferred embodiment this process can be automated using a distribution service object working in conjunction with a distribution partner server. Distribution service objects and partner servers will be discussed further below.

In all of these approaches the version monitoring method 141 could also accept parameters used to control the quantity or dates of previous versions received. In this manner the consumer could specify that he/she only wishes to receive n past updates or updates back to X date.

A communications object system can also automate a different form of archiving commonly required of any software program using a database. This is the storage of backup copies of the provider database 11 or consumer database 21 in order to prevent data loss from corruption, hardware failures, or other problems. In this case an archive method is functioning as a data exchange method 141. Backup control can be accomplished using backup preferences stored as attributes of global preferences 103, or as special backup elements 143, together with backup methods 141. Backups can be performed manually, or automated using scheduled events instances 117. Backup services can also be automated via a data exchange service object, which will be further discussed below.

Reporting and Statistics Control

Reports are typically one of the most valuable functions of any database system. In a communications object system, reports have particular value because they can be delivered automatically using the same system about which they are reporting. In this sense reporting control is simply a specialized case of data exchange control. Reporting control is especially useful to providers because it can give them valuable statistics and feedback about the communications needs and behaviors of their audience. Reporting control can also be used by the operators of a communications object system as the basis for billing and licensing, much as telephone usage reports are the basis for billing telephone system customers.

As shown in FIG. 3, reports can be compiled on any class or group of classes in a database 100. These include specific communications object components 140, 141, 142, 143, and 144; individual communications objects 110; folders 115 or other groups of communications objects 110; recipients 120; and events 116, scheduled events 117, and logged events 118. Reports which are locally useful to the provider or consumer can be defined and executed using report instances 105. These reports are activated using the other reports form (640, FIG. 13). Report instances 105 are in essence a special case of the overall reporting capabilities of the system. If a report does not exist as a report element 105, a report is generated using a reporting element 143 and a reporting method 141. Reporting methods 141 function as a special case of data exchange methods 141, discussed above. As with data exchange methods, reporting methods are governed by reporting rules 140. Reporting rules function as a special case of data access rules 140, discussed above.

A unique feature of a communications object system is its ability to produce reports about the metadata it uses to control communications. This can happen at both the communications object level and at the element level. A specific example is communications object subscription reports. Referring to the example in the notification section above and illustrated in FIG. 4, in a communications object 110 a provider may create topic elements 201 from which a consumer can choose their notification preferences for topics of interest. These preferences are stored in a element preferences instance 221. By including a reporting rule 140 and a reporting method 141 in the communications object 110, the provider can be updated on any changes to user's preference element instances 221. The reporting rule 140 operates as a data exchange rule monitoring the element preference instances 221. When an element preference instance 221 is created or edited, the reporting rule 140 triggers the reporting method 141 which generates a message object 110. This message object contains the changed attributes of the preference element instances 221. The reporting method 141 next transmits the message object back to the provider program 12. When it is received, the message object calls another reporting method 141 to process the reported data, for example by creating or updating associations to the recipient instance 120. The provider is now able to run reports 105 against this data in the provider database 11 to produce statistics about communications object usage. These can include the total subscribership to any communications object 110 as well as the total subscribership to any particular topic element 201. In this way the provider can see the precise communications needs of the provider's audience. This feedback loop also allows providers to further refine communications topics and messages to better meet the needs of this audience. Alternatively, the first reporting method 141 can transmit a message object 110 or another form of structured message to another reporting server. Reports can be generated in the same fashion at this reporting server. This process can also be automated using reporting service objects, which will be further discussed below.

In addition to control of metadata, reports can also monitor communications activity. Continuing the example above, a communications object 110 can include a reporting rule 140 which monitors access to any message element instance (211, FIG. 4) contained in the communications object 110. When the message element is read from the consumer database 21 for the first time (i.e. read by the consumer), the reporting rule 140 is triggered. This executes a method 141 that creates a logged event instance 118 recording the UID of the communications object 110 and message element (211, FIG. 4). The communications object 110 can also include a receipt method 141 that creates a scheduled event instance 117. This scheduled event instance will periodically execute a reporting method 141 which queries the consumer database 21 for new logged event instances 118 matching the UID of the communications object 110 and the appropriate event type. This reporting method 141 can then produce a message object reporting the results as explained above. Any data present in the queue of logged event instances 118 can be reported on in this fashion. As with other forms of data exchange, protection of both provider and consumer security is achievable through the use of reporting rules 140. Such rules can limit reporting access, for example, to logged event instances 118 which matched a particular communications object UID or a provider group UID.

For many reasons, including efficiency, security, and consumer anonymity, reporting control may operate at the system level. In this case, reports may be aggregated for providers by the system operators using a reporting server or system of servers using reporting service objects. System level reporting may also be used to enforce licensing rules and create billing and service reports. Reporting service objects and reporting partner servers will be further discussed below.

SERVICE OBJECTS AND PARTNER SERVERS

As described above, service objects are a special class of communications object whose primary function is to provide communications services to other communications objects. A service object is used to coordinate communications between providers and users. The server which provides and operates on a service object is referred to as the service object's "partner server". As with any communications object, the service object includes certain elements, metadata, and methods. Since different users can utilize a service object having certain features, actions between users or by different users can be coordinated by the service object. A provider may include features from a received service object in its own communications objects. A user may also use the methods in the service object to perform routine communication functions with others, including a third party partner server which created the service object. A service object can include any data, metadata, or methods which are useful to a significant number of providers or consumers. Various types of service objects and service providers are discussed below as examples. These examples relate to common functions to be performed in the communication system, and illustrate the operation of service objects. Of course, many other service objects having different features and functions could be created and used in connection with the communication system.

Any given service object (815, FIG. 17) may provide services to providers, consumers, or both. Service objects that offer services to both providers and consumers are called polymorphic. Polymorphic service objects are particularly useful in a communications object system because many of the same services are required by both partners to a communications relationship, each in a different form depending on whether the partner is the provider or consumer. Such services typically fall into three categories: editing or searching databases, encoding or decoding communications, and automating transactions with third parties. An example of the first category is a directory service object, which permits providers to place or update listings in a directory service and permits consumers to automate searches of the same directory service for a specific provider. An example of the second category is an authentication service object, which permits providers to digitally sign communications objects and permits consumers to automatically verify these digital signatures. An example of the third category is a payment service object, which permits a provider to automate receiving payments from a bank or credit company and permits consumers to automate sending payments to the bank or credit company. Alternatively, where it is more efficient, service objects can be split into provider/consumer "pairs", each containing a link component object 110 linking it to the other.

Service objects can wholly contain the services they offer, or they can represent the services of one or more servers available in the communications object system. In the latter case, the service object forms the basis for communicating the necessary information to the server so that the service can be provided. The latter case is also particularly useful because the service object can abstract or "encapsulate" the interface to the server or servers, removing the need for either the provider or consumer to deal with this complexity. A service object may represent services provided by a network of related servers, for example a replicated directory database such as the Internet's Domain Name Service (DNS). The service object can then also abstract and automate the process of choosing one of the network servers as a current partner server which will result in optimal performance and minimal network traffic. Referring to FIG. 3, this feature is accomplished by including a receipt method 141 in the service object (815, FIG. 17) having one or more algorithms for determining the optimal partner server. Such algorithms can access elements 143 in the provider database 11 or consumer database 21 for necessary input data such as the user's geographic location, time zone, network address, and so on, or they can prompt the user for such data via input forms. The service object's receipt method may also use a data exchange method 141 to query a reference server, perform network packet timing tests, or use other techniques to determine the optimal partner server. The same approach can also be used to determine one or more backup partner servers to use in case the primary partner server is unavailable. The particular algorithm or method for determing an optimal partner server or backup partner servers is not a limiting feature of the invention. Once determined, the receipt method can save this data in the provider database 11 or consumer database 21 as one or more element preference instances 147. These element preference instances can then be accessed by the service object's update method 141 or any of its other methods whenever it needs to call operations at the partner server.

Service objects are distinguished in a communications object system by their communications object type. Examples of service object types are shown as classes 830–844 in FIG. 17. Service object types serve the same function at the communications object level as element types serve at the element level. Service object typing allows the programs 12, 22 and other communications objects to make calls to service objects by type. When more than one service object of the proper type is present, the programs 12, 22 can prompt the provider or consumer to choose the desired service object, or the programs 12, 22 can make the choice programmatically. For example, a provider seeking to list a new communications object in one or more directories could execute a system method 141 that would call all directory service objects 832 present in the provider database 11. If more than one was present, the system method 141 would generate an input form prompting the provider to choose the desired directory service object or objects 832. When this form was submitted by the provider, the system method would proceed to call a DirectoryList method of each directory service object 832. The DirectoryList method for each directory service object would then carry out the balance of the operations needed to complete the directory listing.

The same fundamental data structures used in the provider database 11 and consumer database 21 can be used in a partner server database 1301. These data structures are shown in FIGS. 3 and 4. Service objects (815, FIG. 17) can be stored as communications objects 110. They can also be nested as composite and component objects (811, 812, FIG. 17) using association 110A as explained above in the description of composite and component objects. The use of composite and component service objects is ideally suited to many partner server functions, as further explained below. Alternatively, partner servers can use other data structures in order to optimize database performance, particularly for high-volume applications. Such additional data structures may include the use of special indexes or indexing algorithms, special caches or cache techniques, and other database performance enhancement technologies.

The same basic program operations used in the program 12, 22 can be used in a partner server 1302. In particular, a partner server 1302 may use the same HTML and HTTP interface system as described for the programs 12, 22. This allows the partner server 1302 to function as a web server for human interaction via a browser 50, while at the same time providing automated interaction with the programs 12, 22 via the HTTP protocol and any other mutual protocol such as SMTP/MIME.

As a subclass of standard communications objects 110, service objects can include all the control functions of communications objects described above. Certain control functions have special relevance for service objects. First, link control allows other communications objects to call the methods of a service object object regardless of where the service object may be located on a communications network 3. The special applications of link control will be discussed below. Second, update control allows a service object to stay current regardless of where it is located on a communications network 3. Version monitoring and update querying are particularly efficient techniques of update control for service objects and will be discussed below. Third, notification control allows a service object provider to notify providers or consumers using the service object about relevant changes to the service object or the communications services it makes available. Fourth, data exchange control allows the service object to automate data exchanges with the server or servers the service object may represent. Fifth, data archive control allows service objects to delete themselves if they age beyond a certain date or have not been used within a certain period. This allows databases 100 to avoid an accumulation of seldom-used service objects. Finally, event tracking control and reporting control allows service objects to create and report transaction records which can be processed to provide further services to the provider or consumer. These transaction records can also be used by the service object provider for billing or statistical purposes.

Figure 28:
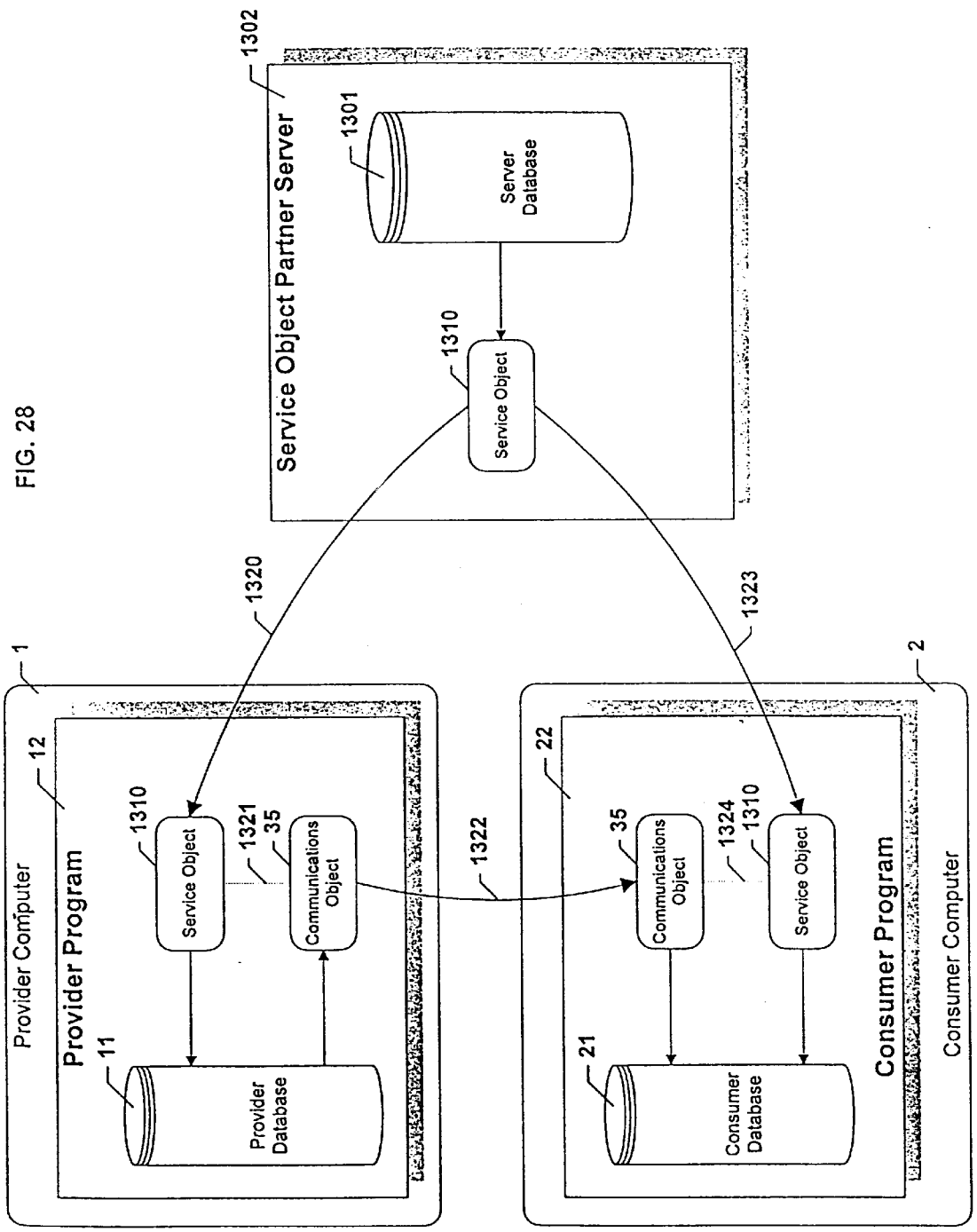
FIG. 28 illustrates operation of the communications system for service objects.

Link control and update control have special applications to polymorphic service objects. The application of link control to polymorphic service objects is illustrated in FIG. 28. A provider using the provider program 12 has need of the services offered by a service object partner server 1302. First the provider obtains a service object 1310 from the partner server 1302 (step 1320). This may be by browsing with a web browser 50, receiving the service object 1310 via e-mail, or any of the other techniques described above. Such partner server 1302 may be a distribution server 32 or any other type of service object partner server such as those described below. Once the provider has obtained the service object 1310, the provider may add a link component object 110 to any of the provider's communications objects 110 which need to access the elements or methods the service object 1310. This link component object 110 will then be included in any communications object instance 35 generated from the consumer database 21 (step 1321). In a preferred embodiment, the link component object 110 is supplied by the service object 1310 itself. In this case, referring to FIG. 3, the provider need only create a contained-by association between the link component object 110 in the service object (1310, FIG. 28) and the provider's communications object 110. This association can also be created automatically when any service object method 141 is executed that creates a service relationship between the service object and the communications object 110. The communications object 110 thus becomes a synthesized object (813, FIG. 17), wherein the link component object 110 is supplied by the service object 1310. Examples of such a service object relationship include listing a communications object 110 in a directory server, registering a communications object 110 with an authentication server, or authorizing a communications object 110 for use with a payment server. Further examples will be given below. Referring again to FIG. 28, the next step is that a communications object instance 35 is transferred to a consumer program 22 (step 1322). This may be via e-mail using the push technique, via a distribution server 32 using the pull technique, or any of the other techniques described above. Once the communications object instance 35 is transferred to the consumer program 22, a link method 141 of the link component object 110 may be manually executed by the consumer or automatically executed by another system method or communications object method. For example, the consumer may wish to look up related communications objects instances 35 in a directory server, or authenticate the communications object instance 35 before forwarding it, or make a payment transaction using the communications object instance 35. When the link method 141 is executed, it uses the attributes of the link element 143 to locate the designated service object 1310 as described in the communications object exchange control section above. For example, if the service object 1310 is not present locally in the consumer database 21, the link method uses other attributes of the link element to locate the service object 1310. For instance, if a URL was present, the link method would use it to obtain the service object 1310. If this fails, the link method would use the UID or name of the service object 1310 to obtain its URL or other current network address via a name server. The link method could also call the methods of a name service object, described below. Once the link method located the proper network address, it would download the service object 1310 from the partner server 1302 (step 1323). At this point the link is reestablished, and the communications object instance 35 can call the service methods of the service object 1310 to perform the services requested (step 1324).

Once a service object 1310 has been transferred to a consumer database 21 via this technique, version monitoring can be a very efficient update control technique. This is because the services of the service object 1310 may not be required again until they are called by another communications object instance 35. Version monitoring can be employed as follows. First, the service object 1310 can use a standard push or pull update control technique at the provider program 12 to maintain a current version. Such version changes will also maintain current version values in any link element 143 associated with the service object 1310. By including this link element 143 in any update of a communications object 110 which contains it, the link element 143 will be transferred to all recipient consumer programs 22 when the communications object 110 is updated. At this point, whenever a method call is made from a communications object instance 35 to the service object 1310, a version monitoring rule 140 contained in the service object 1310 can be triggered. The version monitoring rule 140 compares the service object version value stored in the link element of the calling communications object 110 with the version value of the service object 1310. If the version value in the link element 143 is greater than the version value of the service object 1310, the update method of the service object 1310 is executed and the service object 1310 is updated prior to completion of the original service object method call.

Figure 6B:
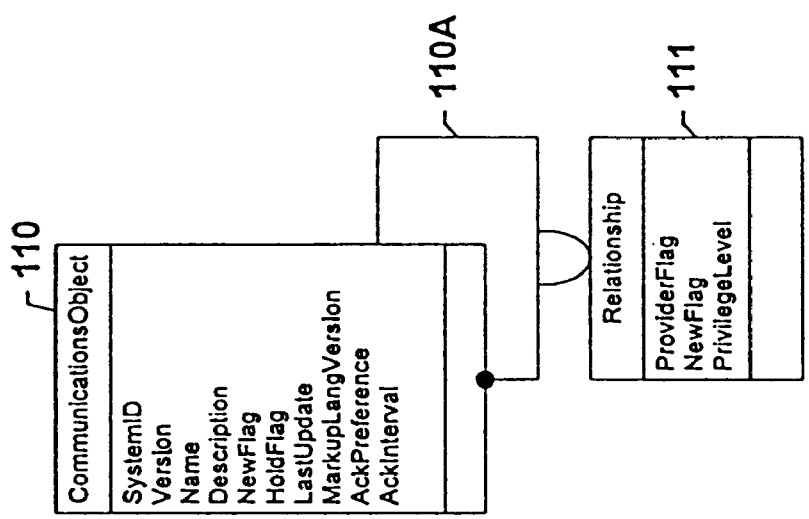
FIGS. 6A and 6B illustrate object oriented data structures for storing system ID data within the system ID database and for user objects.
Figure 6A:
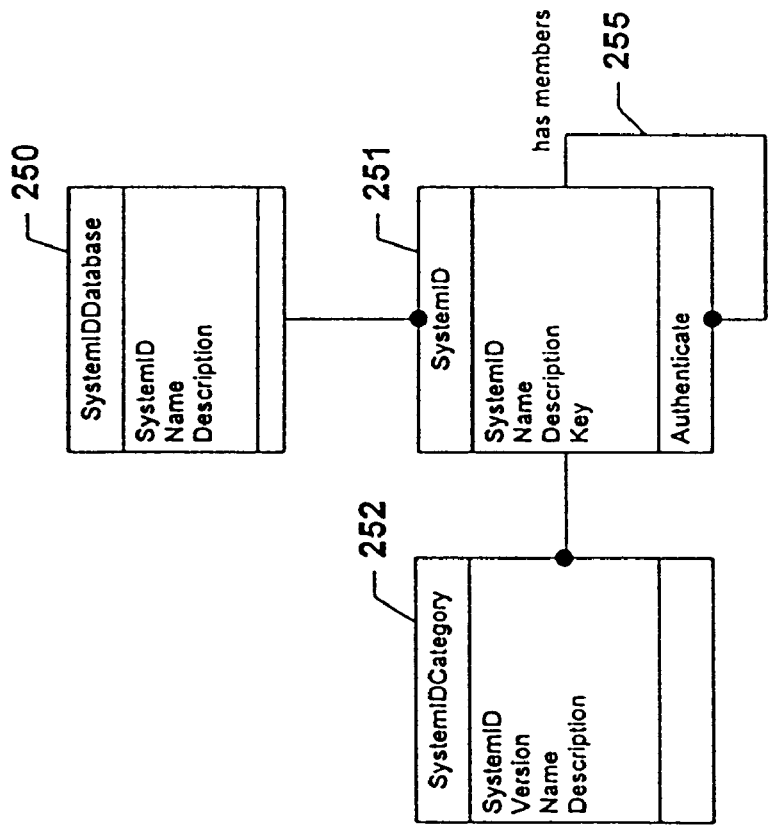

Update queries are also a highly efficient update control technique for service objects. This is especially true when a service object 1310 is used to represent access to a large database of communications objects 110, such as the categories of a yellow pages directory server or a classified advertising server. Basic update query control is explained in the update control section above. When used in conjunction with a service object 1310 and partner server 1302, update query control can be even more efficient by employing user objects 110 on the partner server 1302. The data structures for user objects are shown in FIG. 6B. User objects 110 represent either the providers or consumers interacting with the partner server 1302. The partner server 1302 maintains an index of the provider and consumer relationship associations 111 between all communications objects 110 and the user objects 110. Updates to communications objects 110 in the partner server database 1301 set the NewFlag attribute value of the relationship association to TRUE. This can be accomplished very efficiently on the partner server 1302 using an update association rule 140 and the update association routine (FIG. 10B). By employing such a user object index, an update query method 141 of a service object 1310 need only submit the provider UID in its update query. The partner server 1302 executes the query against the user object index to determine all communications objects 110 associated with that user UID where the NewFlag attribute value is TRUE. Those communications objects 110 are returned immediately as the query result set and the NewFlag attribute for each of these relationship associations 111 is reset to FALSE. User objects 110 can also act as recipients 120. In this case the partner server 1302 can transmit communications object updates via the push technique. The data and methods in user objects 110 on a partner server 1302 can be automatically kept current by a data exchange rule 140 in the service object 1310 as explained in the data exchange control section. The use of user objects 110 in a communications object system can be better understood in the discussion of multiuser operation in the advanced architecture sections below.

The following sections will explain how service objects and partner servers can be employed to provide registration, maintenance, name, directory, distribution, encoding, authentication, data exchange, payment, reporting, and feedback services for a communications object system. This set of service object applications is not exhaustive but merely illustrative of how service objects may be employed. Service objects and partner servers may also combine any number of services. Alternatively, any of the services described below may also be performed directly by one or more system methods 141, rules 140, and elements 143 instead of service objects 1310. Service objects are a preferred embodiment because they allow such services to be encapsulated, distributed, optimized, and updated throughout a communications network 3.

Registration Service Objects and Partner Servers

A registration service object type (830, FIG. 17) can be used to obtain the initial database system ID (100, FIG. 3) used to uniquely identify a provider database 11 or consumer database 21. This process is explained in the system ID and naming services section above. As illustrated in FIG. 5, if a communications object system only requires one system ID server 42 (also called a registration partner server), registration services are easily be accomplished using a system method 141. However, this same process can also be used to obtain other system IDs which can function as group IDs, registration keys, licensing keys, and so on. In this case multiple registration partner servers may be desirable. For example, in addition to a global Internet-wide registration server, a company may wish to have its own registration partner server to manage communications object system group IDs and authorization keys for its employees. By creating its own registration service object, the company can quickly and easily add these services to the programs 12, 22.

Registration partner servers can do more than just automate and track system ID and group ID assignments. By including data exchange methods for other registration data, such as names, addresses, contact information, and so on, registration partner servers can obtain and store all the information necessary to fully register communications object system users. By using data exchange methods to return registration keys and licensing keys to the databases 11, 21 which enable the operation of all or selected subsets of features, registration partner servers also function as licensing servers. For this reason registration servers can be efficiently coupled with naming, authentication, and reporting service objects and partner servers.

Maintenance Service Objects and Partner Servers

A maintenance service object type (831, FIG. 17) can be used to acquire, maintain, and register communications object system components from a system maintenance partner server 1302. This can cover any communications object system component that employs versioning. Referring to FIG. 3, this includes rules 140, methods 141, pages 142, elements 143, and type definitions 144.

If all the components of the programs 12, 22 are stored as one of these classes, the use of maintenance service objects 1310 to monitor and update these components enables the programs in a communications object system to be self-updating. Existing components can be updated, new components can be downloaded as required, and outdated components can be deleted.

Maintenance service objects 1310 also allows all the providers in a communications object system to contribute and obtain new system components. This is accomplished by including a data exchange method 141 in the maintenance service object 1310 that automates the process of uploading and registering the new components in a database 1301 at a maintenance partner server 1302. Another data query method 141 in the same maintenance service object 1310 allows other providers to manually or automatically search the maintenance partner server database 1301. This process is fully described in the data exchange service object section below. The sharing of communications object components across a communications object system is particularly valuable in relation to rules 140, methods 141, and type definitions 144. New rules and methods allow providers to extend the functionality of the communications object system easily. For example, new system objects can encapsulate the services of particular communications protocols. These include network protocols, such as TCP/IP, IPX/SPX, and NetBEUI; communications protocols, such as XMODEM, YMODEM, HTTP, NNTP, and SMTP; APIs such as TAPI, MAPI, and Visual Basic; and even device driver protocols such as those required for printers, modems, CD-ROM drives, monitors, and so on. The particular protocols used are not a limiting feature of the invention. Since newer, more powerful, more efficient, and more secure protocols are always evolving, encapsulating these in component communications objects that can be easily distributed throughout a communications object system is a major advantage.

New type definitions allow groups of providers to create shared data structures that meet particular needs, such as specialized electronic data interchange (EDI) standards for vertical markets. Shared type definition repositories have particular applications that enable new types of intelligent information interchange. An example discussed above in the data exchange control section is the customization of web server content for web browser users. This interchange can be substantially enhanced through the establishment on a maintenance partner server 1302 or a distributed network of partner servers 1302 of a server database 1301 of shared type definition instances 144. These type definition instances could cover families of common psychographic variables such as political affiliations, color preferences, food and beverage preferences, entertainment preferences, and so on. Using a maintenance service object 1310, providers can search for and download these type definitions 144 to be incorporated into the design of the provider's web content customization system as well as the provider's own communications objects 110. When a consumer browses the provider's web server, the web server can return a communications object 110 that queries the consumer database 21 for the values of elements 143 corresponding to specified psychgraphic type definitions 144. If these type definitions are not present, the communications object 110 will include a link component object 110 to obtain the necessary type definitions 144 from the maintenance server 1302. The communications object 110 then generates an input form requesting the values for elements 143 corresponding to each type definition. Once these element preference instances 147 are saved in the consumer database 21, the consumer need not enter this pschographic preference data again. It will be available automatically to any other provider who needs it, subject to data access rules 140 applied by the consumer. In this way the consumer database 21 can steadily grow "smarter" about the consumer's interests and tastes, and providers have a highly direct, efficient, and automated mechanism with which to obtain such psychographic data from the consumer.

This process can be generalized to any set of data types that need to be shared amongst a group of providers. This includes many vertical market applications, such as industrial part types, chemical types, academic research types, business application types, software programming object types, and so on. The specific data type service is not a limiting feature of the invention.

Name Service Objects and Partner Servers

A name service object type (832, FIG. 17) can be used to register and search communications object names or any other kind of names on a name partner server. A name service object is an excellent example of a polymorphic service object because the same service object used by a provider or a provider program 12 to list or edit a communications object name with a name partner server can be used by a consumer or a consumer program 22 to locate communications objects using the name partner server.

The use of naming and name resolution services in a communications object system are fully discussed in the communications object exchange control section above. A name partner server 1302 can implement name services using many database structures. In a preferred embodiment, name services for individuals are provided using communications objects 110 of the user object type (816, FIG. 17). Referring to FIG. 3, a basic "white pages" name service can be implemented using an element 143 of a composite type UniqueName for each user object 110 listed. A user object 110 could have more than one unique name by allowing more than UniqueName element 143 to be associated with the user object 110. Alternate names may also be desirable, for example to allow individuals using nicknames to be located using the nickname. Alternative names are also advantageous in a commercial tradename name service because it allows companies who use the same trademark name across different industries to all reference that name. Alternate names can be created using an element 143 of the communications object 110 with the composite type AlternateName. By including methods 141 for listing and editing a name as well as searching for a unique name or an alternate names, a name service object 110 can automate name server access for both providers and consumers.

Name service objects 1310 and name partner servers 1302 allow multiple naming systems to be employed in a communications object system, either globally or across any subset of the system. A global communications object system name is particularly valuable to individuals because it allows them to obtain a lifetime communications address that never needs to change regardless of any changes to specific communications network addresses the individual may hold. This address may also be completely identical to the individual's real name if such a name is unique in the naming system. The same advantage may be realized by organizations using tradenames for their company, product, or service.

Other advantages of communications object system naming services are enumerated in the communications object exchange control section above. Besides individual names and commercial trademark names, communications object system naming services can be applied to many specialized or vertical market naming needs such as industrial part names; research topic names; corporate department, group, or project names; software programming object names; and so on. The specific naming service used is not a limiting feature of the invention.

Directory Service Objects and Partner Servers

A directory service object type (833, FIG. 17) and a directory partner server 1302 provide an extension to name services whereby communications objects can be listed and located by additional attributes. Any attribute that enables consumers to locate communications objects of interest may be employed. For example, consumers may wish to locate user objects 110 representing other consumers. In this case, desirable attributes may include geographic location, age, occupation, family lineage, educational affiliation, political affiliation, religious affiliation, and so on. These attributes may all be represented by different elements 143 in a directory partner server 1302 in the same manner as described above for psychographic attributes on a type definition maintenance server. When a provider of a communications object 110 uses a directory service object 1310 to create a directory listing on the directory partner server 1302, a data exchange method 141 in the service object uses the system ID of the type definition 144 for each required or desired attribute to automatically identify and copy these attributes from elements 143 in the provider database 11 to elements 143 in the directory partner server database 1301.

Another commonly desired set of directory attributes is a hierarchical categorization system such as that employed by many "yellow pages" directories. In a preferred embodiment, such a categorization system is implemented on a directory partner server 1302 using composite communications objects (811, FIG. 17) and component communications objects (812, FIG. 17). Such a data structure is illustrated in FIG. 29A. The directory service object 1401 functions as the highest-level composite communications object. Each of its first-level component objects represents the top-level categories 1410, 1411, 1413. These component objects are called category objects. Component objects of each top-level category object represent the second-level categories 1421, 1422, 1423, 1424. Such a category object structure can be nested as many layers deep as is necessary. Alternatively, a separate directory service object 1401 could represent a particular branch within the category structure.

Figure 30:
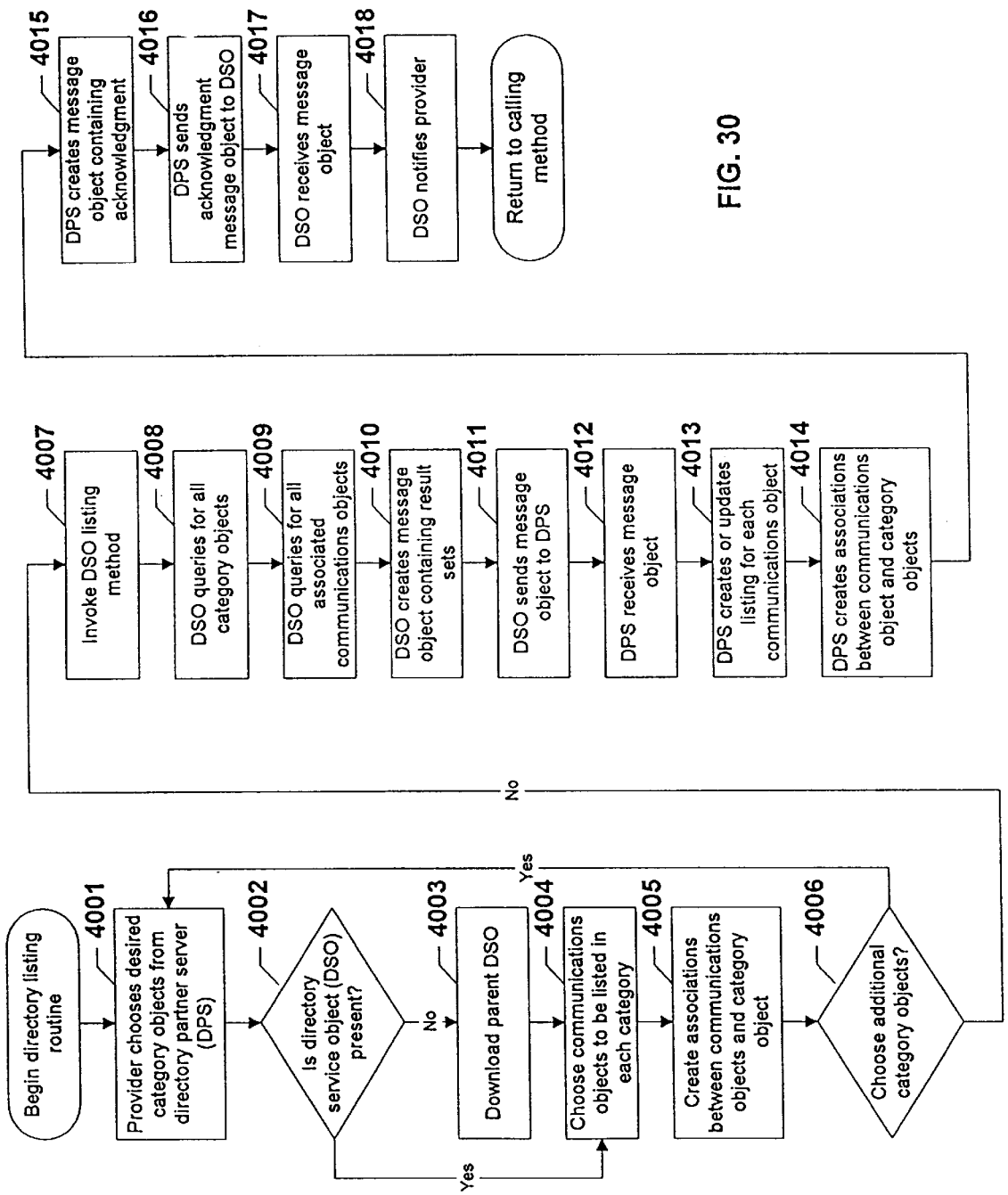
FIG. 30 is a block flow diagram for a process for creating directory listings using service objects and partner servers.

The use of a communications object-based directory service offers several advantages over conventional directory systems. First, it can simplify and automate the listing process for providers. The steps in this process are illustrated in FIG. 30. In this example a directory system is implemented on a directory partner server 1302 as a web server using HTML pages to display the category hierarchy. Each category description includes a hyperlink to its category object 110. The process begins with the provider using his/her browser 50 to navigate the directory partner server 1302. The provider chooses the hyperlink representing each category object 110 in which the provider is interested in listing a communications object 110 (step 4001). The receipt method for the category object 110 first checks to see if its parent directory service object 1310 is present in the provider database 11 (step 4002). If not, the category object uses its link component object 110 to download the directory service object 1310 from the directory partner server 1302 (step 4003). Next the receipt method 141 for each category object 110 generates an input form prompting the provider for the communications object or objects 110 to be listed in this category (step 4004). When this input form is submitted, the receipt method creates an association between the communications object or objects 110 and the category object 110 (step 4005). Finally, the receipt method 141 asks the provider if he/she would like to choose additional category objects (step 4006). If so, the above steps are repeated. Once the provider has chosen all desired category objects 110, the provider executes a data exchange method 141 in the directory service object 1310 that will carry out the listing procedure (step 4007). This data exchange method 141 queries the provider database 11 for all category objects 110 belonging to the directory service object 1310 (step 4008). The data exchange method 141 then queries for all of the provider's communications objects 110 associated with these category objects 110 (step 4009). The data exchange method 141 creates a message object 110 containing this query result set together with the necessary attributes or elements of the listed communications object or objects 110 (step 4010). The data exchange method 141 transmits this message object 110 to the directory partner server 1302 (step 4011). When received by the directory partner server 1302, the message object 110 triggers a corresponding data exchange method 141 (step 4012). This data exchange method 141 creates or modifies the listing for each communications object or objects 110 in the directory partner server database 1301 (step 4013). This listing consists of a new component object 110 containing the desired listing elements 143. The data exchange method 141 then creates the appropriate associations with each composite category object 110 (step 4014). When this process is completed, the data exchange method 141 creates a message object 110 containing an appropriate acknowledgment message (step 4015). The data exchange method 141 transmits this message object 110 back to the directory service object 1310 at the provider program 12 (step 4016). When received by the directory service object 1310, the message object 110 executes its receipt method 141 (step 4017). The receipt method 141 executes the provider's desired notification method 141 to complete the listing (step 4018). This directory listing process can also include authentication services, payment, or reporting services as further described below.

A second advantage of a communications object-based directory service is that it automates the directory updating process in both directions. The steps in the process of updating a provider's listings on a directory partner server 1302 are shown in FIG. 31A. This process employs a data exchange rule 140 in the directory service object 1310, explained in the data exchange control section above. The data exchange rule 140 monitors for changes in attributes or elements 143 of a communications object 110 associated with a category object 110 or a directory service object 1310 (step 4031). When such changes occur, the data exchange rule triggers a data exchange method 141 in the directory service object 1310 (step 4032). The data exchange method 141 creates a message object 110 containing those changes (step 4033). The data exchange method 141 transmits the message object 110 to the directory partner server 1302 (step 4034). When received by the directory partner server 1302, the message object 110 triggers a corresponding data exchange method 141 (step 4035). This data exchange method 141 updates the necessary attributes and associations in the directory partner server database 1301 (step 4036). If desired, data exchange method 141 also returns an acknowledgment message object 110 to the directory service object 1310 at the provider program 12 to confirm the update has been made.

Figure 31B:
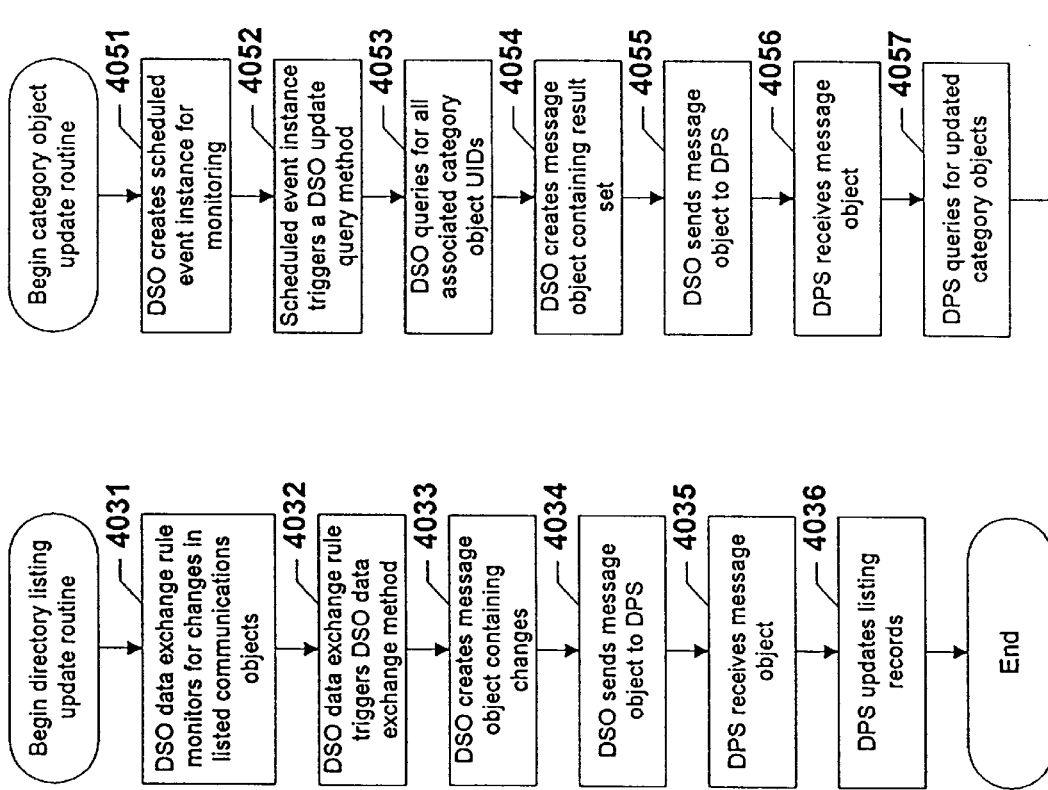
FIGS. 31A and 31B are block flow diagrams of processes for updating directory listings and monitoring category objects using service objects and partner servers.
Figure 31A:
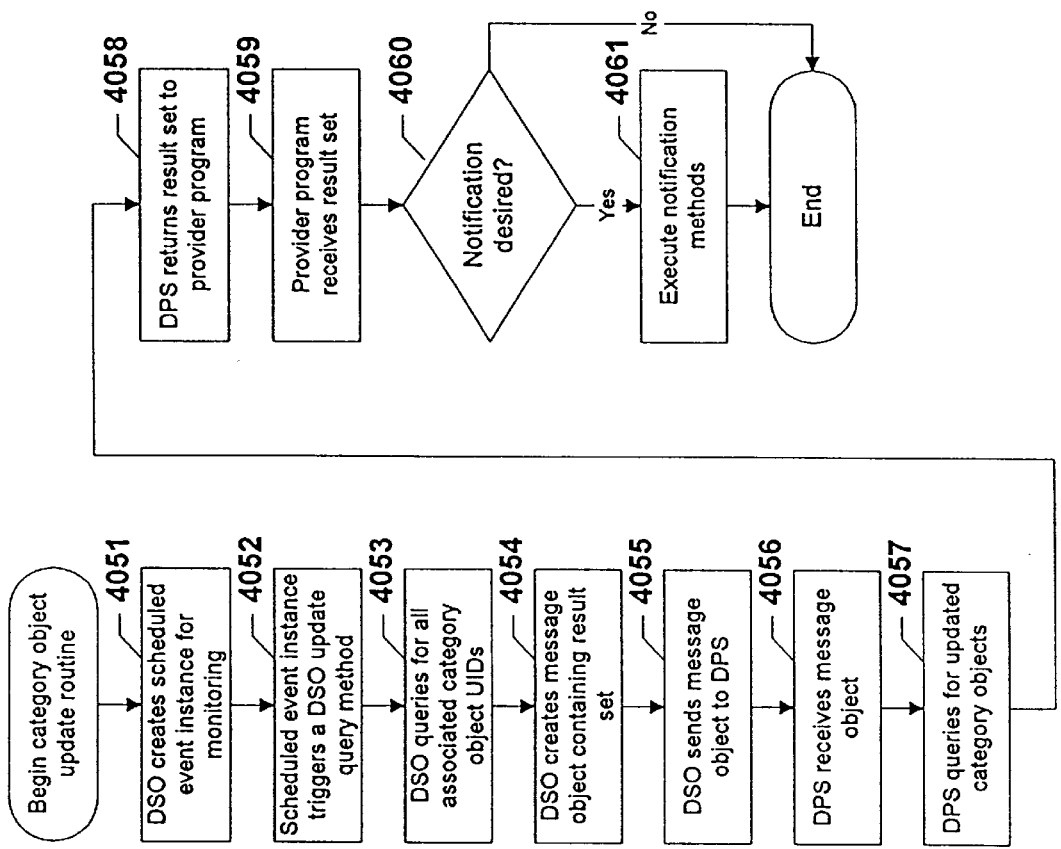

The steps in the process of notifying a provider about changes to one or more category objects on the directory partner server 1302 are shown in FIG. 31B. Such changes occur when a category definition is changed, the directory provider needs to bifurcate a directory category into two or more categories, when a category is replaced by another category or categories, and so on. This process uses the update query technique described in the update control section above to monitor the directory partner server 1302 for changes. When the first directory listing is made by the directory service object 1310, the data exchange method 141 creates a scheduled event instance 117 in the provider database 11 (step 4051). When activated, the scheduled event instance 117 triggers a update query method 141 in the directory service object 1310 (step 4052). The update query method 141 first queries the provider database 11 for the UID and version value of all category objects 110 associated with the directory service object 1310 (step 4053). Alternatively, an index of these values could be maintained as an element in the directory service object 1310. The update query method 141 then creates a message object 110 containing the result set (step 4054). The update query method 141 transmits this message object 110 to the directory partner server 1302 (step 4055). When received by the directory partner server 1302, the message object 110 triggers a corresponding update query method 141 (step 4056). This update query method 141 uses the message object result set to query the directory partner server database 1301 for any changes to the corresponding category objects 110 (step 4057). The update query method 141 then returns the result set to the provider program 12 (step 4058). If there are no changes, the result set is a message object 110. If there have been changes, the result set is the changed category objects 110. The provider program 12 receives the result set and executes any receipt methods pertaining to the result set objects (step 4059). This includes the notification test (step 4060). If the provider desires notification of changes to directory category objects upon which the provider may wish to take action, the provider program 12 executes the desired notification methods (step 4061).

Alternatively, for high-volume applications, the directory partner server 1302 can maintain an index of the provider UIDs associated with each category object 110. These UIDs can be stored in user objects 110. In this case step 4053 can be eliminated, and the update query in step 4054 can consist of just the provider UID. The provider user objects 110 can also function as recipients 120 on the directory partner server 1302. In this case, updated category objects can be distributed using the push technique. This process is explained in the service object introduction section above.

A third advantage of a communications object-based directory service is that consumers may use a directory service object 1310 to monitor a directory partner server 1302 for new listings in any category or changes to the category structure. Because they are symmetric and can be performed by a polymorphic directory service object 1310, these processes are largely identical to those described above for a provider. In addition, data exchange methods in a directory service object 1310 can allow consumers to create custom queries that can be run at scheduled intervals against the directory server 1302. Thus a consumer could, for example, be notified if any new listing containing the word "Mustang" was added to a directory server 1302 even if there was no "Mustang" category object 110. This is further discussed in the section on data exchange service objects below.

The value of a communications object-based directory services can be further increased using link control. Any provider who associates (lists) a communications object 110 with one or more category objects 110 on a directory partner server 1302 can include a link component object 110 from those category objects 110 in the communications object 110. This is identical to the process of including a link component object 110 from a service object 1310 as described above. Category object links provide a powerful new way for consumers to locate communications objects in which they are interested. The consumer can just activate the link method 141 to immediately download the desired category object 110 and access directory listings for other communications objects 110 in the same category. Using the directory service object 1310 linked to the category object 110, the consumer can also immediately begin monitoring the directory partner server 1302 for new listings in that category.

Directory partner servers are well-suited to be combined with distribution partner servers and data exchange partner servers because it is easy to create and maintain associations in a single database 100 between directory category objects 110, the listed communications objects 110, elements 143 associated with the communications objects 110, and user objects 110.

Since a communications object can represent anything which a provider wishes to communicate, the advantages of a communications object system directory service can be transfered to any real-world function where directory services are useful. Besides conventional white pages and yellow pages, this includes catalogs, professional and academic directories, computer network directories, personal address books, classified advertising services, and so on. The specific directory service is not a limiting feature of the invention.

Distribution Service Objects and Partner Servers

A distribution service object type (834, FIG. 17) can automate the transmission, storage, and updating of communications objects on a distribution partner server 1302. While any server on a communications network 3 capable of file storage and retrieval can operate as a distribution server 32, a distribution partner server 1302 which includes the full capabilities of a database 100 offers many additional services to communications object providers and consumers.

The first of these advantages is the automated transmission of communications objects and communications object updates from the provider program 12 to the distribution partner server 1302. This is accomplished through the use of a data exchange method 141 in the distribution service object 1310. Referring to FIG. 12, this data exchange method is called at step 550 of the object instance generation and transmission routine. The distribution service object 1310 then carries out step 551 before returning to the calling routine. If multiple communications objects or object updates are to be transmitted to the same distribution server 32, the distribution service object 1310 aggregates these and performs fewer, more efficient transmissions.

The inverse of this process becomes a key advantage for consumers because a single distribution service object 1310 can use the update query technique to monitor a distribution partner server 1302 for updates to all communications objects 110 associated with the distribution service object 1310. The greater the number of communications objects 110 associated with a single distribution service object 1310, the more efficient the update process becomes. Only a single update query needs to be made to the distribution partner server 1302. This update query technique is further described in the update control and directory service object sections above. This technique is particularly efficient when used in conjunction with a user object 110 index at the distribution partner server 1302. User object indexes are explained in the service object introduction section above.

A second advantage to providers is that the distribution partner server 1302 can offload the work of transmitting communications object updates via the push technique. For large numbers of recipients 120, e-mail generation and transmission can require large amounts of computer processor time and network bandwidth. Offloading this to a distribution partner server 1302 can free the operation of the provider program 12 on a smaller personal computer. By maintaining a user object index at a distribution partner server 1302, the distribution partner server 1302 can also receive and process all acknowledgment message objects used to maintain the user object index for any communications object 110.

A third advantage to providers is that a distribution service object 1310 and distribution partner server 1302 can provide distribution control capabilities, i.e. the ability to deliver customized communications objects 110 to consumers. This process is fully explained in the distribution control section above. In particular, a distribution service object 1310 can use a data exchange method 141 to transmit distribution control methods 141 from a provider program 12 to the distribution partner server 1302. At a distribution partner server 1302, these methods 141 are called by a distribution service object 1310 or a communications object 110.

A fourth advantage to providers is that a distribution service object 1310 and distribution partner server 1302 can automate archive control, i.e. the ability to retreive previous updates to a communications object 110. This process is fully described in the data archive control section above. In particular, a distribution service object 1310 can use a version monitoring method 141 to call a version monitoring method 141 at the distribution partner server 1302 to retrieve missing updates for all communications objects 110 associated with the distribution service object 1310.

Distribution services are integral to the performance of almost any type of partner server 1302, so it can be desirable to combine them with any of the service object types discussed herein.

Encoding Service Objects and Partner Servers

An encoding service object type (834, FIG. 17) can automate the encoding and decoding of any type of communications object or communications transmission resulting from a communications object. Encoding service objects are perhaps the purest example of a polymorphic service object because in many forms of communications encoding, the same algorithm or process used to perform the encoding is used in reverse to perform the decoding. Because communications partners by nature need to be able to efficiently encode and decode each other's transmissions, shared access to the same encoding service object 1310 is an ideal mechanism for accomplishing this objective. Of particular attractiveness to providers is the ability described above for an encoding service object 1310 to be retreived from a distribution server 32 or encoding partner server 1302 automatically using the encoding service object's link component object 110. This gives providers a mechanism to automatically share any desired encoding/decoding method with any consumer with no effort whatsoever on the consumer's part. This is especially useful for globally distributing a new encoding/decoding standard such as a file format, graphics format, or encryptions format across a wide area network such as the Internet.

Encoding service objects 1310 can supply any of the elements 143 or methods 141 required to perform encoding or decoding operations in the programs 12, 22 or at a partner server 1302. The application of encoding and decoding methods in these programs is fully described in the encoding control section above. In particular, referring to FIG. 21 illustrating the example of a word processing file transfer, an encoding service object 1310 can be used to perform the encoding steps 966, 967, and 969 and the decoding steps 971, 973, and 974. The appropriate encoding service objects 1310 for each step can be retrieved automatically by the consumer program 22 using link component objects 110 included in the provider's communications object instance 35.

Encoding service objects 1310 can also supply encoding/decoding methods to other software programs via an API to the programs 12, 22 as described in the word processing transfer example. Using remote procedure calls, such an API could also be extended to methods stored on an encoding partner server 1302.

As explained in the encoding control section above, encoding services in a communications object system can be applied to any form of encoding. This includes human languages, computer languages, object languages, character sets, data file formats, compression formats, transmission formats, and encryption formats. The specific encoding service is not a limiting feature of the invention.

Authentication Service Objects and Partner Servers

An authentication service object type (840, FIG. 17) is a specialized type of encoding service object used to authenticate the identity of a communications object provider, consumer, or another service object. Authentication service objects are especially useful in a communications object system because they can largely automate the process of creating secure communications channels between providers and consumers.

Many cryptographic protocols have been devised to provide authentication of user identity and message integrity over data networks. These include Kerberos 5, developed at MIT; SPX, developed by Digital Equipment Corporation; Privacy Enhanced Mail (PEM), adopted by the Internet Engineering Task Force (IETF); Pretty Good Privacy (PGP), developed by Philip Zimmermann; and the CCITT X.509 protocols. Such protocols are fully described in the aforementioned *Applied Cryptography* by Bruce Schneier. Authentication service objects 1310 and authentication partner servers 1302 can be employed to automate the operation of many of these protocols. This is accomplished by storing the appropriate encryption keys as elements 143 and the appropriate encryption functions as methods 141 of the authentication service object 1310 or authentication partner server 1302.

Figure 32C:
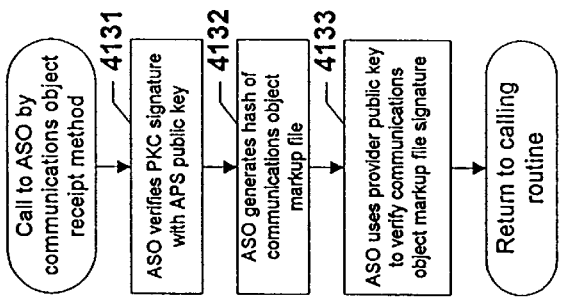
FIGS. 32A, 32B, and 32C are block flow diagrams of processes for use of authentication service objects.
Figure 32B:
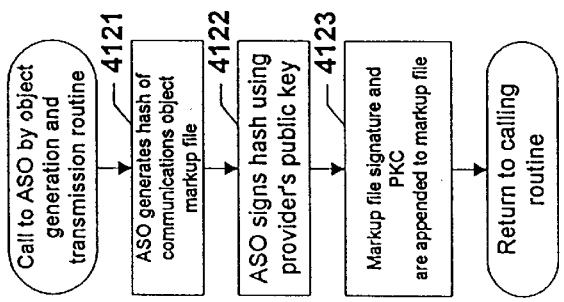
Figure 32A:
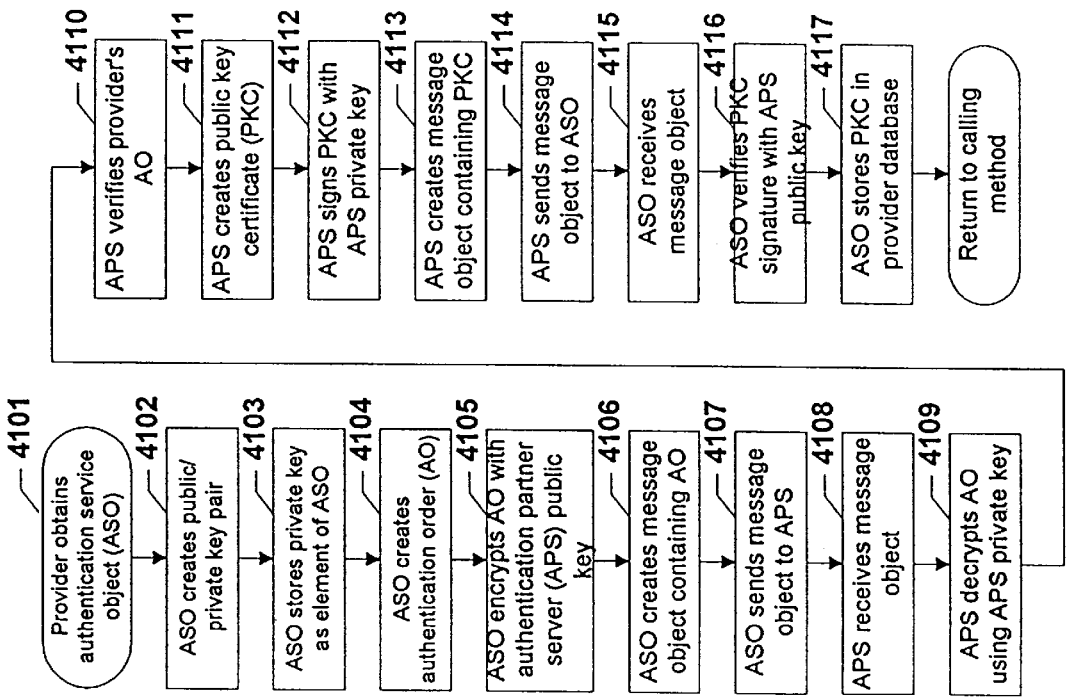

An example is authentication using digital signatures based on public/private keys. The first set of steps in this process are shown in FIG. 32A. The process begins with the provider obtaining a suitable authentication service object (1310, FIG. 28) if one is not already present in the provider program 12 (step 4101). An authentication service object 1310 contains one or more public keys from its corresponding authentication partner server 1302, stored as elements 143. The authentication service object 1310 also contains the encoding method or methods 141 necessary to carry out its authentication functions, called authentication methods. When the provider is ready to create an authentication account, the provider executes one of the authentication methods 141 to generate a public/private key pair (step 4102). The private key is stored as an element 143 of the authentication service object 1310 in the provider database 11 (step 4103). Optionally, the data exchange method 141 may also encrypt this private key element 143 with a password known only to the provider and not stored anywhere in the provider database 11 or on the local computer. The authentication method 141 next creates an authentication order consisting of three elements: the public key generated in step 1402, the provider's UID, and a unique registration key known only to the provider and the authentication partner server 1302 (step 4104). Other elements or variables, such as a timestamp, may also be included. If the authentication partner server 1302 is operated in conjunction with a registration partner server 1302, the unique registration key may be the provider's password or other identification key created at the time of registration. This is shown as the Key attribute of the system ID instance (251, FIG. 6A). This unique registration key is stored in the provider database 11 as an encrypted element 143 which can be decrypted using a provider-supplied password. Alternatively, it may not be stored at all locally but be entered manually by the provider when required. The authentication method 141 next encrypts the authentication order using the authentication partner server's public key (step 4105). The authentication method 141 then creates a message object 110 containing the encypted authentication order (step 4106). The authentication method 141 transmits this message object 110 to the authentication partner server 1302 (step 4107). The authentication partner server 1302 receives the message object 110 and executes its receipt method 141, which is either the same authentication method or another authentication method residing on the authentication partner server 1302 (step 4108). This authentication method 141 decrypts the authentication order using the authentication partner server's private key (step 4109). Next the authentication method 141 verifies the provider's unique registration key and UID in the authentication partner server database 1301 to validate the authentication order (step 4110). The authentication method 141 then creates a public key certificate by combining the provider's public key with certain other identifying data, such as the provider's UID (step 4111). The authentication method 141 digitally signs the public key certificate using the authentication partner server's private key (step 4112). The authentication method 141 then creates a message object 110 containing the public key certificate (step 4113). Finally, the authentication method 141 transmits the message object 110 back to the authentication service object 1310 in the provider program 12 (step 4114). There the provider program 12 receives the message object 110 and executes the original authentication method 141 in the authentication service object 1310 (step 4115). This authentication method 141 first verifies the signature of the public key certificate using the public key of the authentication partner server 1302 (step 4116). Lastly the authentication method 141 saves the public key certificate in the provider database 11 as an element 143 (step 4117).

The provider is now ready to digitally sign communications object instances 35 using the provider's private key. This process would take place as part of the communications object instance generation and transmission routine, specifically as part of step 548, FIG. 12. The steps in this process are illustrated in FIG. 32B. First, an authentication method 141 in the authentication service object 1310 uses a one-way hash function to generate a hash of the communications object markup file (step 4121). Next the authentication method 141 uses the provider's private key to create a digital signature of the hash (step 1462). Finally the digital signature of the markup file together with the provider's public key certificate are appended to the markup file before the communications object markup file is transmitted (step 1463).

The final portion of the authentication process takes place when a communications object instance 35 bearing a digital signature arrives at a consumer program 22. These steps occur as part of the communications object receipt process, specifically as part of steps 721 or 722, FIG. 15. The steps in this process are illustrated in FIG. 32C. The process is initiated when a receipt method 141 of the communications object instance 35 calls an authentication method 141 in an authentication service object 1310 to verify the digital signature. First, the authentication method 141 uses the authentication partner server's public key, stored as an element 143 in the authentication service object 1310, to verify the digital signature on the provider's public key certificate (step 4131). Since the authentication partner server's private key was used to sign the certificate, only the authentication partner server's public key can be used to verify it. Once the public key certificate is authenticated, the authentication method 141 generates a hash of the communications object markup file using the same one-way hash algorigthm used at the provider program 12 (step 4132). Finally, the authentication method uses the provider's public key to verify the provider's digital signature of the hash (step 4133). If the results of step 4132 and 1633 match, the communications object markup file is authenticated, and processing proceeds.

Other data may be encrypted and signed with the authentication partner server's or provider's digital signatures in order to ensure a secure communications channel. Such data may include time/date stamps, the provider's UID or group IDs, random session keys, initialization vectors, incremental counters, and so on. Other authentication protocols such as Kerberos, SPX, or PEM may also be employed. The specific authentication protocols used are not a limiting feature of the invention. Multiple encryption or authentication protocols may also be used by the same authentication service object and authentication partner server or by different authentication service objects and authentication partner servers. The use of additional protocols further increases the overall security of the system because the compromise of any single protocol does not compromise the security of the entire system.

Figure 33B:
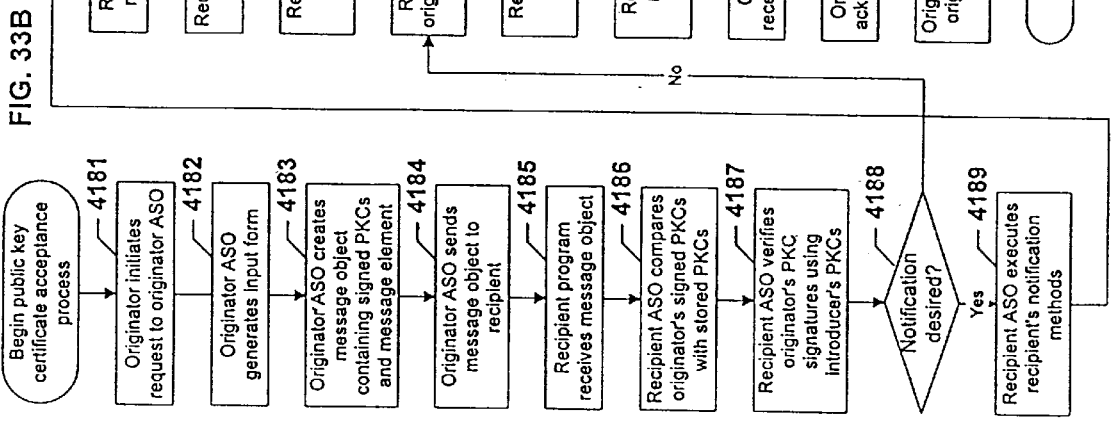
FIGS. 33A and 33B are block flow diagrams of processes for use of public key certificates.
Figure 33A:
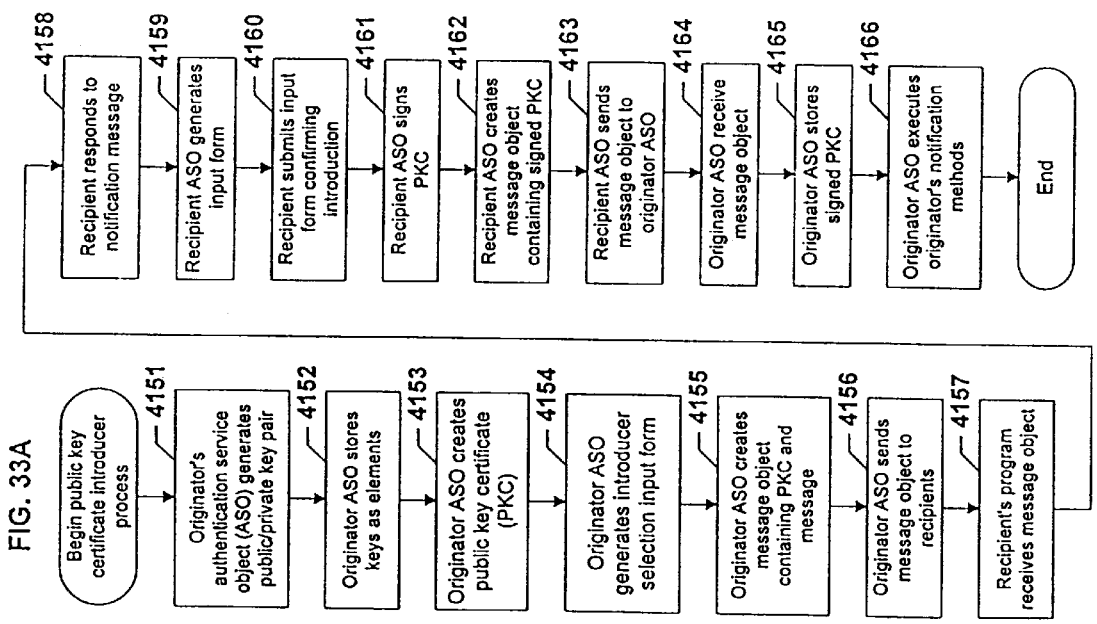

Authentication on a communications object system may also take place without using centralized authentication partner servers 1302. This technique, known as distributed key management, is used by the public-domain encryption program Pretty Good Privacy (PGP). It is based on the concept of an "introducer". An introducer is a person who signs the public key certificate of another person whose identity they personally know and are willing to certify. Introducers are easily employed on a communications object system using authentication service objects 1310. The steps in the process for using introducers are illustrated in FIG. 33A. First, a user requring a public key certificate introduction, called the "originator", executes a data exchange method 141 of an authentication service object 1310 to generate a public/private key pair (step 4151). Next, the data exchange method 141 stores each key as an element 143 of the authentication service object 1310 (step 4152). Then the data exchange method 141 creates a public key certificate consisting of the public key element 143 plus such additional elements 143 as will allow any potential introducer to certify the identify of the orginator (step 4153). These first three steps can be omitted if the originator only wishes to add introducers for an existing public key certificate already stored as an element 143 of the authentication service object 1310. Now, the data exchange method 141 generates an input form prompting the originator for the recipients 120 whom the originator would like to make introduction requests (step 4154). The checkboxes on this input form can represent each of the recipients 120 in the originator's consumer database 21, or the originator can specify the e-mail addresses of still other potential introducers. The input form also allows the originator to enter the attributes of a message element (211, FIG. 4) to be sent to these recipients. When the input form is submitted, the data exchange method 141 creates a message object 110 consisting of the public key certificate, the message element, and any other relevant data, such as a timestamp (step 4155). The data exchange method 141 transmits this to all recipients 120 selected by the originator (step 4156). When received by the recipient's consumer program 22, the message object's receipt method 141 executes the recipient's selected notification method or methods 141 for introduction requests (step 4157). If distributed key management was implemented on a communications object system, message objects containing introduction requests can use a standard notification element type definition 144. This type definition 144 allows consumers to assign notification methods 141 globally for all introduction requests, or designate specific notification methods for introduction requests from individual recipients 120. When the recipient responds to the notification message, a data exchange method 141 in the authentication service object 1310 is executed (step 4158). This data exchange method 141 generates a input form for confirming the introduction request from the originator (step 4159). This input form may include any such data as may be relevant to an introduction request, including the elements 143 of the public key certificate that fully identify the originator. The recipient may also wish to verify the public key with the originator via another secure channel, such as via telephone. When the recipient is satisifed that the request is genuine, the recipient submits the input form (step 4160).

The data exchange method 141 calls an authentication method 141 in the authentication service object 1310 which digitially signs the originator's public key certificate using the recipient's private key (step 4161). If the recipient's private key is stored as an encrypted element 143 of the authentication service object 1310, the recipient may need to enter password or passphrase for decryption. Then the data exchange method 141 creates a message object 110 containing the signed public key certificate (step 4162). The data exchange method 141 transmits this message object 110 to the originating authentication service object 1310 at the originating consumer program 22 (step 4163). When the message object 110 is received, the consumer program 22 executes the originating data exchange method 141 (step 4164). This data exchange method 141 stores the signed public key certificate as an element 143 of the authentication service object 1310 (step 4165). Finally, the data exchange method 141 executes any notification methods 141 assigned by the originator to the acknowledgment of introduction requests (step 4166).

Once a set of signed public key certificates has been received by the originator, the originator can send a public key acceptance request to any other communications object system user. The steps in the process for public key certificate acceptance requests are illustrated in FIG. 33B. The originator initiates the request by executing a data exchange method 141 of an authentication service object 1310 (step 4181). This data exchange method 141 generates an input form for the acceptance request (step 4182). This input form can include the attributes of a message element (211, FIG. 4) allowing the originator to compose the electronic equivalent of an introductory letter. The input form can also allow the originator to choose the introducers whose public key certificate signatures the originator wishes to present to the recipient. When the input form is submitted, the data exchange method 141 creates a message object 110 consisting of the selected public key certificate signatures, the message element, and any other relevant data, such as a timestamp (step 4183). Note that the first two steps above may be omitted if the acceptance request comes directly from another communications object method 141. In this case the recipient of the acceptance request will be specified in the method call, the set of introducer signatures can be selected algorithmically, and the message object in step 4183 can be created automatically. Next the message object 110 is transmitted to the recipient 120 (step 4184). When received by the recipient's consumer program 22, the message object's receipt method 141 executes a data exchange method 141 of an authentication service object 1310 (step 4185). This data exchange method 141 compares the UID of the introducer public key certificate signatures in the message object 110 with the UID of the trusted public key certificates stored in the recipient's consumer database 21 (step 4186). These trusted public key certificates are stored as elements 143 of the authentication service object 1310, and represent introducers whom the recipient trusts. For any matching UIDs, the data exchange method 141 then calls an authentication method 141 to verify the introducer signature using the introducer's public key (step 4187). The data exchange method 141 then checks an acceptance request preference element 147 in the recipient's consumer database 21 to determine if notification is desired (step 4188). For example, notification may not be desired if the signatures of 3 or more introducers are verified. If notification is desired, the data exchange method 141 executes the assigned notification methods 141 to generate a notification message for the recipient (step 4189). When the recipient responds to the notification message, a data exchange method 141 in the authentication service object 1310 is executed (step 4190). This data exchange method 141 generates a input form for confirming the acceptance request from the originator (step 4191). This input form can include the results of the comparison test in step 4186. It can also include input fields for a message back to the originator, messages to the introducers, or other automated options. For purposes of this illustration, we will assume the recipient confirms the acceptance request when the input form is submitted (step 4192). (If the recipient denies the request, the following steps could produce a negative acknowledgment message to the originator.) The data exchange method 141 then saves the originator's public key certificate as an element 143 of the authentication service object 1310 (step 4193). This now becomes another of the recipients trusted public key certificates. The data exchange method 141 next creates a message object 110 containing an acknowledgment of the acceptance request (step 4194). Optionally, this message object 110 could also include a copy of the originator's public key certificate signed by the recipient using the recipient's private key. The data exchange method 141 transmits this message object 110 to the originating authentication service object 1310 at the originating consumer program 22 (step 4195). When the message object 110 is received, the consumer program 22 executes the originating data exchange method 141 (step 4196). This data exchange method 141 stores the public key certificate acceptance acknowledgment as an element 143 of the authentication service object 1310 (step 4197). Such acceptance acknowledgments can now be checked automatically by data exchange methods 141 in the consumer program 22. Alternatively, if the acceptance acknowledgment included a copy of the originator's public key certificate signed by the recipient, this public key certificate could be added to the originator's set of introducers. Finally the data exchange method 141 executes any notification methods 141 assigned by the originator to the acknowledgment of acceptance requests (step 4198).

These public key certificate introduction and acceptance processes can be further improved by the use of "trust levels". A trust level is one or more attributes of a public key certificate that indicate the level of trust the introducer extends to the originator. For example, a trust level attribute could accept an integer value range from 1 to 10, where 1 equals the lowest level of trust and 10 the highest level. The trust level is part of the public key certificate and is signed by the introducer so it cannot be modified by the originator. The trust level value can be entered by the introducer in step 4159 of FIG. 33A. Trust level values play the same role for public key certificates as threshold values play for notification elements, as explained in the notification control section. This means trust levels permit recipients to further automate the processing of acceptance requests and other operations pertaining to secure communications. This processing would take place in step 4186 of FIG. 33B. By implementing a trust rule 140, the recipient can determine what trust characteristics would qualify to generate an acceptance request automatically by the authentication service object 1310 without prior notification to the recipient. For example, a trust rule 140 could dictate that if an acceptance request had two or more verified introducers with trust levels of 8 or greater, an positive acknowledgment would be generated automatically. Trust rules 140 could also govern the autoexchange of signed public key certificates. For example, a trust rule could dictate that if an acceptance request had three or more verified introducers with trust levels of 9 or greater, the authentication service object 1310 would automatically sign and return a copy of the originator's public key certificate. Trust levels are a powerful technique for enabling efficient and effective distributed key management. Trust levels can also be used with other communications object system services such as feedback services, as described further below.

Another way authentication service objects 1310 and authentication partner servers 1302 increase the security of a communications object system is by automating key exchange. Automated key exchange makes it feasible to use larger keys, to change keys frequently, to autoexchange keys among communications partners, to share keys among communications groups, and to use specific keys chosen from among larger key sets. In particular, authentication service objects 1310 can use update control to change they public keys they obtain from their authentication partner server as frequently as is deemed necessary to maintain adequate security. Each update to an authentication service object 1310 can be verified using a digital signature created with the existing public/private key as described above. Only after the authentication service object 1310 has verified the signature of its update will it inherit its new public key. This capability can be further enhanced by the use of acknowledgment control. Each authentication service object update can include a receipt method 141 that generates a acknowledgment message object 110 back to the authentication partner server 1302. This acknowledgment message object can include a digital signature generated by the new public key. This digital signature allows the authentication partner server 1302 to verify the authenticity of the acknowledgment as described above. If the acknowledgment is not received on a timely basis or is not authentic, rules 140 implemented at the authentication partner server 1302 can trigger notification of the authentication partner server provider. This constant "challenge" technique can ensure that authentication service objects 1310 are operating correctly throughout a communications object system.

A final way authentication service objects 1310 can help ensure the security of a communications object system is security rules 140. Security rules can monitor all aspects of key handling and signature verification. Security rules can be particularly useful for enforcing a provider's control over forwarding or chaining of the provider's communications objects 110. When digital signatures do not match, these rules can automatically trigger notification of the user of the programs 12, 22 via any notification method 141 the user desires. These rules can also generate message objects 110 capable of notifying the communications object provider, the authentication service object provider, and the communications object system vendor. Since authentication service objects play such a central role in the security of a communications object system, they can be subject to special rules 140. For example, a rule may require one or more authentication service objects 1310 to be included with the programs 12, 22 at all times, or the programs will not function. Alternatively, rules 140 may govern the acceptance of authentication service objects or object updates, for example requiring explicit approval from the user. Another approach is the use of a master authentication service object 1310 to authenticate all other authentication service objects 1310. This master authentication service object may be a built-in system object. It may also use a large public key or keys that are publicly verifiable via other trusted communications networks such as newspapers or telephones.

Data Exchange Service Objects and Partner Servers

A data exchange service object type (841, FIG. 17) can automate the exchange of data with a data exchange partner server 1302. Since communications objects can include their own data exchange methods as described in the data exchange control section above, the primary purpose of data exchange service objects 1310 is to consolidate the data exchange methods required by a group of communications objects. This may be for a single data exchange specialized service needed shared by a small group of communications objects from a single provider, or a common set of data exchange services needed shared by a large set of communications objects from many providers.

An example of the first case is a product registration service object 1310. A software company may offer a large number of software products, each with its own representative communications object 110. If the software company wanted all these communications objects to share the same product registration services for new buyers of the company's software products, the company could create a product registration service object 1310. Any of the company's product communications objects 110 could then call the services of the product registration service object 1310 to carry out a new user product registration via a product registration partner server 1302. Ideally, such a shared service object would also offer other common services to the individual product objects, such as distribution/update control, directory services, and so on.

For a communications object system deployed on a wide area network, such as the Internet, there are a number of common data exchange services desired by many providers. Besides the specialized services discussed above, examples include file transfer, fax transfer, news distribution, discussion databases, knowledgebases, and classified advertising services. In most cases polymorphic service objects 1310 are desirable for data exchange. This is because the same data exchange service objects 1310 that allow communications object system users to upload and maintain data at a data exchange partner server 1302 can allow other communications object system users to automatically monitor and/or download that data as desired. A simple example is an FTP service object 1310 and an FTP partner server 1302 offered by a provider of network file backup services. The FTP service object 1310 would allow users to select a local file or files which the FTP service object 1310 would monitor and automatically transfer to the FTP partner server 1302 at periodic intervals or when the files had changed. The same FTP service object 1310 could be used to restore backed up files from the FTP partner server 1302 to the user's local system. The FTP service object 1310 could combine these backup services with payment and reporting services. Payment and reporting services are discussed below.

A more advanced example is classified advertising services. A classified ad service object 1310 combines the functions of a data exchange service object 1310 and a directory service object 1310. (It could also incorporate the functions of an authentication service object 1310, payment service object 1310, reporting service object 1310, or other such service object functions as may be applicable.) A classified ad partner server 1302 represents the categories of the classified advertising system as category objects in the same manner as a directory partner server 1302 (FIG. 29A). Each of these category objects 110 includes one or more elements 143, methods 141, and rules 140 that allows a classified advertiser to define the attributes and values of an ad listing in this category.

The steps involved in the process of a seller using a classified ad service object 1310 to create an ad listing in a classified ad partner server database 1301 are shown in FIG. 34A. (These closely parallel the steps involved in creating a listing on a directory partner server 1302 shown in FIG. 30.) The process begins with the seller using his/her browser 50 to navigate the classified ad partner server 1302. The seller chooses the hyperlink representing the category object 110 in which the provider is interested in making an ad listing (step 4201). The receipt method for the category object 110 first checks to see if its parent classified ad service object 1310 is present in the provider database 11 (step 4202). If not, the category object uses its link component object 110 to download the classified ad service object 1310 from the directory partner server 1302 (step 4203). The receipt method 141 then executes a data exchange method 141 in the classified ad service object 1310 that generates a listing input form (step 4204). This input form consists of the category attribute and value choices obtained from the category object 110. For example, a category object 110 such as "Minivan" might generate an input form for attributes including make, model, year, color, mileage, condition, and so on. The appropriate value choices for each of these attributes would be displayed as drop-down lists, radio buttons, and so on. When the seller submits the completed input form, the data exchange method 141 creates a message object 110 containing this input data (step 4205). This message object 110 also contains such other communications object components as are necessary to let prospective buyers communicate with the seller. The data exchange method 141 then transmits this message object 110 to the classified ad partner server 1302 (step 4206). When received by the classified ad partner server 1302, the message object 110 triggers a corresponding data exchange method 141 (step 4207). This data exchange method 141 first creates a communications object 110 representing the seller in the classified ad partner server database 1301 (step 4208). Next the data exchange method 141 creates a communications object 110 of the component object type (812, FIG. 17) containing the ad listing element or elements 143 (step 4209). Then the data exchange method 141 creates member associations 110A between the seller's composite communications object 110 and the category composite communications object 110 (step 4210). In this manner the seller can submit additional ad listings without needing to duplicate the data in the communications object 110 representing the seller. When this process is completed, the data exchange method 141 creates a message object 110 containing an appropriate acknowledgment message (step 4211). The data exchange method 141 transmits this message object 110 back to the classified ad service object 1310 at the provider program 12 (step 4212). When received by the classified ad service object 1310, the message object 110 executes its receipt method 141 (step 4213). The receipt method 141 executes the seller's desired notification method 141 to complete the ad listing process (step 4214). This process could also incorporate authentication services as described above or payment and reporting services as described below.

Any interested buyer can use the same classified ad service object 1310 and category object 110 to specify and monitor ad listings that meet the buyer's interests. The steps involved in this process are shown in FIG. 34B. (This process is similar to the process of monitoring category objects 110 on a directory partner server 1302 as shown in FIG. 31B.) As with the ad listing process, the monitoring process begins with the buyer using his/her browser 50 to navigate the classified ad partner server 1302. The buyer chooses the hyperlink representing the category object 110 in which the buyer is interested in making a purchase (step 4231). The receipt method for the category object 110 first checks to see if its parent classified ad service object 1310 is present in the consumer database 11 (step 4232). If not, the category object uses its link component object 110 to download the classified ad service object 1310 from the directory partner server 1302 (step 4233). The receipt method 141 then executes a data exchange method 141 in the classified ad service object 1310 that generates a monitoring input form (step 4234). The monitoring input form is largely identical to the listing input form described above. It draws some of its attributes and values from the category object 110. The principle difference is that it allows the buyer to specify value ranges or other query formulas for category attributes obtained from the category object 110. To use the automobile example above, a "Minivan" category object might use drop-down list of integer values for the "Not older than" year attribute; use checkboxes for multiple color choices; accept an integer value for "maximum mileage"; use radio buttons for acceptible condition attributes; and so on. When the form is submitted, the data exchange method 141 first saves the input form data as a query element 143 (step 4235). Secondly it creates one or more scheduled event instances 117 in the consumer database 11 (step 4236). These scheduled event instances 117 can begin immediately and repeat at intervals or according to rules 140 specified by the consumer on the input form. They can also be subject to monitoring rules 140 imposed by the classified ad service provider in the category object 110 or classified ad service object 1310. When activated, these scheduled event instances execute a data exchange method 141 in the classified ad service object 1310 (step 4237). The data exchange method 141 then creates a message object 110 containing the ad query (step 4238). The data exchange method 141 transmits this message object 110 to the classified ad partner server 1302 (step 4239). When received by the classified ad partner server 1302, the message object 110 triggers a corresponding data exchange method 141 (step 4240). This data exchange method 141 uses the ad query to to query the classified ad partner server database 1301 for any ad listings satisfying the query (step 4241). The data exchange method 141 then returns the result set to the consumer program 12 (step 4242). If there are no ad listings that satisfy the query, the result set is a message object 110 reporting this. If there are ad listings that satify the query, the result set are the communications objects 110 representing the seller together with the component object 110 representing the seller's ad listing. This is advantageous because these communications objects 110 enable the buyer and seller to immediately establish their own communications relationship to consummate the sale. After the consumer program 22 receives the result set, it executes any receipt methods pertaining to the result set objects (step 4243). This includes the notification test (step 4244). If the there were no matching ads, the buyer may not desire notification. If there are matching ads, the buyer may desire different notification based upon the attributes values of the matching ads. For example, if a minivan meeting the buyer's query was listed at a price below a certain value, the buyer might desire to be paged immediately, whereas at a higher price the buyer may only wish to receive notification in the buyer's notification report (630, FIG. 13). The provider program 12 then executes any desired notification methods (step 4245). Again, this process could also incorporate authentication, payment, reporting, or other service object services.

Figure 35:
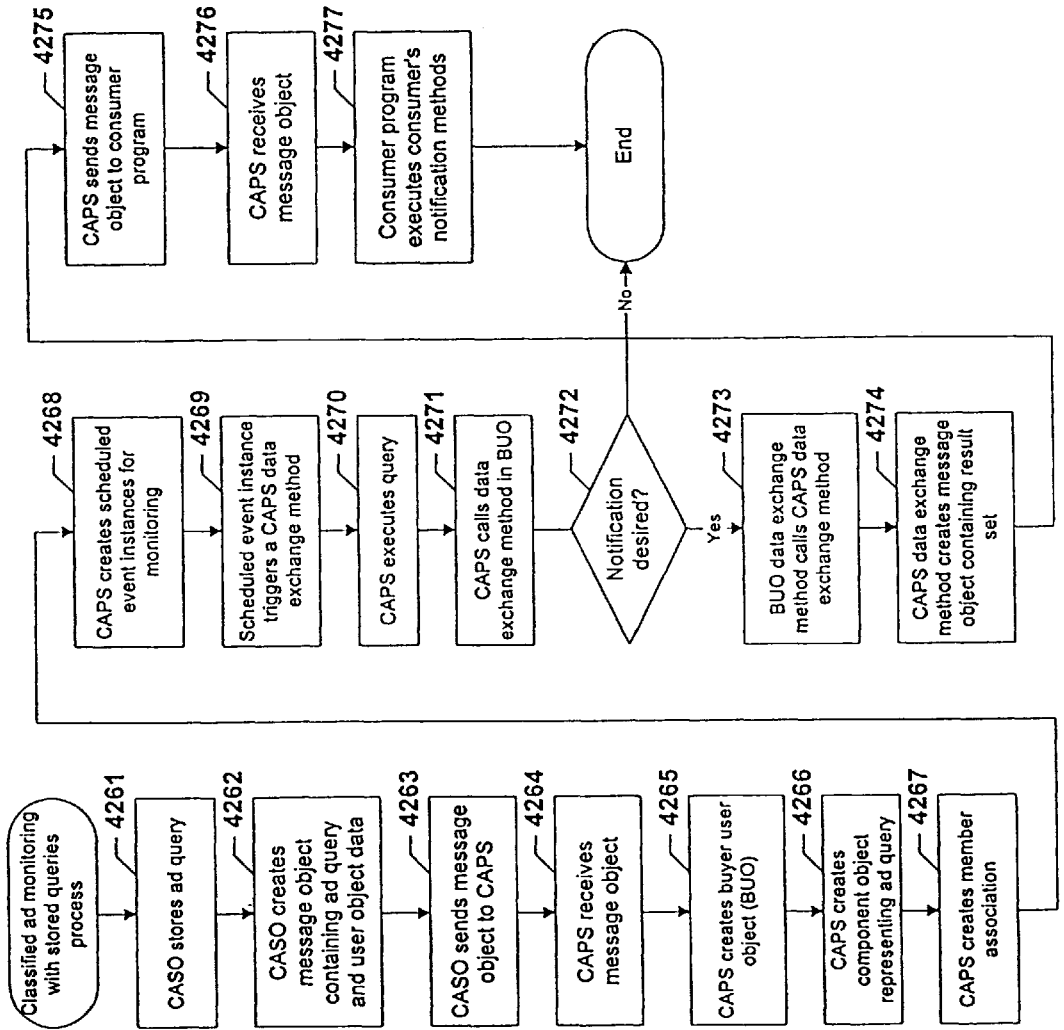
FIG. 35 is a block flow diagram for a process for monitoring classified ad listings.

The above classified ad monitoring process operates by storing and executing the classified ad query at the consumer program 22. In the same fashion that it can be more efficient to monitor a high-volume directory partner server 1302 using a user object index, it can be more efficient to monitor a high-volume classified ad partner server 1302 using a user object index that includes the buyer's stored queries. This also allows query result sets to be transmitted to to buyers via the push technique, as opposed to the pull technique illustrated above. The steps for implementing monitoring with a user object index with stored queries at a partner server are shown in FIG. 35. The first step is identical to step 4235 of FIG. 34B, where the data exchange method 141 of the classified ad service object 1310 saves the input form data as a query element or elements 143 (step 4261). The data exchange method 141 then creates a message object 110 containing the query element or elements 143 (step 4262). This message object 110 also contains such other communications object components as are necessary to create a user object 110 representing the buyer. This includes a data exchange method 141 for processing result sets produced at the classified ad partner server 1302. The data exchange method 141 of the classified ad service object 1310 next transmits this message object 110 to the classified ad partner server 1302 (step 4263). When received by the classified ad partner server 1302, the message object 110 triggers a corresponding data exchange method 141 (step 4264). This data exchange method 141 first creates a user object 110 representing the buyer in the classified ad partner server database 1301 (step 4265). Next the data exchange method 141 creates a communications object 110 of the component object type (812, FIG. 17) containing the ad query element or elements 143 (step 4266). This component object 110 is given a member association 110A with the buyer's composite communications object 110 (step 4267). In this manner the buyer can submit additional ad queries without needing to duplicate the user object 110 representing the buyer. User objects 110 and ad query component objects 110 can also be indexed for performance optimization. Next the data exchange method 141 uses the query elements 143 of the ad query component object 110 to create one or more scheduled event instances 117 in the classified ad partner server database 1301 (step 4268). As with stored queries in the consumer program 22, these scheduled event instances 117 can begin immediately and repeat at intervals or according to rules 140 specified by the consumer or the classified ad service provider. When activated, these scheduled event instances execute a data exchange method 141 on the classified ad partner server 1302 (step 4269). This data exchange method 141 then executes the ad query (step 4270). When the query result set is returned, the data exchange method 141 calls another data exchange method 141 in the buyer user object 110 (step 4271). The buyer's data exchange method 141 processes the result set to determine if notification is desired by the buyer (step 4272). If so, the buyer's data exchange method 141 calls a data exchange method 141 in the classified ad partner server 1302 (step 4273). This data exchange method 141 creates a message object 110 containing the result set (step 4274) and transmits it to the consumer program 22 (step 4275). There the consumer program 22 receives the message object 110 and executes its receipt method 141 (step 4276). The consumer program 22 then executes any notification methods 141 specified by the buyer to control notification about classifed ad queries (step 4277).

Figure 36:
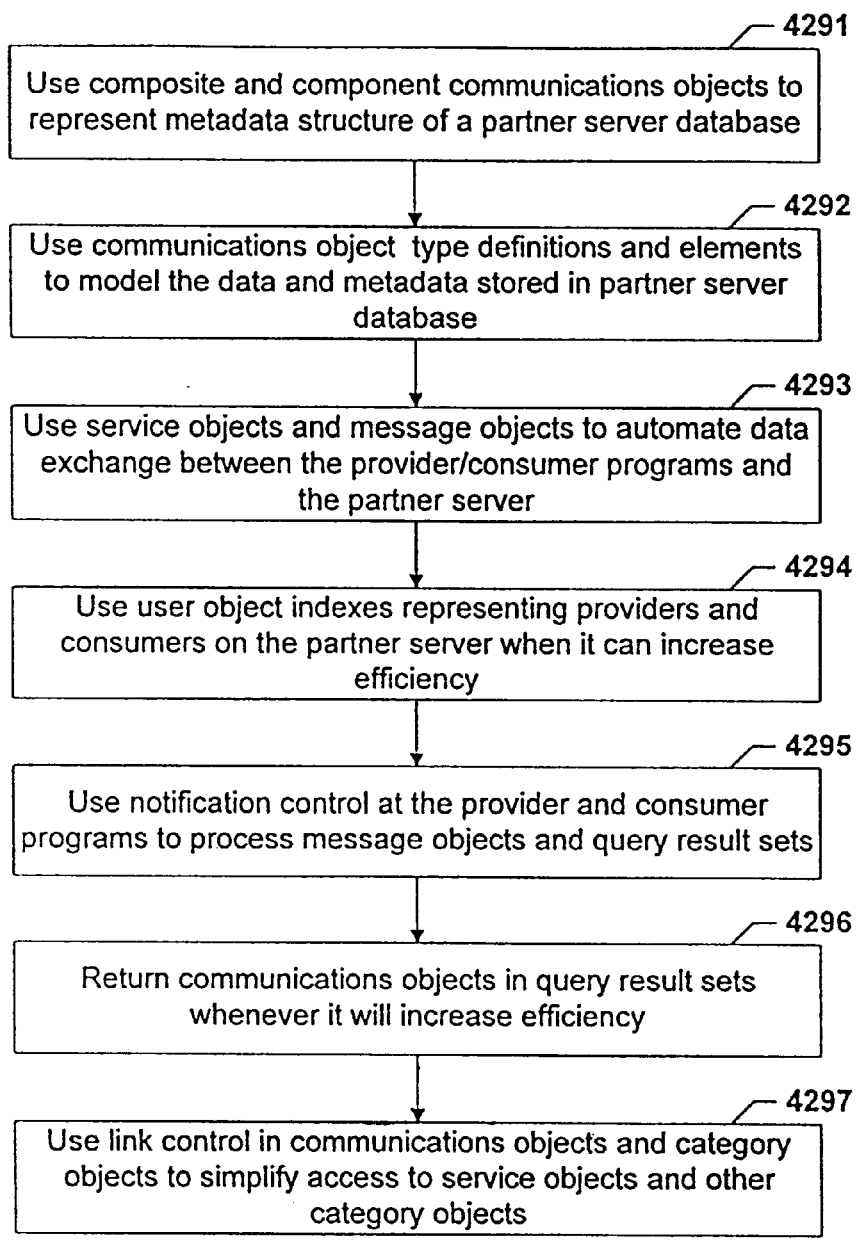
FIG. 36 is a block flow diagram for a process for structuring and optimizing automated data exchange using a communications object system.

The data exchange procedures illustrated here for sellers and buyers using a classified service object 1310 to automate interchange with a classified advertising database 1301 stored on a classified ad partner server 1302 can be generalized to any type of data that can be stored in a server database mutually accessible to providers and consumers on a communications network 3. This includes search services, news services, document retreival services, knowledgebases, discussion databases, and so on. The specific type of database, database server, or data exchange service is not a limiting feature of the invention. The only differences are the organization and format of the data stored on the server database and the queries and rules used to automate information interchange. These generalized steps are summarized in FIG. 36. The first step is to use composite and component communications object types (811, 812, FIG. 17) to represent organizational or topic structure in the data exchange partner server database 1301 (step 4291). This creates a metadata structure for the data stored in the database. Category objects discussed above and shown in FIG. 29A are one example of such a metadata structure. A second example is shown in FIG. 29B. This illustrates how composite and component communications objects can be organized as the main topic and response "threads" in a message database, discussion database, or knowledgebase. The main topic is a composite communications object type 1451. Each response to this main topic is shown as a first-level response thread object 1461, 1462. Each response to a first-level response is shown as a second-level response thread object 1471, 1472, 1473, 1474. Just as software object relationships can be used generally to model many real-world relationships, the association and aggregation relationships (shown in FIGS. 3 and 4) between composite and component communications objects can be used generally to model many metadata relationships. The first advantage to using communications objects 110 to represent the metadata structure of a partner server 1302 is that the structure is dynamic. Communications objects 110 can be added, deleted, and edited easily. Secondly, when these changes take place to the metadata structure, every provider and consumer affected by the change is updated and notified automatically.

Referring back to FIG. 36, the second step is to use communications object type definitions 144 and elements 143 to model the data and metadata stored within the larger metadata structures on the partner server (step 4292). The use of type definitions 144 and elements 143 to model data and metadata is explained in multiple sections above. A specific example is the use of notification elements and message elements (201, 211, FIG. 4) as discussed in the notification control section above. Again, the use of software objects allows such modelling to be applied broadly to many real-world database needs. The third step is to use data exchange service objects 1310 and message objects 110 to automate data exchange between the programs 12, 22 and the data exchange partner server 1302 (step 4293). As explained throughout this section and the data exchange control section, a combination of data exchange methods 141, data exchange rules 140, and data exchange elements 143 can be used to automate many kinds of data uploading and updating for providers and data monitoring, querying, and downloading for consumers. The fourth step is using user object indexes representing the providers and consumers interacting with the data exchange partner server 1302 whenever transferring processing tasks from the programs 12, 22 to the partner server will increase data exchange or network efficiency (step 4294). This procedure is explained in the service object introduction section, the directory service object section, the distribution service object section, and illustrated in detail in this section and FIG. 34B. In particular, it allows data updates or query result sets to be transmitted via the push technique when it is more efficient than the pull technique. The fifth step is to use data exchange methods 141 and notification control at the programs 12, 22 to process message objects and query result sets (step 4295). This is shown in the final steps of FIGS. 34A, 34B, and 35. This allows providers and consumers to realize the maximize benefit of data exchange automation by not being notified of anything but the most highly relevant information, and then having complete control over the notification method. The sixth step is returning communications objects 110 in query result sets whenever it would increase the efficiency of data exchange or communications for the user (step 4296). This is illustrated in step 4242 of FIG. 34B, where the seller's communications object 110 is returned together with the seller's ad listing. This technique is particularly powerful when the communications object 110 returned is a category object 110 or a service object 1310 or granting the user access to a new set of communications objects 110 or partner servers 1302. The final step is using link control in communications objects 110 and category objects 110 to simplify and automate access to service objects 1302 and other category objects 110. This is discussed in the service object introduction section and the directory service object section. This technique spreads linking intelligence with every communications object 110 in a communications object system, making it as easy as possible for the users to gain access to the services of any type of partner server 1302.

Payment Service Objects and Partner Servers

A payment service object type (842, FIG. 17) is a specialized data exchange service object that operates in conjunction with payment partner servers 1302 to provide secure financial transaction services to providers and consumers. A payment service object 1310 may combine the functions of a data exchange service object 1310 with those of an authentication service object 1310, or it may call the services of a separate authentication service object 1310. (The examples in this section will use the latter technique.) Payment service objects allow such common payment services as credit card transactions, debit card transactions, electronic funds transfers, and cybercash transactions to take place easily, automatically, and securely in a communications object system.

Figure 38:
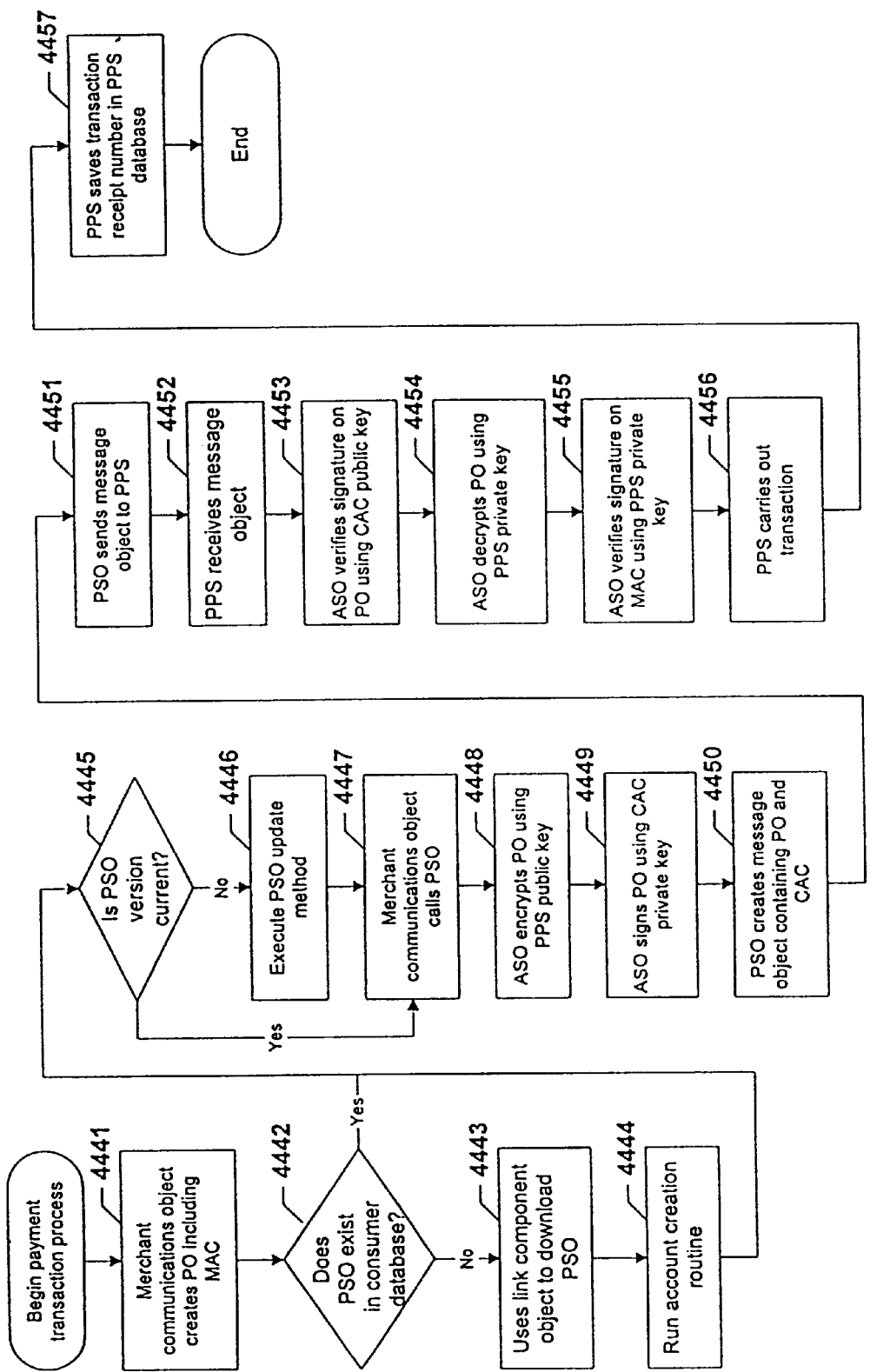
FIG. 38 is a block flow diagram for a process for executing payment transactions using service objects and partner servers.
Figure 39:
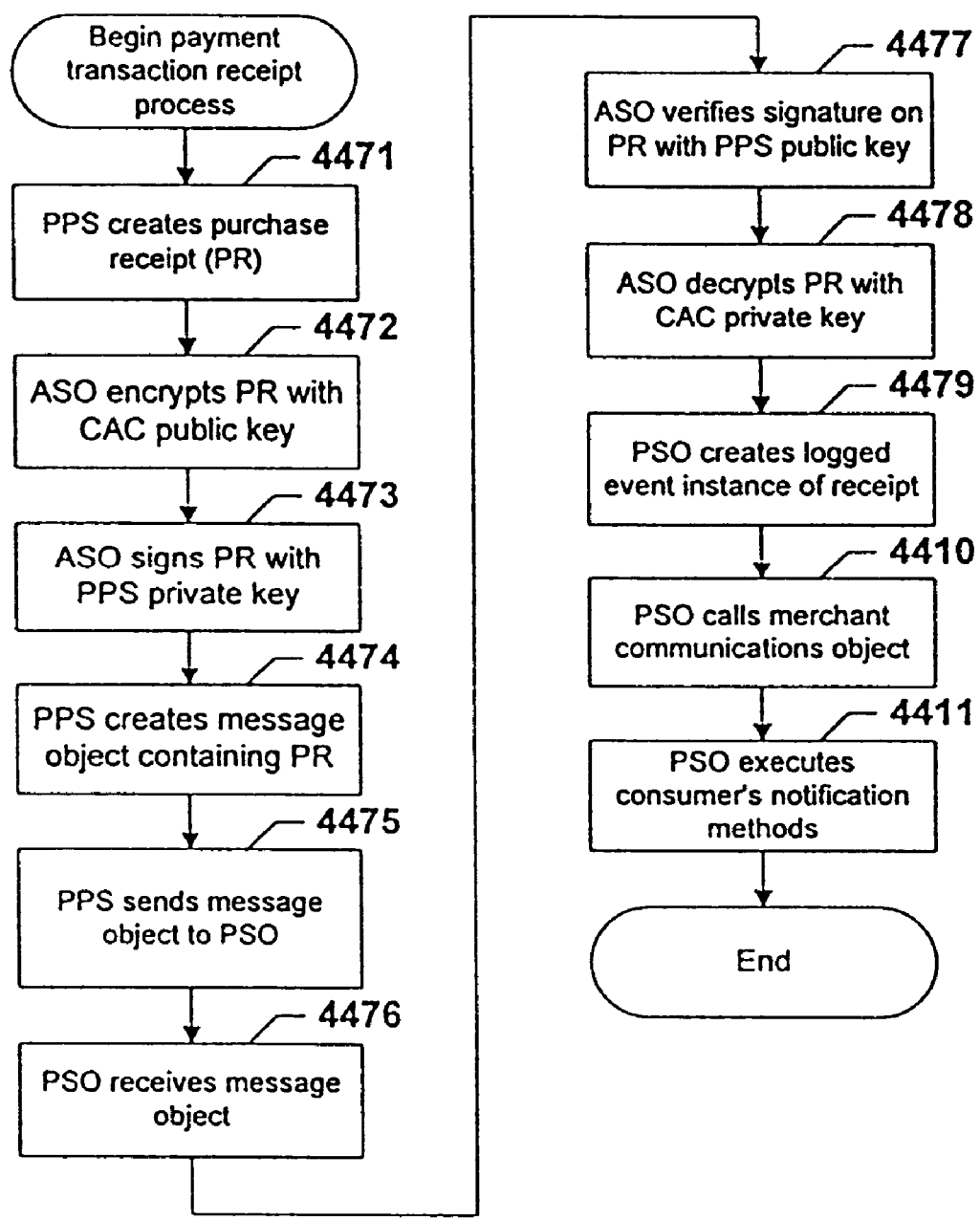
FIG. 39 is a block flow diagram for a process for returning a transaction receipt using service objects and partner servers.

The following explains the basic processes involved with the use of payment service objects 1310 and payment partner servers 1302. These are broken into several sets as shown in FIGS. 37, 38, and 39. The steps in the process of a merchant creating a payment account are illustrated in FIG. 37. The process begins with the merchant obtaining a copy of the payment service object 1310 if one is not already present in the provider database 11 (step 4401). When the merchant is ready to use the payment service object 1310 to set up a payment account, the merchant activates a data exchange method 141 in the payment service object 1310 (step 4402). This data exchange method 141 first generates a public/private key pair, either itself or by calling the services of an authentication service object 1310 (step 4403). Alternatively the data exchange method 141 can use an existing public/private key pair available from the authentication service object 1310. The private key is stored as an element 143 of the payment service object 1310 in the provider database 11 (step 4404). As with an authentication private key, this key may also be encrypted with a password known only to the user and not stored locally. The data exchange method 141 then queries the provider database 11 for the elements 143 necessary to create a payment account (step 4405). This process is explained in the data exchange control section. Because many of these elements 143 are commonly required items of data, such as the provider's name, contact data, financial account data, credit references, and so on, they will already be present in the provider database 11 and can be automatically accessed by the payment service object 1310. The data exchange method 141 then generates an account data input form (step 4406). The purpose of this form, as with most data exchange input forms, is threefold. First, it allows the merchant to confirm any data exchange rules 140 the merchant may have applied to the transfer of the merchant's sensitive financial data, such as bank account numbers or credit references. Second, it allows the merchant to confirm the accuracy of any other data to be transferred, such as contact data. Third, it allows the merchant to enter any specific new data required by the payment service provider. As explained in the data exchange control section, such new data can also be saved as elements in the provider database 11 for future use. When the merchant submits the completed input form, the data exchange method 141 creates a account order (step 4407). The payment service object 1310 then calls an authentication method 141 in an authentication service object 1310 to encrypt the account order using the payment partner server's public key, stored in the payment service object 1310 as an element 143 (step 4408). The authentication method 141 then digitally signs the account order using the merchant's private key (step 4409). The merchant's private key may be stored in the authentication service object 1310 as an encrypted element 143, in which case the authentication method 141 may first require a password from the merchant for decryption. Alternatively the merchant's private key may be entered manually in some other way. The data exchange method 141 now creates a message object 110 containing the secure account order and the merchant's public key certificate, stored as an element 143 in the authentication service object 1310 (step 4410). Optionally this message object 110 may also contain such data as is necessary to create a user object 110 representing the merchant at the payment partner server 1302. The data exchange method 141 transmits this message object 110 to the payment partner server 1302 (step 4411). The payment partner server 1302 receives the message object 110 and executes a data exchange receipt method 141 (step 4412). This data exchange method 141 calls the same authentication service object 1310 to decrypt the secure account order using the payment partner server's private key, stored as an element 143 in the partner server database 1301 (step 4413). Next the authentication service object 1310 verifies the merchant's public key certificate signature using the authentication partner server's public key, stored in the authentication service object 1310 as an element 143 (step 4414). Finally the authentication service object 1310 verifies the merchant's signature on the account order using the merchant's public key (step 4415). Now the data exchange method 141 on the payment partner server 1302 can execute whatever steps are necessary to use the account order to create a merchant account (step 4416). In a preferred embodiment, the merchant account would be represented by a user object 110 in the payment partner server database 1301. When finished, the data exchange method 141 creates a merchant account certificate consisting of the merchant's account number, the merchant's provider UID, and whatever other data the payment service provider wishes to include in the certificate, such as a timestamp, account type identifiers, payment partner server identifiers, and so on (step 4417). (The merchant account certificate may also be encrypted if desired using a single key; decryption will only be necessary at the payment partner server.) The data exchange method 141 then calls an authentication method 141 in the authentication service object 1310 to digitally sign the merchant account certificate using the payment partner server's private key (step 4418). Next the data exchange method 141 creates a message object 110 containing the signed merchant account certificate (step 4419). The data exchange method 141 transmits this message object 110 back to the payment service object 1310 in the merchant's provider program 12 (step 4420). There the provider program 12 receives the message object 110 and executes the original data exchange method 141 of the payment service object 1310 (step 4421). This data exchange method 141 first calls an authentication method 141 in the authentication service object 1310 to verify the signature of the merchant account certificate using the payment partner server's public key (step 4422). Then the data exchange method 141 stores the merchant account certificate in the provider database 11 as an element 143 of the payment service object 1310 (step 4423). Lastly the data exchange method 141 calls any notification methods desired by the merchant for notification of the merchant account certificate receipt (step 4424). This completes the process of setting up a secure payment account for the merchant.

To begin using this account with customers, the merchant includes the merchant account certificate and a link component object 110 from the payment service object 1310 in any communications object 110 where the merchant wishes to use payment services. The payment service object 1310 can then be called by any data exchange method 141 in the merchant's communications object 110. The merchant can indicate the services of such payment service objects 1310 by using the names or logos of the appropriate credit cards, debit cards, and so on in a product ordering input form, for example. When a customer chooses one of these options and submits a data exchange input form, the payment service object 1310 is used automatically. The steps in this process are shown in FIG. 38. First the data exchange method 141 creates a purchase order consisting of the data from the input form together with the merchant account certificate (step 4441). Next the data exchange method 141 queries to see if the payment service object 1310 is present in the customer's consumer database 21 (step 4442). If not, the data exchange method 141 uses the payment service object's link component object 110 to download the payment service object 1310 (step 4443). The payment service object's receipt method 141 will then initiate the process to create a customer account (step 4444). This process is identical to the merchant payment account creation process shown in FIG. 37, except the final result is that the customer is issued a customer account certificate stored in the consumer database 21 as an element 143 of the payment service object 1310. If the payment service object 1310 was present in the consumer database 21 in step 4441, the data exchange method 141 calls a version monitoring method 141 to see if the version is current (step 4445). This version monitoring method 141 compares the version value of the payment service object 1310 with the version value stored in the link component object 110 of the merchant's communications object 110. Version monitoring is explained in the data exchange control section above. If the version is not current, the data exchange method 141 executes the update method 141 of the payment service object 1310 to download the current version (step 4456). Once the current version of the payment service object 1310 is present in the consumer database 21, the data exchange method 141 in the merchant's communications object 110 calls a data exchange method 141 in the payment service object 1310 to continue the transaction (step 4457). This data exchange method 141 calls an authentication method 141 in an authentication service object 1310 to encrypt the purchase order using the payment partner server's public key, stored in the payment service object as an element 143 (step 4458). The authentication method 141 also digitally signs the purchase order using the customer account certificate private key (step 4459). As described above, this key may be stored as an encrypted element 141 in the payment service object 1310 and require a password from the customer to decrypt. Alternatively the customer may supply the key manually in some other way. Next the data exchange method 141 creates a message object 110 containing the secure purchase order and the customer account certificate (step 4460). The data exchange method 141 transmits this message object 110 to the payment partner server 1302 (step 4461). The payment partner server 1302 receives the message object 110 and executes its receipt method 141, which is either the same data exchange method 141 or another data exchange method 141 residing on the payment partner server 1302 (step 4462). This data exchange method 141 calls an authentication method 141 in the authentication service object 1310 to verify the customer's signature on the secure purchase order using the customer account certificate public key (step 4463). Next the authentication method 141 decrypts the purchase order using the payment partner server's private key (step 4464). Finally the authentication method 141 verifies the merchant's signature on the merchant account certificate using the payment partner server's private key (step 4465). Now a data exchange method 141 on the payment partner server 1302 can carry out the purchase order transaction using the verified purchase order data, the verified customer account certificate, and the verified merchant account certificate (step 4466). This may involve any sequence of steps between the payment partner server 1302 and other payment servers or data processing systems, such as the consumer's bank or credit clearinghouse, a credit card processor, a cybercash server, and so on. When the transaction has been completed, the data exchange method 141 creates a unique receipt number stored as an element 143 in the payment partner server database 1301 (step 4467). This receipt number can now be used to verify the transaction with both the customer and the merchant.

From this point the receipt acknowledgment process can take several paths. The payment partner server 1302 can return receipt acknowledgments to both the consumer program 22 and the provider program 12. Each of these programs can in turn send receipt acknowledgments to the other to complete full three-way acknowledgment. Alternatively the payment partner server 1302 can send a receipt acknowledgment to the customer's consumer program 22, which can in turn send a receipt acknowledgment to the merchant's provider program 12, or vice versa. In all cases the steps in sending secure receipt acknowledgment messages are similar. The steps in the process of the payment partner server 1302 sending a receipt acknowledgment message to the customer's consumer program 22 are shown in FIG. 39. First a data exchange method 141 on the payment partner server 1302 creates a purchase receipt (step 4471). The purchase receipt includes the unique receipt number plus any other relevant data, such as timestamp, the payment partner server UID, bank certification numbers, and so on. Next the data exchange method 141 calls an authentication method 141 in an authentication service object 1310 to encrypt the purchase receipt using the customer account certificate public key (step 4472). This step is optional if the purchase receipt does not contain any sensitive information. The authentication method 141 then signs the purchase receipt with the payment partner server's private key (step 4473). The data exchange method 141 creates a message object 110 containing the purchase receipt (step 4474). The data exchange method 141 transmits this message object 110 to the payment service object 1310 at the consumer program 22 (step 4475). There the consumer program 12 receives the message object 110 and executes the original data exchange method 141 of the payment service object 1310 (step 4476). This data exchange method 141 first calls an authentication method 141 in the authentication service object 1310 to verify the signature on the purchase receipt using the payment partner server's public key (step 4477). If the purchase receipt has been encrypted, the authentication method 141 decrypts it using the customer account certificate private key (step 4478). Then the data exchange method 141 stores the purchase receipt in the consumer database 21 as an element 143 of the payment service object 1310 (step 4479). This makes the purchase receipt available to the payment service object 1310 and the merchant communications object 110 for use in any further transactions or correspondence involving this transaction, such as a return or exchange. Finally the data exchange method 141 executes any notification methods 141 desired by the customer for notification about the receipt acknowledgment (step 4480).

This technique can be generalized to any form of data exchange requiring secure, verifiable, non-repudiable transactions between multiple parties. This includes stock trading, electronic data interchange (EDI), credit card systems, banking systems, bartering systems, and so on. The specific nature of the transaction service is not a limiting feature of the invention.

Reporting Service Objects and Partner Servers

A reporting service object type (843, FIG. 17) is another specialized data exchange service object that operates in conjunction with reporting partner servers 1302 to provide statistical reports on the usage of a communications object system. Since communications objects 110 can include their own reporting methods 141 as described in the reporting control section above, the primary purpose of reporting service objects 1310 is to consolidate the reporting methods required by a group of communications objects 110.

Shared access to the methods 141 of a reporting service object 1310 is particularly efficient for gathering statistics and metadata for a large population of communications objects 110. This is because statistics and metadata for a large number communications objects 110 from a large number of providers can accumulated in the databases 11, 21 and then transmitted using a small number of message objects 110 to one or more reporting partner servers 1302. The same reporting service object 1310 or a linked reporting service object 1310 can then be used by the providers to monitor the aggregated reports at the reporting partner server 1302. This can be done using data exchange methods 141 running queries against a reporting partner server 1302 in the same fashion as explained in FIGS. 34B and 35 for classified ad buyers.

Reporting partner servers 1302 can also serve a valuable function by providing high-volume report processing services to communications object providers. Report processing methods 141 on the reporting partner server 1302 can be triggered automatically by report message objects 110 transmitted from reporting service objects 1310. These report processing methods 141 can produce any type of statistical aggregation or analysis offered by the reporting service provider. Alternatively, communications object providers can use the reporting service object 1310 to submit their own stored report queries and report processing methods 141 as explained in FIG. 35 for classified ad buyers.

Figure 40:
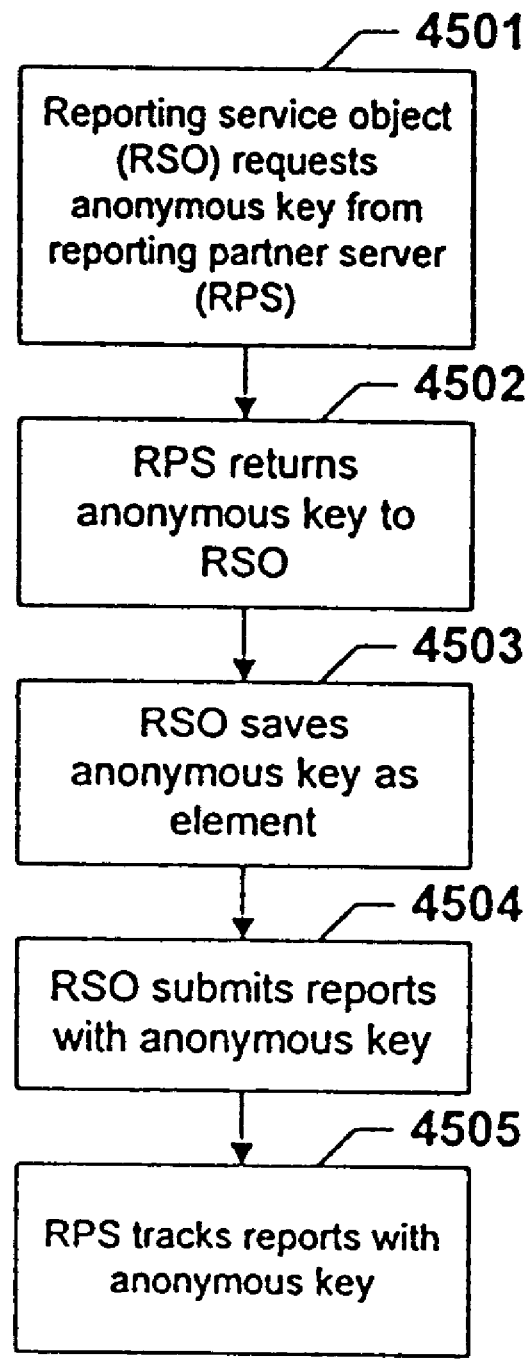
FIG. 40 is a block flow diagram for a process for anonymous reporting using service objects and partner servers.

Anonymous reporting relationships can be accomplished using a simple procedure. The steps in this process are shown in FIG. 40. The process begins when a reporting service object 1310 first needs to set up an anonymous reporting relationship with a reporting partner server 1302. A data exchange method 141 in the reporting service object 1310 uses an anonymous protocol such as HTTP to request an anonymous reporting key from a reporting partner server 1302 (step 4501). The reporting partner server 1302 returns an unique anonymous reporting key in the protocol response (step 4502). The data exchange method 141 then saves the anonymous reporting key as an element 143 of the reporting service object 1310 (step 4503). If desired, such an element 143 can also be encrypted using a password or similar key provided by the user. From this point on the reporting service object 1310 can supply the anonymous reporting key together with the report data when submitting reports via the anonymous protocol to the reporting partner server 1302 (step 4504). In this fashion the reporting partner server 1302 can track the report data submitted from a unique instance of the reporting service object 1310 without having any knowledge of the user's identity (step 4505).

Reporting partner servers 1302 can aggregate reporting data by indexing reports by provider UID or consumer UID, or in the case of anonymous reporting, by unique anonymous reporting key. Alternatively reporting partner servers 1302 can use the incremental counter technique. This technique is explained below in the section on feedback service objects.

Secure reporting can be accomplished using the functions of an authentication service object 1310 in conjunction with a reporting service object 1310. Reporting service objects can also be efficiently coupled with payment service objects to perform billing and payment for communications object system services.

Feedback Service Objects and Partner Servers

A feedback service object type (844, FIG. 17) is another specialized data exchange service object that works in conjunction with a feedback partner server 1302 to aggregate and report feedback from users of any communications object 110 across a communications object system. Feedback service objects 1310 combine the functions of directory service objects, data exchange service objects, and reporting service objects to aggregate feedback from multiple communications object system users across different categories of communications objects 110. Feedback service objects 1310 are another excellent example of a polymorphic service object because the same feedback service object 1310 that is used to provide feedback from one communications object system user (called the "feedback provider") can be used to access or monitor that feedback by another communications object system user (called the "feedback consumer").

Feedback service objects 1310 can most easily be understood as an extension to the functionality of category objects 110. Category objects 110 are explained in the directory service object section above and shown in FIG. 29A. In particular, communications objects 110 listed in a directory partner server 1302 can include a link component object 110 to each category object 110 with which the communications object 110 is associated. This allows users of a communications object system to quickly and easily obtain category objects 110 to check directory partner servers 1302 for other communications objects 110 associated with the category object 110. This process extended into a powerful feedback system with three enhancements. First, feedback attributes and value choices can be added to category objects 110. This permits users of a communications object 110 can be solicited for feedback specific to that particular category of communications objects 110. Second, report processing capabilites can be added to directory partner servers 1302. This permits feedback data to be aggregated into reports of high value to communications object system users. Third, the feedback attributes of the category objects 110 can be used by feedback consumers to create queries to a feedback partner server 1302. This allows feedback consumers to be automatically notified of new or changed communications objects 110 that meet the user's specific interest criteria.

The steps in these processes are very similar to those described for classified ad category objects in the data exchange service object section above and in FIGS. 34A, 34B, and 35. The following explains the basic processes involved with the use of feedback service objects 1310 and feedback partner servers 1302. Both the feedback provider and feedback consumer will be illustrated as users of the consumer program 22. The steps in the process of a feedback provider submitting feedback input are illustrated in FIG. 41A. We will assume the feedback provider already has obtained the communications object 110 upon which the feedback will be given. The process begins with the feedback provider executing a feedback link method 141 in the communications object 110 (step 4601). The presence of a feedback link method 141 for feedback can be shown by the use of a feedback hyperlink or hypergraphic on a page 142 of the communications object 110. Alternatively, if feedback services are implemented as a global function of a communications object system, this feedback link method 141 can be available as a system method 141 to all communications objects 110. In this case feedback services could be initiated through a feedback hyperlink or hypergraphic on the selected object form (611, FIG. 13), on any selected page form (612, FIG. 13), or on a global toolbar in the consumer program 22. Once executed, the feedback link method 141 queries the consumer database 21 for the linked feedback category object 110 (step 4602). If the link method 141 is linked to more than one feedback category object 110, the link method 141 can present the feedback provider with an input form to select the desired feedback category object 110. If the feedback category object 110 is not present, the link method 141 uses link control to download the feedback category object 110 (step 4603). Next a link method 141 in the feedback category object 110 queries the consumer database 21 for the linked feedback service object 1310 (step 4604). If the feedback service object 1310 is not present, the link method 141 uses link control to download the feedback service object 1310 (step 4605). Now a data exchange method 141 in the feedback service object 1310 generates a feedback input form (step 4606). This input form consists of the category attribute and value choices obtained from the feedback category object 110. This is identical to the input form process described in step of 1704 of FIG. 34A for creating a classified ad listing. The feedback attributes and value choices for any feedback category object 110 are determined by the feedback service provider. To continue the example used in the classified ad service description, the feedback input form for a feedback category object 110 representing minivans might include attributes for dealer satisfaction, fit and finish, gas mileage, maintenance costs, repurchase plans, and so on. The appropriate value choices for each of these attributes would be displayed as drop-down lists, radio buttons, and so on. When the feedback provider submits the completed input form, the data exchange method 141 first saves the feedback data as a feedback element 143 of the feedback service object 1310 (step 4607). This permits the feedback provider to easily recall and modify the feedback data as his/her feedback changes. Next the data exchange method 141 creates a message object 110 containing the feedback data from the input form and the UID of the target communications object 110 (step 4608). The data exchange method 141 then transmits this message object 110 to the feedback partner server 1302 (step 4609). When received by the feedback partner server 1302, the message object 110 triggers a corresponding data exchange method 141 (step 4610). This data exchange method 141 can aggregate and process the feedback data in the feedback partner server database 1301 as proscribed by the feedback serve provider (step 4611). Feedback data aggregation and processing is described below. The data exchange method 141 can also perform any kind of aggregation or statistical analysis required to produce the reports the feedback service provider wishes to offer feedback consumers. The attributes of these reports must match the feedback report query attributes of a feedback category object 110 as described below.

Feedback data can be aggregated by a feedback partner server 1302 in several ways. One approach is to save and index feedback data by the UID of the feedback provider. In this approach the feedback partner server 1302 maintains records of the feedback data from each feedback provider. This allows the feedback partner server 1302 to produce accurate feedback statistics reports over time. Another approach is to aggregate feedback using counters. In this approach the feedback partner server 1302 does not need to maintain a record from each feedback provider. Instead the feedback partner server 1302 increments a counter for each feedback message object 110 received from a feedback provider. The accuracy of this counter is maintained in the following manner. The first time a feedback provider uses a feedback category object 110 to send feedback data, the full set of feedback data is transmitted in the feedback message object 110 as described in step 4608 of FIG. 41A. This feedback data is saved as an element 143 of the feedback category object 110 the consumer database 21 as described in step 4607 of FIG. 41A. The steps required for subsequent changes to the feedback are shown in FIG. 41B. First the feedback provider executes the feedback link method 141 as in step 4601 of FIG. 41A (step 4631). Because the feedback provider has already submitted feedback, the feedback category object 110 and feedback service object 1310 are present in the consumer database 21. Thus the feedback link method 141 can directly execute a data exchange method 141 of the feedback service object 1310 (step 4632). This data exchange method 141 reads the saved feedback element 143 of the feedback category object 110 (step 4633). The data exchange method 141 uses this feedback data to generate an input form for the feedback provider to edit the feedback data (step 4634). When this input form is submitted, the data exchange method 141 saves the new feedback data as a new version of the feedback element 143 (step 4635). Versions of the feedback data element can be controlled using data archive control as explained above. The data exchange method 141 next calculates the differentials between the new feedback data and the old feedback data (step 4636). For example, a minivan owner originally rated dealer service at an 8 on a scale of 1 to 10. The minivan owner subsequently had a poor dealer service experience. The minivan owner then edits the feedback data to rate the dealer service at a 2. The data exchange method 141 would calculate the differential as a minus 6. Now the data exchange method 141 creates a message object 110 containing the feedback differential data, the UID of the target communications object 110, and a "RevisedFlag" element 143 set to TRUE (step 4637). The data exchange method 141 transmits this message object 110 to the feedback partner server 1302 (step 4638). When received by the feedback partner server 1302, the message object 110 triggers a corresponding data exchange method 141 (step 4639). This data exchange method 141 uses the value of the RevisedFlag element 143 to process the feedback data as incremental data and not new data. The data exchange method 141 then uses the differentials in the feedback data to adjust the feedback counters (step 4640). Revised feedback data will not increment a "Total Feedback Providers" counter, so feedback consumers can see an accurate report at of the total aggregated feedback at any point in time and the total number of feedback providers who have contributed to this feedback data. Feedback data counters allow the maintenance of feedback data to be distributed throughout a communications object system, making it feasible to centrally aggregate feedback for a large number of communications objects 110 from a large population of feedback providers. Feedback data counters also make it easy to do anonymous reporting, as no provider UIDs must be tracked at the reporting partner server 1302. Alternatively, if feedback data is saved and indexed at the reporting partner server 1302, anonymous reporting can be accomplished using the anonymous reporting key technique as described in the reporting service object section above and illustrated in FIG. 40.

The steps in the process of a feedback consumer accessing and monitoring feedback are identical to those of a classified ad buyer accessing and monitoring classified ad listings as explained in the data exchange service object above and illustrated in FIGS. 34B and 35. As with directory category objects 110, a feedback consumer can obtain a feedback category object 110 either directly from a feedback partner server 1302 or by using a link component object 110 in any communications object 110 associated with that feedback category object 110.

The value of feedback data can vary enormously with the experience and expertise of the feedback provider. This is particularly true for feedback on topics requiring specialized knowledge or expertise, such as academics, law, medicine, technology, and so on. For this reason feedback services can also be applied to feedback providers. This can be accomplished using a feedback partner server 1302 by linking feedback category objects 110 to user objects 110 representing each of the feedback providers. The attributes of a feedback category object 110 representing a feedback provider might include level of expertise, level of credibility, level of decision-making ability, and so on. By aggregating feedback data on feedback providers, a feedback partner server 1302 is able to offer even more useful feedback reports to feedback consumers. This is because feedback queries can select feedback data using on the attributes or "ratings" of the feedback providers. An example is a feedback partner server 1302 which collects feedback data on communications objects 110 representing automobiles. A feedback consumer can create a query for only those communications objects 110 representing minivans with a sticker price of less than $20,000 which also had overall quality rating of 7 or higher on a scale of 1 to 10 from feedback providers whose expertise level was rated by other feedback providers to also 7 or higher on a scale of 1 to 10. Another example applies to response thread objects (FIG. 29B) in a topic discussion database. Here a feedback consumer can use a topic feedback category object 110 to monitor the response thread objects 110 contained by a discussion topic 110. A query can notify the feedback consumer only of new response thread objects posted by providers with an expertise rating of 7 or higher on a scale of 1 to 10. A feedback consumer can also ask for feedback provider ratings to be factored into feedback data reports. An example would be a report on recommended minivans where the feedback data from feedback providers with an expertise rating of 8 or higher on a scale of 1 to 10 was weighted twice as heavily as feedback data from feedback providers with a rating lower than 8.

The integrity of such a feedback system can be enforced by employing feedback rules 140 in the feedback partner server 1302. For instance, a feedback rule 140 can constrain the rating a first feedback provider can give a second feedback provider using the rating of the first feedback provider. An example would be a expertise rating system for securities analysts. Every analyst in a securities analysis firm can be given an initial expertise rating on a scale of 1 to 10 for each feedback category object 110 representing the industry segments covered by the analysis firm. Thereafter all analysts can modify the expertise ratings of the other analysts as new security analysis work is performed. A feedback rule 140 can enforce that a first analyst cannot give a second analyst an expertise rating for a specific feedback category object 110 more than 1 point higher than the expertise rating of the first analyst on that same feedback category object 110. A second feedback rule 140 can specify that no analyst can change the feedback rating of another analyst more than 1 point in any six month period. These rules help enforce accurate expertise appraisals.

The integrity of such a feedback system can also be enforced through the use of authentication services to authenticate the identity of the feedback providers as described in the authentication service object section above. Feedback systems may also incorporate payment services as described in the payment service object section above. An example would be a commercial product rating service that paid industry experts for feedback input and charged consumers for feedback reports.

As with directory services, feedback services can be employed for a wide variety of purposes on a communications object system. This includes product and service rating services, political office ratings, employee performance feedback, discussion group participation, personal references, and so on. The particular feedback service is not a limiting feature of the invention.

ADVANCED SYSTEM ARCHITECTURE
Combined Provider, Consumer, and Server Program Operation It has been explained how in an embodiment of the present invention the functions of the provider and consumer programs 12, 22 and databases 11, 21 can be combined because they use identical database structures and similar operations. In another embodiment of the present invention, the functions of either or both the programs 12, 22 and databases 11, 21 can be combined with a partner server 1302 and a partner server database 1301. This is again because identical database structures and similar operations are used. All programs can also employ the same HTML and HTTP interface operations as described above. This means that a communications object system user may fully access the capabilities of a provider program 12, a consumer program 22, and a partner server 1302 all from a single web server 32 using a single web browser 50.

One of the additional benefits of combining the provider program 12 with a distribution server 32 is that providers do not have to transmit new and updated communications objects 110 to a separate distribution server 32 for distribution via the pull technique. Nor do they require the services of a distribution service object 1310. Rather pull updating from a consumer program 22 can take place directly from the combined provider program 12 and partner server 1302. This saves time and reduces the potential for transmission errors. A provider is also able to more easily apply distribution control by specifying distribution control methods 141 directly in the combined database 100.

The same benefit applies in reverse to consumers when the consumer program 22 is combined with a distribution partner server 32. The consumer program 22 does not need to update communications objects 110 stored on the distribution partner server 1302 using the pull technique because those communications objects or object updates 110 can be pushed directly by the provider program 12 to the combined consumer program 12 and partner server 1302. This also eliminates the need for a distribution service object 1310.

These benefits are further compounded when both the provider program 12 and consumer program 22 are combined with any type of distribution server 32. This combination of yields special benefits for multiuser communications object system installations in the same way as combining the functionality of the programs 12, 22 yielded special benefits for a single communications object system user. These benefits will be further described in the following sections.

Multiuser Operation

The programs 12, 22, and 1302 or any combination thereof can accommodate multiuser operation. In all cases this can be accomplished by employing the user object type (816, FIG. 17). The data structures for user objects 110 are shown in FIG. 6B. Like all other communications objects 110, user objects 110 have a system ID attribute that uniquely identifies them within the database 100. The provider and consumer relationship between user objects 110 and other communications objects 110 uses a relationship association class 111 of the association 110A. One attribute of the relationship class 111 is a logical value "ProviderFlag". If a user is a provider of a communications object 110, the ProviderFlag value is TRUE. If the ProviderFlag value is FALSE, the user is a consumer of the communications object 110. The relationship class 111 also has an attribute NewFlag which is employed in user object indexes as described above. The relationship class 111 may have other attributes such as "PrivilegeLevel" that govern access control to operations such as editing the communications object, forwarding the communications object, and so on. Access control will be discussed below.

User objects 110 can represent individual communications object system users or groups of users. User group objects 110 function similarly to e-mail aliases in an e-mail system. Groups can be nested by creating composite user objects 110 and components user objects 110. User group objects 110 can also have their own distinct attributes used to control the communications functions and privileges of the group.

Multiuser operation is beneficial in the programs 12, 22 or a program combining their operation because it allows a single database 100 to be shared by multiple users. A separate instance of the global preferences class 103 can be associated with each user object 110. In a multiuser database 100, multiple user objects 110 can have a consumer relationship association 111 with single instance of communications object 110. This saves disk space and increases overall system efficiency. In this case each consumer can maintain separate preferences using separate element preferences instances 147 associated with the consumer's user object 110. Users can also share preferences by having an association to the same element preference instance 147.

Access control rules 140 can be used to govern editing rights to shared element preference instances 147. Access control rules will be discussed below.

In a multiuser database 100, a user object 110 can have a consumer relationship with a communications object 110 to which another user object 110 has a provider relationship. This has several very important benefits. To begin with, no instance of the recipient class 120 nor the acknowledgement association 121 is needed. Both can be replaced entirely by the relationship associations 111. Secondly, no communications object distribution routine is necessary. When the user object 110 representing a provider (called the "provider user object") and the user object 110 representing a consumer (called the "consumer user object") are both present in a multiuser database 100, a communications object 110 can be "pushed" to a consumer simply by the provider creating a new association between the communications object 110 and the consumer user object 110. A communications object 110 can be "pulled" by a consumer just by the consumer creating a new association between the communications object 110 and the consumer user object 110. In both of these cases, creation of the new association triggers a "new object reception rule" 140 in the database 100. This rule takes the place of the new object reception routine in a separate consumer program 22 and executes steps 703–708 of FIG. 15. Updates to a communications object 110 by the provider can also be "transmitted" to all associated consumers via the operation of the standard update association rule 140 operating throughout the database 100. This operation of this rule takes the place of the update object reception routine (FIG. 10B) by executing steps 721–731 of FIG. 15. This rule 140 only applies to consumer relationship associations, i.e. where the ProviderFlag value is FALSE.

Finally, in a multiuser database 100, multiple user objects 110 can also have a provider relationship with a single communications object 110. This is referred to as multiuser editing. Multiuser editing of communications objects 110 is advantageous in a communications object system for the same reasons multiuser database sharing is advantageous in many business applications. Just as two or more individuals can need the ability to read or edit same data, two or more individuals can need to communicate about the same subject or topic through the same "channel". In many multiuser database environments, including network file systems, database access and editing rights are controlled using access control lists. This same principle can be applied to a communications object system through the use of access control elements 143, access control methods 141, and access control rules 143. Collectively these are referred to as access control components. Access control elements 143 are special elements 143 included in a communications object 110 in order to define the editing rights which the original communications object provider wishes to grant to other providers. Access control methods 141 and access control rules 140 act in conjunction with access control elements 143 to enforce these rights. Access control is an extension of data exchange control, discussed in the data exchange control section above. Access control components are a unique advantage of a communications object system because they can be contained within the communications object 110 which they govern. Thus they can be distributed and enforced throughout a communications object system. Access control rights can also be governed using user group objects 110. In this capacity user group objects 110 function similarly to access control groups used in many computer network environments to govern file and resource access.

As in any multiuser database, simultaneous editing of the same data field or record by different users can result in conflicts. Many multiuser database record locking or data conflict resolution techniques have been developed to solve this problem, including rules based on time precedence, user priority, location priority, data types, and so on. This is referred to as concurrency control. In a multiuser communications object system database 100, concurrency control can be applied using concurrency elements 143, concurrency methods 141, and concurrency rules 140. Collectively these are referred to as concurrency control components. Concurrency control can be applied in one or more communications object system databases 100 in the same manner as access control. The specific concurrency control rules or techniques employed are not a limiting feature of the invention.

In a communications object system, multiuser editing applies to three situations. The first is single users operating different single-user installations of the combined programs 12, 22 on different computers 1, 2. The second is different users operating the same multiuser installation of the combined program 12, 22. This could be on a single central computer accessible over a local area network, or on a distributed database available over a wide area network. The third is a combination of the first two. In the first situation, multiple users can edit the same communications object 110 through the use of message objects 110. The basic steps involved with this form of multiuser editing are illustrated in FIG. 42A. The process begins with the first provider of a communications object 110 specifying the access control the provider wishes to apply to a communications object 110 (step 4701). This is done by specifying access control components and choosing appropriate access control values. Next the first provider transmits the communications object 110 to a recipient (step 4702). The consumer program 22 of the recipient receives the communications object 110 and stores it in his/her consumer database 21 (step 4703). The recipient next performs an editing operation on the communications object 110 (step 4704). These editing operations will be constrained by the access control components of the communications object 110. For example, the provider of a communications object 110 representing a discussion topic may grant recipients the right to add response thread objects 110 representing responses, such as is shown in FIG. 29B. However this provider may not grant recipients the right to edit the name, description, or message in the original topic object 110. The completion of an editing operation by the recipient triggers a data exchange control rule 140 which executes a data exchange method 141 of the communications object 110 (step 4705). In this way the data exchange control rule 140 serves the same purpose as the update association rule 140 in a database 100. The data exchange method 141 creates a message object 110 containing the changes to the communications object 110 (step 4706). The data exchange method 141 then transmits the message object 110 to the combined program 12, 22 of the first provider (step 4707). When the message object 110 is received, its receipt method 141 is executed (step 4708). The receipt method 141 saves the edits to the communications object 110 (step 4709). Conflicts in edits by two or more users are handled by concurrency control as discussed above. This save operation results in the same set of operations as an edit operation in the provider program 12 as shown in FIGS. 10A and 10B. These changes will now be distributed to all recipients of the communications object 110 using distribution control as described in the distribution control section above. Lastly, the receipt method 141 executes any notification methods 141 assigned by the first provider (step 4710).

This procedure centralizes distribution control at the original communications object provider. An alternative is distributed distribution control. In this technique, a distribution control list is included with the communications object 110 itself. Distribution control lists operate for a communications object 110 similarly to the recipient list of an Internet SMTP e-mail message. E-mail recipient lists allow each message recipient to identify the other recipients and send message replies to all other recipients. Like access control lists, distribution control lists can consist of distribution control elements 143, distribution control methods 141, and distribution control rules 140. Collectively these are referred to as distribution control components. Distribution control components can be as simple as a set of elements 143 containing the UIDs of each recipient 120. In this case the receiving program 12, 22 would resolve these UIDs into the e-mail addresses or other addresses of the recipients. Alternatively distribution control components can include instances of recipient objects 120 or user objects 110. In this case the necessary distribution control intelligence is transferred entirely with the communications object 110. Distribution control methods 141 and rules 140 can be applied at each combined program 12, 22 receiving the communications object 110. For example, a distribution control rule 140 from the original provider could specify that no additional recipients may be added to a distribution control list. Another distribution control rule could specify that certain edits to the communications object, such as a change in a notification element, are sent only to the original provider. The original provider can then approve the edit and distribute the change to the rest of the distribution control list.

The steps involved with multiuser editing using distribution control components are shown in FIG. 42B. The process begins with the first provider of a communications object 110 specifying both the access control and the distribution control the provider wishes to apply to a communications object 110 (step 4731). This is done by specifying access control components and values and distribution control components and values. Next the first provider transmits the communications object 110 to the recipients on the distribution control list (step 4732). The consumer program 22 of the recipient receives the communications object 110 and stores it in his/her consumer database 21 (step 4733). The recipients next performs an editing operation on the communications object 110 (step 4734). The completion of an editing operation by a recipient triggers a data exchange control rule 140 which executes a data exchange method 141 of the communications object 110 (step 4735). The data exchange method 141 creates a message object 110 containing the changes to the communications object 110 (step 4736). The data exchange method 141 then transmits the message object 110 to each of the recipients on the distribution control list (step 4737). When the message object 810 is received by each recipient, its receipt method 141 is executed (step 4738). The receipt method 141 saves the edits to the communications object 110 (step 4739). Conflicts in edits by two or more users are handled by concurrency control as discussed above. This save operation results in the same set of operations as an edit operation in the provider program 12 as shown in FIG. 1A. However, because the changes have already been distributed to the distribution control list, this is an exception to the update association rule 140 and does not trigger the update association routine shown in FIG. 10B. Lastly, the receipt method 141 executes any notification methods 141 assigned by each recipient (step 4740).

The second multiuser editing situation applies when the combined programs 12, 22 are operated as a multiuser system and the providers and consumers involved are all users of this system. In this case multiuser editing operates in the same manner as record sharing in a typical multiuser database environment. Each communications object 110 is a record created by the first provider in the database 100, and the access control components of the communications object 110 act as the access control rights for other users of the database 100. In a multiuser database 100, access control rights can also be governed by the attributes of a relationship association (111, FIG. 6B). In this manner a provider can grant different access control rights to different user objects 110 or user group objects 110 representing other providers. Distribution control within a multiuser database 100 is not necessary because, as explained above, distribution in a shared database 100 is accomplished through the operation of the update association rule 140.

The third multiuser editing situation is a combination of the fist two, i.e. users spread across both single-user installations and multiuser installations of the programs 12, 22. This operates as a special case of the first situation. In this case, distribution control lists can contain special entries representing multiple users at a multiuser installation. These special entries can consist of nested elements 143 representing the UID of the multiuser database 100 and the UIDs of each individual user object 110. Alternatively they can contain nested composite and component objects 110 representing the multiuser program 12, 22 and the individual user objects 110. User group objects 110 can also be employed for this purpose. In this manner only one communications object or communications object update transmission needs to take place to each multiuser database 100. The receipt method 141 of the communications object 110 or message object 110 can then create or update the relationship associations 111 to each user object 110 in the multiuser database 100.

A multiuser communications object system can be applied to solving many longstanding communications problems. A common example is many-to-many messaging among large groups. One existing solution to this problem is e-mail list servers, or "listservs", which are common on the Internet. Listservs require a great deal of effort to setup, configure, and maintain. Listservs typically operate in three modes which must be carefully configured in the listserv program. The first mode is "closed" or "broadcast only", in which messages can only be sent out to the list subscribers, usually by one or more "list owners". The second mode is "moderated", in which list subscribers can reply to messages or submit new messages, but all messages pass through one or more moderators authorized to select those that will be passed on to the full list. The third mode is "open" or "unmoderated", in which any member can respond to messages sent out to the list or submit new messages, and all messages or replies are sent to all subscribers. The single biggest drawback to any of these modes is the subscriber's inability to filter the messages on the list for those of personal relevance. The list is either "on" or "off" for all subscribers. The use of closed or moderated listservs offers some useful filtering capability applicable to all subscribers to the list, but this filtering is not personalized for individual subscribers. It also takes a great deal of effort on the part of the moderators.

A communications object system overcomes all these limitations. First, in a communications object system, such a mailing list can be created simply by creating a communications object 110 to represent the list. No special server program or complex configuration is required. Secondly, this mailing list object 110 can employ notification control to allow every member of the list to filter messages on the list. As shown in FIG. 4 and explained in the notification control section, this is done by including a set of notification elements 201 representing interest topics. One or more message elements 211 are associated with one or more notification elements 201. Each list member can choose the set of interest topics to which they wish to "subscribe". Thereafter in each communications object update the list member will receive notification only of the messages assigned to these topics as described in the notification control section above. The work of one or more moderators is still required to create and periodically refine this set of interest topics, but this small effort produces an very large benefit to the entire audience. Thirdly, the operation of the mailing list can be controlled using access control components and a distribution control components. A closed list can be maintained by restricting editing rights to the the provider as list owner. A moderated list can be maintained by giving all members message editing rights, but keeping distribution control centralized at the list owner and employing a moderator rule 140 that each new message 211 must be confirmed by the list owner. An open list can be created by eliminating the moderator rule 140. A fully distributed list, in which the processor workload for sending out new messages is distributed equally among all list contributers rather than centralized at one provider, can be accomplished using a distribution control list.

Multinetwork Communications Control

Figure 43:
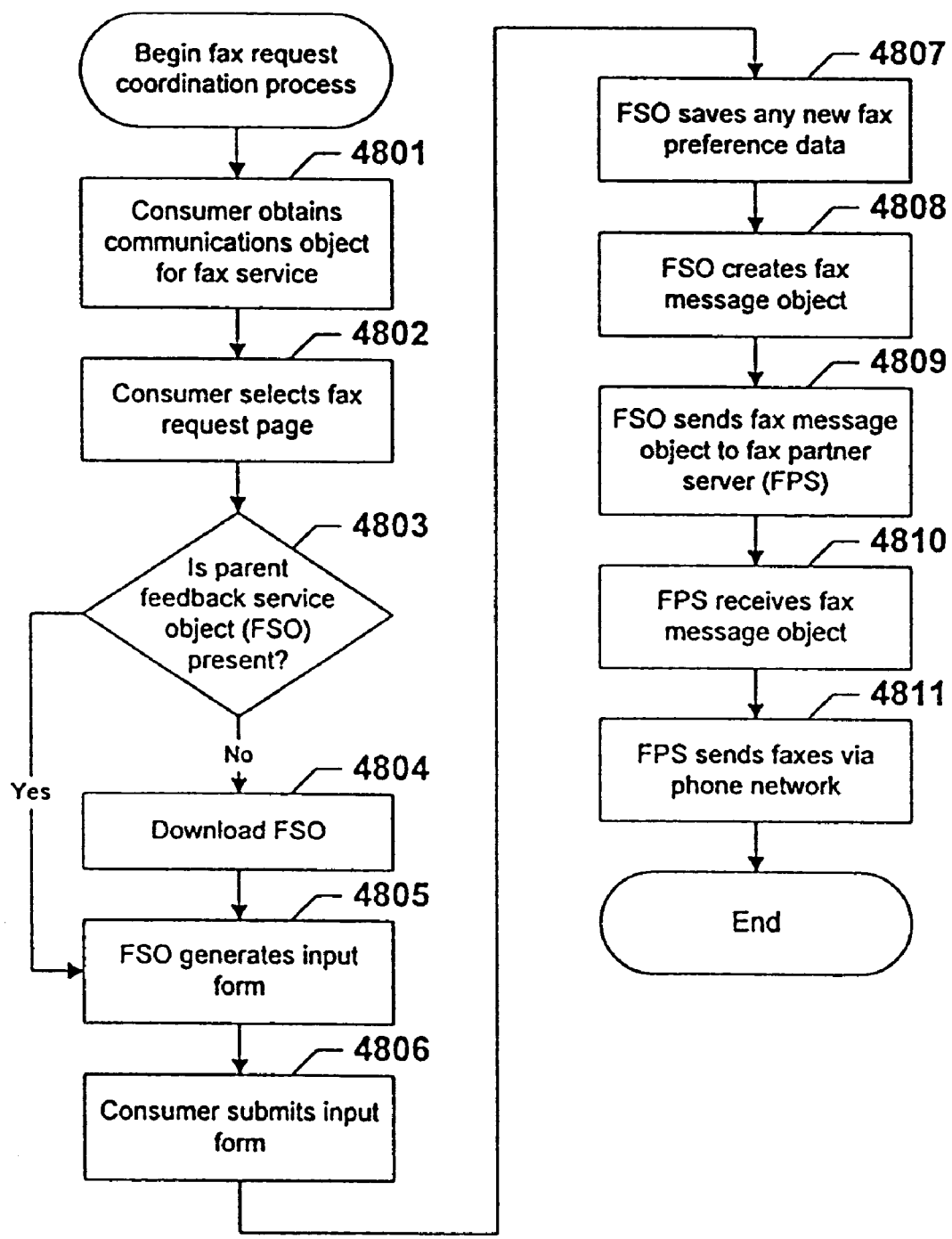
FIG. 43 is a block flow diagram for a process for coordinating fax document delivery using a communications object system.

Because a communications object system permits providers and consumers to control any type of communications over any type of communications network 3, it can be particularly useful for coordinating communications relationships that take place over multiple communications networks. A simple example is a Internet-based fax request system. Such a system allows users to request fax documents using a web server 50 and have them transmitted to the user as fax documents via a telephone network. Such a system can easily be automated using communications object system. This can be accomplished using data exchange methods 141 included directly in a communications object 110, or it can be done using a data exchange service object 1310. The latter permits fax services to easily be shared among many communications objects 110. The steps for automating a fax request system using a fax service object 1310 are shown in FIG. 43. The process begins with the consumer obtaining the communications object 110 offering fax request services (step 4801). Next the consumer selects the hyperlink or hypergraphic representing a fax request page within the communications object 110 (step 4802). This executes a link method 141 which checks to see if the linked fax service object 1310 is present in the consumer database 21 (step 4803). If not, it uses link control to download the fax service object 1310 (step 4804). Next a data exchange method 141 in the fax service object 1310 generates an input form (step 4805). This input form allows the consumer to select the fax documents the consumer would like to receive as well as the target fax number. Note that the fax service object 1310 can query the consumer database 21 for elements 143 with a type definition 144 of "FaxNumber" in order to automatically present such a list. The fax service object 1310 can also prompt the user to enter new fax numbers if none are present. When the consumer submits the input form (step 4806), the data exchange method 141 first saves any new fax number elements 143 as well as the consumer's preferences about the last-used fax number, the most-used fax number, and so on (step 4807). The data exchange method 141 then creates a message object 110 (step 4808). This message object 110 contains the indentification data for the requested fax documents (which could be the UIDs of the fax documents if they are stored as elements 143 on the fax partner server 1302). The message object 110 also contains the selected fax number. The data exchange method 141 transmits the message object 110 to the fax partner server 1302 (step 4809). When the message object 110 is received by the fax partner server 1302, it executes a corresponding data exchange method 141 (step 4810). This data exchange method 141 uses the fax request IDs and fax number to transmit the requested fax documents via the telephone network (step 4811). Note that if the fax partner server 1302 cannot successfully transmit the fax documents, the fax partner server 1302 can also send an acknowledgment message object 110 back to the consumer via the communications object system.

Figure 44:
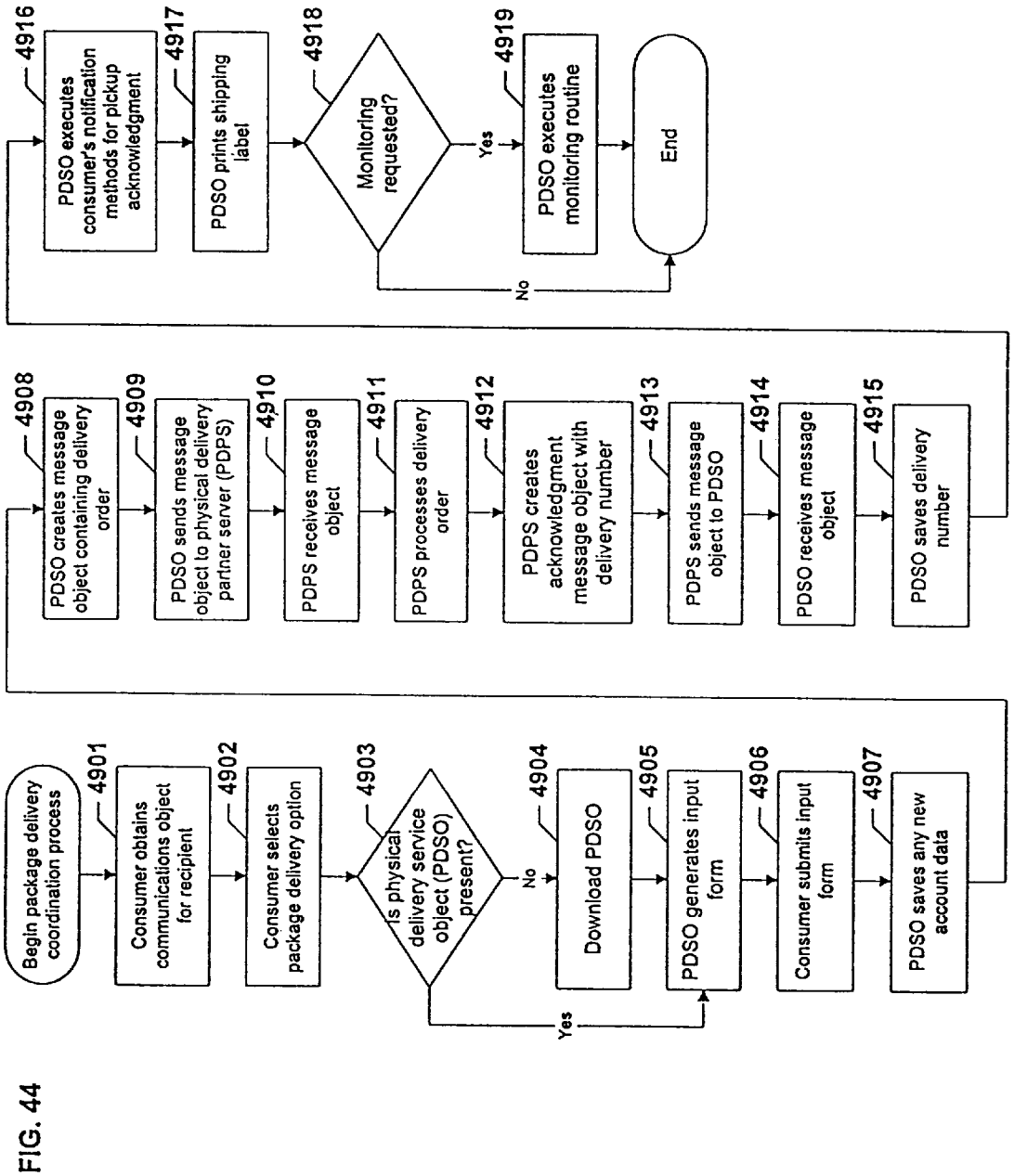
FIG. 44 is a block flow diagram for a process for coordinating physical package delivery using a communications object system.

A more complex example is the coordination of package deliveries over a physical communications network such as a postal network. This process uses account certificates as described in the payment service object section. The steps in this process are shown in FIG. 44. The process begins with the consumer obtaining the communications object 110 of the package recipient (step 4901). Next the consumer selects a hyperlink or hypergraphic representing a physical package delivery option within the communications object 110 (step 4902). Such an option might be represented by hypergraphics of the logos of common delivery services. This executes a link method 141 which checks to see if the linked physical delivery service object 1310 is present in the consumer database 21 (step 4903). If not, it uses link control to download the physical delivery service object 1310 (step 4904). Next a data exchange method 141 in the physical delivery service object 1310 generates an input form (step 4905). This input form allows the consumer to select the desired delivery options. This includes the type of delivery required, whether delivery pickup is needed, payment options, and so on. Note that the consumer does not need to enter any information pertaining to the delivery attributes of the recipient. The data exchange method 141 is able to obtain all such attributes from the account certificate included in the recipient's communications object 110. If the consumer also has a account certificate, the data exchange method 141 can use this data automatically as well. If the consumer does not have an account certificate, the data exchange method 141 can use the input form to prompt the consumer for the necessary account information. When the consumer submits the input form (step 4906), the data exchange method 141 saves any new account data or preferences as elements 143 of the physical delivery service object 1310 (step 4907). The data exchange method 141 then creates a message object 110 containing the recipient account certificate, the sender account certificate, the delivery options selected, and any other pertinent data, such as a timestamp (step 4908). The data exchange method 141 transmits the message object 110 to the physical delivery partner server 1302 (step 4909). When received by the physical delivery partner server 1302, the message object 110 executes a corresponding data exchange method 141 (step 4910). This data exchange method 141 processes the delivery order (step 4911). This can include obtaining a delivery number, initiating the package delivery pickup by the physical delivery service provider, and any other steps necessary to initiate the delivery. When complete, the data exchange method 141 creates a acknowledgment message object 110 containing the delivery number together with any other acknowledgment data, such as the delivery pickup confirmation message (step 4912). The data exchange method 141 transmits this message object 110 to the physical delivery service object 1310 at the originating consumer program 22 (step 4913). When received at the consumer program 22, the message object 110 executes the originating data exchange method 141 of the physical delivery service object 1310 (step 4914). The data exchange method 141 first saves the delivery number and any other pertinent data as logged event 118 (step 4915). This allows it to be referenced for any future actions involving this delivery. Next the data exchange method 141 executes any notification methods 141 assigned by the consumer to delivery acknowledgment messages (step 4916). The data exchange method 141 then calls a print method 141 to print a delivery label (step 4917). The data exchange method 141 tests to see if delivery monitoring was requested in by the input form submitted in step 4906 (step 4918). If so, the data exchange method 141 carries out the monitoring process (step 4919). This monitoring process is identical to that performed by classified ad service objects 1310 as shown in FIG. 34B. Alternately, if the physical delivery partner server 1302 offers monitoring via a user object index and stored queries, the necessary user object data and query data can also be contained in the message object 110 created in step 4910. Monitoring using stored queries is shown in FIG. 35.

Another example of multinetwork communications control is the reception of communications objects or object updates via a broadcast network such as television or cable systems. Because such networks are broadcast-only, communications resulting from the consumer's communications object copies back to the provider must occur via a backchannel such as a telephone network or computer network, e.g. the Internet. Communications objects represent a unique advantage in this respect in that the backchannel can be controlled by the provider in the communications object 110. In addition, multiple backchannels can be controlled by the same communications object 110 depending on the communications action involved or the backchannel capabilities of the particular consumer program 22 where the communications object 110 is stored.

Schedule Control

Schedule coordination among any group is a fundamental challenge in communications. Scheduled events and schedule changes must be communicated to everyone in the group or else the group will not function. A communications object system can solve many widespread scheduling problems using a special type of communications object called a schedule object. Schedule objects are shown as class 817 of FIG. 17. Schedule objects 110 represent real-world events associated with any other communications object 110. Like all other communications objects 110, schedule objects 110 can contain schedule elements 143, schedule methods 141, and schedule rules 140 used to control scheduling operations. Collectively these are referred to as schedule control components. These all function as special cases of data exchange control, discussed above. Schedule objects 110 can also be nested as composite and component objects (811, 182, FIG. 17). This permits a composite schedule object 110 to contain multiple component schedule objects 110. An example would be a composite schedule object representing a multi-day conference, with component schedule objects representing the individual seminars at the conference. Like any communications object 110, schedule objects 110 can be distributed via push and pull and contain their own update methods. This is particularly relevant to schedule coordination because any changes to a schedule object 110 can be transmitted to all consumers associated with that schedule object 110 object. Using notification control, each user can also control exactly how he/she is notified of these changes. Schedule objects 110 can be maintained in any database 100, whether single-user or multiuser. Schedule objects 110 are particularly useful for managing group schedules in a multiuser database 100. This is because schedule objects 110 can easily be associated with user objects 110 or user group objects 110 to create and maintain scheduling relationship associations 111. Alternatively, communications object system programs can handle scheduling requests through an API with an external scheduling program or database. A communications object system API is discussed further below.

One of the most effective uses of schedule objects 110 is to constrain or modify the communications capabilities of communications object 110 or user objects 110 used to represent individuals. For example, an individual whose current schedule object indicates they are at lunch may be reachable via a cellular phone but not via e-mail. This can be accomplished using scheduling rules 140 associated with particular elements 143 and methods 141 in a communications object 110. For example, a scheduling rule may dictate that after business hours important phone calls should be directed to a provider's home phone number. The use of scheduling objects 110 and schedule control allows communications objects 110 to assume the same functions of "universal phone numbers", also called "personal numbers", "lifetime numbers", and "follow me numbers". The difference is that universal phone numbers apply only to telephone communications and are limited to the capabilities of a particular telephone network, whereas communications objects 110 apply to every form of communications and are not limited to the capabilities of any particular communications network.

Schedule objects 110 can be employed to solve a wide variety of common scheduling problems. One example is the universal problem of "telephone tag". In this example, schedule objects 110 are employed at a distribution server 32. Any type of distribution server 32 can be used, but in a preferred embodiment, a combination of the programs 12, 22 and a distribution partner server 1302 is used. This allows message objects 110 to be transmitted and received directly from the distribution partner server 1302 using a direct transmission protocol such as HTTP. This is faster than a store-and-forward protocol like Internet SMTP e-mail, however the latter can also be used if the scheduling process is not time-sensitive. To enable telephone call coordination, the provider first adds one or more scheduling elements 143, methods 141, and rules 140 to any communications object 110 in which the provider wishes to offer scheduling control. The provider can also add schedule control using a scheduling component object 110. The provider also maintains his/her current schedule by adding and maintaining schedule objects 110 to the provider database 11. Thus the provider's current set of schedule objects 110 will indicate the present readiness of the provider to receive a phone call; the current phone number at which the provider should be reached; the options for notifying the provider about the call request; and the options for scheduling a phone call with the provider at some future time if the provider is not available immediately.

Figure 45:
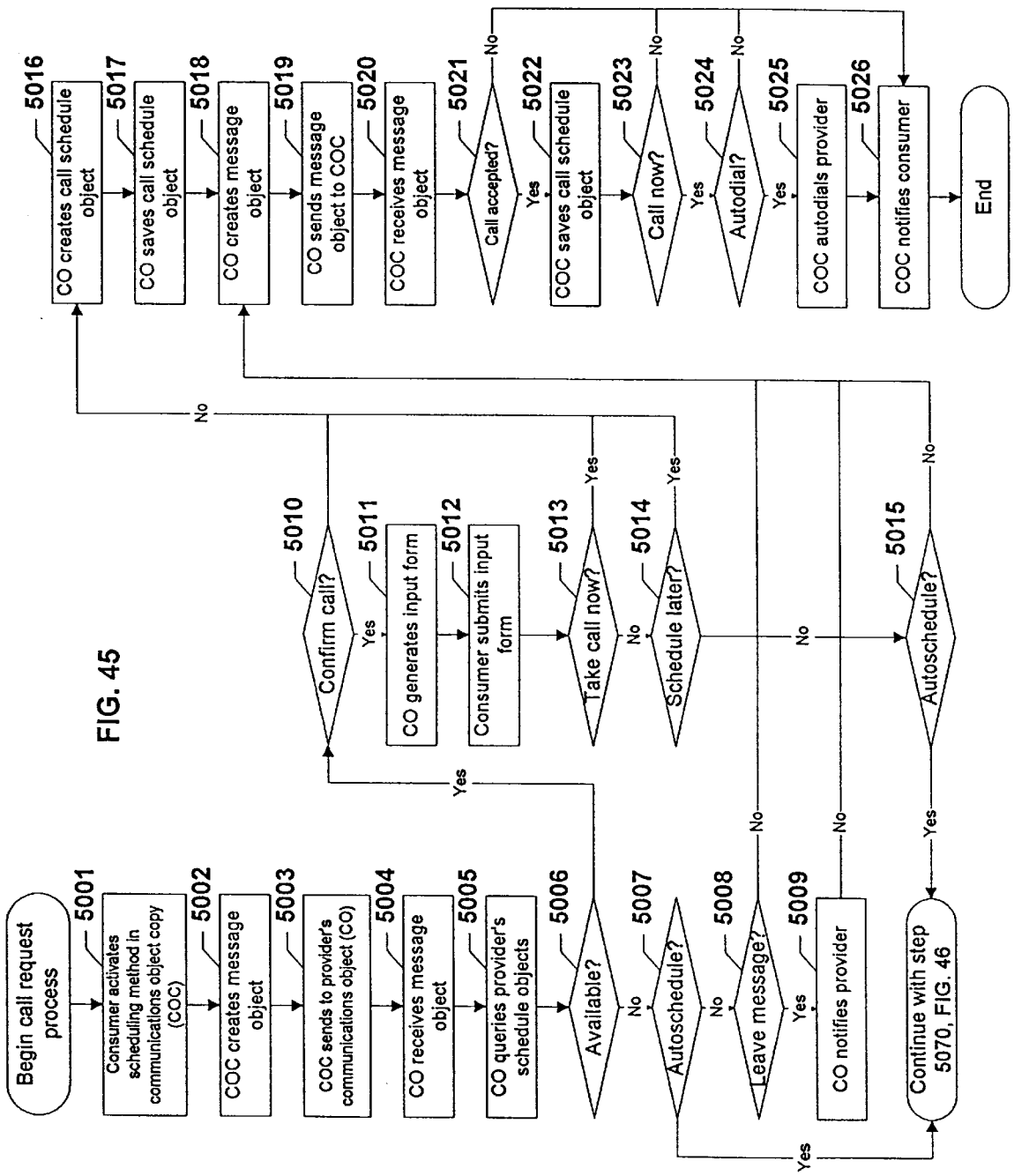
FIG. 45 is a block flow diagram for a process for coordinating telephone calls using a communications object system.

The steps in the process of a consumer contacting a provider to request a phone call using the provider's communications object 110 are illustrated in FIG. 45. The consumer first executes a hyperlink or hypergraphic representing a voice call request on on a page within the provider's communications object 110 (step 5001). This executes a scheduling method 141 which creates a message object 110 containing the voice call request (step 5002). This request can include the name and UID of the consumer, the nature of the call, the priority of the call, the estimated length of the call, and any other parameters the provider has specified in the scheduling method 141. The scheduling method 141 then transmits this message object 110 to the provider's communications object 110 at the provider program 12 (step 5003). When received by the provider program 12, the message object 110 executes a corresponding scheduling method 141 (step 5004). This scheduling method 141 queries the provider's schedule objects 110 to determine the provider's current status (step 5005). The scheduling method 141 first tests the result set to see if the provider is currently available to take the phone calls (step 5006). If not, the scheduling method 141 next checks the provider's scheduling rules 140 and/or scheduling preference elements 147 to determine if the provider wishes to schedule the phone call using automatic scheduling (step 5007). If so, the scheduling method 141 proceeds with autoscheduling as described below starting at step 5070 of FIG. 46. If the provider does not wish to use autoscheduling, the scheduling method 141 checks the provider's scheduling preferences to determine if the provider wishes to have a record of the phone call request (step 5008). If so, the scheduling method 141 executes the notification method 141 the provider has assigned to unfulfilled phone call request messages (step 5009). In either case, the scheduling method 141 proceeds to step 5018 below.

If the test in step 5006 determined the provider was available to take the call, the scheduling method 141 next checks the provider's scheduling preferences to see if the provider wishes to confirm phone call requests (step 5010). If so, the schedule object 110 calls the provider's notification method 141 for confirming phone call requests (step 5011). Notification control gives a provider rich control over such requests. Notification processing can take into account all of the data included in the call request message object 110 plus all of the data present in the combined programs 12, 22. This includes the consumer's identity, the presence or absence of the consumer UID in the provider database 21, the priority of a call, its expected length, and so on. By processing this data, a notification method 141 can produce any type of notification the provider desires. For purposes of this example, we will assume that this notification method generates an input form to obtain the provider's response. This form displays the data explained above. An option to initiate a phone call immediately from the provider back to the consumer could also be presented as a hyperlink or hypergraphic on this input form. The provider responds by submitting this input form (step 5012). This executes the scheduling method 141 which tests the input form data to see if the provider wishes to take the call immediately (step 5013). If not, the scheduling method 141 tests the input form data to determine if the provider has choosen an alternate time, for example scheduling the call to take place 10 minutes from now (step 5014). If not, the scheduling method 141 determines if the provider wishes to schedule the phone call using automatic scheduling (step 5015). If so, the scheduling method 141 proceeds with autoscheduling as described below starting at step 5070 of FIG. 46. If the provider has chosen to take the call, either immediately or at a later time, the scheduling method 141 next creates a schedule object 110 representing the scheduled phone call (step 5016). The scheduling method 141 saves this schedule object 110 in the provider database 11 (step 5017), then creates a message object 110 containing this schedule object 110 (step 5018). If the phone call request was denied for any reason, this message object 110 will contain a negative acknowledgment message. Lastly the scheduling method 141 transmits this message object 110 to the provider's communications object 110 at the consumer program 22 (step 5019). When received by the consumer program 22, the message object 110 executes a corresponding scheduling method 141 (step 5020). This scheduling method 141 first tests the message object 110 to see if it contains a schedule object 110, meaning the phone call request was accepted (step 5021). If so, the scheduling method 141 saves this schedule object 110 in the consumer database 21 (step 5022). The scheduling method 141 then tests the schedule object 110 to determine if the phone call should being immediately (step 5023). If so, the scheduling method 141 tests the consumer's scheduling preferences to see if the phone call should be autodialed by the consumer program 22 (step 5024). If so, the scheduling method 141 executes a transmission method 141 to autodial the provider's telephone number included in the schedule object 110 (step 5025). The phone call can take place via a public telephone network, via a private phone network, via the Internet, or via any other phone transmission network, as discussed in the transmission control section. Finally, the scheduling method 141 executes the consumer's notification method 141 for initiating phone calls (step 5026). If the phone call was not accepted in step 5021, or the phone call is not to begin immediately in step 5023, or the phone call is not to be autodialed in step 5024, then a message to this effect would be given to the consumer in step 5026.

Figure 46:
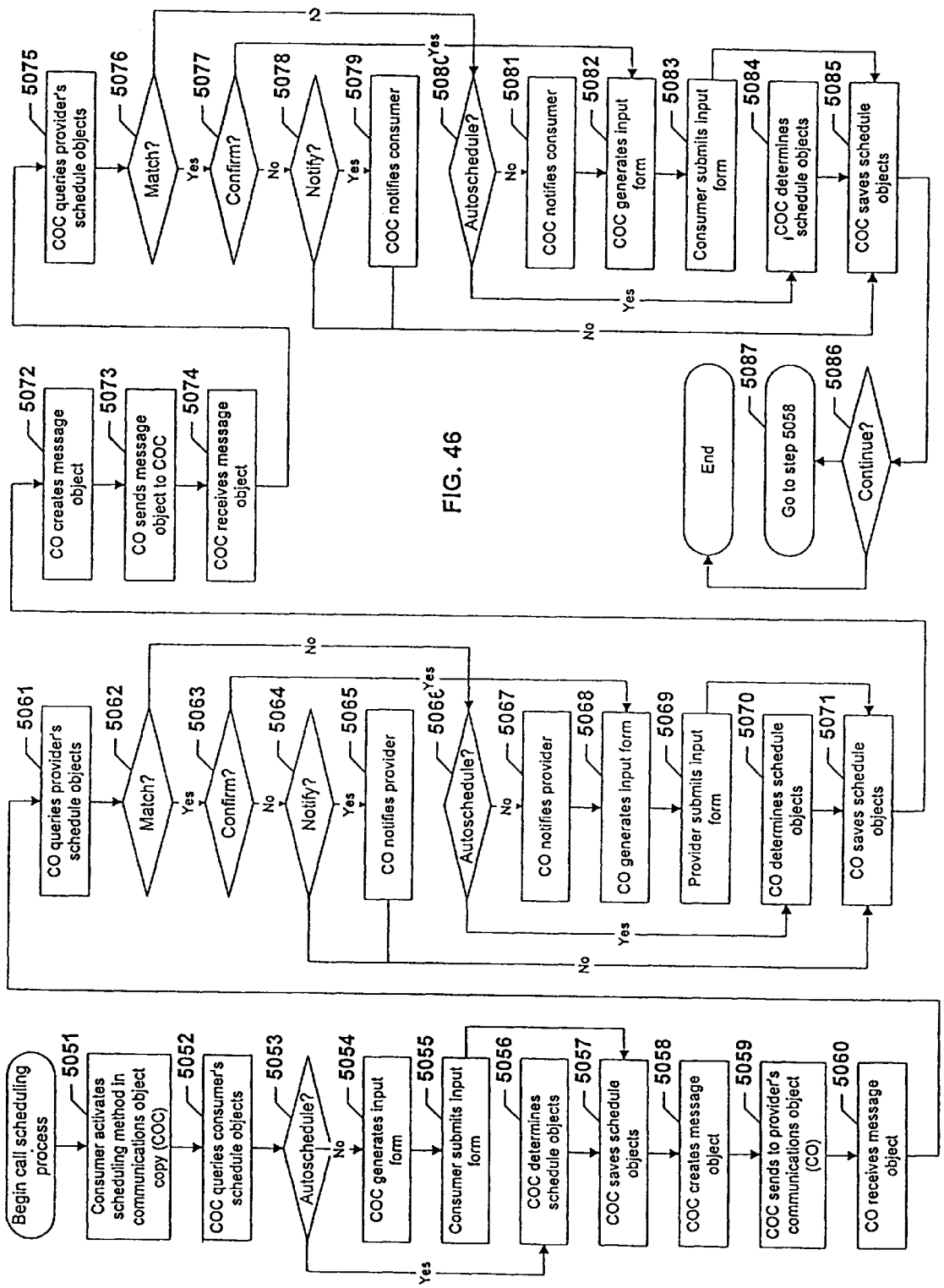
FIG. 46 is a block flow diagram for a process for scheduling telephone calls using a communications object system

When either the provider or the consumer are not ready to proceed with a phone call immediately, schedule objects 110 can automate the process of scheduling a future phone call. The steps in this process are illustrated in FIG. 46. This process can be used as an adjunct to the phone call request process described in FIG. 45, or it can be used without a prior call request. The process begins with the consumer executing a hyperlink or hypergraphic representing a voice call scheduling method 141 on a page within the provider's communications object 110 (step 5051). The scheduling method 141 first queries the consumer database 21 to determine the consumer's own schedule (step 5052). Then the scheduling method 141 tests consumer's preferences for voice call scheduling to determine if automatic scheduling should be used (step 5053). If not, the scheduling method 141 generates an input form (step 5054). This input form would present the consumer's current schedule, represented by schedule objects 110, and allow the consumer to choose a time to schedule the phone call. The consumer responds by submitting the input form (step 5055). Alternatively, if the consumer choose autoscheduling in step 5053, the scheduling method 141 uses the consumer's scheduling rules 141 and scheduling preferences 147 to determine an optimal schedule time or times for the phone call (step 5056). In either case, once one or more proposed schedule times have been determined, the scheduling method 141 saves the corresponding schedule objects 110 in the consumer database 21 (step 5057). These schedule objects 110 may have a "proposed" attribute to indicate their unconfirmed status. The scheduling method 141 now creates a message object 110 containing the proposed schedule object or objects 110 (step 5058). The scheduling method 141 transmits this to the provider's communications object 110 at the provider program 12 (step 5059). When received by the provider program 12, the message object 110 executes a corresponding scheduling method 141 (step 5060). This scheduling method 141 queries the provider's schedule objects 110 to determine the provider's schedule (step 5061). The scheduling method 141 first tests the result set to see if there are any matching schedule time slots between the consumer's proposed schedule objects 110 and the provider's schedule objects 110 (step 5062). If so, the scheduling method 141 next tests the provider's scheduling preferences to determine if the provider wishes to manually confirm the optimal time match (step 5063). If not, the scheduling method 141 tests to determine if the provider desires notification of the new scheduled item (step 5064). If so, the scheduling method 141 executes the notification method 141 the provider has assigned to new schedule items (step 5065). This notification action may vary with the UID of the consumer, the type of event, the duration of the event, and/or other scheduling or notification rules 140 or preferences 147 established by the provider. If there were no schedule matches in step 5062, the scheduling method 141 checks the provider's scheduling preferences to determine if the provider wishes to proceed with automatic scheduling (step 5066). If not, the scheduling method 141 executes the provider's designated notification method 141 for unfulfilled call scheduling requests (step 5067). For purposes of this example, we will assume this notification method 141 generates an input form (step 5068). This input form can present the proposed schedule times, the provider's conflicts, proposed alternatives, and so on. The provider responds by selecting one or more proposed schedule times and submitting this input form (step 5069). If the automatic scheduling alternative was chosen in step 5066, the scheduling method 141 uses the provider's scheduling rules 141 and/or scheduling preferences 147 to determine an optimal time or times for the phone call (step 5070). Once the schedule time or times are determined in step 5062, 5069, or 5070, the scheduling method 141 saves the corresponding schedule objects 110 in the provider database 11 (step 5071). These object's status attribute can indicate whether the schedule time is proposed or confirmed. The scheduling method 141 then creates a message object 110 containing the schedule object or objects 110 (step 5072). The scheduling method 141 transmits this message object 110 to the provider's communications object 110 at the consumer program 22 (step 5073). When received by the consumer program 22, the message object 110 executes a corresponding scheduling method 141 (step 5074). This scheduling method 141 first queries the consumer's schedule objects 110 to determine the consumer's current status (step 5075). This step is necessary as the consumer's status may have changed since the last transmission. The scheduling method 141 then tests the result set to see if there are any matching schedule time slots between the provider's schedule objects 110 and the consumer's schedule objects 110 (step 5076). If so, the scheduling method 141 next tests the consumer's scheduling preferences to determine if the provider wishes to manually confirm the optimal time match (step 5077). If not, the scheduling method 141 tests to determine if the consumer desires notification of the new scheduled item (step 5078). If so, the scheduling method 141 executes the notification method 141 the consumer has assigned to new schedule items (step 5079). If there were no schedule matches in step 5076, the scheduling method 141 checks the consumer's scheduling preferences to determine if the consumer wishes to continue with automatic scheduling (step 5080). The consumer may wish to limit autoscheduling to a specified number of attemps. If not, the scheduling method 141 executes the consumer's designated notification method 141 for unfulfilled call autoscheduling requests (step 5081). For purposes of this example, we will assume this notification method 141 generates an input form (step 5082). This input form can present the proposed schedule times, the consumer's conflicts, proposed alternatives, and so on. The consumer responds by selecting one or more proposed schedule times and submitting this input form (step 5083). If the autoscheduling alternative was chosen in step 5080, the scheduling method 141 uses the consumer's scheduling rules 141 and scheduling preferences 147 to determine an optimal schedule time or times for the phone call (step 5084). Once the schedule time or times are determined in step 5076, 5083, or 5084, the scheduling method 141 saves the corresponding schedule objects 110 in the consumer database 11 (step 5085). The scheduling method 141 next tests to determine if the scheduling process is complete (step 5086). If not, the process is repeated starting with step 5058 (step 5088).

Once a phone call has been scheduled, both the provider and consumer have copies of the same schedule object 110 in their respective databases 11, 21. Should either need to reschedule the phone call appointment, they need only edit the schedule object 110. Any changes will be automatically transmitted to the other party. Each can assign his/her own notification methods 141 to the schedule object 110 in order to receive notification of changes in exactly the manner each prefers. The schedule object 110 also provides a channel for communications related to the scheduled phone call. For example, one party could add a message element (211, FIG. 4) containing an agenda for the phone call, and the other would receive it automatically. At the time of the phone call, any elements 143 or other related communications objects or object components could be recalled automatically by the respective schedule objects 110. Additionally, the respective schedule objects 110 can also using event tracking control and reporting control to log the phone call and prepare call reports.

This scheduling automation process can be enhanced through the addition of API functions that allow the programs 12, 22 to monitor the communications status of the user. For example, using a telephony API call, the programs 12, 22 could determine if the user was currently on the telephone or another communications device and therefore unavailable to directly accept an incoming call. Such API calls would also allow the programs 12, 22 to contact the user or forward communications requests via other means, such as pagers, cellular phones, and so on. Because schedule objects 110 can carry the elements 143, methods 141, and rules 140 necessary to communicate with the scheduled user at any point in time, the programs 12, 22 and any supporting servers 1310 can take the place of "universal number" telephone processing systems as described above. Such services are further enhanced by the fact that call routing can place locally at the calling computer 1, 2 instead of at a remote phone switch or phone server.

This technique for using schedule objects 110 can be generalized to many forms of scheduling. This includes business meetings; professional appointments; teleconferences or videoconferences; television, cable, or video shows; public seminars; and so on. The specific type of scheduling use is not a limiting feature of the invention.

Applications Programming Interface (API)

Communications objects 110 encapsulate communications data, metadata, and instructions in order to create an automated communications relationship between the provider and consumer. Additionally, these sets of data, metadata, and instructions are automatically maintained by the communications system of the present invention. Therefore, the databases 11, 21, and 1301 of communications objects represent an attractive central repository for any communications data that must be maintained by the provider or consumer on their computers 1, 2, or 1302, or on a local area network to which those computers are connected. To access the data, metadata, and methods of the communications objects 110 stored in these databases, an applications programming interface (API) can be used. An API defines the methods and method parameters that are used to request services from another application within a desktop, server, or network operating environment. In a preferred embodiment, an API for a communications object system would specify the object services available from a communications object system program 12, 22, or 1302 in a format compatible with other industry standards for distributed object system specifications. Examples of such standards include the DCE and CORBA specifications from the Open Software Foundation and the OLE and DCOM specifications from Microsoft Corporation.

When the provider and consumer programs 12, 22 include an API, other computer applications can be relieved of the burden of storing, indexing, and maintaining communications data. For instance, the consumer does not need separate address books for a personal information manager, a network directory, and an e-mail program. Other applications can also use the API to automate communications operations using the methods 141 and rules 140 stored in the databases 11, 21, and 1301. A specific example of API usage is the word processing file transfer process explained in the encoding control section and illustrated in FIG. 21.

Object-Oriented Graphical User Interface

As explained above, the programs 12, 22, 1302 in a communications object system may also employ a user interface native to the operating system on which the program is run. Many computer operating systems, such as Microsoft Windows from Microsoft Corporation, Apple Macintosh from Apple Computer Corporation, and UNIX Motif from the Open Software Foundation, provide for graphical user interfaces. The use of graphical user interfaces for computer programs is discussed generally in Alan Cooper, *About Face* (1994), which is incorporated herein by reference. A graphical user interface is advantageous to a communications object system because it allows a user of the programs 12, 22, 1302 to easily and intuitively manipulate visual screen objects in order to create, edit, or delete the underlying communications objects and object associations in the databases 11, 21, 1301. When used in conjunction with a communications object system, this represents a uniquely powerful new interface technique for initiating and controlling communications.

User interface structures for an object-oriented graphical user interface for the combined programs 12, 22 are illustrated in FIG. 47. The computer screen 5101 includes one or more toolbars 5111 together with one or more operating windows 5121, 5131, 5141. The toolbar 5111 uses tool icons 5112 to graphically represent frequently used commands or editting functions of the programs 12, 22. Similar toolbars are employed by most popular graphical software programs, including Microsoft Word from Microsoft Corporation, Visio from Visio Corporation, and Eudora from Qualcomm Corporation. Examples of functions that can be controlled by tool icons 5112 include deleting an object (323, FIG. 9), publishing an object (326, FIG. 9), viewing or editing the properties of an object (322, FIG. 9), and creating associations between selected objects (312, 322, FIG. 9).

The author palette window 5121 allows the user to visually select different graphical icons for the purpose of creating or editing different types of communications objects or communications object components. Examples shown include a personal communications icon 5122, representing an individual user communications object 110; a group communications icon 5123, representing a user group communications object 110; a telephone number icon 5124, representing a telephone number element 143; a news topic icon 5125, representing a notification element (201, FIG. 4); an open discussion icon 5126, representing a composite topic object (1451, FIG. 29B) with a distribution list component to which additional recipients 120 can be added; a closed discussion icon 5127, representing a composite topic object (1451, FIG. 29B) to which additional recipients 120 cannot be added; a response icon 5128, representing a component response thread object (1461, FIG. 29B) for adding a response in a discussion group; and a meeting icon 5129, representing a schedule object 110 for setting up a meeting.

The user palette window 5131 allows the user to choose different screen icons representing other communications object system users in the databases 11, 21, or 1301. A user palette allows the user to quickly and easily create recipient associations (121, FIG. 3) or relationship associations (111, FIG. 6B) or to take actions on other user objects. Examples shown include three individual user icons Alice 5132, Bob 5133, and Trent 5134; and three user group icons Marketing 5135, Sales 5136, and Development 5137.

The author palette 5121 and user palette 5131 are just examples of the types of object icon palettes that could be used. The user may also create his/her own custom palettes. The specific type of palette used is not a limiting feature of the invention. The workspace window 5141 represents a screen area into which author objects and consumer objects can be copied using a mouse or other pointing device in order to manage a specific set of communications relationships. This technique, often called "drag-and-drop", is employed in most operating systems using graphical user interfaces, including those mentioned above. The technique is specifically employed in software programs that employ object-based visual editing for drawing or forms creation, such as Visio from Visio Corporation and Visual Basic from Microsoft Corporation. In a communications object system user interface, drag-and-drop operations can be used for creating, editing, associating, dessociating, or deleting communications objects and communications object components. For example, a user could create a new open discussion topic 110 by dragging the open discussion icon 5126 into a workspace window 5141. The dragging action would result in a dialog box prompting the user for the new properties of the discussion topic object (1451, FIG. 29B). The resulting icon 1542 would then be ready for use. The user could then add other communications object system users to this discussion, such as Mary 5146 and Trent 5147, by dragging by dragging their icons from the user palette 5131 and dropping them on top of the discussion group icon 5126. The other examples shown in the workspace 5141 include a closed discussion 5143, two scheduled meetings 5144 and 5145, and a user group 5148 that has been added to one of the discussions 1542, 1543.

The user can maintain multiple workspace windows 5141 pertaining to each of the user's areas of communications interests. For example, a user could organize workspaces by projects, by departments, by priority, and so on. Workspace windows 5141 can be represented in the databases 11, 21, 1301 by folders (115, FIG. 3) or another separate workspace object class. Workspace windows 5141 can also be represented by communications objects 110 in order that multiple users can easily share the same workspace. In this case changes to one user's workspace 5141 would be reflected in the workspaces of all other users who were consumers of this workspace 5141. This same technique can be applied to object palettes 5121 and user palettes 5131.

Besides drag-and-drop, other features of object-oriented graphical user interfaces can be advantageous to a communications object system. This includes the ability to edit the properties of an object or initiate an action on that object by using a special button or a special clicking action with a pointing device. A second feature is the use of graphical dialog boxes for streamlining user input. Graphical dialog boxes could be used to replace many of the input forms required by data exchange methods 141 as described herein. A third feature is graphical selection-action techniques. These allow a pointing device to be used to select one or more screen objects for action by a program command. Multiple screen objects can be selected by using the pointing device to draw a visual box around them. All of these techniques are employed by Visio from Visio Corporation, Visual Basic from Microsoft Corporation, and other object-oriented editing systems designed for graphical user interfaces. All of these techniques could be employed to improve an object-oriented graphical user interface for a communications object system.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A node for use in a computer-based communications system which includes multiple nodes arranged and adapted to intercommunicate via a communications network, said node characterized by:

(A) storage means for storing information;

(B) association means for associating portions of said information with metadata, said metadata defining a control structure which is transferred in either direction between said node and a second node of said system to associate with said associated information processes which execute instructions external to said control structure to control communications of said associated information, said metadata including at least one of (1) update metadata which associates with said associated information a process for determining when said portions of said information associated by said metadata have been updated and transfer metadata which associates a process for controlling the transfer at least a portion of said updated information, (2) data exchange metadata which associates with said associated information a process for controlling the transfer of feedback information, said feedback information including at least a portion of said information stored at the receiving node, and (3) receipt processing metadata which associates with said associated information a process for determining the processing of said associated information by comparison to an associated version of said control structure; and (C) communications means for at least one of (1) transferring said information, including said metadata defining said control structure, to said second node to control at least one of (a) transferring said updated information to said second node,
(b) receiving said feedback information from said second node, and
(c) processing said feedback information, and
(2) receiving said information, including said metadata defining said control structure, from said second node to control at least one of
(a) receiving said updated information from said second node,
(b) processing said updated information, and
(c) transferring said feedback information to said second node.

2. The node of claim 1 further characterized by processing means for executing said processes associated by said metadata to control communications of said information.

3. The node of claim 2 wherein the instructions executed by said processes associated by said control structure are transferred as part of said information.

4. The node of claim 1 wherein said metadata includes self-reference metadata describing an association with said control structure.

5. The node of claim 2 wherein said processing means processes said feedback information to modify said metadata defining said control structure.

6. The node of claim 1 wherein multiple instances of said metadata are transferred to said node, and wherein at least one of said processes is associated with more than one of said instances.

7. The node of claim 1 wherein multiple instances of said metadata are transferred to said node, and wherein said a portion of said information is associated with more than one of said instances.

8. The node of claim 1 further characterized by unique identifier generation means for generating unique system data uniquely identifying portions of said information in said system; and
wherein said metadata includes unique identifier metadata describing associations between said unique system data and said portions of said information.

9. The node of claim 1 further characterized by unique identifier association means for creating metadata which associates said control structure with at least one unique identifier from among a plurality of unique identifiers stored at said second node.

10. The node of claim 9 wherein said unique identifier is a representation of a human-language name.

11. The node of claim 1 further characterized by version means for generating state data identifying a state of a portion of said information when said portion of said information is changed; and
wherein said metadata includes version metadata associating said state data and said portion of said information.

12. The node of claim 1 wherein said information includes data types and wherein said metadata includes data type metadata associating said data types and said portions of said information.

13. The node of claim 1 wherein said information has data relationships and said metadata includes data relationship metadata describing said data relationships.

14. The node of claim 13 wherein said data relationships include at least one of container, composite, aggregate, and sequence.

15. The node of claim 2 wherein said processing means includes means for translating said information according to a selected markup language based upon processing of said control structure.

16. The node of claim 2 wherein said information includes preference information representing actions to occur in connection with said associated information, and said metadata includes preference metadata describing associations between said preference information and said associated information; and
wherein said processing means includes preference means for processing said preference metadata to control said actions.

17. The node of claim 2, wherein said information includes acknowledgment information representing a transfer of said associated information at least one of to and from said second node, and said metadata includes acknowledgment metadata associating said acknowledgment information, said second node, and said associated information; and
wherein said processing means includes acknowledgment means for processing said acknowledgment metadata to control further actions with regard to communications of said associated information.

18. The node of claim 2 wherein said information includes recipient information representing said second node and said metadata includes recipient metadata associating said recipient information and said associated information; and
wherein said processing means processes said recipient metadata to control communications of said associated information to and from said second node.

19. The node of claim 18, wherein said recipient information is received as said feedback information.

20. The node of claim 18 wherein said recipient information includes a communications network address, and wherein said transfer metadata includes push metadata describing associations between said communications network address and said associated information; and
wherein said processing means includes transfer means for processing said push metadata to transfer said updated information to said communications network address.

21. The node of claim 2, wherein said information includes a communications network server address and polling control data, and wherein said transfer metadata includes pull metadata associating said network server address, said polling control data, and said associated information; and
wherein said processing means includes:
polling trigger means for processing said pull metadata to trigger update processing,
transfer means for processing said update metadata to access a server at said network server address to request transfer of said updated information, and
reception means for receiving said updated information transferred by said server in response to a request and storing said updated information at said node.

22. The node of claim 2, wherein said information includes at least one communications network casting address, and wherein said transfer metadata includes casting metadata associating said casting address and said associated information; and
wherein said processing means includes
monitoring means for processing said casting metadata to monitor said at least one communications network casting address to retrieve said updated information, and
reception means for receiving said updated information from said at least one communications network casting address and storing said updated information at said node.

23. The node of of claim 2, wherein said information includes notification information and said metadata includes notification metadata associating said notification information and said associated information; and wherein said processing means includes notification means for processing said notification metadata to control notifying at least one of a user and another process when said associated information has been received.

24. The node of claim 2, wherein said information includes secondary recipient information representing a third node, and said metadata includes forwarding metadata associating said third node and said associated information; and wherein said processing means includes forwarding means for processing said forwarding metadata to control the transfer at least a portion of said associated information to said third node.

25. The node of claim 2 wherein said processing means includes:

request means for processing said data exchange metadata to generate a request to obtain at least a portion of said feedback information from a user; and input means for receiving said portion of said feedback information input by a user and storing said portion of said feedback information at said node.

26. The node of claim 2 wherein said processing means includes:

query means for applying a query to information at said node to obtain said feedback information.

27. The node of claim 2 wherein said information includes event information representing events, and said metadata includes event metadata associating said event information and said portions of information; and wherein said processing means includes event means for processing said event metadata to control communications events.

28. The node of claim 27 wherein said event information includes event logging information, and wherein said event metadata includes event logging metadata associating said events and at least one recording process; and wherein said event means executes said at least one recording process when an associated communications event occurs.

29. The node of claim 2 wherein said information includes access control information and wherein said metadata includes access control metadata describing associations between said access control information and said associated information; and wherein said processing means includes access control means for processing said access control metadata to control access to said associated information.

30. The node of claim 2 wherein said information includes selection information representing selected portions of said associated information, and said metadata includes selection metadata describing associations between said selection information and said selected portions of said information; and wherein said processing means includes selection means for processing said selection metadata to select said associated information.

31. The node of claim 2 wherein said metadata includes link metadata associating a portion of secondary information stored at a location separate from said node; and wherein said processing means includes linking means for processing said link metadata to control communications of said secondary information.

32. The node of claim 31 wherein said linking means retrieves said portion of said secondary information based upon the receipt of predetermined information.

33. The node of claim 2 wherein said information includes encoding information representing processes for at least one of encoding and decoding said information for at least one of transfer and receipt, and said metadata includes encoding metadata describing associations between said encoding information and said associated information; and wherein said processing means includes encoding means for processing said encoding metadata to select at least one of a plurality of encoding processes.

34. The node of claim 33 wherein said encoding processes include a process for at least one of compression, encryption, digitally signing, file formatting, data translation, and language translation.

35. The node of claim 33 wherein said encoding processes include asymmetric encoding in accordance with one of a plurality of keys which may include public keys or private keys or both of them, and wherein said encoding metadata describes an association to a selected one of the plurality of keys.

36. The node of claim 35 wherein said asymmetric encoding includes at least one of encryption and digital signing.

37. The node of claim 35 wherein said plurality of keys includes a plurality of key pairs, each key pair including a public key and a private key, and wherein said encoding means includes means for selecting one of the plurality of key pairs; and wherein said metadata includes key selection metadata describing an association between said portions of information and said selected key pair.

38. The node of claim 2 wherein said information includes transmission information representing processes for transmitting said information, and said metadata includes transmission metadata describing associations between said transmission information and said associated information; and wherein said processing means includes transmission means for processing said transmission metadata to select at least one of a plurality of transmission processes.

39. The node of claim 2 wherein said information includes termination information, and said metadata includes termination metadata describing associations between said termination information and at least one process to be executed upon deletion of said metadata at said node; and wherein said processing means includes termination means for processing said termination metadata to execute said at least one process when said metadata is deleted at said node.

40. The node of claim 2 wherein said information includes rules, and said metadata includes rule metadata describing associations between said associated information and said rules; and wherein said processing means includes rule means for processing at least one associated rule to control processing when a communication event occurs with respect to said associated information.

41. The node of claim 40 wherein said at least one of said rules is a rule control rule defining a process for determining another rule to be processed when a communication event occurs with respect to said associated information; and wherein said rule processing means processes said rule control rule based upon said associated information to determine a second rule to be processed and processes the second rule.

42. The node of claim 40 wherein at least one of said rules is a data exchange rule defining a process for determining when to transfer said feedback information; and wherein said rule processing means processes said data exchange rule to execute said process.

43. The node of claim 40 wherein at least one of said rules is an authentication rule defining a process for authenticating a source of received information; and wherein said rule processing means processes said authentication rule to authenticate said source.

44. The node of claim 40 wherein at least one of said rules is an encoding rule defining an encoding process for encoding transferred information; and wherein said rule processing means processes said encoding rule to execute said encoding process.

45. The node of claim 40 wherein at least one of said rules is a notification rule defining a notification process for determining notification, of at least one of a user and another process, of the reception of updated information; and wherein said rule processing means processes said notification rule to execute said notification process.

46. The node of claim 2 wherein said information includes graphical user interface information and said metadata includes graphical user interface metadata describing associations between said graphical user interface information, said metadata, and said associated information; and wherein said system is further characterized by graphical user interface means for processing said graphical user interface metadata to visually create, edit, delete, or manipulate said metadata.

47. The node of claim 1 wherein the node operates as at least one of a web server and a web client.

48. The node of claim 1 wherein the associations are expressed as at least one of Uniform Resource Locaters (URLs), Uniform Resource Names (URNs), and hypertext links.

49. The node of claim 1 wherein said metadata is encoded as a MIME object when transferred.

50. A method for use at a node of a computer-based communications system which includes multiple nodes arranged and adapted to intercommunicate via a communications network, said method characterized by the steps of:

(A) providing storage means for storing information;

(B) associating portions of said information with metadata, said metadata defining a control structure;

(C) transferring said metadata in at least one direction between said node and a second node of said system to associate with said associated information one or more processes which execute instructions external to said control structure to control communications of said associated information, said metadata including at least one of (1) update metadata which associates a process for determining when said portions of said information associated by said metadata have been up dated and transfer metadata which associates a process for controlling the transfer at least a portion of said updated information, (2) data exchange metadata which associates a process for controlling the transfer of feedback information, said feedback information including at least a portion of said information stored at the receiving node, and (3) receipt processing metadata which associates a process for determining the processing of said associated information by comparison to an associated version of said control structure; and (D) at least one of (1) transferring said information, including said metadata defining said control structure, to said second node to control at least one of (a) transferring said updated information to said second node, (b) receiving said feedback information from said second node, and (c) processing said feedback information, and (2) receiving said information, including said metadata defining said control structure, from said second node to control at least one of (a) receiving said updated information from said second node, (b) processing said updated information, and (c) transferring said feedback information to said second node.

51. The method of claim 50 further characterized by executing said processes associated by said metadata to control communications of said information.

52. The method of claim 51 further including the step of transferring the instructions executed by said processes associated by said control structure as part of said information.

53. The method of claim 50 wherein said metadata includes self-reference metadata describing an association with said control structure.

54. The method of claim 51 wherein said feedback information is processed to modify said metadata defining said control structure.

55. The method of claim 50 further characterized by transferring multiple instances of said metadata to said node, and wherein at least one of said processes is associated with more than one of said instances.

56. The method of claim 50 further characterized by transferring multiple instances of said metadata to said node, and wherein a portion of said information is associated with more than one of said instances.

57. The method of claim 50 further characterized by generating unique system data uniquely identifying portions of said information in said system; and wherein said metadata includes unique identifier metadata describing associations between said unique system data and said portions of said information.

58. The method of claim 50 further characterized by creating metadata which associates said control structure with at least one unique identifier from among a plurality of unique identifiers stored at said second node.

59. The method of claim 57 wherein said unique identifier is a representation of a human-language name.

60. The method of claim 50 further characterized by generating state data identifying a state of a portion of said information when said portion of said information is changed; and wherein said metadata includes version metadata associating said state data and said portion of said information.

61. The method of claim 50 wherein said information includes data types and wherein said metadata includes data type metadata associating said data types and said portions of said information.

62. The method of claim 50 wherein said information has data relationships and said metadata includes data relationship metadata describing said data relationships.

63. The method of claim 62 wherein said data relationships include at least one of container, composite, aggregate, and sequence.

64. The method of claim 51 wherein said processing step includes translating said information according to a selected markup language based upon processing of said control structure.

65. The method of claim 51 wherein said information includes preference information representing actions to occur in connection with said associated information, and said metadata includes preference metadata describing associations between said preference information and said associated information; and wherein said processing means includes preference means for processing said preference metadata to control said actions.

66. The method of claim 51, wherein said information includes acknowledgment information representing a transfer of said associated information at least one of to and from said second node, and said metadata includes acknowledgment metadata associating said acknowledgment information, said second node, and said associated information; and wherein said processing step includes processing said acknowledgment metadata to control further actions with regard to communications of said associated information.

67. The method of claim 51 wherein said information includes recipient information representing said second node and said metadata includes recipient metadata associating said recipient information and said associated information; and wherein said processing step processes said recipient metadata to control communications of said associated information to and from said second node.

68. The method of claim 67, wherein said recipient information is received as said feedback information.

69. The method of claim 67 wherein said recipient information includes a communications network address, and wherein said transfer metadata includes push metadata describing associations between said communications network address and said associated information; and wherein said processing step includes processing said push metadata to transfer said updated information to said communications network address.

70. The method of claim 51, wherein said information includes a communications network server address and polling control data, and wherein said transfer metadata includes pull metadata associating said network server address, said polling control data, and said associated information; and wherein said processing step includes:
processing said pull metadata to trigger update processing,
processing said update metadata to access a server at said network server address to request transfer of said updated information, and
receiving said updated information transferred by said server in response to a request and storing said updated information at said node.

71. The method of claim 51, wherein said information includes at least one communications network casting address, and wherein said transfer metadata includes casting metadata associating said casting address and said associated information; and wherein said processing step includes
processing said casting metadata to monitor said at least one communications network casting address to retrieve said updated information, and
receiving said updated information from said at least one communications network casting address and storing said updated information at said node.

72. The method of claim 51, wherein said information includes notification information and said metadata includes notification metadata associating said notification information and said associated information; and wherein said processing step includes processing said notification metadata to control notifying at least one of a user and another process when said associated information has been received.

73. The method of claim 51, wherein said information includes secondary recipient information representing a third node, and said metadata includes forwarding metadata associating said third node and said associated information; and wherein said processing step includes processing said forwarding metadata to control the transfer at least a portion of said associated information to said third node.

74. The method of claim 51 wherein said processing step includes:

processing said data exchange metadata to generate a request to obtain at least a portion of said feedback information from a user; and receiving said portion of said feedback information input by a user and storing said portion of said feedback information at said node.

75. The method of claim 51 wherein said processing step includes:

applying a query to information at said node to obtain said feedback information.

76. The method of claim 51 wherein said information includes event information representing events, and said metadata includes event metadata associating said event information and said portions of information; and wherein said processing step includes processing said event metadata to control communications events.

77. The method of claim 76 wherein said event information includes event logging information, and wherein said event metadata includes event logging metadata associating said events and at least one recording process; and wherein said event metadata processing step executes said at least one recording process when an associated communications event occurs.

78. The method of claim 51 wherein said information includes access control information and wherein said metadata includes access control metadata describing associations between said access control information and said associated information; and wherein said processing step includes processing said access control metadata to control access to said associated information.

79. The method of claim 51 wherein said information includes selection information representing selected portions of said associated information, and said metadata includes selection metadata describing associations between said selection information and said selected portions of said information; and wherein said processing step includes processing said selection metadata to select said associated information.

80. The method of claim 51 wherein said metadata includes link metadata associating and a portion of secondary information stored at a location separate from said node; and wherein said processing step includes processing said link metadata to control communications of said secondary information.

81. The method of claim 80 wherein said step of processing link metadata retrieves said portion of said secondary information based upon the receipt of predetermined information.

82. The method of claim 51 wherein said information includes encoding information representing processes for at least one of encoding and decoding said information for at least one of transfer and receipt, and said metadata includes encoding metadata describing associations between said encoding information and said associated information; and
    wherein said processing step includes processing said encoding metadata to select at least one of a plurality of encoding processes.

83. The method of claim 82 wherein said encoding processes include at least one of compression, encryption, digital signatures, file formatting, data translation, and language translation.

84. The method of claim 82 wherein said encoding processes include asymmetric encoding in accordance with one of a plurality of keys which may include one or more public and private keys, and wherein said encoding metadata describes an association to a selected one of the plurality of keys.

85. The method of claim 84 wherein said asymmetric encoding includes at least one of encryption and digital signing.

86. The method of claim 84 wherein said plurality of keys includes a plurality of key pairs, each key pair including a public key and a private key, and
    wherein said encoding step includes selecting one of the plurality of key pairs; and
    wherein said metadata includes key selection metadata describing an association between said portions of information and said selected key pair.

87. The method of claim 51 wherein said information includes transmission information representing processes for transmitting said information, and said metadata includes transmission metadata describing associations between said transmission information and said associated information; and
    wherein said processing step includes processing said transmission metadata to select at least one of a plurality of transmission processes.

88. The method of claim 51 wherein said information includes termination information, and said metadata includes termination metadata describing associations between said termination information and at least one process to be executed upon deletion of said metadata at said node; and
    wherein said processing step includes processing said termination metadata to execute said at least one process when said metadata is deleted at said node.

89. The method of claim 51 wherein said information includes rules, and said metadata includes rule metadata describing associations between said associated information and said rules; and
    wherein said processing step includes processing at least one associated rule to control processing when a communication event occurs with respect to said associated information.

90. The method of claim 89 wherein said at least one of said rules is a rule control rule defining a process for determining another rule to be processed when a communication event occurs with respect to said associated information; and wherein said rule processing step processes said rule control rule based upon said associated information to determine a second rule to be processed and processes the second rule.

91. The method of claim 89 wherein at least one of said rules is a data exchange rule defining a process for determining when to transfer said feedback information; and
    wherein said rule processing step processes said data exchange rule to execute said process.

92. The method of claim 89 wherein at least one of said rules is an authentication rule defining a process for authenticating a source of received information; and
    wherein said rule processing step processes said authentication rule to authenticate said source.

93. The method of claim 89 wherein at least one of said rules is an encoding rule defining an encoding process for encoding transferred information; and
    wherein said rule processing step processes said encoding rule to execute said encoding process.

94. The method of claim 89 wherein at least one of said rules is a notification rule defining a notification process for determining notification of at least one of a user or another process of the reception of updated information; and
    wherein said rule processing step processes said notification rule to execute said notification process.

95. The method of claim 51 wherein said information includes graphical user interface information and said metadata includes graphical user interface metadata describing associations between said graphical user interface information, said metadata, and said associated information; and
    wherein said method is further characterized by processing said graphical user interface metadata to visually create, edit, delete, or manipulate said metadata.

96. The method of claim 50 wherein the node operates as at least one of a web server and a web client.

97. The method of claim 50 wherein the associations are expressed as at least one of Uniform Resource Locaters (URLs), Uniform Resource Names (URNs), and hypertext links.

98. The method of claim 50 wherein said metadata is encoded as a MIME object when transferred.

99. A product for use in connection with a digital computer connected to a communication network, to configure and operate the computer as a node of said network, comprising a computer-readable medium and a computer program recorded thereon, the computer program comprising a series of instructions for execution in said computer and when so executed causing the computer to instantiate:
    (A) storage means for storing information;
    (B) association means for associating portions of said information with metadata, said metadata defining a control structure which is transferred in either direction between said node and another, second node of said network to associate with said associated information processes which execute instructions external to said control structure to control communications of said associated information, said metadata including at least one of
        (1) update metadata which associates with said associated information a process for determining when said portions of said information associated by said metadata have been updated and transfer metadata which associates a process for controlling the transfer at least a portion of said updated information,
        (2) data exchange metadata which associates with said associated information a process for controlling the transfer of feedback information, said feedback information including at least a portion of said information stored at the receiving node, and (3) receipt processing metadata which associates with said associated information a process for determining the processing of said associated information by comparison to an associated version of said control structure; and (C) communications means for at least one of
 (1) transferring said information, including said metadata defining said control structure, to said second node to control at least one of
  (a) transferring said updated information to said second node,
  (b) receiving said feedback information from said second node, and
  (c) processing said feedback information, and
 (2) receiving said information, including said metadata defining said control structure, from said second node to control at least one of
  (a) receiving said updated information from said second node,
  (b) processing said updated information, and
  (c) transferring said feedback information to said second node.

* * * * *